US012377351B2

(12) United States Patent
Dalmia et al.

(10) Patent No.: US 12,377,351 B2
(45) Date of Patent: Aug. 5, 2025

(54) CROSS-CHANNEL BLOCKCHAIN AND METAVERSE INTEGRATION SOLUTIONS FOR GAMING SYSTEMS

(71) Applicant: SG Gaming, Inc., Las Vegas, NV (US)

(72) Inventors: Mili Dalmia, Bangalore (IN); Sunil Somanna T S, Bangalore (IN); Ramesh Gandhi Mathiyalagan, Chennai (IN)

(73) Assignee: LNW Gaming, Inc., Las Vegas, NV (US)

( * ) Notice: Subject to any disclaimer, the term of this patent is extended or adjusted under 35 U.S.C. 154(b) by 306 days.

(21) Appl. No.: 18/081,778

(22) Filed: Dec. 15, 2022

(65) Prior Publication Data

US 2023/0201725 A1   Jun. 29, 2023

Related U.S. Application Data

(60) Provisional application No. 63/294,110, filed on Dec. 28, 2021.

(51) Int. Cl.
*A63F 13/792* (2014.01)
*A63F 13/77* (2014.01)
*G06F 21/60* (2013.01)
*G07F 17/32* (2006.01)

(52) U.S. Cl.
CPC ............ *A63F 13/77* (2014.09); *A63F 13/792* (2014.09); *G06F 21/602* (2013.01); *G07F 17/3225* (2013.01); *G07F 17/3244* (2013.01); *A63F 2300/5513* (2013.01); *A63F 2300/552* (2013.01)

(58) Field of Classification Search
CPC .......................... A63F 13/792; G07F 17/3244
See application file for complete search history.

(56) References Cited

U.S. PATENT DOCUMENTS

| | | | |
|---|---|---|---|
| 11,151,838 B2 | 10/2021 | Ragnoni et al. | |
| 11,195,371 B2 | 12/2021 | Purohit et al. | |
| 11,263,866 B2 | 3/2022 | Purohit et al. | |
| 11,308,761 B2 | 4/2022 | Purohit et al. | |
| 11,331,579 B1 * | 5/2022 | Koch | A63F 13/71 |
| 11,369,878 B1 * | 6/2022 | Koch | A63F 13/65 |
| 11,373,480 B2 | 6/2022 | Taylor et al. | |
| 11,504,631 B1 * | 11/2022 | Koch | A63F 13/69 |

(Continued)

*Primary Examiner* — Jay Trent Liddle
(74) *Attorney, Agent, or Firm* — Dority & Manning, P.A.

(57) ABSTRACT

Systems and methods are provided for gaming solutions across different gaming channels, different entities, and different environments using non-fungible token (NFT), blockchain, and/or metaverse components and/or functionality. A gaming device in a physical gaming environment can be synced with a gaming device in a metaverse gaming environment. NFTs can be associated with users, gaming devices, gameplay outcomes, and/or vouchers. NFTs can be actioned to players in a gaming computing environment through one or more gaming channels. NFTs can be actioned across different gaming channels, different entities, and different environments. A cross-channel application can pair a user computing device with a first gaming channel and apply a non-fungible token for personalization of the first gaming channel. The cross-channel application can pair the user computing device with a second gaming channel and a apply the NFT for personalization of the second gaming channel.

18 Claims, 42 Drawing Sheets

(56) References Cited

U.S. PATENT DOCUMENTS

| | | | |
|---|---|---|---|
| 2019/0130701 A1* | 5/2019 | Simons | G07F 17/3288 |
| 2020/0380817 A1 | 12/2020 | Purohit et al. | |
| 2020/0380825 A1 | 12/2020 | Purohit et al. | |
| 2020/0380826 A1 | 12/2020 | Taylor et al. | |
| 2021/0074120 A1 | 3/2021 | Ragnoni et al. | |
| 2021/0118085 A1* | 4/2021 | Bushnell | H04L 9/50 |
| 2021/0174634 A1 | 6/2021 | Purohit et al. | |
| 2021/0335093 A1 | 10/2021 | Zhu et al. | |
| 2022/0005316 A1 | 1/2022 | Ragnoni et al. | |
| 2022/0084368 A1* | 3/2022 | Merati | G06Q 50/34 |
| 2022/0092925 A1 | 3/2022 | Purohit et al. | |
| 2022/0165125 A1 | 5/2022 | Purohit et al. | |
| 2022/0237985 A1 | 7/2022 | Purohit et al. | |
| 2022/0327893 A1 | 10/2022 | Taylor et al. | |
| 2022/0358450 A1* | 11/2022 | Stephens | H04L 9/3213 |
| 2023/0055064 A1 | 2/2023 | Dalmia et al. | |
| 2023/0182025 A1* | 6/2023 | Benedetto | G06Q 20/0655 |
| | | | 463/42 |
| 2024/0181349 A1* | 6/2024 | Lee | A63F 13/35 |

\* cited by examiner

Ledger Explorer

Latest Blocks

| Time | Height | Mined By | Transactions | Size |
|---|---|---|---|---|
| AA | XX | LL | KKKK | MM |
| AA | XX | JJ | KKKKK | JJ |
| AA | CC | JNN | KKK | HH |
| AA | XC | JJ | KK | AA |
| AA | AA | HH | GG | AA |
| AA | AA | HH | HH | AS |
| AA | GG | JJ | HHH | SS |

Latest Transactions

| Transaction ID | Output | Details |
|---|---|---|
| KKKK | FFF | View |
| KKK | FDS | View |
| AA | AAA | View |
| AAA | AA | View |
| AA | AAA | View |
| AAA | AAA | View |
| AAA | AAA | View |

FIG. 9

CROSS-CHANNEL BLOCKCHAIN AND METAVERSE INTEGRATION SOLUTIONS FOR GAMING SYSTEMS

PRIORITY CLAIM

The present application claims the benefit of priority of U.S. Provisional Application Ser. No. 63/294,110, titled "Cross-Channel Blockchain and Metaverse Integration Solutions for Gaming Systems", filed on Dec. 28, 2021, which is incorporated herein by reference.

FIELD

The present disclosure relates to integrated computer-implemented gaming systems, digital ledger systems, and metaverse systems.

BACKGROUND

Conventional gaming systems include many different types of games that are provided to users through a variety of different gaming channels. For instance, wagering game machines, such as slot machines, video poker machines and the like, have been a central part of the gaming industry for several years. Generally, the popularity of such machines depends on the likelihood (or perceived likelihood) of winning money or other awards of value at the machine and the intrinsic entertainment value of the machine relative to other available gaming options. In some cases, the perceived likelihood of winning something of value at a machine may be based on the amount of trust users place in the machine and machine operator.

Similarly, there are many online games that can be played using a computer system coupled to a communication network (e.g., the Internet). These games include traditional games of chance, games of skill, and casino-type games, among others. Additionally, various types of gaming terminals have become more popular in recent years. Handheld wagering game machines and docking stations are provided in some environments that enable wagering and other types of game play using handheld devices.

Further, many different types of games are provided that involve the issuance of a lottery ticket to play a game of chance. Lottery tickets are often sold through retailers using machines referred to as point of sale (POS) terminals. These tickets are generally printed at the POS terminal, and are usually issued for a lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

Some conventional systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. However, the game seed itself is not indicative of any outcome or progress of the game. In another type of conventional system, the code stored on the ticket is an encoded form of the lottery result, which is then revealed to the player at the end of play of an online game. This code also is not indicative of the outcome or progress of the game.

As a further aspect, many gaming entities such as gambling establishments (e.g., casino, lottery or other lawful physical or online gambling establishments) utilize various different systems and methods to keep their players engaged and interested in their brand. Player loyalty clubs, "member's only" clubs, or similar programs are a common method used by gambling establishments to attempt to achieve this goal. These clubs typically provide one or more benefits to players, such as discounts, advanced notification of news and events, mailing lists, and other benefits.

With the prevalence of a wide variety of gaming systems being available over numerous gaming channels, a number of systems have been proposed to provide improvements to user gaming experiences. For example, some systems allow users to earn rewards in association with gameplay associated with a user account or reward card. These rewards can be applied to future physical and/or online gameplay or used to redeem other items of value. Some of these systems allows users to track their gameplay so they can view historical activity across a gaming channel.

While traditional systems seek to increase user engagement through new and interesting games, loyalty clubs, and the like, these systems are typically brand-specific and limited to a single gaming channel. A user wishing to redeem or apply a reward is often limited in their ability to do so. For example, there may be use restrictions limiting redemption to certain parties or at particular locations. Moreover, many of these systems do not provide transferrable instruments nor the ability to record information relating to rewards and/or redemptions.

BRIEF DESCRIPTION OF THE DRAWINGS

Detailed discussion of embodiments directed to one of ordinary skill in the art are set forth in the specification, which makes reference to the appended figures, in which:

FIG. 9 illustrates an example graphical user interface provided by an NFT portal system in accordance with example embodiments of the present disclosure;

DETAILED DESCRIPTION

Figure 1:
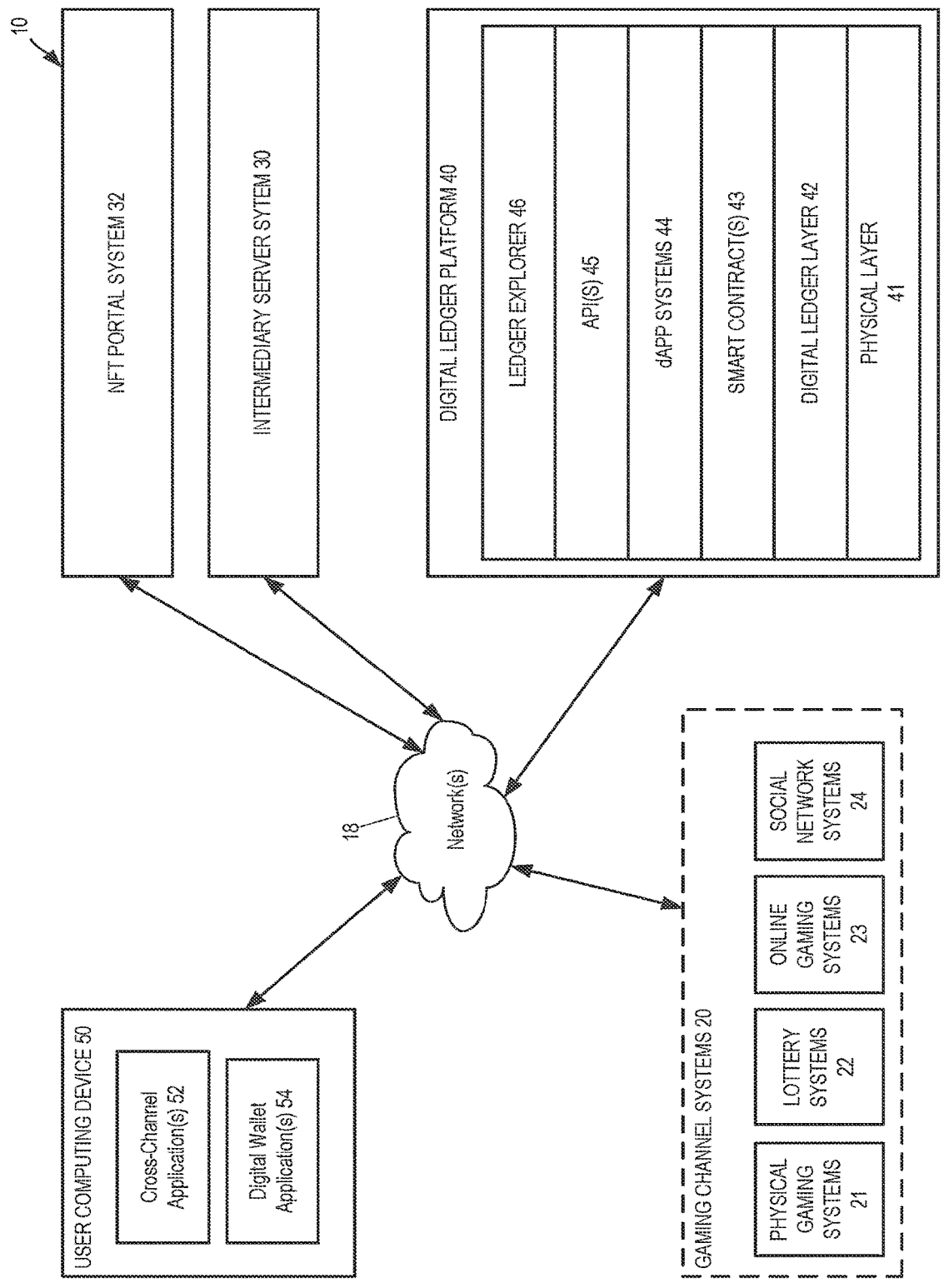
FIG. 1 is a block diagram depicting an example gaming computing environment including a blockchain platform in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In general, embodiments in accordance with the present disclosure are directed to systems and methods that enable gaming solutions across multiple gaming channels using non-fungible tokens and a blockchain infrastructure to manage one or more aspects of gameplay. Non-fungible tokens can be actioned to players in a gaming computing environment through one or more of the gaming channels. By way of example, a non-fungible token (NFT) can be actioned to a player through an electronic gaming machine (EGM), a lottery system, an online game, a social network, or other gaming channel. NFTs can be offered within the gaming computing environment in a variety of forms. NFTs can include representations of real-world digital assets, such as digital assets including gameplay characters or representations of state within a game. Examples of NFTs can include audio clips, game symbols, trump cards, spaces, badges, characters, moments, backgrounds, and bonus awards. Example NFT actions in the gaming system can include making an NFT, trading an NFT, awarding an NFT, creating equity in an NFT, buying an NFT, depleting/recharging an NFT, winning an NFT, lending/leasing an NFT, publishing a time to availability map of an NFT (e.g., Roadmap NFT), loaning an NFT, providing a bond NFT, providing an identity (e.g., of a player) via an NFT, insuring an NFT, or other action relating to the generation, modification, transfer of an NFT.

By way of example, one aspect of the present disclosure provides an NFT portal (also referred to as NFT marketplace) that enables users to purchase NFTs that may have a limited supply. The NFTs may be actioned by or for a user within one or more gaming channels of the gaming system. For instance, the user may pair with a particular gaming channel using a cross-channel application. The cross-channel application may enable traditional digital wallet and/or crypto wallet functionalities such as making payments in traditional currency and/or cryptocurrency and/or managing NFT assets. Additionally, the cross-channel application can facilitate NFT interaction within multiple different gaming channels of a gaming computing environment. A particular gaming channel, for example, may offer NFT-enabled content. The channel may detect compatible-NFT offers associated with a cross-channel application of the player and provide the player with an option to apply the NFT to the content of the channel. If the player accepts, the NFT is applied to the gaming channel. The NFT may be perceived as increasing in value if the player wins a game while the NFT is applied. The player may elect to action the NFT by selling the NFT via an NFT portal, a cross-channel application, a gaming channel, or a standard NFT marketplace. The original purchase transaction and the sell transaction from the first player to the second player can be recorded using one or more blocks of a blockchain which can be viewed publicly, using a blockchain explorer for example.

According to one example aspect of the present disclosure, a gaming system can include a plurality of gaming channels. In some examples, one or more of the gaming channels are associated with at least one channel server. For example, an online gaming channel can include an online game that is hosted on one or more host channel servers. One or more intermediary servers communicate with the various channel servers to action NFTs across the various gaming channels. The intermediary server(s) may provide personalization data based on NFT data received from the digital ledger platform. In another example, the NFT data may be provided to the gaming channel which can generate a personalized user experience directly based on the NFT data. A user device can interface with one or more of the gaming channels via a cross-channel application that enables NFT functionality across the different gaming channels. By way of example, a user may pair their user device (e.g., smartphone) to an electronic gaming machine to enable a personalized NFT experience at the gaming machine based on one or more NFTs associated with the user. The user may create or win other NFTs during gameplay associated with the EGM. The user may later visit another gaming location (either virtually or physically) having a different gaming channel. The player may utilize a cross-channel application to apply the NFT within the different gaming channel. For example, the player may visit a sports booking website and display an NFT badge earned through gameplay at the first EGM. Further, the user may conduct NFT transactions (e.g., buying NFTs, selling NFTs) via an NFT portal operated by the gaming system. Additionally or alternatively, a user may conduct NFT transactions via a standard mobile phone or via a standard NFT marketplace.

The gaming system can further include a digital ledger platform to support NFT functionality across the various gaming channels. The digital ledger platform can include one or more digital ledgers to record transactions associated with NFTs of the gaming system and optionally one or more smart contracts associated with certain ones of the NFTs. The smart contracts can execute a machine-readable contract or agreement in association with one or more of the NFTs. The combined use of smart contracts with NFTs in a gaming system enables various different types of gameplay previously not possible or practical with simple player accounts and in-game purchases for instance. Because of the inherent safety and security associated with NFTs, a player can place trust in the purchase, use, and transfer of gameplay NFTs. For example, a player can view all transactions relating to an NFT with knowledge that the NFT is publicly viewable. Moreover, an intermediary server system as provided herein can bridge the decentralized blockchain framework with a centralized gaming infrastructure to provide security and regularity compliance.

By way of example, an NFT such as a badge or character may be awarded to or purchased by a first player via a first gaming channel. A smart contract for the NFT may define a set of rules or agreements that provide value in association with gameplay of the NFT. For instance, the smart contract may define a first set of player rewards in association with ownership of the NFT. The first set of player rewards may be associated with the NFT being in a first state after having initially being purchased or awarded. The smart contract may define a second set of player rewards in association with the NFT being in a second state. For example, the smart contract may define that a certain number of hours of play in association with the NFT or a certain level achieved in gameplay while displaying the NFT result in the NFT being in or otherwise associated with a second state. As a result of the associated awards, the NFT may have a different perceived value based on its associated state. The first player may elect to transfer all or partial ownership in the NFT to a second player. In some instances, a smart contract may further specify automated actions to occur upon transfer. For example, the smart contract may specify a fee to be paid to a third party (e.g., the NFT issuer) by one or more of the transferring parties if an ownership interest in the NFT is sold.

An NFT history including state changes and transfers are recorded on a blockchain. As such, any party interacting with the NFT has access to all information relating to an NFT. As such, the first party can trust that the NFT will be tracked and transactions relating to the NFT and the first player will be tracked on an open blockchain. The second party can view these transactions and understand the open history of the NFT prior to purchase. In this manner, an NFT based game element provides a transaction history to be tracked and stored in a publicly accessible ledger to enable secure gameplay where all parties can place trust in an open framework.

According to one example aspect of the present disclosure, multi-state NFTs are provided by the digital ledger platform. A multi-state NFT can include a plurality of NFT states managed by the blockchain platform. At least one state can correspond to a fully charged state while at least one other state can correspond to a depleted or uncharged state. Other states may exist at levels higher than the depleted state and lower than the fully charged state. Each state may be associated with a different set of player privileges in example embodiments. The state of the NFT can be based on time and/or spend criteria.

As another example, a player can obtain a non-fungible token through gamification. For instance, a player can win or otherwise receive ownership of at least a share of a non-fungible token through gameplay patterns. Examples of gameplay patterns include a winning streak, losing streak, jackpot, lucky combination, etc. Future gameplay patterns can provide increased reward to the player. Examples of increased reward include higher-level non-fungible tokens, larger wins, etc.

To facilitate responsible gaming, a player can purchase a responsible gaming NFT. As another example, a player can obtain a non-fungible token as a reward for responsible gaming.

As another example, a player can obtain a non-fungible token as a reward for responsible gaming. For instance, a player can win or otherwise receive ownership of at least a share of a non-fungible token through responsible gameplay patterns. For instance, the responsible gameplay patterns can be indicative of a user gaming with reasonable wagers, limited time commitment, etc. As an example, the player can play on an NFT-enabled game channel. A responsible gaming NFT can be awarded in response to detecting a responsible gameplay pattern by the player on the gaming channel.

Additionally, the present disclosure can provide for playing NFT-enabled multiplayer games on various gaming channels. For instance, one multiplayer NFT-enabled game can be played by multiple players through multiple channels offering the same multiplayer NFT-enabled game. Examples of multiplayer games include, but are not limited to, multiplayer poker, real estate trading games, Bingo, electronic table games (e.g., roulette, craps, etc.), snake and ladder, etc.

A voting NFT in accordance with one or more embodiments of the present disclosure can be acquired by one or more users associated with a computing and/or gaming environment described herein. The voting NFT can provide a user with a voting right that allows the user to cast a vote in favor of a certain candidate in a contest and/or an election associated with a gaming environment (e.g., a real, physical gaming environment and/or a virtual, computer-implemented gaming environment).

A pooled NFT in accordance with one or more embodiments of the present disclosure can be acquired by one or more users associated with a computing and/or gaming environment described herein. The pooled NFT can include and/or represent different ownership shares of respective individual users that can be associated with a computing and/or gaming environment described herein, where the individual users can collectively acquire the pooled NFT. Any user having an ownership interest in the pooled NFT can act on behalf of a plurality of individual users (pooled users) associated with such a gaming environment. In one example embodiment, individual users can respectively acquire an ownership share of a pooled NFT using, for instance, currency (e.g., cryptocurrency or real currency) and/or one or more NFTs respectively acquired by the individual users in accordance with one or more embodiments of the present disclosure.

A progressive NFT in accordance with one or more embodiments of the present disclosure can be acquired by one or more users associated with a computing and/or gaming environment described herein. A progressive NFT can allow a user to opt into an NFT progressive pool associated with a game (e.g., a lottery, a poker game, etc.) and/or a play instance of a game (e.g., a single drawing in a lottery, a single hand played in a poker game) in a gaming channel (e.g., a progressive NFT enabled gaming channel). The user can opt into an NFT progressive pool by implementing a progressive NFT in a game and/or in a play instance of a game in a gaming channel (e.g., a progressive NFT enabled gaming channel) and submit a supplemental wager to the NFT progressive pool in addition to an original wager submitted by the user in the game or the play instance of the game. In various embodiments, if a user has opted into such an NFT progressive pool and the outcome of the game and/or the play instance of the game is a win with respect to the NFT progressive pool, the portion of the NFT progressive pool jackpot (e.g., payout) allocated for the user can be distributed to the user in the form of one or more NFTs and/or currency (e.g., cryptocurrency or real currency).

A pact NFT in accordance with one or more embodiments of the present disclosure can be acquired by one or more users associated with a computing and/or gaming environment described herein. The pact NFT can include and/or represent a pact (e.g., an agreement) between individual users to split any gains and/or losses incurred by any individual user of the pact according to one or more predefined terms. For example, the pact NFT can include and/or represent a pact (e.g., an agreement) between individual users to split any gains and/or losses incurred by any individual user of the pact according to different ownership shares of the pact NFT held by respective individual users in the pact (e.g., according to the ownership percentage of the pact NFT held by each individual user in the pact).

A lottery NFT in accordance with one or more embodiments of the present disclosure can be acquired by one or more users associated with a computing and/or gaming environment described herein. The lottery NFT can include and/or represent a lottery ticket. A lottery NFT can include a lottery draw date indicative of the date on which a gaming channel, such as a lottery NFT enabled gaming channel, will implement a lottery game associated with the lottery NFT and determine a lottery NFT winner. A lottery NFT enabled gaming channel can implement the lottery game and/or determine the lottery NFT winner using, for instance, one or more random draw algorithms. If a lottery NFT acquired by a user is determined to be the lottery NFT winner, the user can be notified by the lottery NFT enabled gaming channel and claim the payout at one or more lottery NFT enabled gaming channels associated with a gaming environment.

A bond NFT in accordance with one or more embodiments of the present disclosure can be acquired by one or more users associated with a computing and/or gaming environment. The bond NFT can include and/or represent an underlying NFT that can be used by an owner of the bond NFT if and when the owner elects to exercise the bond NFT upon expiration of one or more lock-in periods (e.g., predefined time periods and/or dates) that can be associated with the bond NFT. In some embodiments, the bond NFT can be inactive and/or valueless until expiration of a first lock-in period in such one or more lock-in periods.

An NFT in accordance with one or more embodiments of the present disclosure can be loaned via an NFT portal or marketplace as described herein. An NFT in accordance with one or more embodiments of the present disclosure be used as collateral against a loan made by a lender to a borrower, where one or more ownership interests corresponding to the NFT can transfer to the lender if the borrower defaults on the loan (e.g., if the borrower fails to repay the loan per the terms of a loan agreement executed between the borrower and the lender).

A NFT in accordance with one or more embodiments of the present disclosure can be leased by a first user (e.g., the owner, hereafter "lessor") to a second user (hereafter "lessee") according to a lease agreement between such users, where one or more ownership interests corresponding to the NFT can transfer to the lessee for the duration of the lease. The lease agreement can be defined by one or more smart contracts in example embodiments. The lease agreement in accordance with one or more embodiments of the present disclosure can define various terms of the lease, such as duration of the lease and/or dividends to be paid by the lessee to the lessor for the duration of the lease. In some embodiments, upon expiration of the lease agreement, one or more ownership interests corresponding to the NFT can transfer back to the lessor. In some embodiments, upon a breach of the lease agreement by lessee, one or more ownership interests corresponding to the NFT can transfer back to the lessor.

An insurance NFT in accordance with one or more embodiments of the present disclosure can be acquired by one or more users associated with a computing and/or gaming environment. The insurance NFT can include and/or represent an insurance policy (e.g., insurance agreement) underwritten by an insurer entity that can protect an asset NFT against certain events, such as theft, loss, and/or valuation loss for the duration of the insurance policy. The insurance NFT in accordance with one or more embodiments of the present disclosure can be associated with, tagged to, and/or tag along with the asset NFT that it protects. In some embodiments, a smart contract can be associated with the asset NFT and/or the insurance NFT. In these embodiments, the smart contract can collect a predefined insurance payout in response to the occurrence of a corresponding insured event as defined by the terms of the insurance policy. In some embodiments, if an insured entity (e.g., an owner of the asset NFT) fails to pay the insurance premium associated with the insurance NFT as defined by the terms of the insurance policy, the insurance NFT can be disassociated with and/or delinked from the asset NFT (e.g., via the smart contract).

An identity NFT in accordance with one or more embodiments of the present disclosure can be acquired by one or more users associated with a computing and/or gaming environment. The identity NFT can be generated to store information regarding a player identity. Other NFTs owned or otherwise associated with the player of the identity NFT can be linked to the identity NFT. In example embodiment, an identity NFT cannot be sold/transferred or re-used. It can be immutable to provide a secure record of all data and transactions associated with the identify NFT. In some examples, an identity NFT can replace all other forms of identification within a gaming environment.

A Roadmap NFT in accordance with one or more embodiments of the present disclosure can be acquired by one or more users associated with a computing and/or gaming environment. A roadmap NFT can be an NFT associated with an NFT campaign in example embodiments. An operator of a gaming system can publish a timeline for a limited number of NFTs to be bought/sold during a limited time period. All dates and quantities of the roadmap NFTs can be made available and be real-time updated on the NFT portal.

According to an example aspect of the present disclosure, a gaming provider can run an event where an NFT is selected at a certain time period and/or interval as a winning NFT. For example, an event can be established to select any random NFT that is in circulation in the market to be a special winner. A player can pair a cross-channel app with a gaming channel to win awards associated with the event. As a specific example, a gaming provider may select an NFT of the day. A player having the NFT of the day can pair their cross-channel app with a gaming channel to receive rewards associated with the NFT during the day.

As referenced herein, the term "player" refers to an entity such as, for example, a human, a user, an end-user, a consumer, an organization (e.g., a company), a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims. As referenced herein, the terms "or" and "and/or" are generally intended to be inclusive, that is (i.e.), "A or B" or "A and/or B" are each intended to mean "A or B or both." As referred to herein, the terms "first," "second," "third," etc. can be used interchangeably to distinguish one component or entity from another and are not intended to signify location, functionality, or importance of the individual components or entities. As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

Additional and/or alternative example aspects of the present disclosure are generally directed to one or more computing systems and/or methods (e.g., computer-implemented methods) that can facilitate associating a non-fungible token (NFT) with a player associated with a gaming environment. For instance, in example embodiments, a computing system described herein can associate the player's identity (e.g., the player's account identification data) with the digital asset identification data of an NFT. In some embodiments, the computing system can codify and/or manifest such an association of the player with the NFT in the form of, for example, an identification code (e.g., a quick response (QR) code) that can include data (e.g., encrypted data) that is descriptive of the association between the player and the NFT. In these or other embodiments, the computing system can provide such an identification code (e.g., a QR code) to the player (e.g., via the above-described cross-channel application) such that the player can use the identification code to implement one or more operations in the gaming environment (e.g., via one or more of the above-described gaming channels and/or NFT enabled gaming channels) according to one or more example embodiments described herein. In this manner, any or all rights and/or privileges of the player with respect to the NFT and/or the gaming environment can be represented and/or encapsulated by the identification code such that the identification code can provide the player with an NFT enabled gaming experience in the gaming environment according to one or more example embodiments of the present disclosure.

A problem with NFTs is that the digital asset identification data of an NFT and/or identification data of an owner of the NFT can be exposed to one or more third-party entities when implementing an operation and/or a transaction involving the NFT, which can cause privacy, regulatory, confidentiality, and/or security issues. Another problem with NFTs is that some computing environments and/or one or more resources thereof (e.g., software applications, hardware, infrastructure, communication protocols, services, etc.) do not provide and/or support NFT enabled operations and/or transactions. For instance, some computing environments and/or one or more resources thereof do not provide and/or support NFT enabled operations and/or transactions involving use of a decentralized digital ledger such as, for example, a blockchain. As such, use of an NFT across different computing environments can be limited or prevented entirely. In another example, a single computing environment can have one or more resources that provide and/or support NFT enabled operations and/or transactions and one or more resources that do not provide and/or support NFT enabled operations and/or transactions. In such a computing environment, use of an NFT across such resources can be limited or prevented entirely. Another problem with NFTs is that execution of NFT enabled operations and/or transactions involving use of a decentralized digital ledger such as, for instance, a blockchain can involve relatively high computational costs and/or energy consumption.

According to example embodiments of the present disclosure, a computing system such as, for instance, a computing system in a computer-based gaming environment having integrated digital ledger components and/or functionality, can associate an NFT with a player associated with a gaming environment. To facilitate such association of the NFT with the player, the computing system can include, be coupled to (e.g., communicatively, operatively, etc.), and/or otherwise be associated with one or more processors and/or one or more one or more non-transitory computer-readable storage media that can store instructions that, when executed by the one or more processors, can cause the computing system (e.g., via the one or more processors) to perform operations in accordance with one or more example embodiments described herein.

In at least one example embodiment, the computing system can obtain data indicating an NFT is to be actioned (e.g., transferred) to a player associated with a gaming environment (e.g., a real, physical gaming environment and/or a virtual, computer-implemented gaming environment). For example, in this or another embodiment, the computing system can obtain data indicating that an NFT and/or one or more ownership rights and/or privileges associated therewith are to be transferred to a player associated with a gaming environment.

In one or more embodiments described herein, based at least in part on (e.g., in response to) receipt of such data indicating the NFT is to be actioned to the player, the computing system can generate identification data that associates the NFT with the player, where the identification data can include and/or constitute embedded data descriptive of the player and the NFT. For example, in at least one embodiment, the identification data and/or the embedded data descriptive of the player and the NFT can include and/or constitute: identity data descriptive of the player (e.g., player's name, username, gaming identification number, telephone number, e-mail address, etc.); data descriptive of a player and/or a user account associated with the gaming environment that can correspond to the player (e.g., player's account identification data, telephone number, e-mail address, etc.); data descriptive of a digital wallet of the player (e.g., a traditional digital wallet, a crypto wallet, etc.); digital asset identification data corresponding to the NFT; data descriptive of an identifier corresponding to the NFT, where the identifier can include and/or constitute data indicative of a storage location where the NFT is stored (e.g., the identifier can include and/or constitute a pointer and/or a computer program object having a memory address where the NFT is stored); and/or other data descriptive of the player and the NFT. In some embodiments, the computing system can encrypt and/or otherwise encode the above-described identification data and/or embedded data descriptive of the player and the NFT such that the data is protected and/or secured from interception, viewing, and/or use by one or more unintended third-parties.

According to one or more embodiments of the present disclosure, the computing system can create an identification code that can include the above-described identification data and/or embedded data descriptive of the player and the NFT. For example, in at least one embodiment, based at least in part on (e.g., in response to) generating the identification data, the computing system can create an identification code such as, for instance, a barcode, a quick response (QR) code (e.g., an audio QR code, a visual QR code, etc.), an audio code, a visual code, a numeric code, a textual code, an alphanumeric code, and/or another type of code that can include the identification data and/or embedded data descriptive of the player and the NFT.

In accordance with one or more embodiments described herein, the computing system can change a status indicator corresponding to the NFT to reflect that a transfer of ownership of the NFT to the player is in progress, where the status indicator can be associated with a blockchain (e.g., a block of a blockchain) having data descriptive of the NFT (e.g., digital asset identification data corresponding to the NFT and/or an identifier that can include and/or constitute a pointer and/or a computer program object having a memory address where the NFT is stored). In these or other embodiments, the computing system can change the state of such a status indicator to reflect that a transfer of ownership of the NFT to the player is in progress to prevent the NFT from being actioned (e.g., transferred) to another entity (e.g., another player, an entity of another gaming environment, etc.) while the computing system is generating the above-described identification data that associates the NFT with the player and/or the above-described identification code that can include such identification data.

In one example embodiment, the computing system can change the state of such a status indicator to reflect that a transfer of ownership of the NFT to the player is in progress upon receipt of the above-described data indicating the NFT is to be actioned to the player. For instance, in this example embodiment, the computing system can change the state of such a status indicator to reflect that a transfer of ownership of the NFT to the player is in progress before the computing system generates the identification data and/or the identification code. In another example embodiment, the computing system can change the state of such a status indicator to reflect that a transfer of ownership of the NFT to the player is in progress while (e.g., concurrently, at the same time) the computing system is generating the identification data and/or the identification code.

In at least one embodiment described herein, the computing system can associate one or more rights and/or privileges with the identification data, the identification code, the NFT, and/or the player, where the one or more rights and/or privileges can be associated with the gaming environment and/or another gaming and/or computing environment. For example, in this or another embodiment, the computing system can associate the identification data and/or the identification code with one or more rights and/or privileges of the player with respect to the NFT and/or the gaming environment (e.g., right(s) and/or privilege(s) granted and/or assigned to the player via ownership of the NFT and/or via the gaming environment). In an embodiment, the computing system can associate the identification data and/or the identification code with such right(s) and/or privilege(s) of the player during (e.g., concurrently) and/or after generation of the identification data and/or the identification code.

According to one or more embodiments of the present disclosure, the computing system can provide the above-described identification code to the player. For example, in these one or more embodiments, based at least in part on (e.g., in response to) creating the identification code, the computing system can provide the identification code to the player via, for instance, a network (e.g., a wide area network (WAN), a local area network (LAN), the Internet, etc.) and/or the cross-channel application described above that can be installed on and/or executed on a computing device (e.g., a smart phone, laptop, tablet, etc.) associated with the player.

In at least one embodiment described herein, upon receipt of the identification code, the computing system can request that the player provide the computing system with confirmation of the player's receipt and/or acceptance of the identification code, the NFT, data descriptive of the NFT, and/or data indicative of the location of the NFT. In this or another embodiment, upon receipt of the identification code, the player can provide the computing system (e.g., via the above-described cross-channel application) with confirmation of the player's receipt and/or acceptance of the identification code, the NFT, data descriptive of the NFT, and/or data indicative of the location of the NFT. In some embodiments, upon receipt of the identification code, the player can verify the authenticity of the NFT (e.g., via the above-described cross-channel application, a blockchain explorer, etc.) and/or provide the computing system with confirmation that the NFT is authentic (e.g., via the above-described cross-channel application). For example, in one embodiment, the identification code and/or the above-described identification data that can associate the player with the NFT can include data descriptive of the NFT and/or data indicative of the location of the NFT (e.g., the above-described identifier and/or pointer). In this example embodiment, the player can thereby view the data descriptive of the NFT and/or access (e.g., view, execute, use, etc.) the NFT to confirm its authenticity and, if authentic, provide the computing system with such confirmation of the NFT authenticity.

According to one or more embodiments of the present disclosure, upon receiving confirmation of the player's receipt and/or acceptance of the identification code, the computing system can change a status indicator corresponding to the NFT to reflect that a transfer of ownership of the NFT to the player is complete, where the status indicator can be associated with a blockchain (e.g., a block of a blockchain) having data descriptive of the NFT (e.g., digital asset identification data corresponding to the NFT and/or an identifier that can include and/or constitute a pointer and/or a computer program object having a memory address where the NFT is stored). In these or other embodiments, the computing system can change the state of such a status indicator to reflect that a transfer of ownership of the NFT to the player is complete to inform other entities (e.g., another player, an entity of another gaming environment, etc.) that the NFT is currently unavailable for transfer.

In one or more embodiments described herein, upon receiving confirmation of the player's receipt and/or acceptance of the identification code, the computing system can record data descriptive of a transfer of ownership of the NFT to the player on a blockchain. For example, in these one or more embodiments, the computing system can record (e.g., by using a smart contract associated with the NFT), on one or more blocks of a blockchain, data that can include, for instance: data descriptive of the identity of the player; data descriptive of the NFT; data indicative of a location of the NFT (e.g., the above-described identifier and/or pointer); data indicative of the player's ownership of the NFT; data descriptive of the identification code; data descriptive of the identification data; data descriptive of the above-described embedded data descriptive of the player and the NFT; and/or other data that can reflect ownership of the NFT by the player.

In at least one example embodiment, upon receiving confirmation of the player's receipt and/or acceptance of the identification code, the computing system can store data descriptive of the association of the player with the NFT on the above-described one or more non-transitory computer-readable storage media that can be included in, coupled to, and/or otherwise associated with the computing system. For example, in this or another example embodiment, the computing system can store, on such one or more non-transitory computer-readable storage media, data that can include, for instance: data descriptive of the identification code; data descriptive of the identification data; data descriptive of the above-described embedded data descriptive of the player and the NFT; data descriptive of the NFT (e.g., digital asset identification data); and/or other data that can reflect the association of the player with the NFT. In another embodiment, the computing system can store the NFT itself and/or data indicative of the location of the NFT (e.g., the above-described identifier and/or pointer) on such one or more non-transitory computer storage media that can be included in, coupled to, and/or otherwise associated with the computing system.

In one or more embodiments of the present disclosure, upon the computing system receiving confirmation of the player's receipt and/or acceptance of the identification code, the player can use the identification code to implement one or more operations in the gaming environment (e.g., via one or more of the above-described gaming channels and/or NFT enabled gaming channels) according to one or more example embodiments described herein. As described above, in some embodiments, the computing system can associate the identification data and/or the identification code with one or more rights and/or privileges of the player with respect to the NFT and/or the gaming environment (e.g., right(s) and/or privilege(s) granted and/or assigned to the player via ownership of the NFT and/or via the gaming environment). In this manner, any or all rights and/or privileges of the player with respect to the NFT and/or the gaming environment can be represented and/or encapsulated by the identification code such that the identification code can provide the player with an NFT enabled gaming experience in the gaming environment according to one or more example embodiments of the present disclosure.

In accordance with one or more embodiments described herein, the computing system can receive input data indicative of the player using the identification code in the gaming environment to perform one or more operations associated with the NFT. For example, in some embodiments, the computing system can receive input data indicative of, for instance, scanned data from a scanner that has been used to scan the identification code (e.g., a QR code) and/or other input data indicative of the player's use of the identification code to perform such operation(s) associated with the NFT.

In at least one embodiment described herein, the one or more operations associated with the NFT can include, but are not limited to, for instance: validating the authenticity of the NFT (e.g., the existence of the NFT) and/or the player's ownership of the NFT; exercising, celebrating, and/or otherwise executing (e.g., implementing) the NFT and/or the underlying content associated with the NFT (e.g., content linked to and/or represented by the NFT) such as, for instance, rendering the underlying content of the NFT (e.g., an image, video, audio, game character, text, emoji, etc.) and/or data descriptive of the player's identity (e.g., name, username, etc.) on a display (e.g., a screen and/or monitor included in, coupled to, and/or otherwise associated with the computing system); transferring ownership of the NFT from the player to one or more other entities (e.g., another player, an entity associated with another computing and/or gaming environment, etc.); transferring one or more ownership rights and/or privileges of the NFT from the player to one or more other entities (e.g., another player, an entity associated with another computing and/or gaming environment, etc.); providing (e.g., via the above-described cross channel application) the player with an audit trail descriptive of one or more transactions corresponding to the NFT and/or data descriptive of the NFT; providing (e.g., via a network such as, for instance, a WAN, a LAN, the Internet, etc.) data indicative of the above-described identification data, data indicative of the NFT, and/or data descriptive of the player (e.g., name, username, etc.) to one or more remote computing devices (e.g., to a remote computing device (e.g., a server located external to the gaming environment) that provides a media platform (e.g., social media platform), where the player can exercise, celebrate, and/or otherwise execute (e.g., implement) the NFT and/or underlying content associated with the NFT on the media platform); and/or another operation associated with the NFT.

In one example embodiment, based at least in part (e.g., in response to) receipt of such input data indicative of the player using the identification code in the gaming environment to perform one or more operations associated with the NFT, the computing system can perform and/or facilitate performing such one or more operations (e.g., the computing system can forego validation of the identification code and perform and/or facilitate performing one or more of the above-described operations). In another example embodiment, based at least in part (e.g., in response to) receipt of such input data indicative of the player using the identification code in the gaming environment to perform such one or more operations associated with the NFT, the computing system can: validate the identification code against the identification data and/or the above-described embedded data descriptive of the player and the NFT; and perform and/or facilitate performing such one or more operations (e.g., one or more of the above-described operations) based at least in part on (e.g., in response to) validation of the identification code by the computing system. For example, the computing system can evaluate the identification data and/or the above-described embedded data descriptive of the player and the NFT to confirm the authenticity of the NFT (e.g., actual existence of the NFT) and/or the player's ownership of the NFT. In embodiments where the identification code and/or the embedded data descriptive of the player and the NFT is encrypted and/or otherwise encoded with protection and/or security features, the computing system can decrypt and/or decode the identification code and/or the embedded data to confirm such authenticity of the NFT and/or the player's ownership of the NFT.

According to one or more embodiments of the present disclosure, to facilitate validating the identification code against the identification data and/or the above-described embedded data descriptive of the player and the NFT (e.g., to confirm authenticity of the NFT and/or the player's ownership thereof), the computing system can access one or more storage locations and/or devices to analyze, for instance: the identification data; the embedded data descriptive of the player and the NFT; and/or the NFT. For example, in one embodiment, to facilitate such validation of the identification code, the computing system can access the above-described one or more non-transitory computer-readable storage media that can store, for instance: data descriptive of the identification code; data descriptive of the identification data; data descriptive of the above-described embedded data descriptive of the player and the NFT; data descriptive of the NFT (e.g., digital asset identification data);

data indicative of the location of the NFT (e.g., the above-described identifier and/or pointer); and/or the NFT itself. In another embodiment, to facilitate such validation of the identification code, the computing system can access the above-described one or more blocks of a blockchain that can store, for instance: data descriptive of the identity of the player; data descriptive of the NFT; data indicative of a location of the NFT (e.g., the above-described identifier and/or pointer); data indicative of the player's ownership of the NFT; data descriptive of the identification code; data descriptive of the identification data; data descriptive of the above-described embedded data descriptive of the player and the NFT; and/or other data that can reflect ownership of the NFT by the player.

In at least one embodiment described herein, based at least in part on (e.g., in response to) validation of the identification code by the computing system as described above, the computing system can perform and/or facilitate performing one or more of the above-described operations associated with the NFT. For example, in one embodiment, the computing system can provide the player with an audit trail descriptive of one or more transactions corresponding to the NFT and/or data descriptive of the NFT based at least in part on validation of the identification code by the computing system against the above-described identification data and/or embedded data descriptive of the player and the NFT.

In some embodiments, the computing system can disassociate the NFT from the player. For example, in one or more embodiments, based on receiving input data (e.g., via the above-described cross-channel application) indicating the player's intent to transfer ownership of the NFT to another entity (e.g., another player, an entity associated with another computing and/or gaming environment, etc.), the computing system can validate the player's ownership interests associated with the NFT and further disassociate the player from the NFT. For instance, in at least one embodiment, the computing system can disassociate the player from the NFT by, for instance, deleting the above-described identification data that can associate the NFT with the player and/or the above-described data descriptive of the player and the NFT that can be embedded in such identification data. In some embodiments, the computing system can disassociate the player from the NFT by, for instance, deleting and/or removing, from one or more storage locations (e.g., a blockchain, the above-described one or more non-transitory computer-readable storage media, etc.), such identification data and/or such data descriptive of the player and the NFT that can be embedded in the identification data.

Aspects of the present disclosure provide numerous technical effects and benefits. For example, in multiple embodiments of the present disclosure, the above-described computing system and/or identification code that can associate a player with an NFT can provide the player with an NFT enabled gaming experience across multiple gaming channels of a gaming environment while protecting and/or keeping confidential, the digital asset identification data of the NFT.

In some embodiments, the above-described computing system and/or identification code can also provide the player with an NFT enabled gaming experience across one or more gaming channels of one or more gaming and/or computing environments, regardless of whether such environments have one or more resources (e.g., software applications, hardware, infrastructure, communication protocols, services, etc.) that provide and/or support NFT enabled operations and/or transactions involving use of a decentralized digital ledger such as, for example, a blockchain. That is, for instance, the computing system and/or identification code according to example embodiments of the present disclosure can allow for elimination (e.g., by the computing system and/or one or more resources thereof and/or associated therewith) of the task of accessing data on a blockchain (e.g., each time a player utilizes the identification code to access and/or implement the NFT) to confirm authenticity of an NFT (e.g., the existence of an NFT) and/or a player's ownership interest(s) associated with such an NFT. Consequently, in these or other embodiments, the computing system and/or identification code can provide a heterogeneity solution for heterogenous computing and/or gaming systems such that a player associated with one or more of such systems can have an NFT enabled experience across one or more gaming channels of at least one of such computing and/or gaming systems.

Further, as the computing system and/or identification code according to example embodiments of the present disclosure can allow for elimination of the task of accessing data on a blockchain to confirm authenticity of an NFT (e.g., the existence of an NFT) and/or a player's ownership interest(s) associated with such an NFT, the computing system and/or identification code can thereby improve performance, efficiency, and/or workload capacity (e.g., improved bandwidth of communication channels, improved processing capacity, etc.) of one or more resources (e.g., computing devices, network communication components, software applications, etc.) that perform and/or are otherwise involved with one or more operations associated with utilizing an NFT in one or more gamming channels of a computing and/or gamming system (e.g., NFT creation, modification, transfer, implementation, communication, etc.). For example, as the computing system and/or identification code according to example embodiments of the present disclosure can allow for elimination (e.g., by the computing system and/or one or more resources thereof and/or associated therewith) of the task of accessing data on a blockchain (e.g., each time a player utilizes the identification code to access and/or implement an NFT) to confirm authenticity of the NFT and/or a player's ownership interest(s) associated with the NFT, the computing system and/or identification code can thereby eliminate one or more computationally expensive and/or energy consuming operations that would otherwise be performed by such one or more resources in accessing such data on a blockchain. Therefore, the computing system and/or identification code according to example embodiments of the present disclosure can improve the performance, efficiency, and/or workload capacity of such one or more resources. Accordingly, the computing system and/or identification code according to example embodiments of the present disclosure can thereby also reduce computational costs and/or energy consumption associated with such one or more resources.

Additional and/or alternative example aspects of the present disclosure are generally directed to one or more computing systems and/or methods (e.g., computer-implemented methods) that can facilitate integration of NFT and/or metaverse components and/or functionality in a gaming environment to provide a player with a borderless, boundaryless, and interleaved real-virtual world gaming experience across different gaming channels, different entities (e.g., different gaming organizations, different casinos, different product and/or service providers, etc.), and/or different environments (e.g., different gaming environments, different physical real-world environments, different computer-based environments, etc.). For instance, in example embodiments, a computing system described herein can sync, couple, and/or otherwise associate a metaverse gaming device of a metaverse gaming environment (e.g., a virtual and/or digital gaming device that can be implemented in a metaverse gaming environment) with a physical gaming device of a physical gaming environment (e.g., a real gaming device and/or a real gaming table that can be implemented in a physical gaming environment such as, for instance, a casino). For example, the computing system can sync, couple, and/or otherwise associate the metaverse gaming device with the physical gaming device such that one or more activities and/or operations associated with one of such devices is also associated with the other device. As an example, in one embodiment, the computing system can sync, couple, and/or otherwise associate the metaverse gaming device with the physical gaming device such that an outcome of a gameplay executed via the physical gaming device in the physical gaming environment can also be the outcome of the gameplay that can be output (e.g., simultaneously, in real-time) by the metaverse gaming device in the metaverse gaming environment.

In some embodiments described herein, the computing system can associate an NFT with an outcome of a gameplay that can be executed via the metaverse gaming device or the physical gaming device and/or provide the NFT to a player that participated in the gameplay via the metaverse gaming device in the metaverse gaming environment or via the physical gaming device in the physical gaming environment. In these or other embodiments, the computing system can configure the NFT such that it is redeemable by different entities in the metaverse gaming environment, the physical gaming environment, and/or another environment (e.g., by a different real-world casino, by a non-gaming organization (e.g., a product and/or service vendor), and/or by another entity). For instance, in at least one embodiment, the computing system can configure the NFT such that it constitutes, corresponds to, and/or is otherwise associated with, for example, a voucher that can be redeemed (e.g., to transfer ownership of the NFT) by such different entities in the metaverse gaming environment, the physical gaming environment, and/or another environment.

In at least one embodiment of the present disclosure, the computing system can associate an NFT with a player associated with a metaverse gaming environment (also referred to herein as a "metaverse player" or "metaverse user"). For example, in one or more embodiments, the computing system can associate the NFT with a metaverse player associated with a metaverse gaming environment, an account of the metaverse player (e.g., a metaverse gaming account), and/or one or more privileges of the metaverse player, where the one or more privileges can be associated with the metaverse gaming environment, the physical gaming environment, and/or another environment (e.g., another physical environment, computing environment, and/or computer-based gaming environment).

In one or more embodiments, the computing system can associate the metaverse gaming device and/or the physical gaming device with an NFT. In one example embodiment, the computing system can associate the physical gaming device with an NFT such that the NFT constitutes a representation of the physical gaming device in the metaverse gaming environment. In another example embodiment, the computing system can associate the metaverse gaming device with an NFT such that the NFT constitutes a representation of the metaverse gaming device in the physical gaming environment. In these or other embodiments, such an NFT can be used in the metaverse gaming environment and/or the physical gaming environment to implement and/ or reflect one or more events corresponding to the physical gaming device that occur in the physical gaming environment and/or one or more events corresponding to the metaverse gaming device that occur in the metaverse gaming environment (e.g., transfer of ownership of the physical gaming device and/or the metaverse gaming device).

A problem with physical and/or metaverse gaming devices and/or environments is that the various attributes, assets, activities, operations, and/or associations of a physical gaming device and/or environment are compartmentalized and/or disconnected from that of a metaverse gaming device and/or environment. For example, a player that wins a gameplay executed by a metaverse gaming device and is thereafter awarded a digital asset (e.g., an NFT) is not able to redeem the digital asset via different gaming entities associated with one or more physical gaming environments and/or via other entities (e.g., product and/or service vendors) associated with one or more other physical, real-world environments. As another example, physical gaming devices and/or environments do not allow for players in a metaverse gaming environment to concurrently participate in a game together with other players participating in the game in the physical gaming environment or vice versa (e.g., metaverse gaming devices and/or environments do not allow for players in a physical gaming environment to concurrently participate in a game together with other players participating in the game in the metaverse gaming environment).

Another problem with some physical and/or metaverse gaming devices and/or environments is that one or more resources thereof (e.g., software applications, hardware, infrastructure, communication protocols, services, etc.) do not provide and/or support NFT enabled operations and/or transactions. For instance, some of such devices, environments, and/or one or more resources thereof do not provide and/or support NFT enabled operations and/or transactions involving use of a decentralized digital ledger such as, for example, a blockchain. As such, use of an NFT across such physical and/or metaverse gaming devices and/or environments can be limited or prevented entirely. A problem with some physical and/or metaverse gaming devices and/or environments that do have resources that provide and/or support NFT enabled operations and/or transactions is that execution of NFT enabled operations and/or transactions involving use of a decentralized digital ledger such as, for instance, a blockchain can involve relatively high computational costs and/or energy consumption.

According to example embodiments of the present disclosure, a computing system such as, for instance, a computing system in a computer-based gaming environment having integrated digital ledger components and/or functionality, can integrate NFT and/or metaverse components and/or functionality in a gaming environment to provide a player with a borderless, boundaryless, and interleaved real-virtual world gaming experience across different gaming channels, different entities (e.g., different gaming organizations, different casinos, different product and/or service providers, etc.), and/or different environments (e.g., different gaming environments, different physical real-world environments, different computer-based environments, etc.). To facilitate such integration of the NFT and/or metaverse components and/or functionality in a gaming environment, the computing system can include, be coupled to (e.g., communicatively, operatively, etc.), and/or otherwise be associated with one or more processors and/or one or more one or more non-transitory computer-readable storage media that can store instructions that, when executed by the one or more processors, can cause the computing system (e.g., via the one or more processors) to perform operations in accordance with one or more example embodiments described herein.

In one or more embodiments, the computing system can generate, implement, host, manage, and/or otherwise be involved with the creation and/or operation of a metaverse gaming environment and/or one or more metaverse gaming devices thereof to facilitate integration of NFT and/or metaverse components and/or functionality in a gaming environment in accordance with one or more embodiments described herein. In some embodiments, to facilitate integration of NFT and/or metaverse components and/or functionality in a gaming environment in accordance with one or more embodiments of the present disclosure, the computing system can generate, implement, host, manage, and/or otherwise be involved with the creation and/or operation of one or more metaverse gaming devices of a metaverse gaming environment that is operated by and/or otherwise associated with a remote computing system that is external to the computing system described herein. In some embodiments, the computing system can generate, implement, host, manage, and/or otherwise be involved with the creation and/or operation of one or more physical gaming devices (e.g., an electronic gaming machine (EGM)) located in a physical gaming environment (e.g., a casino) to facilitate integration of NFT and/or metaverse components and/or functionality in a gaming environment in accordance with one or more embodiments described herein.

In at least one example embodiment of the present disclosure, to facilitate integration of NFT and/or metaverse components and/or functionality in a gaming environment, the computing system can sync, couple, and/or otherwise associate a metaverse gaming device of a metaverse gaming environment with a physical gaming device of a physical gaming environment. For example, the computing system according to example embodiments described herein can sync, couple, and/or otherwise associate a virtual and/or digital gaming device that can be implemented in a metaverse gaming environment with a real gaming device and/or a real gaming table that can be implemented in a physical gaming environment such as, for instance, a casino. In multiple embodiments, the computing system can sync, couple, and/or otherwise associate the metaverse gaming device with the physical gaming device such that the metaverse gaming device can include and/or constitute a virtual and/or digital representation of the physical gaming device in the metaverse gaming environment.

In one embodiment, the physical gaming device can constitute, include, be coupled to, and/or otherwise be associated with an electronic and/or computer-based gaming device such as, for example, an electronic gaming machine (EGM), an electronic table game (ETG), and/or another electronic and/or computer-based gaming device that can be physically located in a physical gaming environment such as, for instance, a casino. In this embodiment, the metaverse gaming device can constitute and/or include application software (e.g., computer-readable instructions) such as, for example, an application instance, an application object, a system image, a virtual machine, and/or other application software that can be implemented in the metaverse gaming environment and synced with, coupled to, and/or otherwise correspond to the physical gaming device. For instance, in this embodiment, the metaverse gaming device can constitute and/or include such application software (e.g., application instance, application object, system image, virtual machine, etc.) that can be synced with, coupled to, and/or otherwise correspond to the physical gaming device such that the application software can constitute a virtual and/or digital representation of the physical gaming device in the metaverse gaming environment.

In another embodiment, the physical gaming device can constitute, include, be coupled to, and/or otherwise be associated with a real, physical table game (e.g., poker table, blackjack table, roulette table, etc.) that can be physically located in a physical gaming environment such as, for instance, a casino. In this embodiment, the physical gaming device can constitute, include, be coupled to, and/or otherwise be associated with a computing device (e.g., a special-purpose computer or general-purpose computer) that can be physically located in the physical gaming environment and/or another environment and can perform one or more operations associated with the physical gaming device. For instance, in one embodiment, the computing device can provide output data that can include and/or constitute instructions associated with executing a game and/or a gameplay via the physical gaming device (e.g., the computing device can provide output data that is descriptive of which card(s) a gaming dealer should deal to one or more players participating in the game and/or gameplay). In another example embodiment, the computing device can receive input data that can be descriptive of one or more activities and/or events associated with the physical gaming device. For example, in one embodiment, the computing device can receive input data that can be descriptive of an outcome (e.g., win, loss, tie, etc.) of a game and/or a gameplay that can be implemented via the physical gaming device in the physical gaming environment. In one or more embodiments, the computing device can store, communicate, and/or otherwise manage the above-described output and/or input data.

In the embodiments described above, where the physical gaming device can constitute, include, be coupled to, and/or otherwise be associated with a computing device (e.g., a special-purpose computer or general-purpose computer), the metaverse gaming device can constitute and/or include application software (e.g., computer-readable instructions) such as, for example, an application instance, an application object, a system image, a virtual machine, and/or other application software that can be implemented in the metaverse gaming environment and synced with, coupled to, and/or otherwise correspond to the computing device and/or the physical gaming device. For instance, in these or other embodiments, the metaverse gaming device can constitute and/or include such application software (e.g., application instance, application object, system image, virtual machine, etc.) that can be synced with, coupled to, and/or otherwise correspond to the computing device and/or the physical gaming device such that the application software can constitute a virtual and/or digital representation of the computing device and/or the physical gaming device in the metaverse gaming environment.

In multiple embodiments of the present disclosure, the metaverse gaming device and/or the above-described application software can include and/or constitute a virtual and/or digital representation of one or more attributes, structural components, and/or functionality of the physical gaming device. For example, in embodiments where the physical gaming device is an electronic gaming machine (EGM), the metaverse gaming device and/or the above-described application software can include and/or constitute a virtual and/or digital representation of one or more attributes (e.g., featured game(s), graphical user interface(s), etc.), structural components (e.g., cabinet housing, primary game display, etc.), and/or functionality of the EGM. In one or more other example embodiments where the physical gaming device is a real, physical table game such as, for instance, a blackjack table, the metaverse gaming device and/or the above-described application software can include and/or constitute a virtual and/or digital representation of one or more attributes, structural components, and/or functionality of the blackjack table (e.g., table design, size, shape, color, number of player positions, player seat design, etc.).

In one or more embodiments described herein, the computing system can sync, couple, and/or otherwise associate the metaverse gaming device with the physical gaming device such that one or more attributes, activities, and/or operations associated with one of such devices is also associated with the other device. As an example, in one embodiment, the computing system can sync, couple, and/or otherwise associate the metaverse gaming device with the physical gaming device such that an outcome (e.g., win, loss, tie, etc.) of a gameplay executed via the physical gaming device in the physical gaming environment can also be the outcome of the gameplay that can be output by the metaverse gaming device in the metaverse gaming environment. In at least one embodiment, the computing system can sync, couple, and/or otherwise associate the metaverse gaming device with the physical gaming device such that the metaverse gaming device in the metaverse gaming environment can output in real-time (e.g., live, simultaneously, etc.) the same outcome that can be output by the physical gaming device in the physical gaming environment. For instance, in this or another embodiment, the outcome can result from execution of a gameplay via the physical gaming device in the physical gaming environment and the metaverse gaming device can simultaneously output the same outcome in the metaverse gaming environment at the same time the outcome is output by the physical gaming device in the physical gaming environment.

According to one or more embodiments described herein, the computing system can sync, couple, and/or otherwise associate the metaverse gaming device with the physical gaming device such that the computing system can provide a metaverse gaming experience associated with a gameplay to a player participating in the gameplay while being located at the physical gaming device and/or in the physical gaming environment. For example, in at least one embodiment, whether the gameplay is executed via the physical gaming device or the metaverse gaming device, the computing system can sync, couple, and/or otherwise associate the metaverse gaming device with the physical gaming device such that the computing system can provide a metaverse gaming experience associated with a gameplay to a player participating in the gameplay while being located at the physical gaming device and/or in the physical gaming environment. For instance, in this example embodiment, the computing system can employ an augmented reality process and/or a virtual reality process to provide the metaverse gaming experience associated with the gameplay to such a player participating in the gameplay while being located at the physical gaming device and/or in the physical gaming environment.

That is, for example, in one or more embodiments, a player can employ an augmented and/or virtual reality device (e.g., augmented reality glasses, a head-up-display (HUD), a smart phone, etc.) and physically stand or sit at a real, physical blackjack table in a real, physical casino. In these or other example embodiments, the computing system can facilitate execution of a blackjack game via the metaverse gaming device and employ an augmented and/or virtual reality process to provide the player (e.g., via the player's augmented and/or virtual reality device) with a metaverse gaming experience of the blackjack game while the player is physically located at such a blackjack table in such a casino located in the real world.

In one or more embodiments, the computing system can employ an augmented and/or virtual reality process to provide the player (e.g., via the player's augmented and/or virtual reality device) with a metaverse gaming experience of the blackjack game while the player is physically located at such a blackjack table by, for example, projecting images and/or video corresponding to one or more entities (e.g., objects, players, etc.) associated with the execution of the blackjack game by the computing system via the metaverse gaming device in the metaverse gaming environment. In these one or more embodiments, the computing system can employ the augmented and/or virtual reality process to project the images and/or video such that the player can view and/or interact with such image and/or video projections via the player's augmented and/or virtual reality device. In at least one embodiment, the computing system can employ the augmented and/or virtual reality process to project the images and/or video in real-time (e.g., live) such that the player can view and/or interact with such projected images and/or videos during the blackjack game via the player's augmented and/or virtual reality device.

In one example embodiment, the computing system can employ an augmented and/or virtual reality process to provide the player (e.g., via the player's augmented and/or virtual reality device) with a metaverse gaming experience of the blackjack game while the player is physically located at such a blackjack table by, for example, projecting avatar images and/or videos corresponding to other players that are participating in the blackjack game, where such other players are participating in the blackjack game via the metaverse gaming device in the metaverse gaming environment. In this example embodiment, the computing system can employ the augmented and/or virtual reality process to project the avatar images and/or videos such that the player can view and/or interact with the avatar images and/or videos via the player's augmented and/or virtual reality device. In at least one embodiment, the computing system can employ the augmented and/or virtual reality process to project the avatar images and/or videos in real-time (e.g., live) such that the player can view and/or interact with such projected avatar images and/or videos during the blackjack game via the player's augmented and/or virtual reality device.

In accordance with at least one embodiment of the present disclosure, the computing system can sync, couple, and/or otherwise associate the metaverse gaming device with the physical gaming device such that the computing system can prevent multiple players from concurrently employing the same metaverse gaming device and/or the same physical gaming device. For example, the computing system can prevent such concurrent use of the same metaverse gaming device and/or the same physical gaming device whether such multiple players attempt to concurrently employ the same metaverse gaming device in the metaverse gaming environment or the same physical gaming device in the physical gaming environment.

As an example, in one embodiment, the computing system can sync, couple, and/or otherwise associate a metaverse gaming device with a physical gaming device as described above and the computing system can receive data indicative of a first player employing the metaverse gaming device (e.g., data indicative of the first player employing the metaverse gaming device in the metaverse gaming environment). In this example embodiment, the computing system can subsequently receive a request from a second player to employ the physical gaming device in the physical gaming environment, where the physical gaming device has been synced, coupled, and/or otherwise associated with the metaverse gaming device as described above. In this example embodiment, the computing system can provide the second player with data indicative of a rejection of the request based at least in part on the data indicative of the first player employing the metaverse gaming device in the metaverse gaming environment.

In another example embodiment, the computing system can sync, couple, and/or otherwise associate a metaverse gaming device with a physical gaming device as described above and the computing system can receive data indicative of a first player employing the physical gaming device (e.g., data indicative of the first player employing the physical gaming device in the physical gaming environment). In this example embodiment, the computing system can subsequently receive a request from a second player to employ the metaverse gaming device in the metaverse gaming environment, where the metaverse gaming device has been synced, coupled, and/or otherwise associated with the physical gaming device as described above. In this example embodiment, the computing system can provide the second player with data indicative of a rejection of the request based at least in part on the data indicative of the first player employing the physical gaming device in the physical gaming environment.

In additional and/or alternative embodiments, the computing system can sync, couple, and/or otherwise associate the metaverse gaming device with the physical gaming device such that the computing system can allow multiple players to concurrently employ the same metaverse gaming device and/or the same physical gaming device. For example, the computing system can allow such concurrent use of the same metaverse gaming device and/or the same physical gaming device whether such multiple players attempt to concurrently employ the same metaverse gaming device in the metaverse gaming environment or the same physical gaming device in the physical gaming environment. In one embodiment, the computing system can sync, couple, and/or otherwise associate a metaverse gaming device with a physical gaming device as described above such that the multiple players can concurrently employ the same metaverse gaming device and/or the same physical gaming device to, for instance, share a gaming and/or social experience resulting from and/or otherwise associated with execution of a gameplay via the metaverse gaming device and/or the physical gaming device.

In one or more embodiments described herein, the computing system can sync, couple, and/or otherwise associate the metaverse gaming device with the physical gaming device such that the computing system can prevent multiple players from concurrently occupying the same player role in a gameplay executed via the metaverse gaming device and/or the physical gaming device. For example, the computing system can prevent such concurrent occupation of the same player role whether such multiple players attempt to concurrently occupy the same player role via the metaverse gaming device in the metaverse gaming environment or via the physical gaming device in the physical gaming environment.

In additional and/or alternative embodiments, the computing system can sync, couple, and/or otherwise associate the metaverse gaming device with the physical gaming device such that the computing system can allow multiple players to concurrently occupy the same player role in a gameplay executed via the metaverse gaming device and/or the physical gaming device. For example, the computing system can allow such concurrent occupation of the same player role whether such multiple players attempt to concurrently occupy the same player role in a gameplay executed via the metaverse gaming device in the metaverse gaming environment or the physical gaming device in the physical gaming environment. In one embodiment, the computing system can sync, couple, and/or otherwise associate a metaverse gaming device with a physical gaming device as described above such that the multiple players can concurrently occupy the same player role in the gameplay to, for instance, share a gaming and/or social experience resulting from and/or otherwise associated with execution of the gameplay via the metaverse gaming device and/or the physical gaming device.

In one or more embodiments of the present disclosure, the computing system can associate the metaverse gaming device and/or the physical gaming device with an NFT. For example, in some embodiments, the computing system can associate the physical gaming device with an NFT such that the NFT constitutes a representation of the physical gaming device in the metaverse gaming environment. For instance, in these or other embodiments, such an NFT can be used in the metaverse gaming environment and/or the physical gaming environment to implement and/or reflect one or more events corresponding to the physical gaming device that occur in the physical gaming environment (e.g., transfer of ownership of the physical gaming device). In one or more other embodiments, the computing system can associate the NFT with the metaverse gaming device, where the metaverse gaming device can be synced, coupled, and/or otherwise associated with the physical gaming device as described above. In this manner, the computing system according to example embodiments described herein can thereby associate the NFT with the metaverse gaming device and the physical gaming device, where the NFT can represent the metaverse gaming device and the association of the metaverse gaming device with the physical gaming device (e.g., the association established via the above-described syncing of the metaverse gaming device with the physical gaming device).

In one embodiment, the computing system can associate an NFT with the metaverse gaming device and/or the physical gaming device by creating and/or defining a machine-readable contract such as, for instance, a smart contract as described herein that can include data that is descriptive of the identity of the NFT, the identity of the metaverse gaming device, and/or the identity of the physical gaming device. In this or another embodiment, the smart contract can further include pre-defined terms and/or conditions corresponding to the NFT, the metaverse gaming device, and/or the physical gaming device. In this or another embodiment, the computing system can create and/or define the smart contract such that it includes digital asset identification data of the NFT that the smart contract and/or the pre-defined terms and/or conditions thereof can associate with identification data of the metaverse gaming device (e.g., identification data descriptive of the above-described application software that can constitute the metaverse gaming device) and/or identification data of the physical gaming device (e.g., serial number, model number, etc.).

In another embodiment, the computing system can associate an NFT with the metaverse gaming device and/or the physical gaming device by implementing the same or similar process as described above for associating a player with an NFT. For instance, in this or another embodiment, the computing system can associate the NFT with the metaverse gaming device and/or the physical gaming device by generating NFT and gaming device identification data that can associate the NFT with the metaverse gaming device and/or the physical gaming device, where such NFT and gaming device identification data can include and/or constitute embedded data descriptive of the NFT, the metaverse gaming device, and/or the physical gaming device. For example, in this or another embodiment, the NFT and gaming device identification data and/or the embedded data descriptive of the NFT, the metaverse gaming device, and/or the physical gaming device can include and/or constitute: digital asset identification data corresponding to the NFT; data descriptive of an identifier corresponding to the NFT, where the identifier can include and/or constitute data indicative of a storage location where the NFT is stored (e.g., the identifier can include and/or constitute a pointer and/or a computer program object having a memory address where the NFT is stored); identification data of the metaverse gaming device (e.g., identification data descriptive of the above-described application software that can constitute the metaverse gaming device); identification data of the physical gaming device (e.g., serial number, model number, etc.); and/or other data descriptive of the NFT, the metaverse gaming device, and/or the physical gaming device. In some embodiments, the computing system can encrypt and/or otherwise encode the above-described NFT and gaming device identification data and/or embedded data descriptive of the NFT, the metaverse gaming device, and/or the physical gaming device such that the data is protected and/or secured from interception, viewing, and/or use by one or more unintended third-parties.

In some embodiments of the present disclosure, the computing system can create a gaming device identification code that can include the above-described NFT and gaming device identification data and/or embedded data descriptive of the NFT, the metaverse gaming device, and/or the physical gaming device. For example, in at least one embodiment, based at least in part on (e.g., in response to) generating the NFT and gaming device identification data, the computing system can create the above-described gaming device identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT and gaming device identification data and/or embedded data descriptive of the NFT, the metaverse gaming device, and/or the physical gaming device. In one or more embodiments, the computing system can provide the gaming device identification code to, for instance, the player and/or another entity that can use the gaming device identification code in the same or similar manner as described above to implement and/or otherwise utilize the NFT, the metaverse gaming device (e.g., to execute a game via the metaverse gaming device, to transfer ownership of the NFT and/or the metaverse gaming device, etc.), and/or the physical gaming device (e.g., to record gameplay outcome(s) output by the physical gaming device, to transfer ownership of the NFT and/or the physical gaming device, etc.).

In at least one embodiment, the computing system can record data descriptive of the NFT, the metaverse gaming device, and/or the physical gaming device on a blockchain in accordance with one or more embodiments described herein. For example, in this or another embodiment, the computing system can employ the above-described smart contract to record, on one or more blocks of a blockchain, data that can include, for instance: data descriptive of the identity of the metaverse gaming device (e.g., identification data descriptive of the above-described application software that can constitute the metaverse gaming device); data descriptive of the identity of the physical gaming device (e.g., serial number, model number, etc.); data descriptive of the identity of the NFT (e.g., digital asset identification data of the NFT); data indicative of a location of the NFT (e.g., the above-described identifier and/or pointer); data indicative of an entity's ownership of the NFT, the metaverse gaming device, and/or the physical gaming device; data descriptive of the above-described gaming device identification code; data descriptive of the above-described NFT and gaming device identification data; data descriptive of the above-described embedded data descriptive of the NFT, the metaverse gaming device, and/or the physical gaming device; and/or other data that can be descriptive of the NFT, the metaverse gaming device, and/or the physical gaming device.

According to one or more embodiments described herein, the computing system can provide an outcome of a gameplay that can be executed via the metaverse gaming device or the physical gaming device to one or more players in the metaverse gaming environment and/or the physical gaming environment. For example, in at least one embodiment, the computing system can provide data descriptive of an outcome (e.g., win, loss, tie, etc.) of a gameplay that can be executed via the metaverse gaming device or the physical gaming device to one or more players participating in the gameplay via the metaverse gaming device in the metaverse gaming environment and/or via the physical gaming device in the physical gaming environment. That is, for instance, in this example embodiment, the computing system can provide the outcome of the gameplay to such one or more players via the metaverse gaming device and/or the physical gaming device.

As an example, in some embodiments, the computing system can receive a request from a player employing the metaverse gaming device to allow the player to participate in a gameplay via the metaverse gaming device, where the gameplay is to be executed via the physical gaming device. In these or other example embodiments, the computing system can provide the player with the outcome of the gameplay via the metaverse gaming device (e.g., via one or more augmented reality and/or virtual reality processes and/or devices). As another example, in additional and/or alternative embodiments, the computing system can receive a request from a player employing the physical gaming device to allow the player to participate in a gameplay via the physical gaming device, where the gameplay is to be executed via the metaverse gaming device. In these or other example embodiments, the computing system can provide the player with the outcome of the gameplay via the physical gaming device.

In at least one example embodiment of the present disclosure, the computing system can associate the above-described outcome of the gameplay with an NFT. In one embodiment, the computing system can associate the outcome with an NFT by creating and/or defining a machine-readable contract such as, for instance, a smart contract as described herein that can include data that is descriptive of the outcome, the identity of the outcome, and the identity of the NFT. In this or another embodiment, the smart contract can further include pre-defined terms and/or conditions corresponding to the outcome and/or the NFT. In this or another embodiment, the computing system can create and/or define the smart contract such that it includes digital asset identification data of the NFT that the smart contract and/or the pre-defined terms and/or conditions thereof can associate with data descriptive of the outcome and/or the identity of the outcome.

In another embodiment, the computing system can associate the above-described outcome with an NFT by implementing the same or similar process as described above for associating a player with an NFT and/or for associating an NFT with a metaverse gaming device and/or a physical gaming device. For instance, in this or another embodiment, the computing system can associate the outcome with the NFT by generating NFT and outcome identification data that can associate the outcome with the NFT, where the NFT and outcome identification data can include and/or constitute embedded data descriptive of the outcome and the NFT. For example, in this or another embodiment, the NFT and outcome identification data and/or the embedded data descriptive of the outcome and the NFT can include and/or constitute: digital asset identification data corresponding to the NFT; data descriptive of an identifier corresponding to the NFT, where the identifier can include and/or constitute data indicative of a storage location where the NFT is stored (e.g., the identifier can include and/or constitute a pointer and/or a computer program object having a memory address where the NFT is stored); data descriptive of the outcome (e.g., data descriptive of a win, loss, and/or tie, data descriptive of a value (e.g., monetary value) corresponding to the outcome, etc.); identification data of the outcome (e.g., a digital code, digital number, and/or another digital identifier that can identify the outcome as being the result of a certain gameplay executed via the metaverse gaming device or the physical gaming device); and/or other data descriptive of the outcome and/or the NFT. In some embodiments, the computing system can encrypt and/or otherwise encode the above-described NFT and outcome identification data and/or embedded data descriptive of the outcome and the NFT such that the data is protected and/or secured from interception, viewing, and/or use by one or more unintended third-parties.

In some embodiments of the present disclosure, the computing system can create an outcome identification code that can include the above-described NFT and outcome identification data and/or embedded data descriptive of the outcome and the NFT. For example, in at least one embodiment, based at least in part on (e.g., in response to) generating the NFT and outcome identification data, the computing system can create the above-described outcome identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT and outcome identification data and/or embedded data descriptive of the outcome and the NFT. In one or more embodiments, the computing system can provide the outcome identification code to, for instance, the player and/or another entity that can use the outcome identification code in the same or similar manner as described above to implement and/or otherwise utilize the NFT and/or the outcome (e.g., to redeem a monetary value corresponding to the outcome).

In at least one embodiment, the computing system can record data descriptive of the outcome and/or the NFT on a blockchain in accordance with one or more embodiments described herein. In one or more embodiments, the computing system can record on a blockchain data descriptive of an association of the outcome of the gameplay with the NFT, the metaverse gaming device, and/or the physical gaming device. For example, the computing system can employ the above-described smart contract to record, on one or more blocks of a blockchain, data that can include, for instance: data descriptive of the outcome (e.g., data descriptive of a win, loss, and/or tie, data descriptive of a value (e.g., monetary value) corresponding to the outcome, etc.); identification data of the outcome (e.g., a digital code, digital number, and/or another digital identifier that can identify the outcome as being the result of a certain gameplay executed via the metaverse gaming device or the physical gaming device); data descriptive of an association of the outcome with the metaverse gaming device and/or the physical gaming device (e.g., data descriptive of the outcome being the result of a certain gameplay executed via the metaverse gaming device or the physical gaming device); data descriptive of the identity of the NFT (e.g., digital asset identification data of the NFT); data indicative of a location of the NFT (e.g., the above-described identifier and/or pointer); data indicative of a player's ownership of the NFT and/or the outcome (e.g., data descriptive of the player's identity and data descriptive of how the player received the outcome and/or the NFT as a result of winning a certain gameplay executed via the metaverse gaming device or the physical gaming device); data descriptive of the above-described outcome identification code; data descriptive of the above-described NFT and outcome identification data; data descriptive of the above-described embedded data descriptive of the outcome and the NFT; and/or other data that can be descriptive of the outcome and/or the NFT.

According to one or more embodiments described herein, to facilitate integration of NFT and/or metaverse components and/or functionality in a gaming environment, the computing system can configure an NFT such that it can be used and/or redeemed by different entities in the metaverse gaming environment, the physical gaming environment, and/or another environment (e.g., another physical environment, computing environment, and/or computer-based gaming environment). For example, the computing system can configure any of the NFTs described in one or more embodiments of the present disclosure such that the NFT can be used and/or redeemed by different entities (e.g., different players, different product and/or service vendors, etc.) in the metaverse gaming environment, the physical gaming environment, and/or another environment (e.g., by a different real-world casino, by a non-gaming organization (e.g., a product and/or service vendor), and/or by another entity).

In one embodiment, the computing system can create such a redeemable NFT and provide it to a player in the metaverse gaming environment and/or the physical gaming environment. In some embodiments, the computing system can configure such a redeemable NFT such that it is associated with and/or can be redeemed to receive a digital asset (e.g., another NFT, crypto currency, etc.) in the metaverse gaming environment and/or a physical asset (e.g., a car) in the physical gaming environment and/or another physical environment.

In at least one embodiment, the computing system can configure such a redeemable NFT such that it includes, constitutes, and/or is otherwise associated with, for example, a voucher that can be used and/or redeemed by different entities (e.g., different players, different product and/or service vendors, etc.) in the metaverse gaming environment, the physical gaming environment, and/or another environment (e.g., another physical environment, computing environment, and/or computer-based gaming environment). For example, in at least one embodiment, the computing system can associate a voucher with an NFT that has been actioned to a player in the metaverse gaming environment (e.g., ownership of the NFT has been transferred to the player in the metaverse gaming environment). In this or another embodiment, the computing system can associate the voucher with the NFT and configure the voucher such that it can be redeemed by the player via one or more entities (e.g., different players, different product and/or service vendors, etc.) in the metaverse gaming environment, the physical gaming environment, and/or another environment (e.g., another physical environment, computing environment, and/or computer-based gaming environment). For instance, in this or another embodiment, the computing system can associate the voucher with the NFT and configure the voucher such that it can be redeemed by the player to action the NFT (e.g., transfer ownership of the NFT) to an entity (e.g., a product or service provider, a gaming organization, etc.) in the metaverse gaming environment, the physical gaming environment, and/or another environment (e.g., another physical environment, computing environment, and/or computer-based gaming environment).

In one example embodiment, a player can participate in a gameplay that can be executed via the metaverse gaming device in the metaverse gaming environment. In this example embodiment, the metaverse gaming device can output a winning outcome in favor of the player (e.g., the player can win) and the metaverse gaming device and/or the computing system can provide the player with an award corresponding to the winning outcome (e.g., a monetary value, an asset, a service, etc.). In this example embodiment, the computing system can associate the winning outcome with an NFT and can further associate the NFT with, for instance, a voucher that the player and/or another entity (e.g., another player, a product or service vendor, etc.) can use and/or redeem in the metaverse gaming environment, the physical gaming environment, and/or another environment (e.g., another physical environment, computing environment, and/or computer-based gaming environment). For example, in this example embodiment, the voucher can be redeemed to receive the winning outcome (e.g., an asset, a product, a service, etc.) and/or the value (e.g., monetary value) corresponding to the winning outcome. In one embodiment, the player can redeem the voucher at a real, physical product and/or service vendor such as, for instance, a car dealership located in the real, physical world, where the player can redeem the voucher to receive the monetary value of the winning outcome and/or apply such monetary value toward the purchase of a vehicle from the car dealership.

In accordance with one or more embodiments of the present disclosure, to facilitate configuring an NFT such that it can be used and/or redeemed by different entities across different gaming channels and/or different environments as described above, the computing system can associate the NFT with, for instance, a voucher that can be used and/or redeemed by such different entities across such different gaming channels and/or different environments. In at least one embodiment, to facilitate such association of the NFT with a voucher such that the NFT and/or the voucher can be used and/or redeemed by such different entities across such different environments, the computing system can associate the NFT with the voucher by implementing the same or similar process as described above for associating a player with an NFT and/or for associating an NFT with a metaverse gaming device and/or a physical gaming device.

In at least one embodiment, the computing system can associate the NFT with the voucher by generating NFT and voucher identification data that can associate the NFT with the voucher, where the NFT and voucher identification data can include and/or constitute embedded data descriptive of the NFT and the voucher. For example, in this or another embodiment, the NFT and voucher identification data and/or the embedded data descriptive of the NFT and the voucher can include and/or constitute: digital asset identification data corresponding to the NFT; data descriptive of an identifier corresponding to the NFT, where the identifier can include and/or constitute data indicative of a storage location where the NFT is stored (e.g., the identifier can include and/or constitute a pointer and/or a computer program object having a memory address where the NFT is stored); data descriptive of the voucher (e.g., data descriptive of which entities can use and/or redeem the voucher in which environment, data descriptive of an expiration date of the voucher, data descriptive of an asset, a value (e.g., monetary value), a product, and/or a service corresponding to the voucher and/or the NFT, etc.); identification data of the voucher (e.g., a digital code, digital number, and/or another digital identifier that can identify the voucher); and/or other data descriptive of the NFT and/or the voucher. In some embodiments, the computing system can encrypt and/or otherwise encode the above-described NFT and voucher identification data and/or embedded data descriptive of the NFT and the voucher such that the data is protected and/or secured from interception, viewing, and/or use by one or more unintended third-parties.

In some embodiments of the present disclosure, the computing system can create a voucher identification code that can include the above-described NFT and voucher identification data and/or embedded data descriptive of the NFT and the voucher. For example, in at least one embodiment, based at least in part on (e.g., in response to) generating the NFT and voucher identification data, the computing system can create the above-described voucher identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT and voucher identification data and/or embedded data descriptive of the NFT and the voucher. In one or more embodiments, the computing system can provide the voucher identification code and/or the voucher to, for instance, the player and/or another entity that can use the voucher identification code in the same or similar manner as described above to implement and/or otherwise utilize the NFT and/or the voucher (e.g., to redeem an asset, product, service, and/or monetary value corresponding to the voucher).

In at least one embodiment, the computing system can record on a blockchain data descriptive of the NFT, the voucher, and/or ownership of the NFT and/or the voucher by a player in accordance with one or more embodiments described herein. In one or more embodiments, the computing system can employ the above-described smart contract to record, on one or more blocks of a blockchain, data that can include, for instance: data descriptive of the voucher (e.g., data descriptive of which entities can use and/or redeem the voucher in which environment, data descriptive of an expiration date of the voucher, data descriptive of an asset, a value (e.g., monetary value), a product, and/or a service corresponding to the voucher and/or the NFT, etc.); identification data of the voucher (e.g., a digital code, digital number, and/or another digital identifier that can identify the voucher); identification data of the entity that generated and/or issued the voucher (e.g., identity data corresponding to a gaming entity (e.g., gaming organization, casino, company, etc.) and/or another entity that generated and/or issued the voucher); data descriptive of the identity of the NFT (e.g., digital asset identification data of the NFT); data indicative of a location of the NFT (e.g., the above-described identifier and/or pointer); data indicative of a player's ownership of the NFT and/or the voucher (e.g., data descriptive of the player's identity and data descriptive of how the player obtained the voucher and/or the NFT (e.g., as a result of winning a certain gameplay executed via the metaverse gaming device or the physical gaming device), etc.); data descriptive of the above-described voucher identification code; data descriptive of the above-described NFT and voucher identification data; data descriptive of the above-described embedded data descriptive of the voucher and the NFT; and/or other data that can be descriptive of the voucher and/or the NFT.

According to one or more embodiments of the present disclosure, the computing system can receive data indicative of the player redeeming the NFT and/or the voucher in the metaverse gaming environment, the physical gaming environment, and/or another environment (e.g., another physical environment, computing environment, and/or computer-based gaming environment). For example, in one embodiment, the player can obtain the NFT and/or the voucher in the metaverse gaming environment and/or the physical gaming environment as described above and can redeem the NFT and/or the voucher via an entity such as, for instance, a product and/or service vendor located in another environment (e.g., another physical environment, computing environment, and/or computer-based gaming environment). In this or another example embodiment, the computing system can receive from such an entity (e.g., via a network such as, for instance, a WAN, a LAN, the Internet, etc.) data indicative of the player redeeming the NFT and/or the voucher via such an entity (e.g., data indicative of the player redeeming the voucher to receive a monetary value corresponding to the NFT and/or to apply such a monetary value toward the purchase of a product and/or service offered by the entity).

In another example embodiment, the player can obtain the NFT and/or the voucher in the form of the above-described voucher identification code (e.g., a QR code) that can associate the NFT with the voucher. In this or another example embodiment, the player can obtain such a voucher identification code in the metaverse gaming environment and/or the physical gaming environment as described above and can use the voucher identification code to redeem the NFT and/or the voucher via an entity located in the metaverse gaming environment, the physical gaming environment, and/or another environment (e.g., another physical environment, computing environment, and/or computer-based gaming environment). In this or another example embodiment, the computing system can receive (e.g., via a network such as, for instance, a WAN, a LAN, the Internet, etc.) data indicative of the player using the voucher identification code in the metaverse gaming environment, the physical gaming environment, and/or another environment. For example, in one embodiment, the computing system can receive input data indicative of, for instance, scanned data from a scanner that has been used to scan the voucher identification code (e.g., a QR code) and/or other input data indicative of the player's use of the voucher identification code to redeem the NFT and/or the voucher via an entity located in the metaverse gaming environment, the physical gaming environment, and/or another environment (e.g., another physical environment, computing environment, and/or computer-based gaming environment).

In accordance with at least one embodiment described herein, the computing system can record on a blockchain data indicative of the player redeeming the NFT and/or the voucher in the metaverse gaming environment, the physical gaming environment, and/or another environment (e.g., another physical environment, computing environment, and/or computer-based gaming environment). For instance, in one or more embodiments, such data indicative of the player redeeming the NFT and/or the voucher can include and/or constitute data indicative and/or descriptive of a transfer of the player's ownership of the NFT and/or the voucher to an entity that redeemed the NFT and/or voucher. In these one or more example embodiments, the computing system can employ the above-described smart contract to record, on one or more blocks of a blockchain, data that can include, for instance: data descriptive of the identity of the NFT (e.g., digital asset identification data of the NFT); data indicative of a location of the NFT (e.g., the above-described identifier and/or pointer); data descriptive of the identity of player (e.g., name, username, account identification data, etc.); data descriptive of the identity of the entity that is the new owner of the NFT (e.g., organization and/or company name, tax identification number, etc.); data descriptive of the above-described voucher identification code; data descriptive of the above-described NFT and voucher identification data; data descriptive of the above-described embedded data descriptive of the voucher and the NFT; and/or other data that can be descriptive of the voucher and/or the NFT.

According to one or more embodiments of the present disclosure, the computing system can associate an NFT with a player associated with the metaverse gaming environment (also referred to as a "metaverse player"). For example, in one or more embodiments, the computing system can associate the NFT with the metaverse player, an account of the metaverse player (e.g., a metaverse gaming account), and/or one or more privileges of the metaverse player, where the one or more privileges can be associated with the metaverse gaming environment, the physical gaming environment, and/or another environment (e.g., another physical environment, computing environment, and/or computer-based gaming environment).

In one embodiment, the computing system can associate an NFT with the above-described metaverse player by creating and/or defining a machine-readable contract such as, for instance, a smart contract as described herein that can include data that is descriptive of the identity of the NFT, descriptive of the identity of the metaverse player, descriptive of an account of the metaverse player (e.g., a metaverse gaming account), and/or descriptive of the above-described one or more privileges of the metaverse player that can be associated with the metaverse gaming environment, the physical gaming environment, and/or another environment (e.g., another physical environment, computing environment, and/or computer-based gaming environment). In this or another embodiment, the smart contract can further include pre-defined terms and/or conditions corresponding to the NFT, the metaverse player, an account of the metaverse player (e.g., a metaverse gaming account), and/or such one or more privileges of the metaverse player that can be associated with the metaverse gaming environment, the physical gaming environment, and/or another environment. In this or another embodiment, the computing system can create and/or define the smart contract such that it includes digital asset identification data of the NFT that the smart contract and/or the pre-defined terms and/or conditions thereof can associate with identification data of the metaverse player, identification data of an account of the metaverse player (e.g., a metaverse gaming account number), and/or data descriptive of the above-described one or more privileges of the metaverse player.

In another embodiment, the computing system can associate an NFT with the above-described metaverse player by implementing the same or similar process as described above for associating a player with an NFT. For instance, in this or another embodiment, the computing system can associate the NFT with the metaverse player by generating NFT and metaverse player identification data that can associate the NFT with the metaverse player, an account of the metaverse player, and/or the above-described one or more privileges of the metaverse player, where the NFT and metaverse player identification data can include and/or constitute embedded data descriptive of the NFT, the metaverse player, an account of the metaverse player, and/or the above-described one or more privileges of the metaverse player. For example, in this or another embodiment, the NFT and metaverse player identification data and/or the embedded data descriptive of the NFT, the metaverse player, an account of the metaverse player, and/or the above-described one or more privileges of the metaverse player can include and/or constitute: digital asset identification data corresponding to the NFT; data descriptive of an identifier corresponding to the NFT, where the identifier can include and/or constitute data indicative of a storage location where the NFT is stored (e.g., the identifier can include and/or constitute a pointer and/or a computer program object having a memory address where the NFT is stored); identification data of the metaverse player (e.g., name, metaverse username, e-mail address, telephone number, etc.); identification data of an account of the metaverse player (e.g., a metaverse gaming account number associated with the metaverse gaming environment, a metaverse gaming account username, the metaverse player's digital wallet data, etc.); data descriptive of the above-described one or more privileges of the metaverse player (e.g., a pre-defined privilege level having certain privileges granted to the metaverse player by an entity in the metaverse gaming environment); and/or other data descriptive of the NFT, the metaverse player, an account of the metaverse player, and/or the above-described one or more privileges of the metaverse player. In some embodiments, the computing system can encrypt and/or otherwise encode the above-described NFT and metaverse player identification data and/or embedded data descriptive of the NFT, the metaverse player, an account of the metaverse player, and/or the above-described one or more privileges of the metaverse player such that the data is protected and/or secured from interception, viewing, and/or use by one or more unintended third-parties.

In some embodiments of the present disclosure, the computing system can create a metaverse player identification code that can include the above-described NFT and metaverse player identification data and/or embedded data descriptive of the NFT, the metaverse player, an account of the metaverse player, and/or the above-described one or more privileges of the metaverse player. For example, in at least one embodiment, based at least in part on (e.g., in response to) generating the NFT and metaverse player identification data, the computing system can create the above-described metaverse player identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT and metaverse player identification data and/or embedded data descriptive of the NFT, the metaverse player, an account of the metaverse player, and/or the above-described one or more privileges of the metaverse player. In one or more embodiments, the computing system can provide the metaverse player identification code to, for instance, the metaverse player and/or another entity that can use the metaverse player identification code in the same or similar manner as described above to implement and/or otherwise utilize the NFT, an account of the metaverse player, and/or the above-described one or more privileges of the metaverse player that can be associated with the metaverse gaming environment, the physical gaming environment, and/or another environment (e.g., another physical environment, computing environment, and/or computer-based gaming environment).

As an example, in one embodiment, the metaverse player can utilize the metaverse player identification code in the physical gaming environment and/or another environment (e.g., another physical environment, computing environment, and/or computer-based gaming environment) to implement and/or exercise one or more privileges granted to the metaverse player by an entity in the metaverse gaming environment. In another example embodiment, the metaverse player can utilize the metaverse player identification code in the physical gaming environment and/or another environment to complete a transaction with an entity in the physical gaming environment and/or such other environment using digital funds from the metaverse player's metaverse gaming account associated with the metaverse gaming environment.

In at least one embodiment, the computing system can record data descriptive of the NFT, the metaverse player, an account of the metaverse player, and/or the above-described one or more privileges of the metaverse player on a blockchain in accordance with one or more embodiments described herein. For example, in this or another embodiment, the computing system can employ the above-described smart contract to record, on one or more blocks of a blockchain, data that can include, for instance: data descriptive of the identity of the NFT (e.g., digital asset identification data of the NFT); data indicative of a location of the NFT (e.g., the above-described identifier and/or pointer); data descriptive of the identity of the metaverse player (e.g., name, metaverse username, e-mail address, telephone number, etc.); data descriptive of an account of the metaverse player (e.g., metaverse gaming account number, metaverse gaming account username, the metaverse player's digital wallet data, etc.); data descriptive of the above-described one or more privileges of the metaverse player (e.g., a pre-defined privilege level having certain privileges granted to the metaverse player by an entity in the metaverse gaming environment); data indicative of the metaverse player's ownership of the NFT, the metaverse player's association with an metaverse gaming account of the metaverse player, and/or the metaverse player's association with the above-described one or more privileges of the metaverse player; data descriptive of the above-described metaverse player identification code; data descriptive of the above-described NFT and metaverse player identification data; data descriptive of the above-described embedded data descriptive of the NFT, the metaverse player, an account of the metaverse player, and/or the above-described one or more privileges of the metaverse player; and/or other data that can be descriptive of the NFT, the metaverse player, an account of the metaverse player, and/or the above-described one or more privileges of the metaverse player.

In at least one example embodiment, the computing system can store data that is descriptive of each of the above-described identification codes (e.g., the gaming device identification code, the outcome identification code, the voucher identification code, and/or the metaverse player identification code) on the one or more non-transitory computer-readable storage media described above that can be included in, coupled to, and/or otherwise associated with the computing system. For instance, in this or another example embodiment, the computing system can store, on such one or more non-transitory computer-readable storage media, data that respectively describes the gaming device identification code, the outcome identification code, the voucher identification code, and/or the metaverse player identification code. For example, in this or another example embodiment, with respect to each of such identification codes, the computing system can store data that can include, for instance: data descriptive of the identification code; data descriptive of the identification data and/or the embedded data that can be embodied with the identification code; data descriptive of the NFT (e.g., digital asset identification data); and/or data descriptive of the associations defined within the identification code (e.g., association of a gaming device with an NFT, association of a gameplay outcome with an NFT, association of a voucher with an NFT, association of a metaverse player with an NFT, etc.). In another embodiment, the computing system can store each NFT associated with each identification code and/or data indicative of the location of each NFT (e.g., the above-described identifier and/or pointer) on such one or more non-transitory computer storage media that can be included in, coupled to, and/or otherwise associated with the computing system.

According to one or more embodiments of the present disclosure, to facilitate validating one or more of the above-described identification codes (e.g., the gaming device identification code, the outcome identification code, the voucher identification code, and/or the metaverse player identification code) against the respective identification data and/or embedded data that can be embodied with each of such identification codes (e.g., to confirm authenticity of the NFT and/or the associations defined within the identification code(s)), the computing system can access one or more storage locations and/or devices to respectively analyze, for instance: the identification data and/or embedded data that can be embodied with each identification code; and/or the NFT. For example, in one embodiment, to facilitate such validation of each of such identification codes, the respective NFTs, and/or the respective associations defined within each of such identification codes, the computing system can access the above-described one or more non-transitory computer-readable storage media that can store, for instance: data descriptive of each identification code; data descriptive of the identification data and/or the embedded data that can be embodied with each identification code; data descriptive of each NFT (e.g., digital asset identification data); and/or data descriptive of the associations defined within each identification code (e.g., association of a gaming device with an NFT, association of a gameplay outcome with an NFT, association of a voucher with an NFT, association of a metaverse player with an NFT, etc.); and/or each NFT. In another embodiment, to facilitate such validation of each of the above-described identification codes, the NFT corresponding to each of such identification codes, and/or the respective associations defined within each of such identification codes, the computing system can access the above-described one or more blocks of a blockchain to analyze data that is descriptive and/or indicative of each of such identification codes, each such NFT, and/or each of such respective associations.

Aspects of the present disclosure provide numerous technical effects and benefits. For example, by facilitating integration of NFT and metaverse components and/or functionality in a gaming environment in accordance with one or more example embodiments of the present disclosure, the computing system described herein can provide a player with a borderless, boundaryless, and interleaved real-virtual world gaming experience across the metaverse gaming environment, the physical gaming environment, and/or another environment. Further, by facilitating integration of NFT and metaverse components and/or functionality in a gaming environment in accordance with one or more example embodiments of the present disclosure, the computing system described herein can provide a player with such a borderless, boundaryless, and interleaved real-virtual world gaming experience across different gaming channels and/or different entities that exist in, operate in, and/or are otherwise associated with any or all of such environments.

In accordance with at least one embodiment described herein, the computing system can sync, couple, and/or otherwise associate a metaverse gaming device of a metaverse gaming environment with a physical gaming device of a physical gaming environment. In another embodiment, the computing system can employ an augmented and/or virtual reality process to provide a metaverse gaming experience to a player participating in a gameplay via a physical gaming device located in a physical gaming environment. Accordingly, in these or other embodiments, the computing system can thereby provide one or more players participating in a game in a physical gaming environment and/or a metaverse gaming environment with a borderless, boundaryless, and interleaved real-virtual world gaming experience across the metaverse gaming environment and the physical gaming environment.

In one or more embodiments described herein, the computing system can associate an NFT with a player associated with a metaverse gaming environment such that the player can have an NFT enabled gaming experience across the metaverse gaming environment, a physical gaming environment, and/or another environment while protecting and/or keeping confidential, the digital asset identification data of the NFT. For example, by providing the above-described metaverse player identification code that can associate an NFT with a player associated with a metaverse gaming environment, an account of the player (e.g., a gaming account associated with the metaverse gaming environment), and/or one or more privileges of the player, the computing system according to example embodiments described herein can thereby provide the player with an NFT enabled gaming experience across the metaverse gaming environment, a physical gaming environment, and/or another environment while protecting and/or keeping confidential, the digital asset identification data of the NFT.

In some embodiments, the above-described computing system and/or one or more of the identification codes described above (e.g., the gaming device identification code, the outcome identification code, the voucher identification code, and/or the metaverse player identification code) can also provide a player with an NFT enabled gaming experience across one or more gaming and/or computing environments (e.g., metaverse gaming environment, physical gaming environment, etc.), regardless of whether such environments have one or more resources (e.g., software applications, hardware, infrastructure, communication protocols, services, etc.) that provide and/or support NFT enabled operations and/or transactions involving use of a decentralized digital ledger such as, for example, a blockchain. That is, for instance, the computing system and/or such identification code(s) according to example embodiments of the present disclosure can allow for elimination (e.g., by the computing system and/or one or more resources thereof and/or associated therewith) of the task of accessing data on a blockchain (e.g., each time a player utilizes such identification code(s) to access and/or implement the NFT) to confirm authenticity of an NFT (e.g., the existence of an NFT) and/or a player's ownership interest(s) associated with such an NFT. Consequently, in these or other embodiments, the computing system and/or such identification code(s) can provide a heterogeneity solution for heterogenous computing and/or gaming systems such that a player associated with one or more of such systems can have an NFT enabled experience across one or more gaming channels of at least one of such computing and/or gaming systems.

Further, as the above-described computing system and/or identification code(s) according to example embodiments of the present disclosure can allow for elimination of the task of accessing data on a blockchain to confirm authenticity of an NFT (e.g., the existence of an NFT) and/or the NFT associations defined within each of such identification codes (e.g., association of a gaming device with an NFT, association of a gameplay outcome with an NFT, association of a voucher with an NFT, association of a metaverse player with an NFT, etc.), the computing system and/or identification code(s) can thereby improve performance, efficiency, and/or workload capacity (e.g., improved bandwidth of communication channels, improved processing capacity, etc.) of one or more resources (e.g., computing devices, network communication components, software applications, etc.) that perform and/or are otherwise involved with one or more operations associated with utilizing an NFT across different gaming channels, different entities, and/or different environments (e.g., a metaverse gaming environment, a physical gaming environment, another physical environment, computing environment, computer-based gaming environment, etc.). For example, as the computing system and/or identification code(s) according to example embodiments of the present disclosure can allow for elimination (e.g., by the computing system and/or one or more resources thereof and/or associated therewith) of the task of accessing data on a blockchain (e.g., each time an entity utilizes an identification code to access and/or implement an NFT) to confirm authenticity of an NFT and/or the above-described associations with the NFT, the computing system and/or identification code(s) can thereby eliminate one or more computationally expensive and/or energy consuming operations that would otherwise be performed by such one or more resources in accessing such data on a blockchain. Therefore, the computing system and/or identification code(s) according to example embodiments of the present disclosure can improve the performance, efficiency, and/or workload capacity of such one or more resources. Accordingly, the computing system and/or identification code(s) according to example embodiments of the present disclosure can thereby also reduce computational costs and/or energy consumption associated with such one or more resources.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

FIG. 1 depicts a block diagram of an example computing environment 10 that can be used to implement one or more embodiments of the present disclosure. The computing environment 10 includes a plurality of computing devices that are communicatively coupled over one or more networks 18. In this example, the computing devices include one or more gaming channel systems 20, an intermediary server system 30, a non-fungible token (NFT) portal system 32, a digital ledger platform 40, and a user computing device 50. Although shown separately, various elements of FIG. 1 may be combined. For example, the NFT portal system 32, intermediary server system 30, and/or dApp systems 60 can be part of the digital ledger platform 40 in example embodiments. Computing environment 10 is one example of a computer gaming environment. The number and type of computing devices in the computing systems of FIG. 1 are depicted by way of example only. For example, other computing environments may include additional user computing devices 50, fewer or additional gaming channel systems 20, etc. than those depicted in FIG. 1. It will be appreciated that the system of FIG. 1 is provided by way of example and not limitation as other computing systems may be used in accordance with example embodiments of the present disclosure.

The user computing device 50 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

Gaming channel systems 20 include a physical gaming system 21, a lottery system 22, an online gaming system 23, and a social network system 24. The number and type of gaming systems in FIG. 1 is provided by way of example only. For example, physical gaming systems 21 may represent a single electronic gaming machine (EGM) at a gaming location or multiple EGM's and/or associated computing devices such as one or more physical gaming servers that support the EGMs or client devices. Lottery system 22 may represent a single point-of-sale device for distributing lottery tickets and/or additional lottery devices such as servers supporting the lottery POS devices and client devices. Online gaming system 23 may represent a user device running an online game or an online gaming system 23 supporting the game for gameplay on a user device. Social network system 24 may represent a user device executing a local client application and/or server device providing an online social network service. In some example embodiments, the various gaming channel devices may be under control and operation by a single entity such as a gaming operator. In other examples, the gaming channel systems 20 may be under the control of multiple different entities. For example, a first gaming entity may operate a physical gaming server while a different gaming entity may operate a lottery server or online gaming server.

Digital ledger platform 40 can include one or more computing devices that provide a digital ledger infrastructure in association with gaming channel systems 20. Digital ledger platform 40 enables numerous different non-fungible tokens (NFT) to be actioned across one or more of the gaming channel systems 20. Moreover, digital ledger platform 40 supports cross-channel actioning of NFTs to enable NFTs to be used in and across different gaming channels. Digital ledger platform 40 includes a physical layer 41 comprising one or more computing devices (e.g., a server system, distributed peer-to-peer network, etc.), a digital ledger layer 42 comprising one or more digital ledgers, one or more smart contracts 43, distributed application (dAPP) systems 44, an API layer comprising one or more APIs 45 for accessing elements of the ledger platform such as smart contracts 43, and a ledger explorer 46.

A digital ledger, as that term is used herein, refers to all forms of electronic, computer-based, distributed ledgers. Examples of digital ledgers include consensus-based blockchain and transaction-chain technologies, permissioned and un-permissioned ledgers, shared ledgers and variations thereof. A blockchain is a peer-to-peer, digital ledger implemented as a decentralized, distributed computer-implemented system. A blockchain architecture enables different users to make transactions and creates an unchangeable record of those transactions. A network of computing nodes must first agree that a transaction is valid in order to move anything of value over any kind of blockchain. In this manner, a blockchain can operate as a peer-to-peer network. A blockchain ledger can be combined with a distributed time-stamp server so that the blockchain ledger can be managed autonomously to exchange information between different parties.

A blockchain is a write-once, append-many type of electronic ledger comprised of blocks which, in turn, are comprised of transactions. Each transaction includes at least one input and at least one output. A transaction is a data structure that encrypts or otherwise encodes the transfer of ownership or control of a digital asset between participants in the blockchain. Each block in a blockchain contains a hash of the previous block in the blockchain. In this manner, the blocks of a blockchain are chained together to create a permanent record of all transactions which have been written to the blockchain since its inception. This record cannot be altered without detection due to linking of blocks by hashing. Transactions contain small programs or scripts embedded into the inputs and outputs. A transaction script specifies how and by whom the outputs of the transactions can be accessed.

Blockchain transactions can be represented as messages that can be transported between computing nodes using a network (e.g., network 18) for example. A digest of a transaction may be made available to one or more computing systems to make elements of a system aware of the existence of a transaction, and to provide a way to check the integrity of messages containing full transactions. This enables complete and efficient propagation of incoming transaction messages to the appropriate elements. It also reduces the network loading associated with traditional protocols and provides protection. Other examples of recording and making a transaction available may be used.

Transactions are validated before being written to the blockchain. Network nodes, also referred to as miners, perform algorithmic work to determine whether a transaction is valid, and reject invalid transactions from the network. Transactions are validated by a first node in the network, relayed to other nodes in the network upon validation, added to a new block built by a miner, and then "mined" by being added to the public ledger of past transactions.

According to example aspect of the present disclosure, the network nodes can comprise at least a portion of physical layer 41 which stores the data and/or performs functions of the digital ledger platform 40 as described herein. Notably, the digital ledger platform can be implemented with a distributed architecture with distributed computing systems. As such, the network nodes can be implemented by any computing device within the computing environment. For instance, any computing device such as a computing device as part of a gaming channel system can act as a node within the computer network. In some examples, a network node can be a partial network node that has limited or reduced functionality relative to other nodes. For instance, a partial network node may have read-only capabilities. In some examples, third party nodes are not relied upon for conveying data relating to the blockchains. A single party may control the digital ledger platform or portions thereof without third party nodes conveying data such as NFT data.

A digital ledger layer 42 of the digital ledger platform 40 may be used for the implementation of or otherwise in association with one or more smart contracts 43. By way of example, the digital ledger platform 40 may provide one or more virtual machines hosted by the physical layer 41 that are configured to generate and/or manage smart contracts. A smart contract 43 is a computer program that automates the execution of the terms of a machine-readable contract or agreement. A smart contract is a machine executable program including rules that process inputs in order to produce results. The results of processed inputs can cause actions to be performed dependent upon those results. By way of example, a commercial transaction may involve the transfer of property rights and/or assets. Such assets may include real property, personal property including both tangible and intangible property, digital assets such as software, for example, or any other type of asset. Smart contracts can provide enhanced control, efficiency, and speed of transfer for these transactions.

Smart contracts 43 can be written to one or more blockchains of the digital ledger layer 42 such that the smart contracts 43 are immutable. The inputs to a smart contract can be formatted to include the data structures defined by the blockchain. A smart contract can accept inputs extracted from the transactions within the digital ledgers to automatically perform one or more predefined functions.

By way of example, a smart contract may be used to determine whether pre-determined conditions are met that prove an entity owns an NFT and has authority to transfer ownership. Smart contracts may require one or more sets of inputs to trigger a transaction. The inputs can be formatted to include data structures defined by the blockchain. The smart contracts can accept inputs extracted from transactions within the digital ledgers. A smart contract may be written in any suitable programming language, such as various programming languages based on If-This-Then-That (IF-TTT) logic. A smart contract can be published or otherwise employed to enable cross-channel NFT actions as described herein.

A token within the digital ledger platform 40 can be used to represent and transfer assets via a digital ledger. A token can identify a real-world digital item or asset to be referenced from the digital ledger. Tokens may be fungible or non-fungible. A fungible unit is equivalent to and interchangeable with other units of the same commodity. Fungible tokens (FTs) are tokens that can be exchanged for any other token with the same value. A token can have various potential formats such as unique character string, a value, a pointer, an address, etc. A token can include an identifier such as an address or link to information maintained in non-volatile storage.

Nonfungible tokens (NFTs) are not replaceable with other tokens of the same type. NFTs represent nonfungible assets. Nonfungible assets have unique information or attributes. Each NFT is unique and differs from other tokens of the same class. For example, two concert tickets may appear similar, but each may have attributes or properties that render it irreplaceable by another concert ticket. Each concert ticket may have a different seat number and date which causes it to be unique from other concert tickets. Additionally, NFTs cannot be divided as the elementary unit of the NFT is the token itself.

Intermediary server system 30 includes one or more computing devices that communicate with digital ledger platform 40 and gaming channel systems 20 to enable token services across the various gaming channels. In some embodiments, the intermediary server system 30 may include one or more computing devices operating within the physical layer 41 of the digital ledger platform 40. For example, intermediary server system 30 may include one or more nodes of the physical layer 41. In another example, intermediary server system 30 may include a partial node of the digital ledger platform. A "partial node" in this context is a computing device that monitors at least some transactions within the digital ledger platform but does not verify or authenticate the monitored transactions through mining. NFT portal system 32 includes one or more computing devices that provide an access point to NFTs provided by the gaming system. For example, a user can use a user computing device 50 to access a website or application hosted by the NFT portal system 32 in order to purchase, sell, or otherwise engage in transactions in association with NFTs provided by the gaming system. NFT portal system 32 may connect to digital ledger platform 40 over one or more communication channels which may be secured using authentication and/or encryption. In some examples, NFT portal system 32 can access one or more APIs to read data from the digital ledger platform.

By way of example, a player may access a first gaming channel such as a physical electronic gaming machine (EGM). The player may pair a cross-channel application 52 with the EGM in some examples. The player may interact with the EGM and receive an NFT through such interaction (e.g., as a reward or purchase). The NFT can be recorded on a blockchain of the digital ledger platform 40. Later, the user may access another gaming channel such as an online gaming system and use the NFT for rewards through the online gaming system. Alternatively, the user may sell the NFT to another player through the online gaming system. Similarly, the user may access NFT portal system 32 and sell the NFT to another player.

Computing environment 10 further includes one or more distributed application (dApp) systems 60 that run on one or more decentralized networks rather than a typical centralized server. In example embodiments, a dApp can execute on a decentralized network while using a digital ledger to store data associated with the dApp and a smart contract 43 that defines the logic of the dApp. Once deployed on the digital ledger platform 40, a dApp cannot be changed and executes according to the logic defined by the smart contract 43. A computing node in the digital ledger platform can execute one or more decentralized applications via a smart contract 43 in example embodiments.

The network 18 can be any type of communications network, such as a local area network (e.g., intranet), wide area network (e.g., Internet), or some combination thereof and can include any number of wired or wireless links. In general, communication over the network 18 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 2:
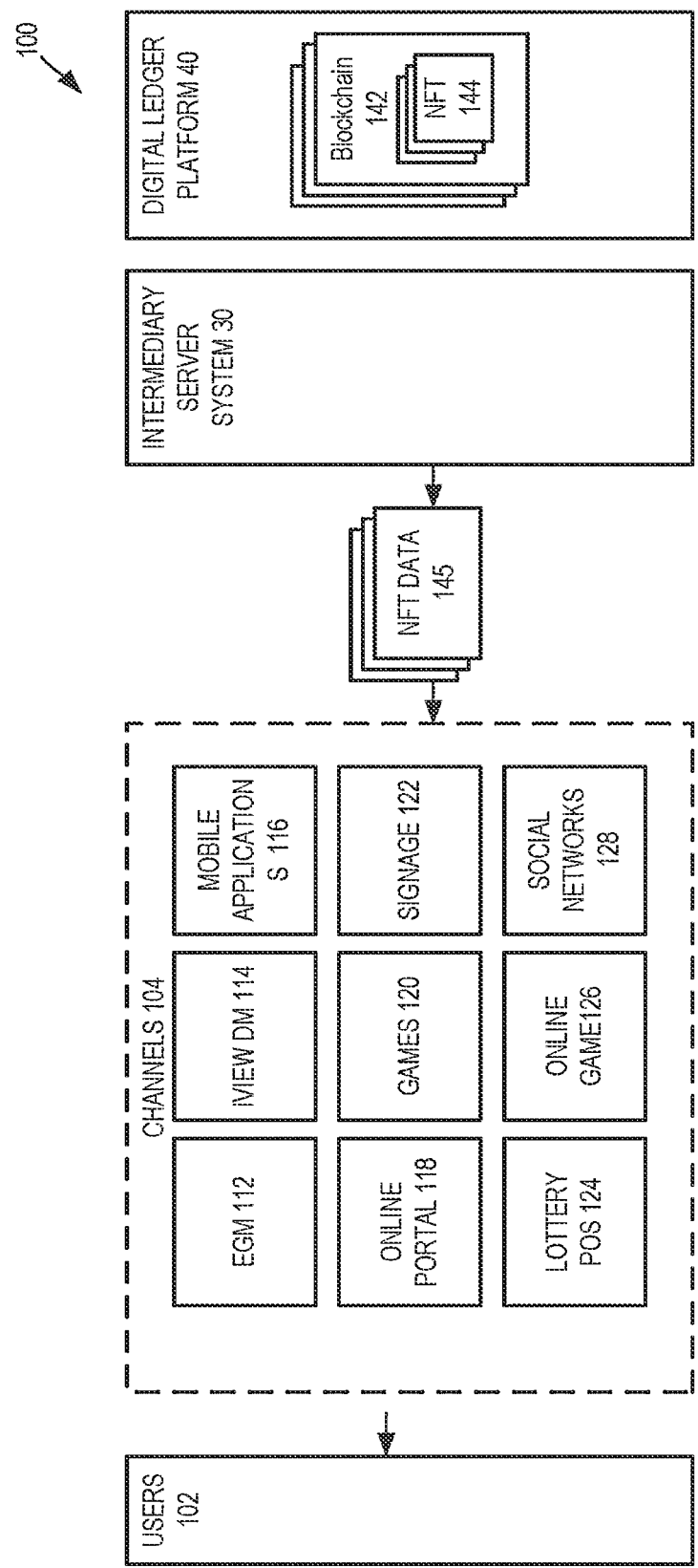
FIG. 2 is a block diagram depicting an example computing environment including multiple gaming channels over which non-fungible tokens (NFTs) may be actioned to users by a blockchain platform including a digital ledger layer in accordance with example embodiments of the present disclosure.

FIG. 2 is a block diagram depicting an example gaming computing environment 100 in which a set of non-fungible tokens 144 (NFTs 144) are actioned by intermediary server system 30 for a plurality of users 102 via a plurality of gaming channels 104 according to an example embodiment of the present disclosure. In this example, the digital ledger platform 40 includes one or more blockchains 142 (e.g., hosted by the digital ledger layer on the physical layer), each including blocks chained together to form an unchangeable record of all transactions written to the blockchain 142. NFTs 144 can be minted on a blockchain 142 as a result of or otherwise in response to validation of a transaction by at least one computing node. According to example aspects of the disclosed technology, private and/or public blockchains 142 may be provided by digital ledger platform 40. A blockchain 142 of the ledger infrastructure may be used to record transactions relating to NFTs 144 which are actioned by the intermediary server system 30 to users via channels 104. In this manner, the NFTs can be managed by the intermediary server system 30 using the digital ledger platform 40 to provide secure public transactions.

By way of example, NFTs may be used to record or otherwise represent virtual objects. Such virtual objects include, but are not limited to, audio clips, game symbols, trump cards, spaces in games, badges, characters, moments, backgrounds bonus and other digital features or elements associated with gameplay. An NFT 144 may be recorded on a blockchain that points to the digital content. For example, traditional location addressing or content addressing may be used to link an NFT with content that it represents. In certain examples, the NFT 144 may point to another distributed and/or decentralized data storage system configured to store data at a relatively larger scale than the blockchain 142, such as the InterPlanetary File System (IPFS) and the like. In some examples, at least a portion of the digital content can be stored in the NFT itself. The digital content may be stored in an encoded format such that retrieval of the digital content from a blockchain includes decoding the digital content for use with the channels 104. Other examples of NFTs include rewards, skins, virtual items such as tools, cars, clothing etc., game payouts, game levels, skill levels, a moment in a game from which play may begin, and other items, elements, objects and the like relating to games. The NFTs may be recorded on the blockchain 142 along with any transactions relating to the NFT. In this manner, a transparent ability to establish and track ownership of any virtual item can be provided.

A blockchain 142 can provide a chronological recording of all transactions relating to a particular NFT 144. This recording can be stored in a blockchain 142 that can be distributed across multiple nodes in the blockchain network of platform 40. Each node can store a copy of the transaction or code, which is accessed and updated in a decentralized manner.

In addition to securing and providing transparency for NFT transactions between players, the use of a blockchain 142 enables third parties such as tax collectors, auditors, government officials, or other parties to access and view transactions related to the blockchain. In some examples, third parties may use one or more distributed applications (dApps) as shown in FIG. 1 to access a blockchain to view details related to NFT transactions.

A non-fungible token 144 (NFT 144) can be actioned to a user 102 via any one of the example gaming channels depicted in FIG. 2. In the example of FIG. 2, an NFT can be actioned to a user 102 by providing NFT data 145 (e.g., data stored on the blockchain with the NFT, or data associated with the NFT by one or more identifiers, pointers, and/or addresses stored with the NFT) associated with a particular NFT on the blockchain to an electronic gaming machine (EGM) 112 or an integrated view display manager 114 such as iView DM that enables a video display of a gaming machine to display customized marketing or other content directly at a point of play. The NFT data 145 can be used to provide a personalized NFT experience at the point of play. For instance, the intermediary server system 30 can access digital content of an NFT such as a character or virtual item, and provide the digital content to the appropriate gameplay channel for display. In another example, NFT data 145 may identify a gameplay level, particular game, or other feature that will be presented to the player based on the NFT.

As yet another example, an NFT can be sold or awarded to a user during gameplay associated with the EGM or iView DM 114. A new block can be created on the blockchain to identify a digital wallet or cross-channel application 52 of the new owner as described in FIG. 1. The transfer of control of the NFT 144 to the user 102 can be recorded as a transaction in a blockchain 142. In some examples, the identifying information for the user recorded in the blockchain for the transaction is a public key of a public key/private key pair. In this manner, the user's privacy may be maintained while facilitating traceable transactions within the blockchain infrastructure.

In another example, an NFT can be actioned to a user directly via a mobile application 116 such as a gaming application executed by a mobile device. A player may be awarded or purchase an NFT during gameplay associated with the mobile application. An NFT can also be actioned to a user 102 via an online portal 118 such as NFT portal system 32 in FIG. 1. NFTs can also be actioned to a user 102 via games 120, signage 122, lottery system 124, online games 126, and social networks 128.

Any transaction involving an NFT 144 can be recorded on a blockchain within digital ledger platform 40. A transaction can be validated, then recorded on the distributed blockchain. In example embodiments, the information recorded for a transaction may include identifying information (e.g., a public key) for the providing and receiving parties, an identification of the gaming channel involved in the transaction, any smart contract actions performed as a result of the transfer (e.g., transfer of funds between a digital wallet of a purchaser and a digital wallet of a seller), or other pertinent information relating to the transaction. The transaction can be stored as a block within the blockchain in example embodiments.

Figure 3:
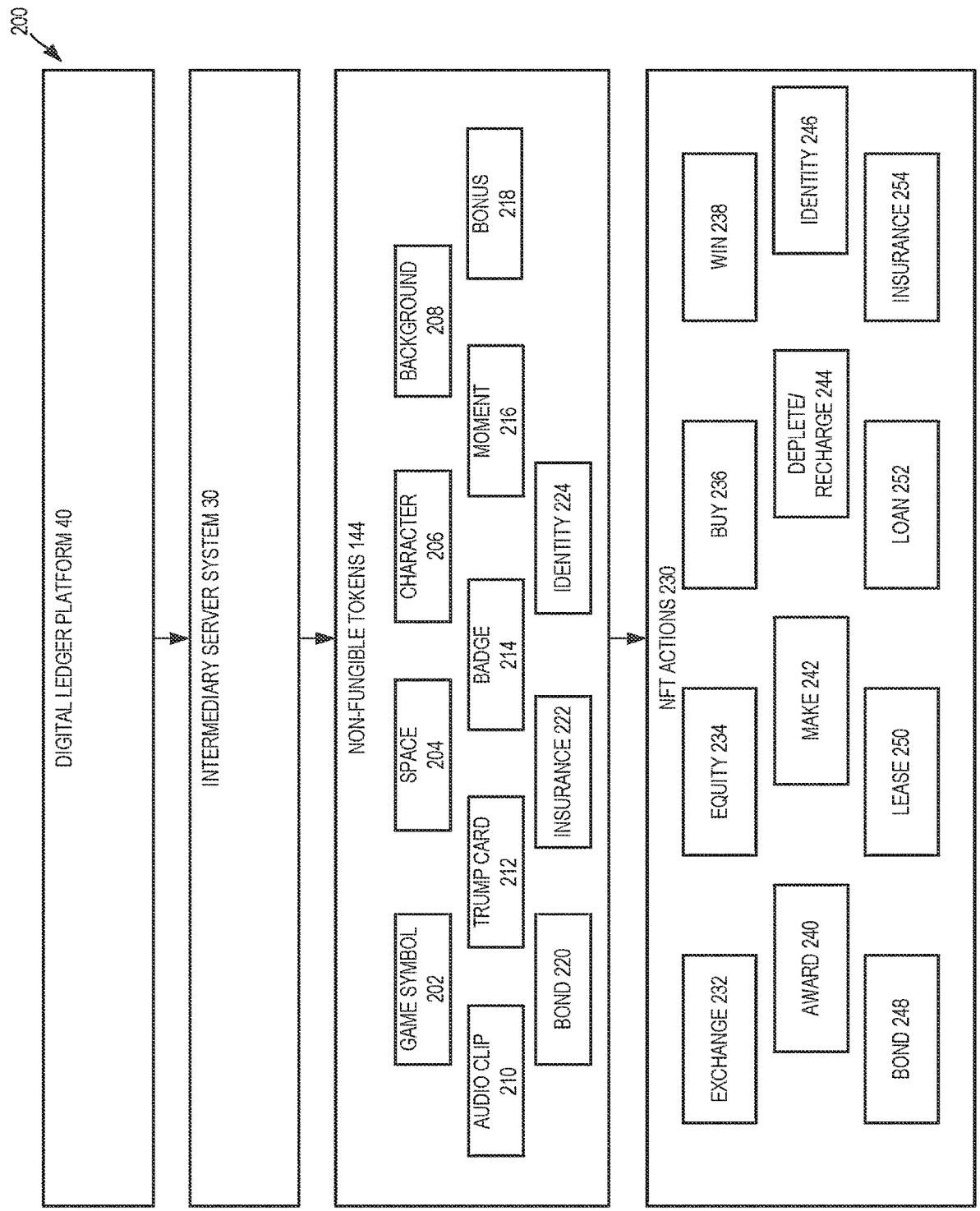
FIG. 3 is a block diagram depicting an example computing environment including examples of NFTs and NFT actions in accordance with example embodiments of the present disclosure.

FIG. 3 is a block diagram depicting an example computing environment 200 illustrating example NFTs and NFT actions in accordance with an example embodiment of the present disclosure. As illustrated in FIG. 3, digital ledger platform 40 provides a digital ledger such as blockchain 142 for recording NFTs 144 and NFT actions 230 within a gaming system including one or more gaming channels. Each NFT 144 in FIG. 3 is recorded on a blockchain 142 of platform 40. For example, each NFT 144 may be minted or otherwise created via a validation procedure by one or more computing nodes of the platform 40. An NFT may be created by any party involved in the gaming system, including players, gaming channel operators, the intermediary server system 30, etc. intermediary server system 30 can make these NFTs available to players through actions executed via one or more of a plurality of gaming channels as previously described.

In the example of FIG. 3, NFTs 144 include NFTs of multiple different types. By way of example, illustrated NFTs 144 include a game symbol NFT 202, a space NFT 204, a character NFT 206, a background NFT 208, an audio clip NFT 210, a trump card NFT 212, a badge NFT 214, a moments NFT 216, a bonus NFT 218, a bond NFT 220, an identity NFT 224, and an insurance NFT 224.

A game symbol NFT 202 represents a game symbol within one or more games and includes examples such as a collectible card (e.g., poker, blackjack, etc.) or a particular number Keno ball (e.g., 7 number Keno ball). A space NFT 204 represents a particular space within a game (e.g., a space on a virtual roulette wheel or virtual boardgame space). A character NFT 206 represents a digital character within a game (e.g., game piece within a virtual boardgame). A background NFT 208 represents a background within a game and can enable a player to control the background within a particular game. An audio clip NFT 210 contains a digital audio file such as a particular audio file for use during a game (e.g., for a gameplay or character response). A trump card NFT 212 contains a representation of a trump card for play during a particular game. A badge NFT 214 can contain a verified representation of a particular status or certification of a player. By way of example, a player may earn a responsible gaming badge based on gaming behavior or purchase a gaming badge that enforces gaming rules to promote responsible gaming behavior. A moment NFT 216 includes one or more digital representations of a gaming moment associated with a user. For instance, a winning streak moment NFT may record a winning streak of a player or a jackpot win moment NFT may record a jackpot win moment of a player. Information relating to the winning streak can be stored within the NFT and transactions relating to the winning streak can be recorded on the blockchain. Additionally or alternatively, a video and/or audio recording of the moment (e.g., video of the player reacting to a win) can be included in the NFT recorded on the blockchain. A bonus NFT 218 contains a representation of a bonus associated with a game. A bond NFT can include a lock-in-period during which the bond NFT cannot be used. After the lock-in period, the bond NFT can be used by a player to receive rewards, etc. An insurance NFT can be associated with an underlying asset NFT to provide insurance for the underlying asset NFT. An identity NFT can provided as a verified identification of a player identity. A roadmap NFT can be part of a campaign that publishes when and for long roadmap NFTs will be available to be bought and sold. It will be appreciated that the depicted NFTs are provided by way of example only. Fewer or additional NFTs of the same or different types may be included in various implementations.

A set of example actions 230 associated with NFTs 144 are illustrated in FIG. 3. In the example of FIG. 3, NFT actions 230 include actions of multiple different types. By way of example, illustrated NFT actions 230 include an exchange action 232, an equity action 234, a buy action 236, a win action 238, an award action 240, a make action 242, a deplete/recharge action 244, an identity action 246, a bond action 248, a lease action 250, a loan action 252, and an insurance action 254. An exchange action 233 can be executed to change control or ownership of an NFT from a first party to a second party. For example, an exchange action can be executed to trade one or more NFTs between two or more parties. An equity action 234 can be executed to transfer partial ownership of an NFT to a party. A buy action 236 can be executed for a first party to buy an NFT through a gaming channel or from a second party, for example. A win action 238 can be executed to transfer control of an NFT to a party in response to the party winning a game, element within a game, or other item of value. An award action 240 can be executed to award an NFT to a party during gameplay. A make action 242 can be executed to create an NFT such as to create a moment NFT. A deplete/recharge action 244 can be executed as part of the lifecycle of an NFT. For example, some NFTs may be created and have multiple states. A deplete action can be executed to delete or otherwise remove charge from an NFT to cause the NFT to transition to a lower level state (closer to a depletion or uncharged level). A recharge action can be executed to add or otherwise increase charge from an NFT to cause the NFT to transition to a higher level state (closer to a fully charged level). An identity action 246 can be executed to validate a player's identity, using an identity NFT 224 for example. A bond action 248 can be executed to redeem a reward associated with a bond NFT 220, for example. A lease action 250 can be executed to lease an NFT. A loan action 252 can be executed to hold an NFT as collateral against a long. An insurance action 254 can be executed to insure an NFT, for example, via an insurance NFT 222 by tagging the insurance NFT 222 and underlying asset NFT. It will be appreciated that the depicted NFT actions are provided by way of example only. Fewer or additional NFT actions of the same or different types may be included in various implementations.

In example embodiments, a smart contract associated with an NFT can specify one or more attributes associated with an NFT action. For example, a smart contract may indicate that each party is to designate a digital wallet or other means for exchanging funds (either physical or virtual currency) to complete a transaction, may indicate a fee to be paid to a third party (e.g., the NFT creator), and a digital wallet for transferring the fee to complete the transaction, etc.

The use of a decentralized blockchain in combination with a centralized gaming system can be provided in example embodiments. This architecture can enable solutions to many problems common in traditional gaming systems. A decentralized blockchain and centralized gaming system architecture may enable mobile infiltration, decentralized finance in gambling that meets the requirements of insurance, lending, exchange, etc., the use of cryptocurrency within gaming systems, regulatory requirements such as Know Your Customer (KYC), security and audit trailing, and central vs. global solutions.

Figure 4:
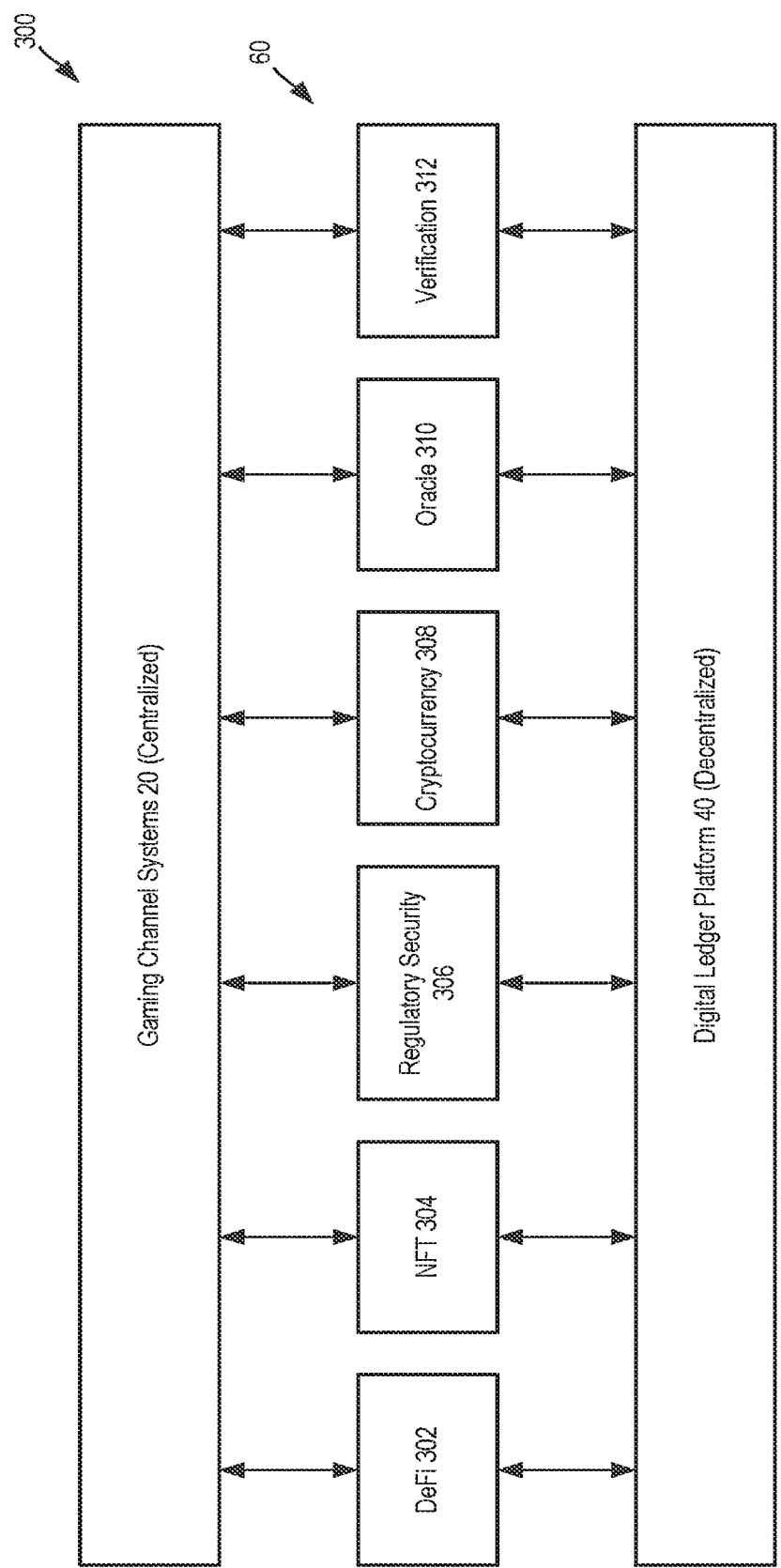
FIG. 4 is a block diagram depicting an example computing environment including a de-centralized blockchain infrastructure that is coupled to a centralized gaming platform via distributed applications in accordance with example embodiments of the present disclosure.

FIG. 4 is a block diagram depicting an example computing gaming environment 300 including gaming channel systems 20 and digital ledger platform 40 with connections via various decentralized application systems 60. FIG. 4 depicts an example of convergence between a centralized gaming system such as gaming channel systems 20 and decentralized digital ledger layer platform via a bridge layer formed using decentralized applications of a distributed application system 60. Digital ledger platform 40 is one example of a de-centralized blockchain infrastructure.

The distributed application systems 60 in FIG. 4 include a distributed finance (DeFi) application 362, an NFT application 364, a regulatory security application 366, a cryptocurrency application 368, an oracle application 370, and a verification application 372. DeFi application 362 enables management, access, and/or insight to finance information in the blockchain infrastructure 340. NFT application 364 provides a personalized NFT experience to users via various gaming channels based on NFTs controlled by the user.

Regulatory security application 366 enables regulatory security within the blockchain infrastructure by supporting access for government agencies, regulators, auditors, etc. to view and access financial information. In example embodiments, a regulatory security application 366 can include a reconciliation and settlement network, a payment network (e.g., procurement), tokenization of loyalty points, a verification, compliance, and document-exchange network for financial institutions and customers. An example of a regulatory security application is CIPHER.

Cryptocurrency application 368 can enable traditional fungible token exchange (e.g., money exchange) within the de-centralized blockchain infrastructure 340. Oracle application 370 enables smart contracts to securely access data feeds, APIs, payments, and the like. An oracle can be a database or other data source that provides traditional business information to a smart contract running on a blockchain ledger. An oracle application 370 can provide security for data provided to and retrieved from the smart contracts. In this manner, an oracle application provides security by using consensus similar to blockchains by which computing nodes agree on the validity of a transaction. An example of an oracle application 370 is CHAINLINK.

A verification application 372 can perform identify verification for parties so that players can be entered into the gaming system in a way that satisfies regulations while providing a satisfactory customer experience and efficient backend operations. Verification application 372 can verify the identity of individuals as well as organizations such as corporations and other institutional groups. In combination with databases that identify sanctioned, blacklisted, watch-listed, etc. individuals and organizations, the verification application can monitor and verify parties for various criminal or otherwise prohibited activities. In some examples, a verification application 372 can enable a party such as a player to store certified identification information on a blockchain with infrastructure 340. The party can provide another party access to their identification information by sharing a public key with the other party. An example of a verification application 372 is KYC-CHAIN.

Figure 5:
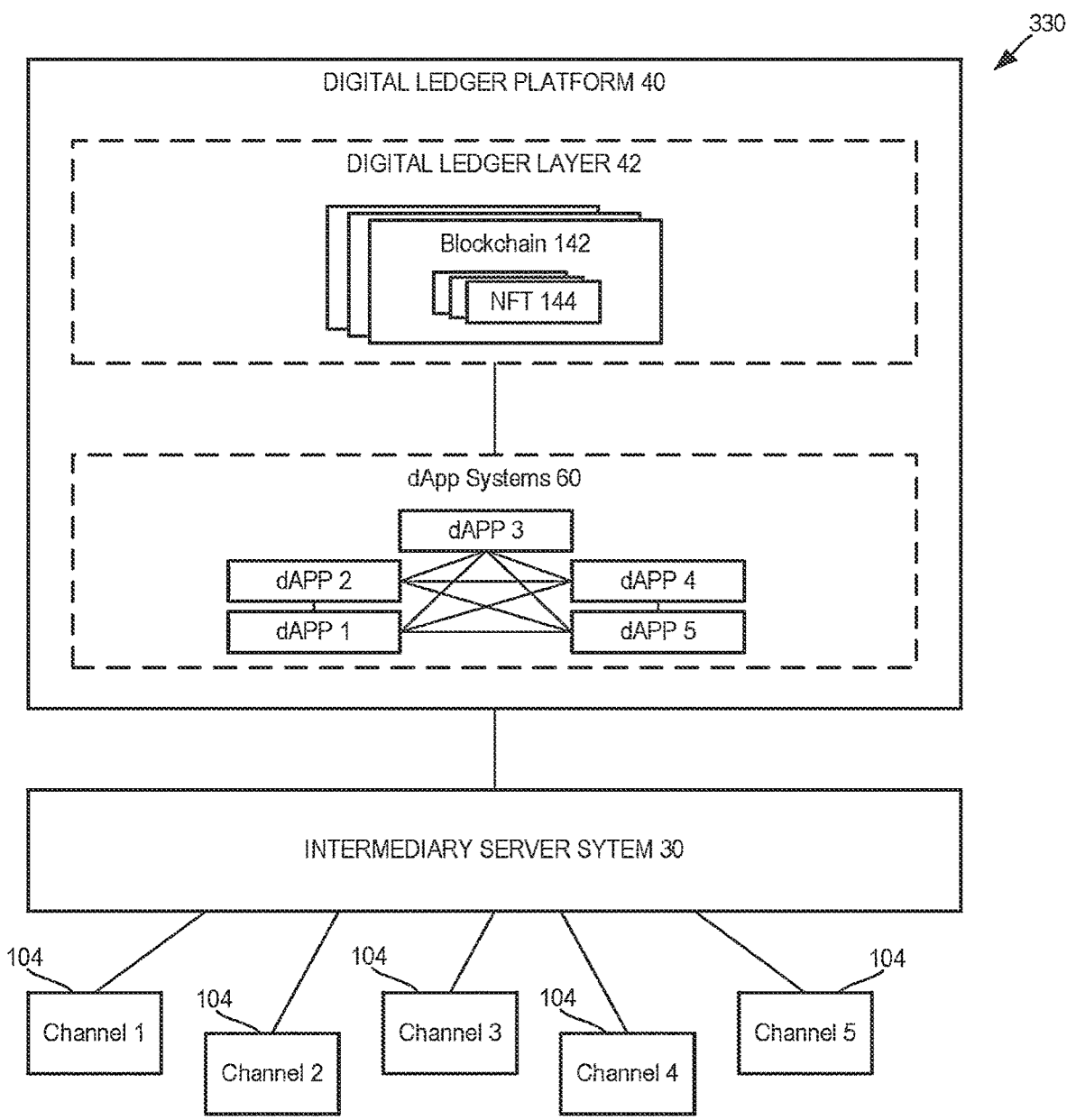
FIG. 5 is a block diagram depicting an example computing environment including a decentralized architecture for gaming.

FIG. 5 is a block diagram depicting an example distributed architecture of a computing gaming environment 330 in accordance with an example embodiment of the present disclosure. Computing gaming environment 300 includes digital ledger platform 40 having a digital ledger layer 42 and a layer of distributed applications within dApp Systems 60. In this particular example, five distributed applications dAPP1, dAPP2, dAPP3, dAPP4, and dAPP5 are provided although it will be appreciated that any number and type of distributed applications may be included in various examples. Computing gaming environment 300 further includes intermediary server system 30 which communicates with the digital ledger platform 40 and gaming channels 104. Five gaming channels 104 are provided by way of example. It will be appreciated that any number and type of gaming channels may be included in various examples.

The dAPP systems 60 of the distributed computing environment provide a bridge between the distributed architecture of the digital ledger platform 40 and the different gaming channels 332. Intermediary server system 30 is disposed between the gaming channels and the distributed digital ledger platform 40 to provide a number of improvements over typical gaming systems.

Traditionally, gaming systems such as games that involve monetary wagers, have required strict security requirements and adherence to various regulations. As such, centralized gaming architectures are often utilized to provide closed solutions that enable strict oversight for security and regulatory compliance. While blockchains and other digital ledger architectures are inherently safe and provide improved security, there are many unique elements within gaming architectures to be considered and addressed so that security and regulatory compliance can be provided.

According to an example aspect of the present disclosure, an intermediary server system is provided that can provide an intermediate bridge between a decentralized blockchain architecture and currently approved centralized gaming solutions which are gaming compliant. Intermediary server system 30 can provide abstraction, isolation, security and gaming compliance as may be required for a gaming system, while also enabling the gaming system to fully leverage the benefits of the decentralized blockchain architecture. By way of example, the intermediary server system 30 can provide firewalls and safety and security solutions to ensure that gaming integrity is maintained in the gaming systems.

Figure 6:
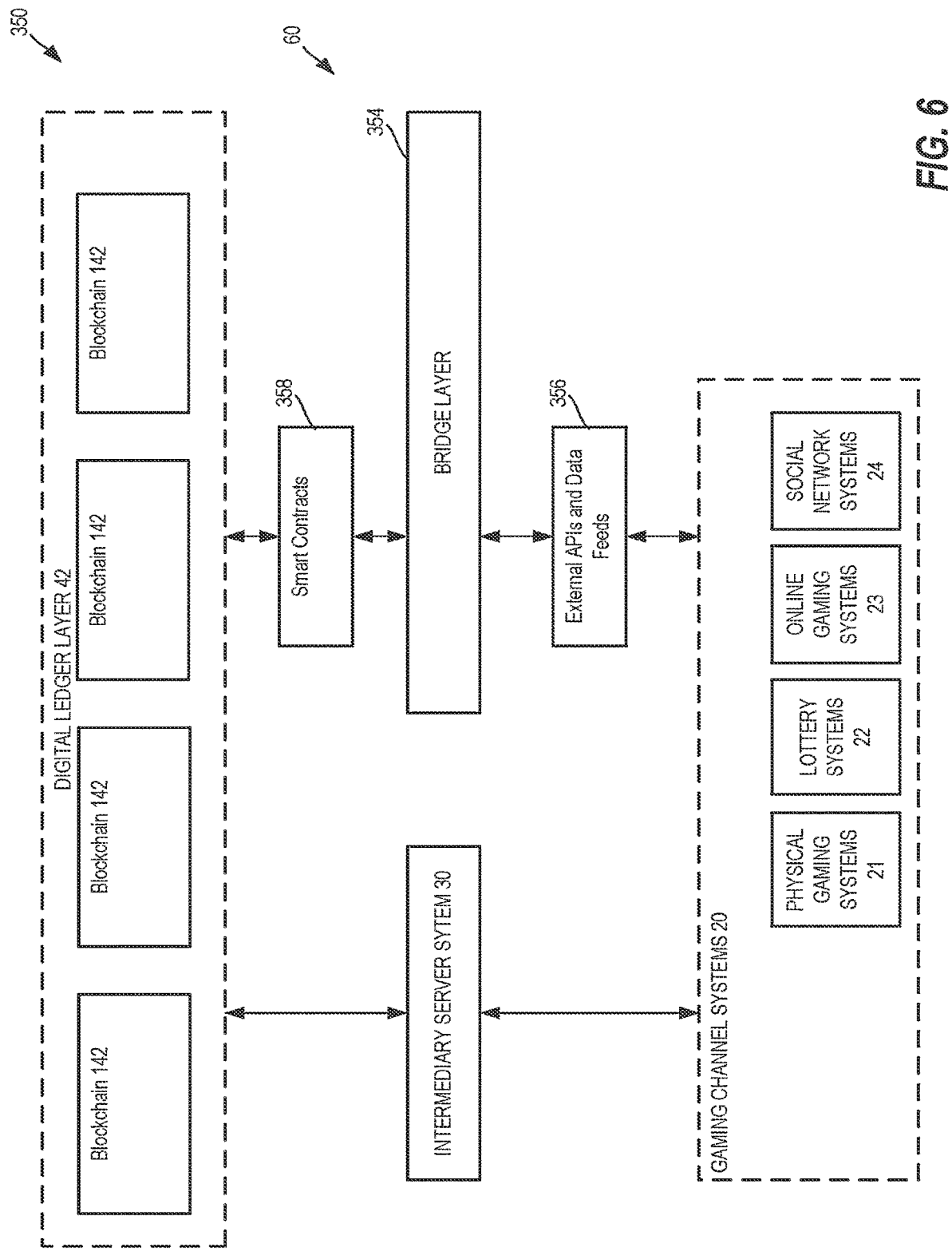
FIG. 6 is a block diagram depicting an intermediary server architecture of a gaming computing environment in accordance with example embodiments of the present disclosure.

FIG. 6 is a block diagram depicting an intermediary server architecture of a gaming computing environment 350 in accordance with an example aspect of the present disclosure. Gaming computing environment 350 includes digital ledger layer 42 having a plurality of blockchains 142 and gaming channel systems 20 such as physical gaming systems 21, lottery systems 22, online gaming systems 23, and social network systems 24.

Intermediary server system 30 is in communication with gaming channel systems 20 and digital ledger layer 42 to provide an intermediate bridge between the two. By way of example, intermediary server system 30 can action NFTs on a blockchain 142 to one or more gaming systems. Intermediary server system 30 can include one or more server and/or other types of computing devices. For instance, intermediary server system 30 can provide an NFT or data associated with an NFT (NFT data) to a gaming system. As an example, intermediary server system 30 can apply an NFT such as a character to a particular gaming system in response to a user pairing a cross-channel application with the gaming system. By way of example, intermediary server system 30 may decode data associated with an NFT and/or format the data for use within a particular gaming channel.

Bridge layer 354 provides a further bridge between gaming systems and digital ledger layer 42. Bridge layer 354 can provide external APIs and data feeds 356 that enable gaming channel systems 20 to communicate with the digital ledger layer. Bridge layer 354 may include one or more distributed applications such as an oracle application (e.g., Chainlink) and/or one or more distributed application networks such as an oracle network. The bridge layer may include one or a plurality of nodes. Bridge layer 354 can further provide smart contracts 358 in association with one or more blockchains 142.

Figure 7:
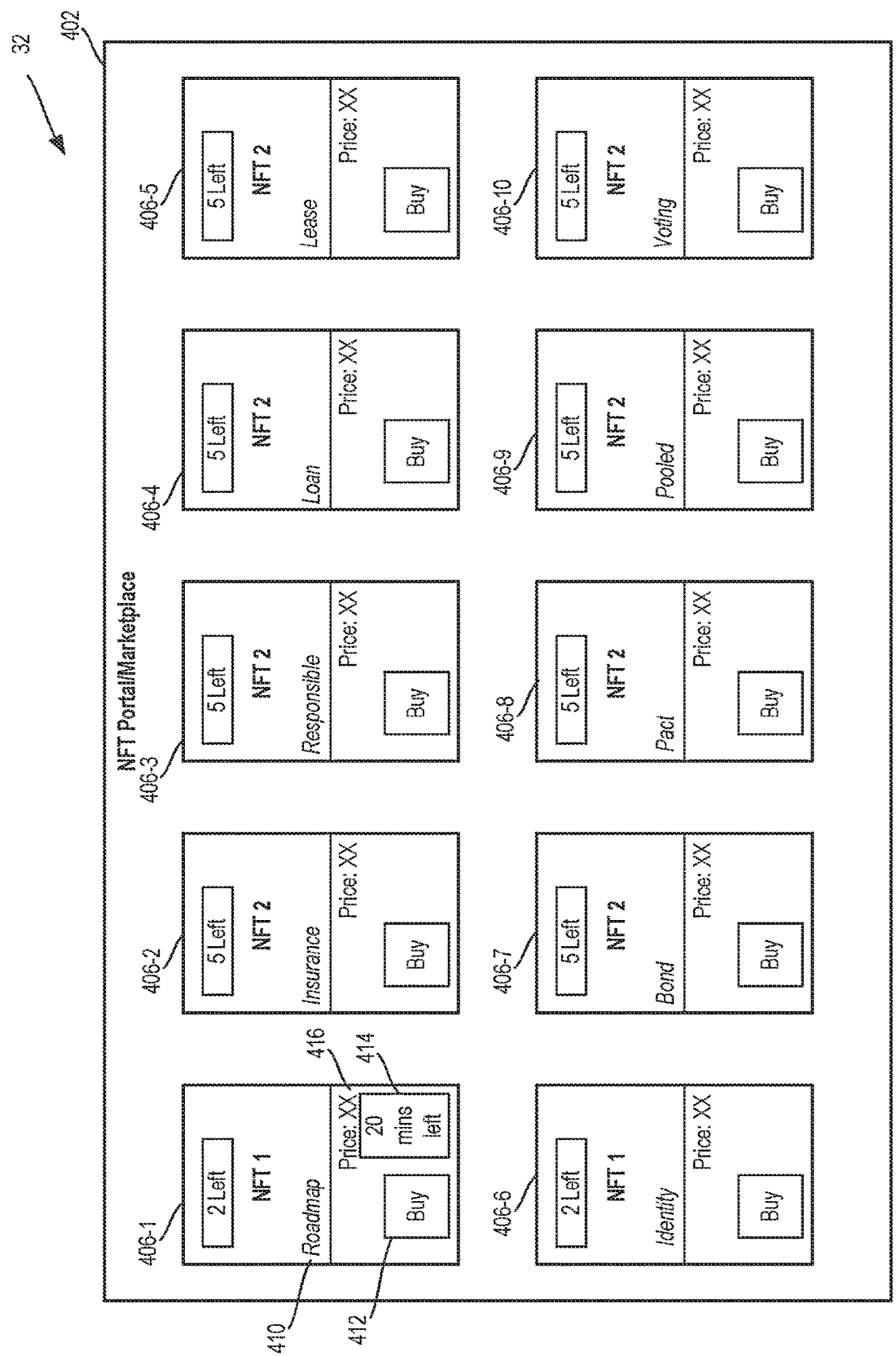
FIG. 7 illustrates an example graphical user interface of an NFT portal for performing NFT actions in association with a set of NFTs recorded on a blockchain platform in accordance with example embodiments of the present disclosure.

FIG. 7 illustrates an example graphical user interface 402 that may be provided by an NFT portal system 32 in accordance with example embodiments of the present disclosure. In this particular example, a particular graphical user interface 402 is provided for an NFT Portal/Marketplace. Graphical user interface 402 (GUI 402) enables a user to perform various actions relating to a subset of NFTs within the gaming system. The example interface depicts ten non-fungible tokens (NFTs) 406 that may be actioned by a player. The player may access the NFT portal system 32 and GUI 402 via a cross-channel application 52 in example embodiments. In other embodiments, a player may access the NFT portal and GUI 402 via another gaming channel such as through an iView interface or online game.

NFTs 406 may include any type of NFT described herein. For instance, NFT's may represent characters with the gaming system. For example, each character may be a game piece within a game or a collectible within a game. It will be appreciated that similar NFTs such as badges, skins, and the like may similarly be represented in a GUI. Example NFTs 406 in FIG. 5 include a Roadmap NFT 406-1, an Insurance NFT 406-2, a Responsible Gaming NFT 406-3, a Loan NFT 406-4, a NFT 406-5, an Identity NFT 406-6, a Bond NFT 406-7, a Pact NFT 406-8, a Pooled NFT 406-9, and a Voting NFT 406-10. Each NFT 406 depiction can include identifying attribute information 410 in some examples. The NFT may include an address (either location or content address) to identify the digital image. For instance, an NFT may include attribute information 410 that describes attributes of a character, etc. Each NFT further includes a Price 416 for purchasing or performing another action relative to the NFT. Each NFT 406 depiction can include a digital image of a character or other representation of the NFT. Roadmap NFT 406-1 includes a depiction 414 of a time remaining until the NFT will be sold FIG. 7 further illustrates at least one action 412 that may be performed by a player with respect to each NFT 406. For example, a player may select a button or provide another input to select an action 412 relating to an NFT 406 to "purchase the NFT." By purchasing the NFT, the player may acquire the NFT and thereby transfer an ownership interest in the NFT to the player. The player may purchase the NFT in some examples with a full ownership interest. In another example, the player may purchase a partial ownership interest in the NFT. In yet another example, the player may rent the NFT for a limited period of time.

A smart contract may define the terms of agreement of the action and execution of code snippets associated therewith. For example, a smart contract may specify that the acquiring party identify a digital wallet from which currency (e.g., cryptocurrency or real currency) will be transferred to the providing party. The transaction between the player and the provider of the NFT can be recorded on a blockchain 142 of the digital ledger infrastructure.

Figure 8:
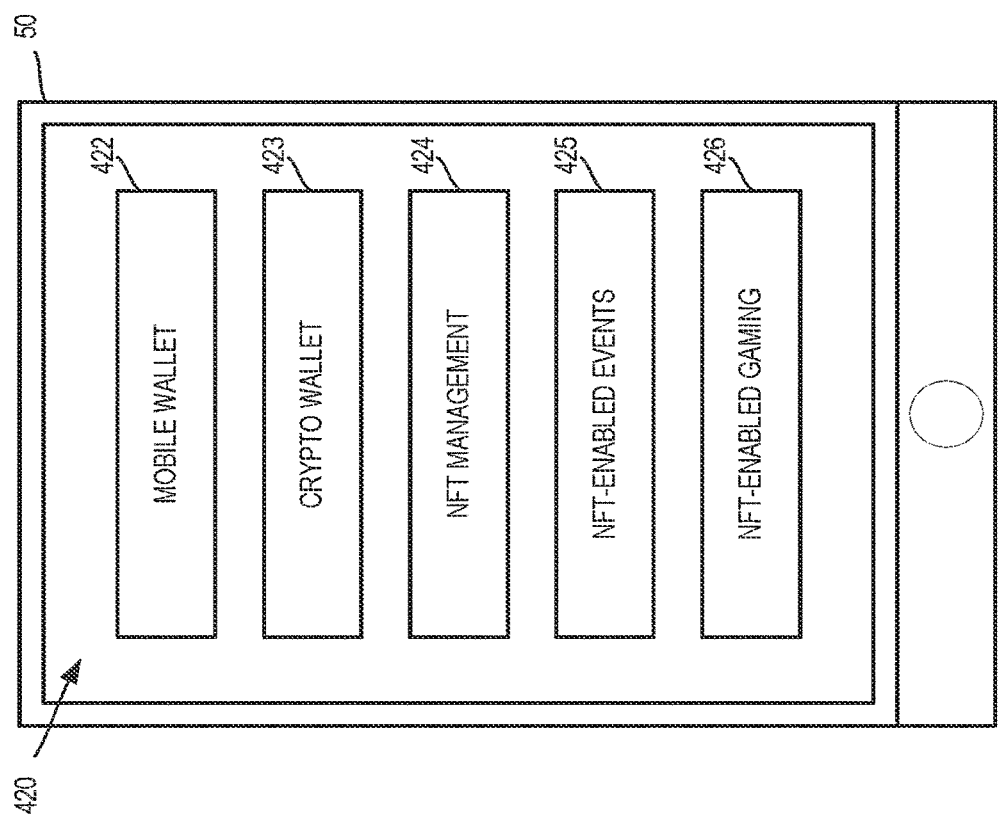
FIG. 8 illustrates an example graphical user interface provided by a cross-channel application of a user computing device in accordance with example embodiments of the present disclosure.

FIG. 8 is a block diagram depicting an example user computing device 50 displaying a graphical user interface 420 (GUI 420) of a cross-channel application in accordance with an example embodiment of the present disclosure. GUI 420 provides user access to various systems of cross-channel application 52. By way of example GUI 420 may include a first GUI element 422 (denoted as "mobile wallet 422" in FIG. 8) that provides input/output functionalities associated with a traditional mobile wallet, such as the ability for a user to provide input and receive displayed information to send and receive payments using traditional currencies via financial accounts. GUI 420 may include a second GUI element 423 (denoted as "crypto wallet 423" in FIG. 8) that provides user I/O functionalities associated with a crypto wallet, such as the ability for a user to provide input and receive displayed information to trade cryptocurrencies recorded on a blockchain. GUI 420 may include a third GUI element 424 (denoted as "NFT management 424" in FIG. 8) that provides user I/O functionalities to manage non-fungible tokens (NFTs). For example, the cross-channel application may enable a user to purchase NFTs, store NFTs, trade NFTs, etc. GUI 420 may include a fourth GUI element 425 (denoted as "NFT-enabled events 425" in FIG. 8) that provides user I/O functionalities for a player to participate in NFT enabled events. GUI 420 may include a fifth GUI element 426 (denoted as "NFT-enabled gaming 426" in FIG. 8) that provides user I/O functionalities for a player to play NFT enabled games. Other suitable GUI configurations may be used having additional, fewer, or alternative functionalities and/or graphical elements for GUI 420, including those described elsewhere herein.

FIG. 9 illustrates an example graphical user interface 430 (GUI 430) that may be provided by ledger explorer 46 in accordance with example embodiments of the present disclosure.

Various examples of recording transactions within a blockchain according to example embodiments of the present disclosure can be used. For example, a plurality of transactions may be processed as part of an action 230 as illustrated in FIG. 3 via any gaming channel as illustrated in FIG. 2. Data for each transaction can be hashed to create a hashed data element for each entry in the digital ledger. For example, an SHA (Secure Hash Algorithm) may be used as a cryptographic hash function to create a one-way entry whose underlying data cannot be retrieved. A SHA-256 algorithm can generate a 256-bit (32-byte) hash using a hashing function. Each hashed data element corresponding to a transaction is added to a block of a blockchain. Each entry may include a transaction identifier, an optional machine identifier, party information such as a public key, details regarding the transaction such as purchase amount and digital wallet transfer information, as well as other content and/or attribute information. The hash value of each hashed data element can be incorporated within the immediately subsequent block to create a system that cannot be altered without detection.

A block generally refers to an aggregation or association of transaction data. A blockchain is an ongoing and growing list of records, called blocks, that are linked and secured using cryptography. There is no specific format required for either a block or a blockchain. Each block typically contains a cryptographic hash linking to the previous block, and transaction data. In order to a provide a distributed ledger, a blockchain is typically managed by a peer-to-peer network that collectively adheres to a protocol for inter-node communication and block validation. After recordation in the blockchain, the data in a block cannot be altered without the alteration of all subsequent blocks.

A blockchain can include a linked hierarchical list of transaction blocks. Chains of related, linked transaction blocks within the hierarchy all relate to an initial genesis block. Each block has a cryptographic value or identity, which is calculated by the header data in the block. Each block contains the hash of the previous block in the chain. Other blockchain architectures may be used in accordance with example embodiments of the present disclosure.

A blockchain can exist as data distributed across network servers on the Internet or other network. It is structured as a chain of blocks, with each block comprising two separate types of information. Each block may include a block header containing information linking to the previous block in the chain, the current time, and cryptographic data that renders the block essentially impossible to remove, modify or corrupt. The block body can include the information about the entry. A blockchain contains, in its block header, mathematical information that renders the data immutable and unchangeable.

Figure 10:
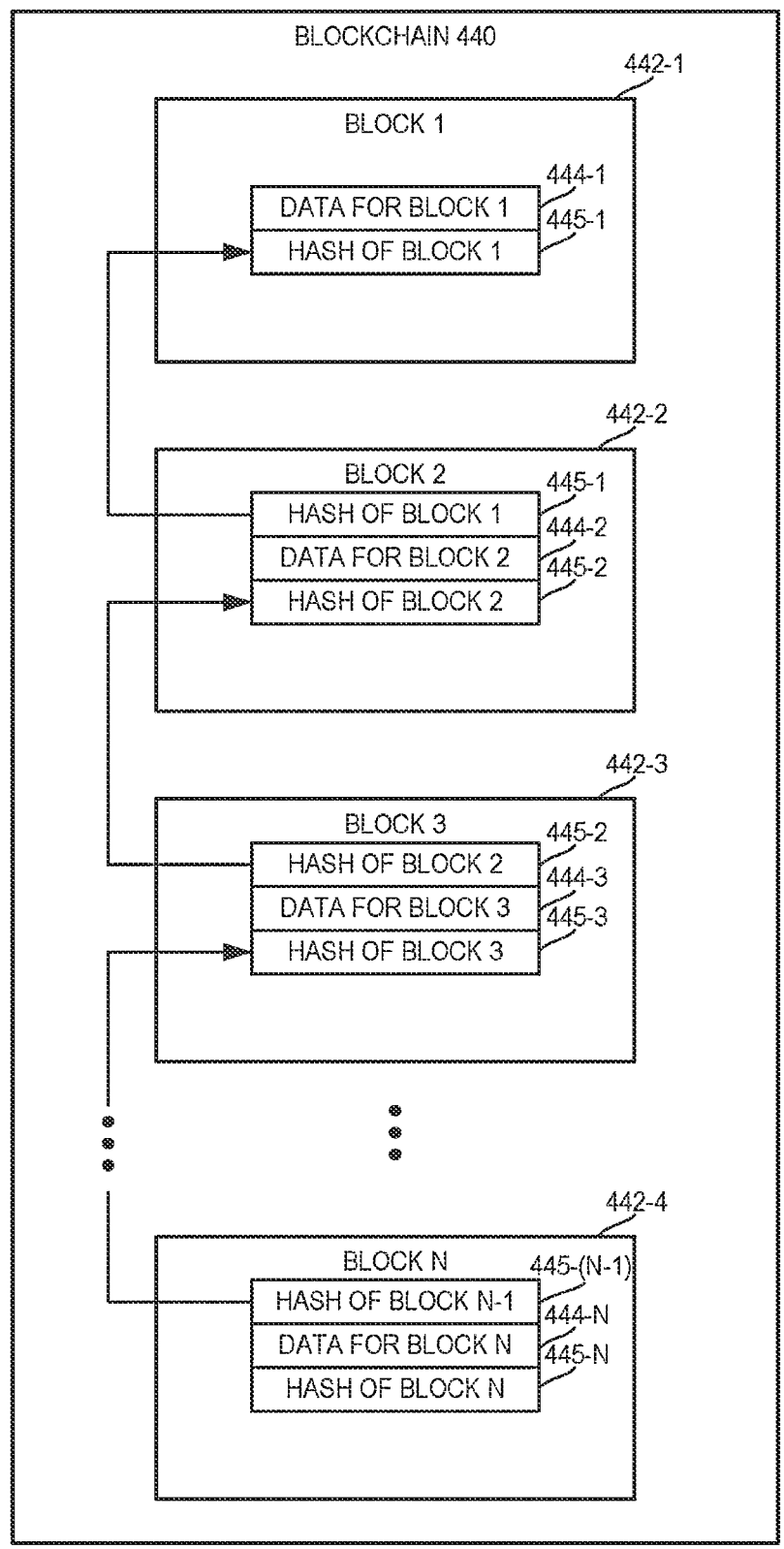
FIG. 10 is a block diagram depicting an example structure of a blockchain in accordance with example embodiments of the present disclosure.

FIG. 10 is a block diagram depicting an example blockchain 440 according to an example aspect of the present disclosure. A block may include data for the respective block and one or more hashes of the respective block data or data of another block. Blockchain 440 includes a plurality of blocks 442 (also referred to as data blocks). Each block includes data 444 for the respective block (e.g., data for Block 1, data for block 2, . . . data for block N) and a cryptographic hash 445 of the data 444 stored in the block.

In FIG. 10, each data block, or simply block 442, includes data 444 for the block and a hashed value, or simply hash 445, of the data for the block. The data 444 for a block 442 may include cryptographic signatures, hash pointers indicating previous transactions, location information such as GPS coordinates, telephone numbers, IP addresses, e-mail addresses, user identifiers, part identifiers, software identifiers, gaming identifiers (e.g., system, channel, session), biometric data, content such as image, video, and/or audio files, etc. The first block (e.g., Block 1) in a particular blockchain can be referred to as the genesis block due to its status as the originating block in the distributed ledger.

The data 444 in each block (e.g., transaction data) can be organized in a data structure over which the hash of the block is computed. For example, the data structure may include smart contract execution results, account balances, public keys, receipts, etc. New transactions can be submitted to and validated by the network. Upon consensus validation of new transactions, additional blocks including the new transactions may be generated. Each new block is appended to the last block of the blockchain 440.

Notably, each new block that is appended to the blockchain includes a hash 445 of the previous block. The cryptographic hash 445 stored in the new block links the new block to the previous block. As illustrated in FIG. 10, block 2 includes a hash 445-1 of Block 1 in addition to the hash 445-2 of the data structure of block 2. Hash 445-1 links Block 2 to Block 1. In this manner, each appended block is linked to the previous block via a hash of the previous block.

Because each block 442 includes a hash 445 of the previous block 442(N-1), any change in a previous block will invalidate all subsequent blocks. Such an architecture makes it practically impossible to compromise a blockchain. Any modification to a transaction recorded in a block will affect subsequent blocks unless a new version of each subsequent block is also modified. The computational requirements to achieve such a modification are infeasible due to the ongoing process of adding blocks to a blockchain.

Typically, blocks 442 may be added to the blockchain 440 by solving algorithmic rules for transactions in a process referred to as mining. During mining, a computing node generates an acceptable block by satisfying one or more proof of work requirements. If a block is validated, the node provides the block (e.g., broadcasts) to the network. The other nodes of the network validate the new block. If a node validates the new block, it adds it to the blockchain. Blockchain transactions can be represented as messages that can be transported between computing nodes.

Other organizations of transaction data may be used. A blockchain is one example of a mechanism to record transaction data. The architecture and associated transport mechanism of this disclosure system may be applicable to other organizations of transaction data. A blockchain, as in a chain or sequence of blocks, may be any organization of blocks including, without limitation, a block tree, a block graph, or the like. Any blockchain and/or block sequence allocation method can be used in accordance with example embodiments.

Figure 11:
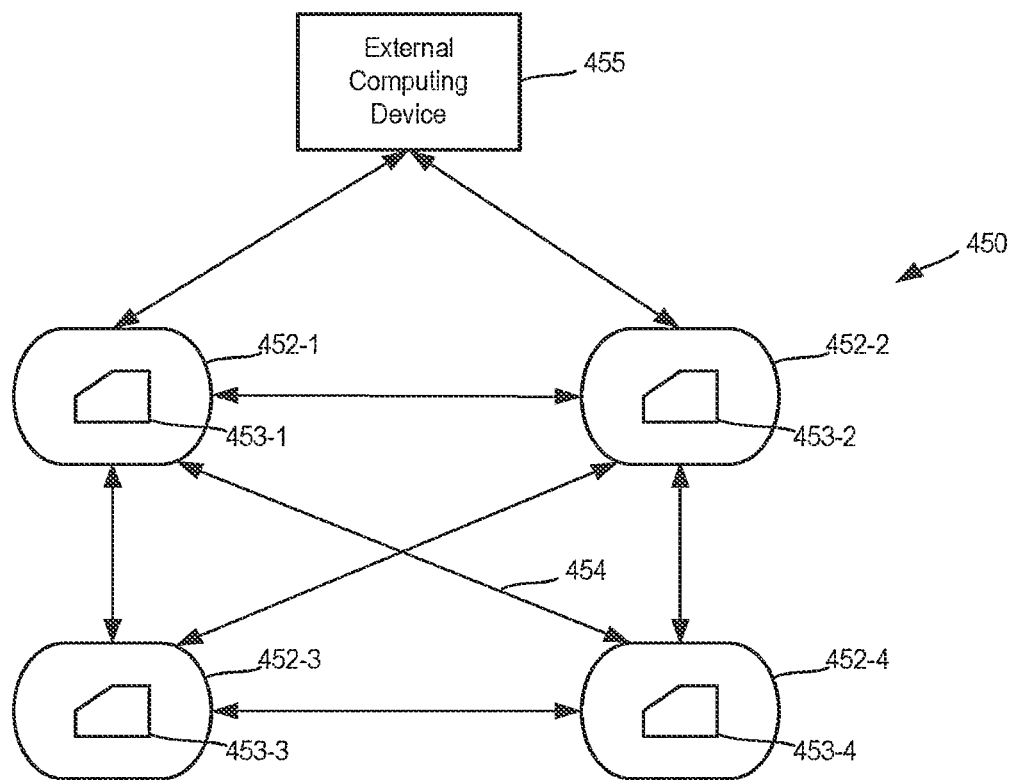
FIG. 11 is a block diagram depicting an example blockchain network in accordance with example embodiments of the present disclosure.

FIG. 11 is a block diagram of an example embodiment of a distributed ledger network 450. A blockchain network is an example of a distributed ledger network 450. Distributed ledger network may be implemented as a peer-to-peer network to provide secure processing, validation, and recording of transactions by consensus validation to avoid traditional implementations that rely on the trust of persons, entities, programs, etc. that are involved in the transactions. The distributed ledger network 450 can be used to transfer and record token actions in blockchain based records. The blockchain forms a cryptographically secured list of blocks that are linked by computational hashing.

The distributed ledger network 450 includes computational nodes 452-1, 452-1, 452-1, and 452-1. Each computational node includes a respective copy 453-1, 453-2,

453-3, 453-4 of the digital ledger. Each computational node comprises one or more computing devices having a memory and one or more processors. Each copy of the digital ledger stored at a node is an identical copy. The nodes send and receive messages to update and synchronize the ledger stored and maintained by each node. The nodes may execute decentralized applications or smart contracts for processing messages. By way of example, a message 454 may be communicated from node 452-1 to node 452-4 to transfer an NFT in the distributed ledger network 450. Similar transmissions may be exchanged between any set of nodes in the distributed ledger network 450 to perform any NFT action (e.g., create, sell, buy) within any gaming channel. A message may include data that confirms a transfer, and which can be recorded in a block of the blockchain. A message may further include a public key for each party participating in the NFT action, such as a transfer of the NFT.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

FIG. 11 depicts an example external computing device 455 in communication with two of the nodes of network 450. External computing device 455 may be a user computing device, intermediary server, gaming server, or other computing device. Although communication with two nodes is depicted, an external computing device may communicate with a single computing node or more than two computing nodes. An external computing device 455 can receive data such as NFT data from the digital ledger system via a computing node. For example, node 452-1 may share data from a digital ledger with external computing device 455. A computing node 452 may also communicate with an external computing device 455 to publish transactions from the external computing device. In some examples, an external computing device may communicate with a computing node using one or more APIs or other interfaces. Data exchanged with an external computing device may be encrypted or otherwise encoded to securely transmit ledger data externally from the blockchain network.

Figure 12:
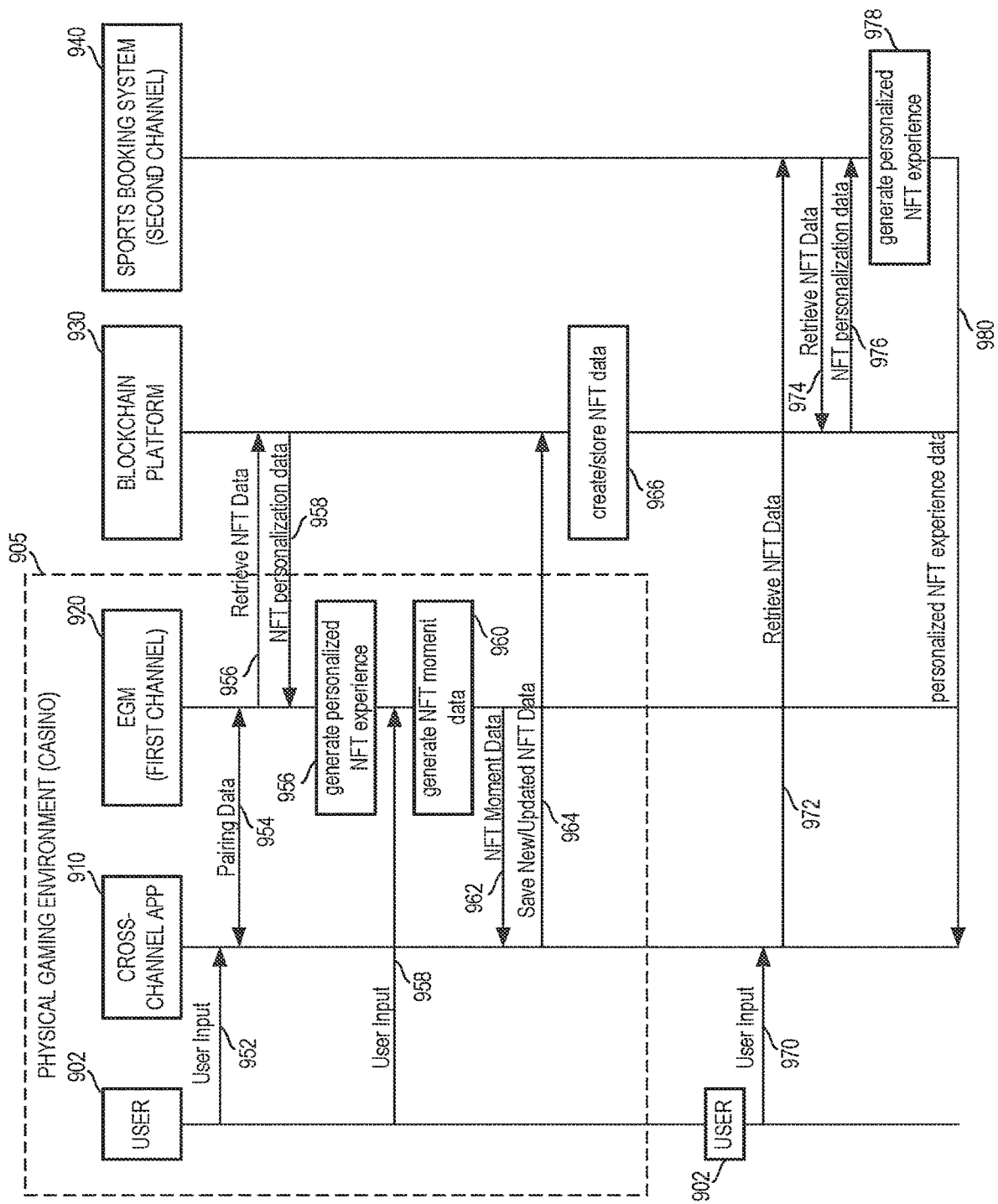
FIG. 12 is a data flow diagram depicting example NFT actions performed over multiple gaming channels in accordance with example embodiments of the present disclosure.

FIG. 12 is a flow diagram depicting the transmission of data between computing nodes in a computing environment including a blockchain platform and multiple gaming channels according to an example embodiment of the present disclosure. The example computing environment includes a cross-channel application 910 which can execute on a user computing device for example. The environment can further include an electronic gaming machine 920 (e.g., a first gaming channel), a sports booking system 940 (e.g., a second gaming channel), and a blockchain platform 930.

In the example of FIG. 12, EGM 920 is located within a physical gaming environment 905 such as a casino. A user 902 can enter the physical gaming environment 905 and pair their user computing device including a cross-channel application 910 with the EGM 920. The user 902 can provide a user input 952 to initiate pairing in some examples. In response to the user input, the cross-channel app can send and receive pairing data 954 with EGM 920 over one or more communication channels such as a low-energy Bluetooth (BLE) connection. In response to pairing with the cross-channel application 910, EGM 920 can send a message to blockchain platform 930 to retrieve NFT data from the platform. In some examples, a cross-channel application identifier or user identifier can be transmitted to the blockchain platform 930 to retrieve NFT data. An identifier can be digitally signed using a private key associated with the user or cross-channel application. The blockchain platform 930 can use a public key associated with the user or application to decrypt the digitally signed message. In some examples, the Intermediary server system can send an authentication challenge or confirmation message directly to the cross-channel application or user computing device to verify that the user is in fact the owner of the NFT. The blockchain platform 930 can return NFT personalization data 958 to EGM 920. Although not shown, EGM 920 may communicate with an Intermediary server system 30 such as that shown in FIG. 3 which in turn can communicate with the blockchain platform 930. The Intermediary server system may retrieve an NFT from the blockchain platform and/or digital content referenced by the NFT. The intermediary server system may generate NFT personalization data which is provided to EGM 920.

EGM 920 can use the NFT personalization data to generate a personalized NFT experience at 956. By way of example, the NFT personalization data may be used to activate a particular game and/or game features of EGM 920. In another example, EGM may display NFT personalization data such as a representation of an NFT badge. With the EGM 920 personalized based on the player's NFT data, the player can provide user input at 958 as part of gameplay or other interaction.

FIG. 12 shows an additional example NFT action. In the example of FIG. 12, EGM 920 generates NFT moment data at 960. A moment associated with an EGM may correspond to a particular win such as wining a jackpot or having a winning streak. Other moments may include losing streaks, certain levels achieved, certain rewards received and the like. The NFT moment data can include any data associated with a moment corresponding to the player and the EGM. For example, the NFT moment data may include a timestamp, player identifier which in some cases may be a public key, machine identifier, game identifier, media data, winning amount, reward information, and the like. Media data may include audio, image, and/or video data such as a video recording of the user and/or the EGM during at least a portion of the moment.

EGM 920 can transmit NFT moment data 962 to cross-channel application 910 and/or to blockchain platform 930. Cross-channel application 910 can send a message 964 to the blockchain platform 930 to save the new NFT within the blockchain platform. The blockchain platform stores the new or updated NFT data at 966. In some examples, the blockchain can create a new moment NFT at 966 using the new and/or updated NFT data. The blockchain platform can record one or more transactions to represent the updated NFT data and/or new moment NFT.

In another example, EGM 920 can transmit NFT moment data 962 to the blockchain platform or Intermediary server system 30 in addition to or in place of transmitting the data to the cross-channel application 910. The intermediary server system 30 or blockchain platform can create a new NFT representing the moment and transfer the NFT to the player, such as through a transaction to the cross-channel application or a digital wallet associated with the player.

FIG. 12 depicts an additional user experience with a second gaming channel. More particularly, FIG. 12 depicts a user experience based on user interaction with a sports booking system 940. As illustrated in FIG. 12, the user leaves the physical gaming environment, although this is not required. The user provides additional user input 970 to the cross-channel application 910. The additional user input 970 is optional. The additional user-input may indicate that the user is at or wishes to access a sports booking gaming channel. Cross-channel application 910 sends one or more messages 972 to the sports booking system 940 to retrieve NFT data associated with the player. The sports booking system communicates with the blockchain platform by sending a message to retrieve the player's NFT data at 974. NFT personalization data 976 is then sent from the blockchain platform to the sports booking system (e.g., a second gaming channel). The sports booking system generates a personalized NFT experience at 978. The sports booking system sends personalized NFT experience data 980 to the cross-channel application at 910. Cross-channel application 910 can in turn deliver a personalized NFT experience in association with the sports booking system 940. Notably, the same NFT can be used in some examples across different gaming channels. By way of example, a gaming badge NFT owned by a player may be displayed on an EGM as part of a first gaming channel and displayed on an online game as part of a second gaming channel.

Figure 13:
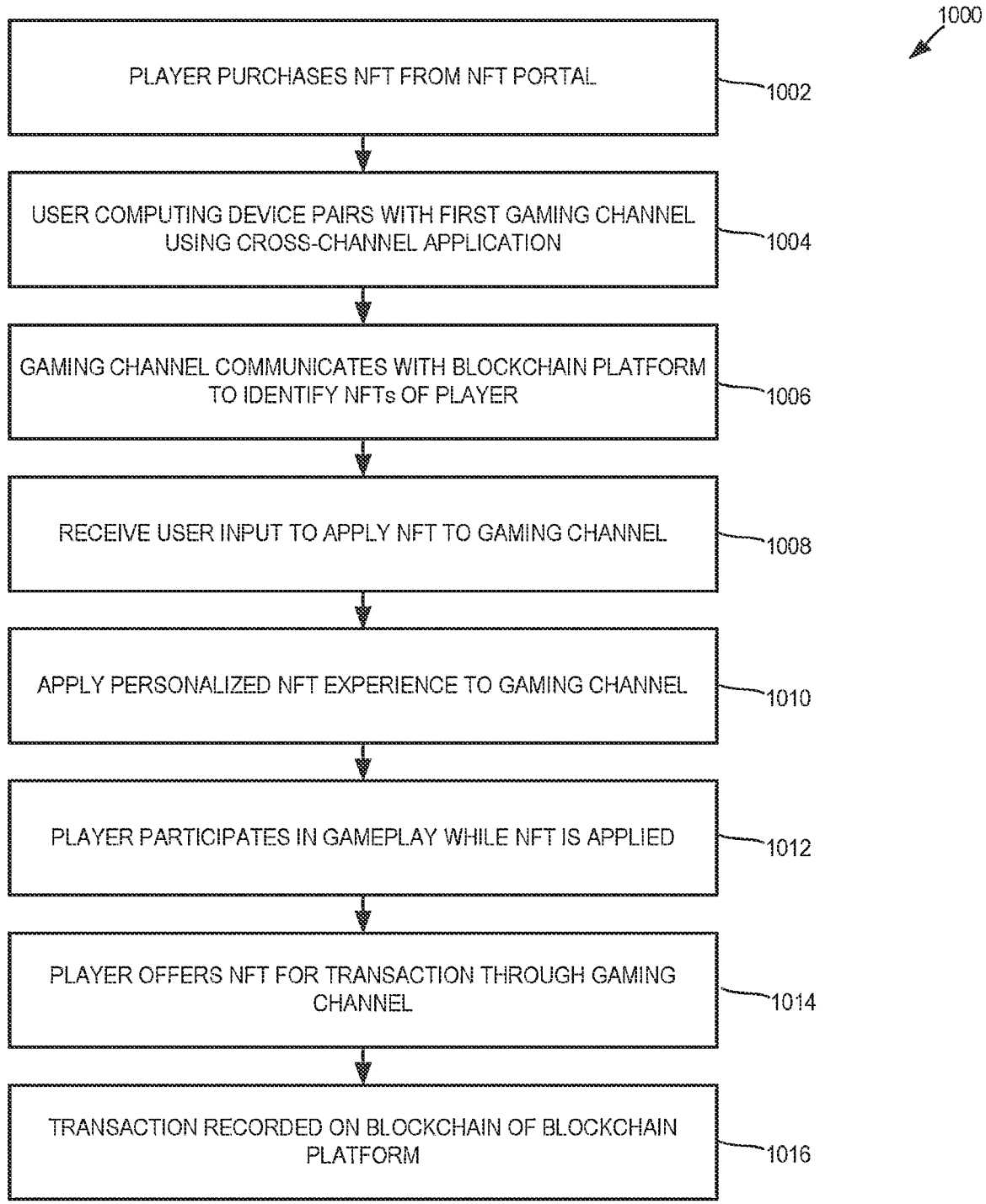
FIG. 13 is a flowchart depicting an example process of managing NFTs in a gaming computer environment including a blockchain platform in accordance with example embodiments of the present disclosure.

FIG. 13 depicts a flowchart illustrating an example method for managing non-fungible tokens across a plurality of gaming channels in accordance with an example embodiment of the present disclosure. One or more portions of method 1000 and the other methods described herein can be implemented by one or more computing devices such as, for example, one or more computing devices of a gaming platform as illustrated in FIG. 1. One or more portions of method 1000 and the other methods described herein can be implemented as an algorithm on the hardware components of the devices described herein to, for example, generate personalized gaming experiences using NFTs and/or action NFTs across one or more gaming channels. In example embodiments, method 1000 may be performed by or otherwise using a digital ledger platform as described herein. Although FIG. 11 depicts steps performed in a particular order for purposes of illustration and discussion, method 1000 of FIG. 11 and the other methods described hereinafter are not limited to the particularly illustrated order or arrangement. The various steps of the methods mentioned above can be omitted, rearranged, combined, and/or adapted in various ways without deviating from the scope of the present disclosure.

At 1002, method 1000 includes a player purchasing or otherwise acquiring an NFT from NFT portal system 32. In example embodiments, a player may additionally or alternatively acquire an NFT via one or more gaming channels or via standard crypto wallet, marketplace, etc.

An NFT portal associated with the digital ledger platform may offer an application, storefront, or other interface for players to view and purchase NFTs available from the platform. The NFTs may be limited in supply in some examples such that only a limited number of NFTs for particular digital content such as a character, game play level, or the like. Other NFTs may include custom reel strips, audio clips, themes of games, and the like.

At 1004, method 1000 includes a user computing device associated with the player pairing with a first gaming channel using a cross-channel application of the user computing device. Various pairing techniques can be used to establish a communication channel between the first gaming channel and the cross-channel application such as a low-energy Bluetooth connection.

At 1006, method 1000 includes the gaming channel communicating with the blockchain platform to identify NFTs of the player. The gaming channel may transmit an identifier of the user's cross-channel application or digital wallet to the blockchain platform in example embodiments.

At 1008, method 1000 includes receiving user input to apply the NFT to the gaming channel. The user input may be received by the cross-channel application in some examples. In other examples, the user input may be received by a computing device of the gaming channel such as an EGM.

At 1010, method 1000 includes applying a personalized NFT experience to the gaming channel. At 1010, the gaming channel can apply particular game attributes, skins, characters, levels, or other NFT related data to the gaming channel for the players gameplay. In some examples, applying a personalized NFT experience can include displaying an NFT such as a badge, charm, etc. during gameplay by the player. These NFTs may be viewed as lucky charms or other items having a value to the player or other players. For example, if someone wins a jackpot while a particular NFT is applied, that NFT may be perceived to increase in value to one or more other players.

At 1012, method 1000 includes the player participating in gameplay while the NFT is applied. For example, a gaming machine may display an NFT badge during gameplay by the player within the first gaming channel.

At 1014, method 1000 includes the player offering the NFT for a transaction through the first gaming channel or another gaming channel. For example, the player can offer to sell, rent, or perform another transaction relative to the NFT.

At 1016, the transaction associated with the NFT is recorded on the blockchain associated with the NFT.

Figure 14A:
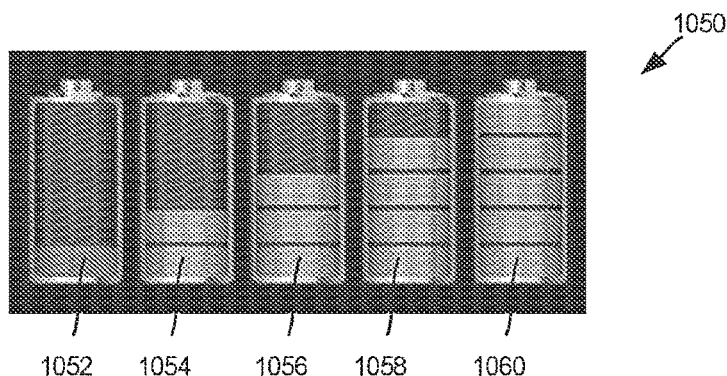
FIG. 14A is a graphical representation of an NFT having multiple NFT states in accordance with example embodiments of the present disclosure.

According to one example aspect of the present disclosure, multi-state NFTs are provided by the digital ledger platform. A graphical representation of a multi-state NFT is depicted in FIG. 14A. In this example, the multi-state NFT has five states 1052, 1054, 1056, 1058, and 1060. State 1060 can correspond to a fully charged state while state 1052 can correspond to a depleted or uncharged state. Each state may be associated with a different set of player privileges in example embodiments. For instance, the fully-charged state 1060 can be associated with a highest level of player privileges (e.g., platinum privileges in an NFT club). In some example, players having a fully charged NFT will be shown in an NFT portal.

The state of the NFT can be based on time and/or spend criteria. For example, a predetermined threshold level of time of play and/or spend may be established for each state or charge level. If a player does not keep an NFT charged by meeting the predetermined threshold(s) associated with a particular charge level, the charge level of the NFT can change and the NFT can enter a lower charge state such as state 1058. In some examples, reminders can be provided to the player to recharge a multi-state NFT. In some examples, an NFT may only be actionable while in a particular set of one or more states. For instance, an NFT may only be transferred when it is in a fully-charged state in an example embodiment.

Figure 14B:
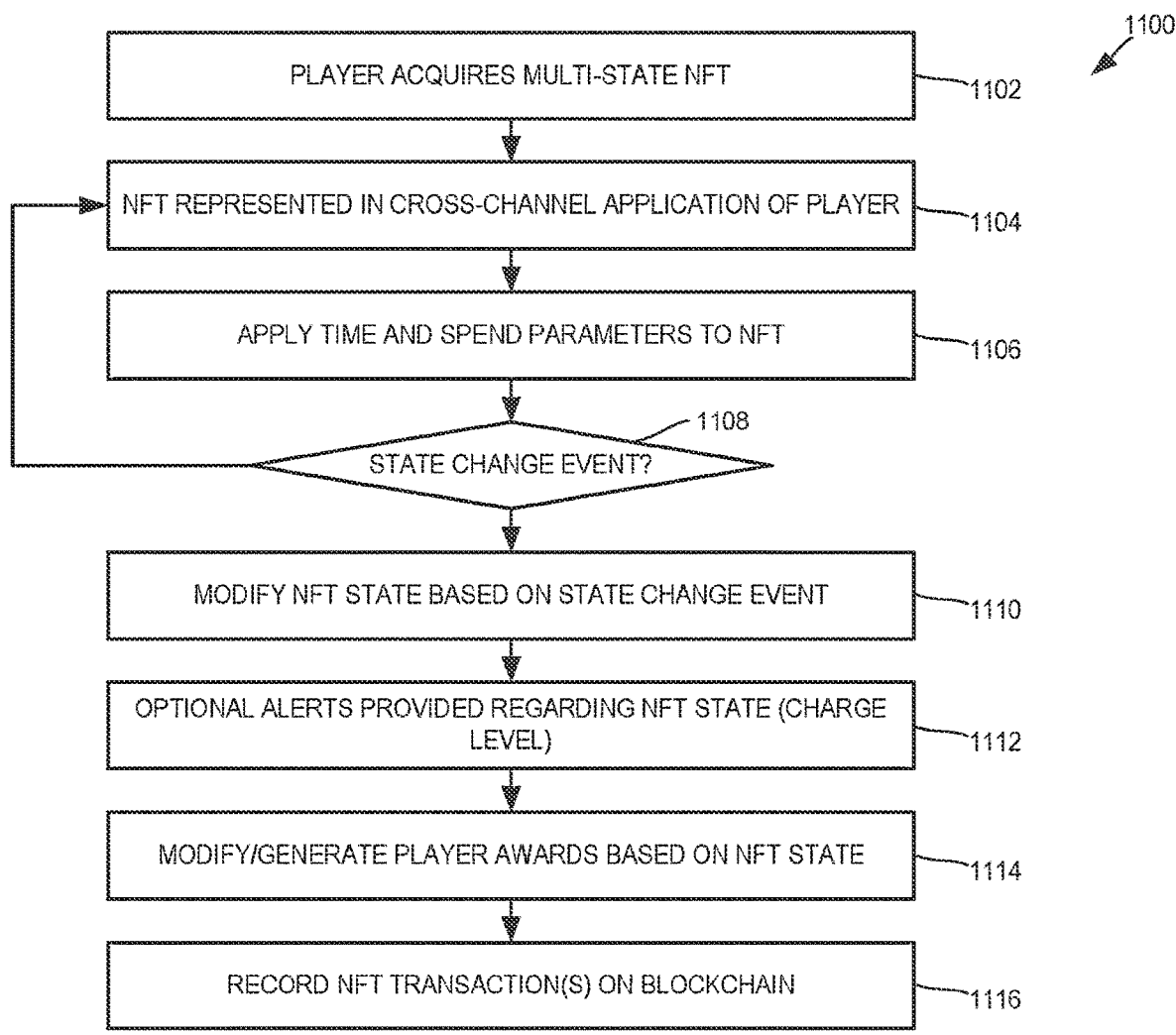
FIG. 14B is a flowchart depicting an example process of managing multi-state NFTs in a gaming computer environment including a blockchain platform in accordance with example embodiments of the present disclosure.

FIG. 14B depicts a flowchart illustrating an example method for managing a multi-state non-fungible tokens in accordance with an example embodiment of the present disclosure. One or more portions of method 1100 can be implemented as an algorithm on the hardware components of the devices described herein to, for example, manage a multi-state NFT by applying time and/or spend rules to determine and apply state changes to the NFT. In example embodiments, method 1000 may be performed by or otherwise using a digital ledger platform as described herein.

At 1102, method 1100 includes a player acquiring a multi-state NFT. A multi-state NFT can be acquired by any of the processes described herein, such as through a purchase, reward, rental, etc. In a particular example, a player can access an NFT portal to purchase NFTs.

At 1104, method 1100 includes representing the NFT in the cross-channel application of the player. Method 1100 can include displaying one or more pieces of digital content included within or linked to the NFT. For example, a video, image, audio, or other digital content can be presented.

At 1106, method 1100 includes applying time and spend parameters to the NFT. For example, the blockchain platform may determine an amount of time associated with gameplay including the NFT or an amount of monetary spend associated with gameplay including the NFT. The blockchain platform can determine whether the amount of spend or time meets one or more predetermined thresholds for a particular state level of the NFT.

At 1108, method 1100 includes determining whether a state change event has occurred. For example, the blockchain platform can determine if the time and/or spend parameters for one or more state levels are met. At 1108, the platform can determine that the state of an NFT should be lowered to a lower-charge state in response to the NFT not meeting the predetermined threshold(s) for a current state level. In another example, the blockchain platform can determine that the state of an NFT should be increased to a higher charge state in response to the NET meeting the predetermined threshold(s) for the higher charge state. At 1110, the blockchain platform modifies the NFT state based on the state change event by lowering or increasing the state level of the NFT. In some examples, the state change may result in the NFT reaching a depleted or uncharged state. In some cases, an NFT may be recharged from a depleted or uncharged state. In other examples, an NFT may not be recharged from a depleted or uncharged state. Instead, the NFT can be discarded, removed, or otherwise removed from circulation. In certain examples, other state changes of the NFT may be implemented by issuing subsequent NFTs having a different set of functions and/or privileges, which may be beneficial for "irreversible" state changes.

At 1112, method 1100 includes providing one or more alerts regarding a state change. In some examples, the blockchain platform can generate alerts to remind a user to recharge an NFT by engaging in gameplay for a time or spend criteria to be met.

At 1114, method 1100 includes modifying and/or generating player rewards based on the NFT state. For example, the blockchain platform can change a set of privileges or rewards associated with the player.

At 1116, any transactions associated with the NFT are recorded on the blockchain associated with the NFT. In some examples, each state change of a multi-state NFT can be recorded on the blockchain.

A player can obtain a non-fungible token through gamification. For instance, a player can win or otherwise receive ownership of at least a share of a non-fungible token through gameplay patterns. Examples of gameplay patterns include a winning streak, losing streak, jackpot, lucky combination, etc. Future gameplay patterns can provide increased reward to the player. Examples of increased reward include higher-level non-fungible tokens, larger wins, etc.

For instance, a player can play on a first NFT-enabled game channel. An NFT can be awarded as a winning from a gameplay pattern of the first gaming channel. The first gaming channel can award a winning streak to the player and concurrently query the player with a decision to collect the reward of the winning streak (e.g., the NFT). The player can be paired with the first gaming channel via a cross-channel application. For instance, the user may pair with the first gaming channel using a cross-channel application. The first gaming channel may offer an NFT portal providing for viewing the player's NFTs. The player may be awarded the NFT from the first gaming channel as a reward for the winning streak, at which point the NFT can become visible in the NFT portal. Additionally, the player's signature may be visible with the NFT in the NFT portal.

Once the NFT has been awarded to the player, the player may subsequently pair with a second NFT-enabled game channel. Upon the player pairing with the second game channel, the player may be prompted with one or more increased reward options. For example, in some implementations, the player may be prompted to select between increasing (e.g., doubling) the player's wins or a higher-value NFT. For instance, the player may select an increased number of wins, such as a doubled number of wins. In response to the player selecting the increased number of wins, the number of wins of the player can be doubled. Additionally, the NFT which was awarded to the player can be dissolved. Alternatively, in response to the player selecting the higher-value NFT, the existing NFT can be replaced by a higher-value NFT in the player's NFT portal.

The transactions can be recorded using one or more blocks of a blockchain which can be viewed publicly, such as by using a blockchain explorer. For instance, a transaction awarding the NFT to the player can be recorded by the blockchain. Additionally and/or alternatively, a transaction awarding an increased number of wins to the player and/or dissolving the NFT can be recorded by the blockchain. Additionally and/or alternatively, a transaction awarding an increased-value NFT to the player in place of the NFT can be recorded by the blockchain. Transactions recorded by the blockchain, such as those described above, can be disputed and/or mined for accuracy.

Figure 15:
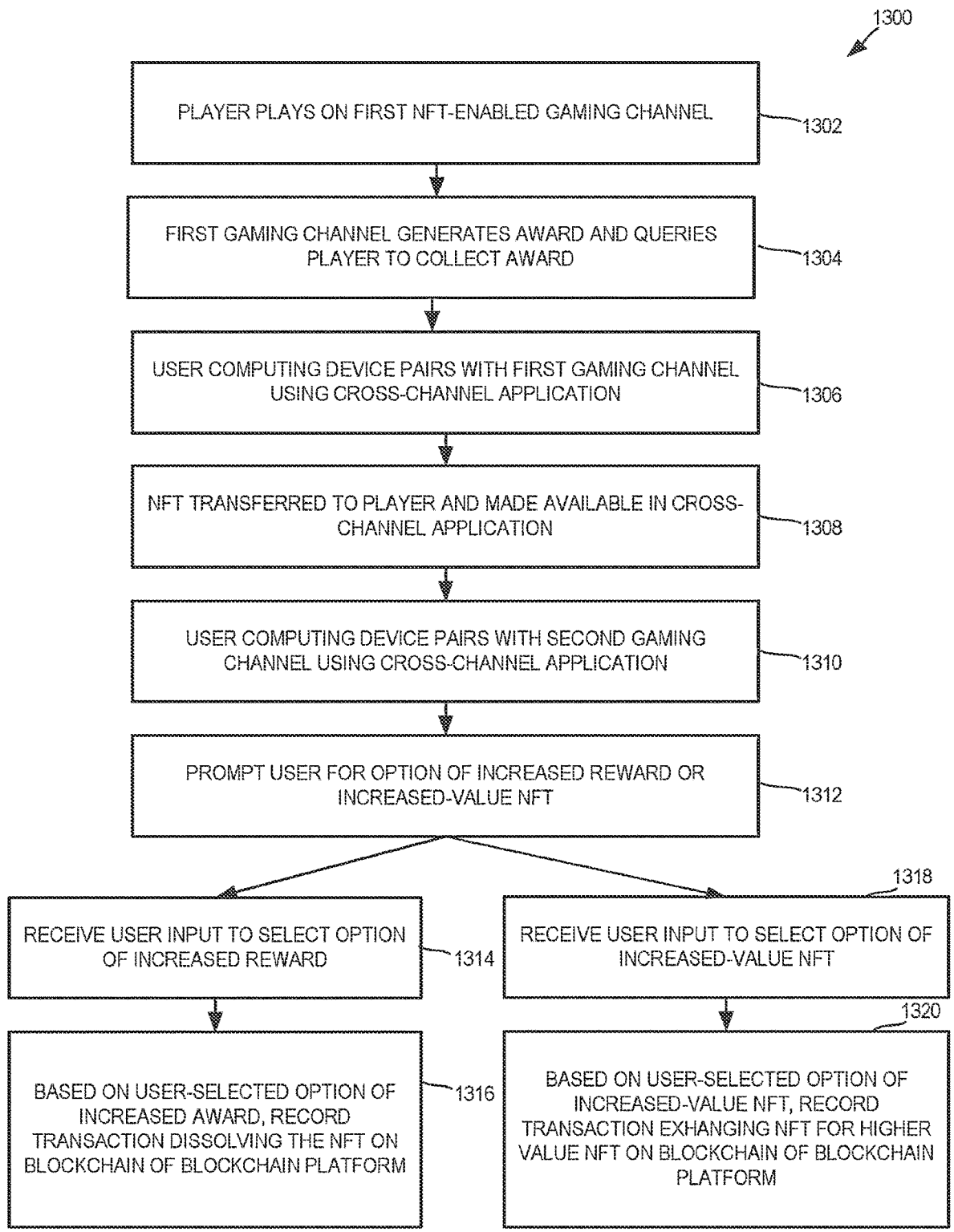
FIG. 15 is a flowchart depicting an example process of awarding NFTs as winnings from an NFT-enabled game in a gaming computer environment including a blockchain platform in accordance with example embodiments of the present disclosure.

FIG. 15 is a flowchart depicting an example process of awarding NFTs as winnings from an NFT-enabled game in a gaming computer environment including a blockchain platform in accordance with example embodiments of the present disclosure. One or more portions of method 1300 can be implemented as an algorithm on the hardware components of the devices described herein to, for example, generate personalized gaming experience using NFTs and/or action NFTs across one or more gaming channels.

At 1302, a player plays on an NFT-enabled gaming channel. For instance, a gaming platform may include a number of gaming channels such as EGMs, online games, social network-based games, etc. The NFTs may be limited in supply in some examples such that only a limited number of NFTs for particular digital content such as a character, game play level, or the like is available. Other NFTs may include custom reel strips, audio clips, themes of games, and the like.

At 1304, the first gaming channel can generate an award and/or query the player to collect the reward. For instance, the first gaming channel can generate an award in response to the player performing favorably at a game of the first gaming channel. The player may be provided with controls (e.g., via a user interface element) enabling the user to accept the reward. The user input may be received by the cross-channel application in some examples. In other examples, the user input may be provided by selection elements on a touch screen.

At 1306, a user computing device associated with the player pairs with the first gaming channel using a cross-channel application of the user computing device. Various pairing techniques can be used to establish a communication channel between the first gaming channel and the cross-channel application such as a low-energy Bluetooth connection.

At 1308, the NFT is transferred to the user. For instance, the cross-channel application can be paired to award the player the NFT. Additionally, the NFT can be made available in the cross-channel application. For instance, the NFT can be made available in a player's NFT portal on the cross-channel application.

At 1310, the user computing device associated with the player pairs with a second gaming channel using a cross-channel application of the user computing device. Various pairing techniques can be used to establish a communication channel between the first gaming channel and the cross-channel application such as a low-energy Bluetooth connection, Wi-Fi connection, etc.

At 1312, upon the player pairing with the second game channel, the player may be prompted with one or more increased reward options. For example, in some implementations, the player may be prompted to select between increasing (e.g., doubling) the player's wins or a higher-value NFT. For instance, the player may select an increased number of wins, such as a doubled number of wins.

At 1314, method 1300 includes receiving user input to select the increased reward option. For example, the user can prove an indication of selecting an increased reward (e.g., an increased amount of wins). As one example, the user may be provided with a user interface on the user computing device that provides for the user to input a selection of increased reward option. Example user interfaces include selection elements on a touch screen. The user input may be received by the cross-channel application in some examples. In other examples, the user input may be received by a computing device of the gaming channel such as an EGM.

At 1316, the transaction associated with the NFT is recorded on the blockchain associated with the NFT. The transaction can be based at least in part on the user input. For instance, in response to the player selecting the increased reward option (e.g., increased number of wins), the increased reward can be provided to the player (e.g., the number of wins of the player can be doubled). Additionally, the NFT which was awarded to the player can be dissolved. For instance, a transaction dissolving the NFT can be recorded on the blockchain.

At 1318, method 1300 includes receiving user input to select the increased reward option. For example, the user can prove an indication of selecting the higher-value NFT. As one example, the user may be provided with a user interface on the user computing device that provides for the user to input a selection of increased reward option. Example user interfaces include selection elements on a touch screen. The user input may be received by the cross-channel application in some examples. In other examples, the user input may be received by a computing device of the gaming channel such as an EGM.

At 1320, in response to the player selecting the higher-value NFT, the existing NFT can be replaced by a higher-value NFT in the player's NFT portal. For instance, a transaction can be recorded in the blockchain that exchanges the original NFT for the higher-value NFT.

To facilitate responsible gaming, a player can purchase a responsible gaming NFT. Purchase (or other ownership) of the responsible gaming NFT can act as an indication for gaming channels that the player plays on to track one or more responsible gaming limits associated with the responsible gaming NFT. Examples of responsible gaming limits include time spent playing, wager spending, time of day, days, number of wins, winning percentage, and/or any other suitable responsible gaming limits. For instance, the gaming channel may track metrics related to the responsible gaming limits to ensure that the player does not exceed any of the responsible gaming limits. Thus, a player can purchase a responsible gaming NFT to act as an incentive to limit the gameplay of the player. When the limits of the responsible gaming NFT expire, the NFT can be dissolved.

As another example, a player can obtain a non-fungible token as a reward for responsible gaming. For instance, a player can win or otherwise receive ownership of at least a share of a non-fungible token through responsible gameplay patterns. For instance, the responsible gameplay patterns can be indicative of a user gaming with reasonable wagers, limited time commitment, etc. As an example, the player can play on an NFT-enabled game channel. A responsible gaming NFT can be awarded in response to detecting a responsible gameplay pattern by the player on the gaming channel.

In some cases, the player can pair with the gaming channel to accept the responsible gaming NFT. For instance, the player can be paired with the gaming channel via a cross-channel application. As an example, the user may pair with the gaming channel using a cross-channel application. The blockchain platform may offer an NFT portal providing for viewing the player's NFTs. The player may be awarded the NFT from the gaming channel in response to a responsible gameplay pattern, at which point the NFT can become visible in the cross-channel application and optionally the NFT portal. Additionally, the player's signature may be visible with the NFT in the NFT portal.

The transactions can be recorded using one or more blocks of a blockchain which can be viewed publicly, such as by using a blockchain explorer. For instance, a transaction awarding the responsible gaming NFT to the player based on a responsible gaming pattern can be recorded by the blockchain. Additionally and/or alternatively, a transaction dissolving the NFT (e.g., if the responsible gameplay limits expire) can be recorded by the blockchain. Additionally and/or alternatively, a transaction awarding a responsible gaming NFT to the player after purchase of the responsible gaming NFT can be recorded by the blockchain.

Figure 16A:
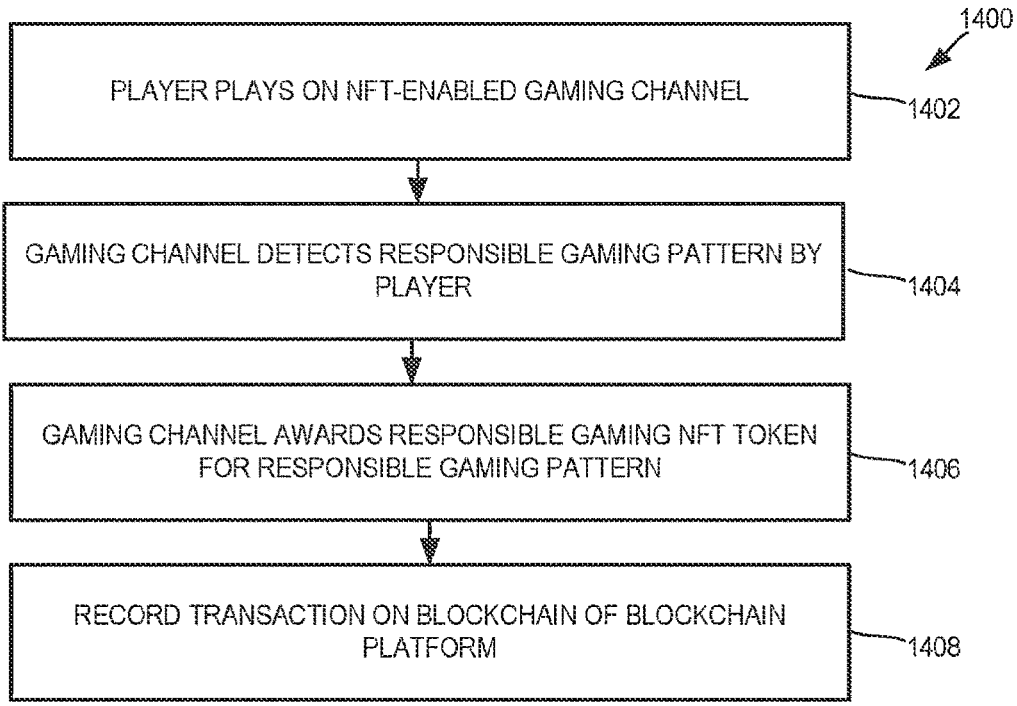
FIG. 16A is a flowchart depicting an example process of managing responsible gameplay NFTs for responsible gameplay patterns in a gaming computer environment including a blockchain platform in accordance with example embodiments of the present disclosure.

FIG. 16A depicts a flowchart illustrating an example process of managing responsible gameplay NFTs in accordance with an example embodiment of the present disclosure.

At 1402, a player plays on an NFT-enabled gaming channel. The NFTs may be limited in supply in some examples such that only a limited number of NFTs for particular digital content such as a character, game play level, or the like. Other NFTs may include custom reel strips, audio clips, themes of games, and the like.

At 1404, the first gaming channel can detect a responsible gameplay pattern by the player. For instance, the first gaming channel can detect that the player plays with responsible wagers, for a reasonable amount of time, a reasonable number of days, with a reasonable success rate, etc. For instance, the gaming channel may track various gameplay statistics of the player, such as, for example, time, spending, days, win/loss, among others. The player may be considered to follow a responsible gameplay pattern if the user has values within a responsible threshold for at least some of the gaming statistics. For instance, in some implementations, detecting the responsible gameplay pattern can include tracking one or more gameplay statistics of the player and determining that values of the one or more gameplay statistics fall within a responsible gameplay pattern threshold.

At 1406, a responsible gaming NFT can be awarded to the player. For instance, the gaming channel can generate or award the responsible gaming NFT in response to the responsible gameplay pattern. In some implementations, the responsible gaming NFT can be awarded by pairing a user computing device associated with the player with the gaming channel using a cross-channel application of the user computing device. Various pairing techniques can be used to establish a communication channel between the gaming channel and the cross-channel application such as a low-energy Bluetooth connection.

At 1408, the transaction associated with the responsible gaming NFT is recorded on the blockchain associated with the NFT. For instance, a transaction can be recorded in the blockchain that provides ownership of the responsible gaming NFT to the player. The responsible gaming NFT earned by responsible gameplay pattern can be later traded or redeemed for other NFTs and/or winnings.

Figure 16B:
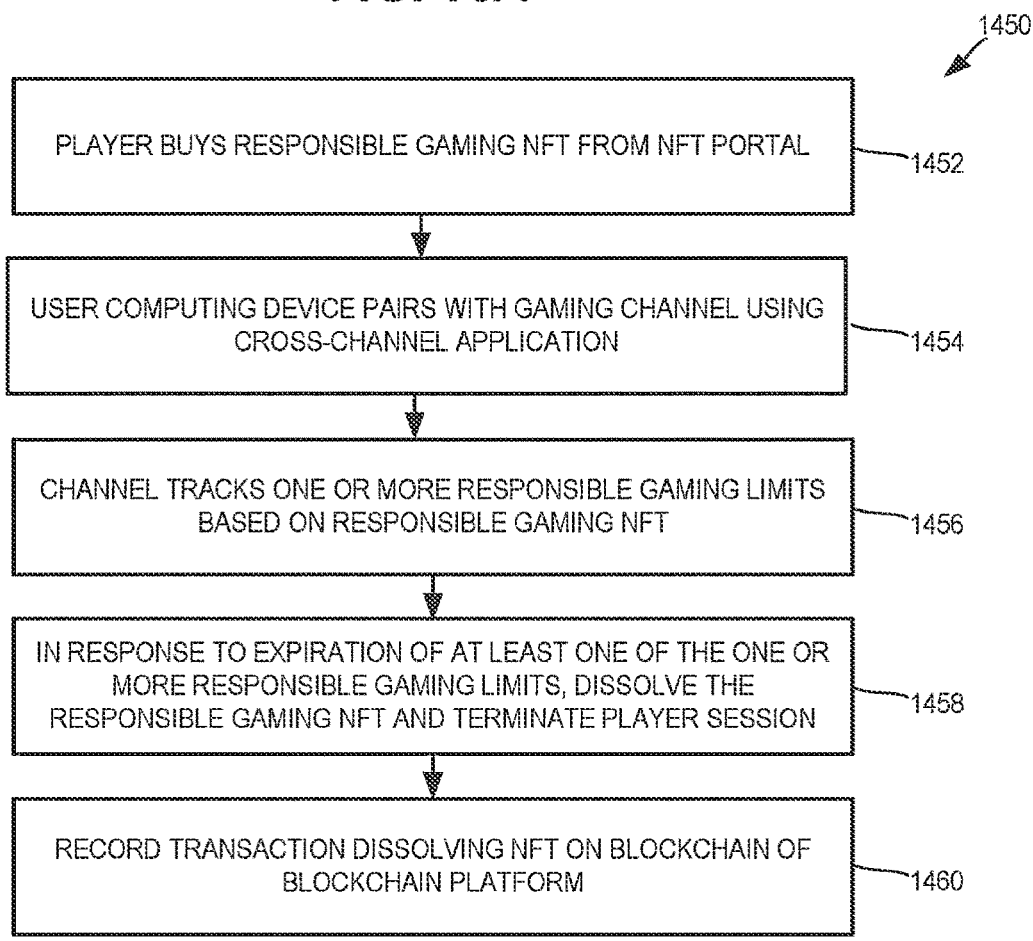
FIG. 16B is a flowchart depicting an example process of managing responsible gameplay NFTs for self-imposed restrictions on a player in a gaming computer environment including a blockchain platform in accordance with example embodiments of the present disclosure.

FIG. 16B depicts a flowchart illustrating an example method for managing non-fungible tokens across a plurality of gaming channels in accordance with an example embodiment of the present disclosure.

At 1452, a player can buy a responsible gaming NFT from an NFT portal. For instance, the player can purchase the responsible gaming NFT to self-impose restrictions on the player's gameplay. For instance, in some implementations, the user can choose which restrictions (e.g., upon which aspects of gameplay, such as time, spending, etc.) to impose. Additionally and/or alternatively, the player can specify values of limits, in some implementations. The self-imposed restrictions can be imposed for a given duration, such as a preset duration, customizable duration etc. A transaction may be recorded in the blockchain of the responsible gameplay NFT assigning the NFT to the player.

At 1454, a user computing device associated with the player pairs with the gaming channel using a cross-channel application of the user computing device. Various pairing techniques can be used to establish a communication channel between the first gaming channel and the cross-channel application such as a low-energy Bluetooth connection.

At 1456, the gaming channel can track one or more responsible gaming limits based at least in part on the responsible gaming NFT. For instance, various gameplay statistics of the player, such as time, spending, day, winnings, win rate, etc. can be tracked as the player plays on the gaming channel (e.g., over a given session). The user can be restricted from certain gameplay patterns that violate the one or more responsible gaming limits. For instance, if the user attempts to perform a gameplay pattern that would exceed any of the one or more responsible gaming limits, the user may be prevented from performing the gameplay pattern.

At 1458, the gaming channel can terminate the player's session and/or dissolve the responsible gameplay NFT if the one or more responsible gaming limits expire. As an example, the one or more responsible gaming limits can expire if the duration of the responsible gaming NFT elapses. For instance, the responsible gaming limits may be set to expire after a given duration of time. As another example, the one or more responsible gaming limits may expire if exceeded. The player may then be unpaired from the gaming channel.

At 1460, the transaction associated with dissolving the responsible gaming NFT is recorded on the blockchain associated with the NFT. For instance, the transaction dissolving the NFT can be recorded on the blockchain such that ownership of the NFT is removed from the player.

The present disclosure can provide for playing NFT-enabled multiplayer games on various gaming channels. For instance, one multiplayer NFT-enabled game can be played by multiple players through multiple channels offering the same multiplayer NFT-enabled game. Examples of multiplayer games include, but are not limited to, multiplayer poker, real estate trading games, Bingo, electronic table games (e.g., roulette, craps, etc.), snake and ladder, etc.

A player can purchase NFTs to be used as currency (e.g., wager) in playing certain NFT-enabled multiplayer games. For instance, the player can wager one or more of the purchased NFTs as entry into the game. As one example, the player can pair with a gaming channel offering the NFT-enabled multiplayer game by a cross-channel application on a user computing device associated with a player. Once the player has paired with the gaming channel offering the multiplayer game, the user can wager one or more of the NFTs as entry to the game and/or during course of the game.

Additionally, one or more second players can join the multiplayer game. The second player(s) can join through the same gaming channel and/or other gaming channels that offer the same NFT-enabled multiplayer game. Example channels include but are not limited to Mobile, in-game hardware interfaces with backend systems (e.g., iVIEW DM), and EGM. The second players can submit NFTs and/or other wagers to enter the game. Once the minimum number of players has joined the game, and/or any confirmation to start is given, the game can be started. The game is executed until one or more winner(s) are selected.

The winner(s) can be prompted to select a form of reward of their choosing. For example, a winner may be presented with the option to select from one or more reward types. As one example, the reward types can include additional NFTs. For instance, user input can be received (e.g., by the user computing device) selecting NFTs as a reward. In response to the user input, one or more NFTs can be awarded to the winner. For instance, one or more transactions can be recorded by the blockchain(s) of the NFTs to provide ownership of the NFTs to the winner. For instance, in some implementations, the winner can pair a user computing device associated with the winner to the winner's respective gaming channel to receive the NFTs in the winner's NFT portal. The game can be tracked by a blockchain prior to the game, during the game, and/or after the game to provide a record of the game. The record of the game can be useful in resolving any disputes that arise.

Figure 17:
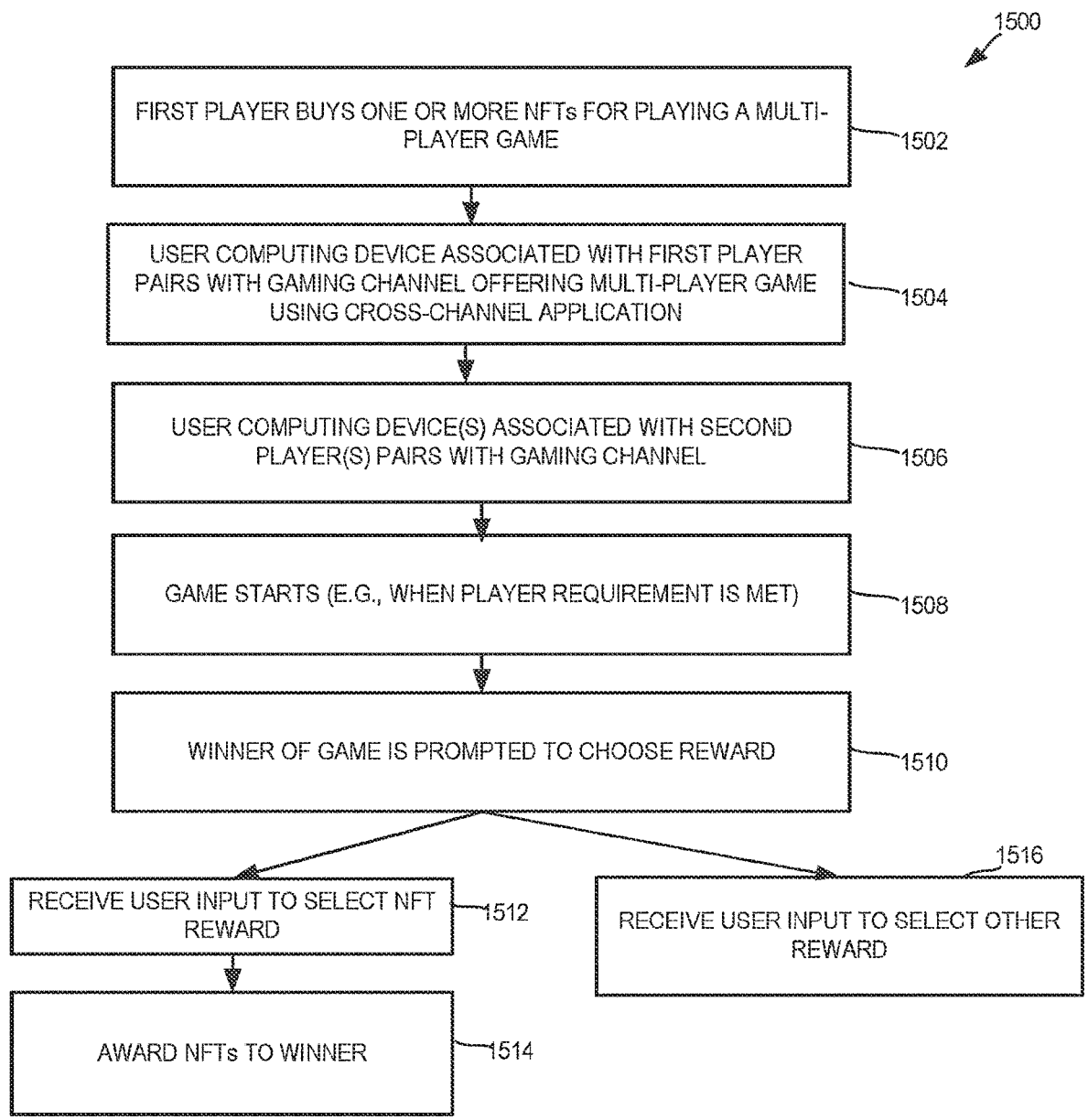
FIG. 17 is a flowchart depicting an example process of managing multi-channel multiplayer games awarding NFTs as a reward in a gaming computer environment including a blockchain platform in accordance with example embodiments of the present disclosure.

FIG. 17 depicts a flowchart illustrating an example method for managing non-fungible tokens for multiplayer games in accordance with an example embodiment of the present disclosure.

At 1502, a first player buys one or more NFTs. The first player can use the NFTs for playing an NFT-enabled multiplayer game. For instance, one or more transactions can be recorded in blockchain(s) of the NFTs for assigning ownership of the NFTs to the first player.

At 1504, a user computing device associated with the first player pairs with the gaming channel using a cross-channel application of the user computing device. Various pairing techniques can be used to establish a communication channel between the first gaming channel and the cross-channel application such as a low-energy Bluetooth connection.

At 1506, user computing device(s) associated with one or more second player(s) pair(s) with one or more same and/or different gaming channel(s) offering the same multiplayer game using a cross-channel application of the user computing device(s). Various pairing techniques can be used to establish a communication channel between the gaming channel(s) and the cross-channel application such as a low-energy Bluetooth connection.

At 1508, the game can be started. For instance, the game can be started when a minimum player requirement of the game is met. As an example, the minimum player requirement can be met when the minimum number of players required for the game can execute have paired with gaming channel(s) offering the multiplayer game. In some implementations, the players can confirm that they are ready for the game to start after joining the channel(s) and prior to starting the game, and the game can be started when each user has confirmed readiness.

At 1510, winner(s) of the game can be prompted to choose a reward type. For instance, a winner of the game may provide user input selecting a reward type from a plurality of candidate reward types. The reward types can include NFTs.

At 1512, user input selecting NFTs as a reward type can be received. For instance, the winner can provide input indicating that the winner desires to receive NFTs as winnings from the multiplayer game.

At 1514, NFTs can be awarded to the winner. For instance, the NFTs can be awarded to the winner in response to receiving the user input selecting NFTs as a reward type. For instance, one or more transactions can be recorded in the blockchain(s) of the awarded NFTs that assigns ownership of the NFTs to the winner. Additionally and/or alternatively, the ownership may be transferred from one of the losing players.

At 1516, user input selecting another reward type can be received. For instance, the winner may elect to receive another reward type in place of and/or additionally to the NFT rewards. The winner may then be provided with the selected reward type.

A voting NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). The voting NFT can provide a user with a voting right that allows the user to cast a vote in favor of a certain candidate in a contest and/or an election associated with a gaming environment (e.g., a real, physical gaming environment and/or a virtual, computer-implemented gaming environment). For instance, such a voting right can allow a user to cast a vote in favor of: a certain game in a contest held to determine the best game provided by one or more game developers; a certain game theme in a contest held to determine the best game theme provided by one or more game developers; a certain type of wager and/or a certain type of win in a contest held to determine the best type of wager and/or win to implement in a particular game; a certain gaming cabinet in a contest held to determine the best gaming cabinet provided by one or more gaming cabinet designers and/or fabricators; and/or another contest and/or election associated with a gaming environment. In some example embodiments, a voting NFT can allow a user to cast a vote in a contest and/or election within a defined voting window (e.g., within a fixed and/or pre-defined duration, such as a day, a week, etc.).

In an example embodiment, a smart contract associated with a voting NFT can define one or more attributes of the voting NFT and/or facilitate execution of one or more voting rights of the voting NFT. For example, a smart contract can define: the specific contest in which a defined voting right can be applied; the time, date, and/or location of the contest; the specific voting right(s) associated with the voting NFT (e.g., the right to cast one vote in favor of one candidate in one contest); the method by which the user can cast a vote in a contest; and/or another attribute of the voting NFT.

In another example embodiment, the smart contract can further facilitate association of a voting NFT with a user that owns the voting NFT across one or more games in one or more gaming channels (e.g., one or more voting NFT enabled gaming channels). For instance, the smart contract can provide confirmation to a game and/or an NFT enabled gaming channel that certain condition(s) have been satisfied to prove that a certain entity (e.g., a user that owns the voting NFT) has an ownership interest in the voting NFT and/or that such an entity can transfer such an ownership interest to another entity.

In another example embodiment, a smart contract can further facilitate one or more actions associated with the voting NFT and/or can further facilitate documentation of such action(s) over the life cycle of the voting NFT. For instance, the smart contract can facilitate transfer of ownership interest(s) corresponding to the voting NFT and/or can further facilitate recording of transaction(s) associated with such ownership interest(s). In another example, the smart contract can facilitate recording of each play instance in each game where a voting NFT was used and/or the respective outcomes (e.g., win or loss) of each play instance and/or each game. In this example, the smart contract can facilitate such recording on, for instance, a blockchain. In another example embodiment, the above-described smart contract can further facilitate the expiration and/or dissolution of a voting NFT. For example, the smart contract can facilitate the expiration and/or dissolution of a voting NFT based at least in part on one or more life cycle terms of the voting NFT that can be defined by and/or included with the smart contract.

According to one or more example embodiments, a user can implement a voting NFT in one or more gamming channels of a gaming environment using, for instance, a cross-channel application that can run on a computing device of the user (e.g., a laptop, smart phone, etc.). For instance, such a computing device can pair with a certain voting NFT enabled gaming channel (e.g., a voting NFT enabled electronic gaming machine (EGM)) based at least in part on input from the user into the cross-channel application.

In the above example, a voting NFT enabled gaming channel can communicate with an intermediary server system and/or a blockchain platform described herein to retrieve a voting NFT associated with the user, where such a voting NFT can be stored on the intermediary server system and/or recorded on a blockchain of the blockchain platform. Alternatively, or additionally, in this example, based on such pairing, the voting NFT enabled gaming channel can communicate with the intermediary server system and/or the blockchain platform to retrieve data indicative of the voting NFT, where such data indicative of the voting NFT can be stored and/or recorded on a blockchain of the blockchain platform.

In the above example, upon receipt of the voting NFT, the voting NFT enabled gaming channel can generate a personalized voting NFT experience (e.g., a graphical user interface having the candidates of a contest) and/or receive input from the user (e.g., via the cross-channel application) indicative of the user's vote. In an example embodiment, once the user has cast a vote associated with a voting NFT, the voting NFT can expire and/or dissolve.

In one or more example embodiments, a user associated with a computing and/or gaming environment described herein can provide a product (e.g., virtual or real) that can be a contestant in a contest and/or election. In such embodiment(s), if the product provided by the user is the elected winner of the contest, the user can be awarded a pre-determined prize, such as one or more of the example NFTs described herein (e.g., a multi-state NFT, an increased-value NFT, etc.). In additional and/or alternative embodiments, if the product provided by the user is the elected winner of the contest, data identifying the user (e.g., a username, a hash function key, etc.) can be published on an NFT portal of such a computing and/or gaming environment via, for instance, a computing device of the NFT portal.

In one or more embodiments, the above-described blockchain platform can include a smart contract (e.g., the above-described smart contract) that can be associated with the voting NFT. In such embodiment(s), the smart contract can define and/or facilitate one or more actions in connection with the voting NFT. For example, the smart contract can define logic that can be used to facilitate acquisition of the voting NFT (e.g., via a purchase using an NFT portal system described herein). In another example, the smart contract can define condition(s) that must be satisfied to transfer ownership interest(s) in the voting NFT, confirm such condition(s) have been satisfied, execute transaction(s) to transfer such ownership interest(s) in the voting NFT, and/or record on a blockchain of the blockchain platform any and/or all transaction data associated with the voting NFT.

According to one or more example embodiments, the transactions associated with a voting NFT can be recorded using one or more blocks of a blockchain which can be viewed publicly, such as by using a blockchain explorer. For instance, a transaction awarding and/or transferring a voting NFT to a user can be recorded on the blockchain. In an additional and/or alternative embodiment, the expiration and/or dissolution of a voting NFT once a user has implemented the voting right(s) associated with the voting NFT can be recorded on the blockchain. In an additional and/or alternative embodiment, the expiration and/or dissolution of all voting NFTs once respective users have implemented the voting right(s) associated with the respective voting NFTs can be recorded on the blockchain. In this example embodiment, such a recording on the blockchain of all expired and/or dissolved voting NFTs associated with a certain contest can allow for viewing and/or tracking of all votes that were cast in the contest using the voting NFTs, thereby ensuring transparency of the votes cast in the contest, which can eliminate subsequent disputes associated with one or more of such votes. In an additional and/or alternative embodiment, a transaction awarding a prize (e.g., a multi-state NFT, an increased-value NFT, etc.) to a user that wins a contest as described above can be recorded on the blockchain. In example embodiments, such above-described transactions can be mined and validated prior to recordation on the blockchain.

Figure 18:
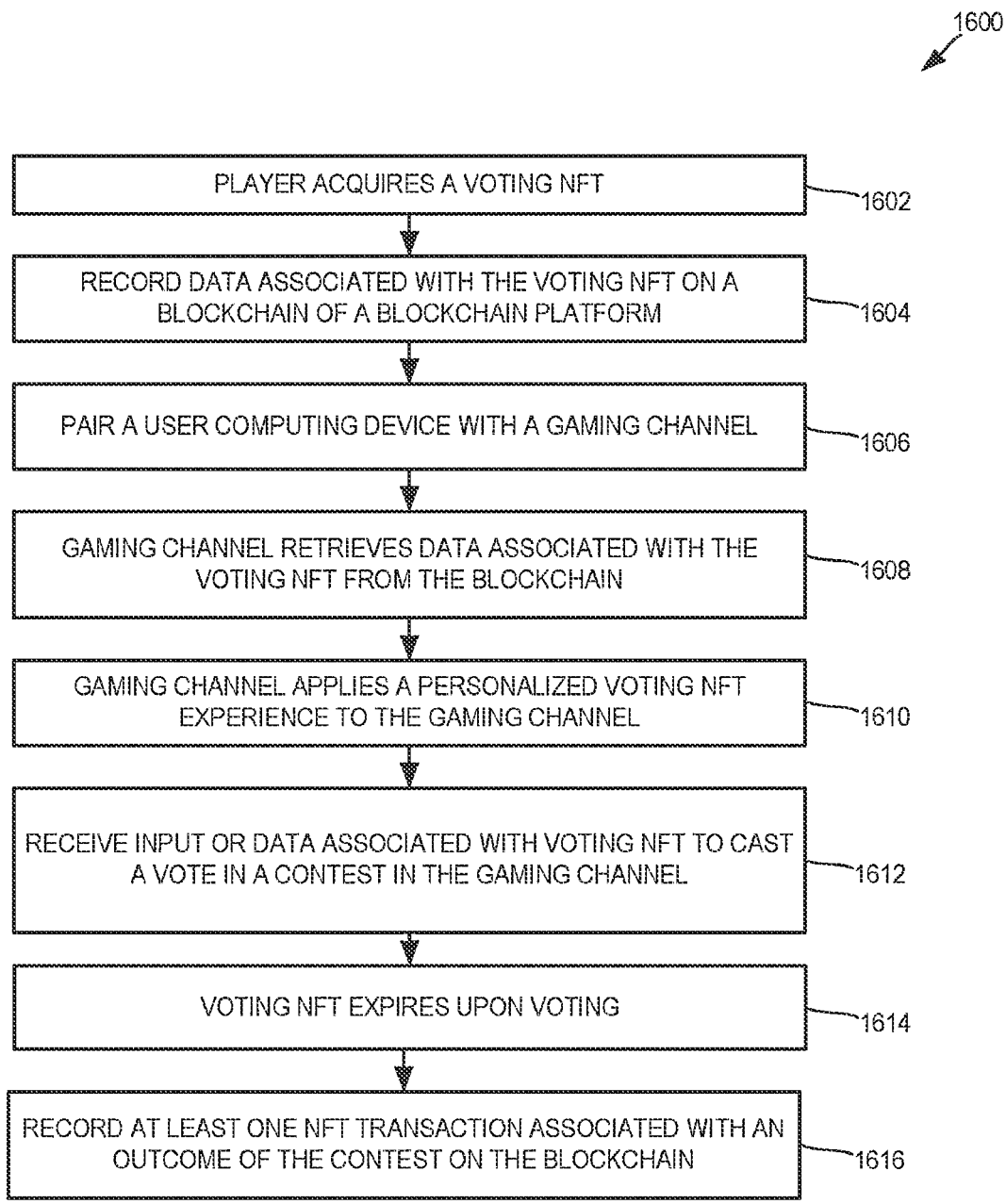
FIG. 18 is a flowchart depicting an example process of implementing a voting NFT in a gaming computer environment including a blockchain platform in accordance with example embodiments of the present disclosure.

FIG. 18 illustrates a flowchart of an example, non-limiting computer-implemented method 1600 that can be implemented to manage one or more non-fungible tokens in a gaming environment in accordance with an example embodiment of the present disclosure. One or more portions of computer-implemented method 1600 can be implemented as an algorithm on the hardware components of the devices described herein to, for example, manage a vote in a contest associated with a gaming channel using a voting NFT in accordance with one or more embodiments described herein.

At 1602, method 1600 includes acquiring, by a computing device (e.g., a computing device associated with a user, such as a laptop, a smart phone, etc.) a voting NFT. The voting NFT can be acquired via a cross-channel application (e.g., cross-channel application 52) running on the computing device, via an NFT Portal/Marketplace, via a gaming channel, or through other means.

At 1604, method 1600 includes recording on a blockchain (e.g., blockchain 440) of a blockchain platform (e.g., digital ledger platform 40, digital ledger layer 42, de-centralized blockchain infrastructure 340, and/or distributed ledger network 450), data associated with the voting non-fungible token (e.g., transaction and/or ownership data associated with the voting NFT). For instance, a computing device may send via the cross-channel application, a message to a blockchain platform (e.g., to one or more computing devices of digital ledger platform 40, digital ledger layer 42, de-centralized blockchain infrastructure 340, and/or distributed ledger network 450) to record data associated with the voting non-fungible token (e.g., transaction and/or ownership data associated with the voting NFT) on a blockchain (e.g., blockchain 440) of the blockchain platform.

At 1606, method 1600 includes pairing a computing device via a cross-channel application with a gaming channel (e.g., a gaming channel of gaming channel systems 20 and/or gaming channels 104).

At 1608, method 1600 includes the gaming channel retrieving the data associated with the voting non-fungible token from the blockchain. For instance, in one example embodiment, at 1608, method 1600 can include receiving, from the computing device via the cross-channel application, a message to retrieve the data associated with the voting non-fungible token from the blockchain.

At 1610, method 1600 includes the gaming channel applying a personalized voting non-fungible token experience (e.g., a graphical user interface having candidates of a contest in the gaming channel) to the gaming channel. For instance, the gaming channel may apply (e.g., via the one or more computing devices of the gaming channel) a personalized voting non-fungible token experience (e.g., a graphical user interface having candidates of a contest in the gaming channel) to the gaming channel based at least in part on the data associated with the voting non-fungible token.

At 1612, method 1600 includes receiving from a computing device via the cross-channel application, an input or data associated with a voting NFT to cast a vote in a contest in the gamming channel.

At 1614, the voting NFT expires upon voting.

At 1616, method 1600 can include recording on the blockchain, at least one non-fungible token transaction associated with an outcome of the contest (e.g., a NFT awarded to a winner of the contest). For instance, in one example embodiment, method 1600 can include receiving at the blockchain platform via the cross-channel application a request to record (e.g., via the one or more computing devices of the blockchain platform), on a blockchain (e.g., blockchain 440), at least one non-fungible token transaction associated with an outcome of the contest (e.g., a NFT awarded to a winner of the contest).

A pooled NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). The pooled NFT can include and/or represent different ownership shares of respective individual users that can be associated with a computing and/or gaming environment described herein, where the individual users can collectively acquire the pooled NFT. Any user having an ownership interest in the pooled NFT can act on behalf of a plurality of individual users (pooled users) associated with such a gaming environment. In one example embodiment, individual users can respectively acquire an ownership share of a pooled NFT using, for instance, currency (e.g., cryptocurrency or real currency) and/or one or more NFTs respectively acquired by the individual users in accordance with one or more embodiments of the present disclosure.

In one or more embodiments of the present disclosure, a pooled NFT can allow a user to participate in a game as a representative of multiple users, where such a pooled user can submit a pooled wager (e.g., a collective wager) on behalf of the multiple users using the pooled NFT or a portion thereof as the pooled wager. In some embodiments, such a user can submit a pooled wager on behalf of the multiple users using a portion (e.g., a percentage) of the pooled NFT as the pooled wager. A gain and/or loss resulting from an outcome of a play instance in a game (e.g., a single hand played in a poker game) and/or an outcome of a game (e.g., a poker game) in which a pooled NFT or a portion thereof was submitted as a pooled wager can be distributed to the individual users according to the respective ownership shares of such individual users. For instance, a first user can have a 51 percent (%) ownership share of a pooled NFT and a second user can have a 49% ownership share of the pooled NFT. In this example, 51% of any gain and/or loss resulting from an outcome of a game in which the pooled NFT or a portion thereof was submitted as a pooled wager can be distributed to the first user, while 49% of any such gain and/or loss can be distributed to the second user.

In an example embodiment, a smart contract associated with a pooled NFT can define one or more attributes of the pooled NFT and/or facilitate execution of actions associated with the pooled NFT. For example, such a smart contract can define: one or more properties of the pooled NFT (e.g., a monetary value of the pooled NFT); one or more use terms (e.g., terms defining how a pooled user can be designated, terms defining how a pooled user can use the pooled NFT or a portion thereof to place a wager in a game, terms defining which game(s) the pooled NFT can be applied to, etc.); the individual ownership share percentage of each user that contributed to acquiring a pooled NFT and/or how each user contributed to acquiring the pooled NFT (e.g., via currency or one or more NFTs); one or more life cycle terms of the pooled NFT (e.g., terms defining one or more events that can trigger expiration and/or dissolution of the pooled NFT and/or how such expiration and/or dissolution can be recorded on, for instance, a blockchain); and/or another attribute of the pooled NFT.

In another example embodiment, a smart contract can further facilitate association of a pooled NFT with all individual users associated with the pooled NFT across one or more games in one or more gaming channels (e.g., one or more pooled NFT enabled gaming channels) such that the individual users can be notified of any gains and/or losses incurred in association with the pooled NFT. For instance, the smart contract can provide confirmation to a game and/or an NFT enabled gaming channel that certain condition(s) have been satisfied to prove that a certain entity (e.g., an individual user associated with the pooled NFT) has an ownership interest in the pooled NFT and/or that such an entity can transfer such an ownership interest to another entity.

In another example embodiment, the smart contract can further facilitate one or more actions associated with the pooled NFT and/or can further facilitate documentation of such action(s) over the life cycle of the pooled NFT. For instance, the smart contract can facilitate transfer of ownership interest(s) corresponding to the pooled NFT and/or can further facilitate recording of transaction(s) associated with such ownership interest(s). In another example, the smart contract can facilitate recording of each play instance in each game where a pooled NFT was used as a pooled wager and/or the respective outcomes (e.g., win or loss) of each play instance and/or each game. In this example, the smart contract can facilitate such recording on, for instance, a blockchain. In another example embodiment, the smart contract can further facilitate the expiration and/or dissolution of a pooled NFT. For example, the smart contract can facilitate the expiration and/or dissolution of a pooled NFT based at least in part on one or more life cycle terms of the pooled NFT that can be defined by and/or included with the smart contract.

According to one or more example embodiments, a pooled user can implement the above-described pooled NFT in one or more gamming channels of a gaming environment using, for instance, a cross-channel application that can run on a computing device of the pooled user (e.g., a laptop, smart phone, etc.). For instance, such a computing device can pair with a certain pooled NFT enabled gaming channel (e.g., a pooled NFT enabled electronic gaming machine (EGM)) based at least in part on input from the pooled user into the cross-channel application.

In the above example, such a pooled NFT enabled gaming channel can communicate with an intermediary server system and/or a blockchain platform described herein to retrieve a pooled NFT associated with the pooled user, where such a pooled NFT can be stored on the intermediary server system and/or recorded on a blockchain of the blockchain platform. Alternatively, or additionally, in this example, based on such pairing, the pooled NFT enabled gaming channel can communicate with the intermediary server system and/or the blockchain platform to retrieve data indicative of the pooled NFT, where such data indicative of the pooled NFT can be stored and/or recorded on a blockchain of the blockchain platform.

In the above example, upon receipt of the pooled NFT, the pooled NFT enabled gaming channel can generate a personalized pooled NFT experience in the pooled NFT enabled gaming channel. For instance, in one embodiment, the personalized pooled NFT experience can include a graphical user interface (GUI) having one or more input fields that can be configured to receive a pooled NFT or a portion thereof as a pooled wager on behalf of multiple individual users based at least in part on input from the pooled user.

In various embodiments, the above-described intermediary server system, blockchain platform, cross-channel application, and/or pooled NFT enabled gaming channel can notify one or more (e.g., all) individual users in the pool of any gains and/or losses incurred in association with the pooled NFT. In some embodiments, the above-described intermediary server system, blockchain platform, cross-channel application, and/or pooled NFT enabled gaming channel can further facilitate distribution to all users in the pool of corresponding gains incurred in association with the pooled NFT.

In one or more embodiments, the above-described blockchain platform can include a smart contract that can define and/or facilitate one or more actions in connection with the pooled NFT. For example, the smart contract can define logic that can be used facilitate acquisition of the pooled NFT (e.g., via a purchase using an NFT portal system described herein). In another example, the smart contract can define condition(s) that must be satisfied to transfer ownership interest(s) in the pooled NFT, confirm such condition(s) have been satisfied, execute transaction(s) to transfer such ownership interest(s) in the pooled NFT, and/or record on a blockchain of the blockchain platform any and/or all transaction data associated with the pooled NFT.

According to one or more example embodiments, the transactions associated with a pooled NFT can be recorded using one or more blocks of a blockchain which can be viewed publicly, such as by using a blockchain explorer. For instance, a transaction in which one or more users (e.g., a pooled user or a plurality of users) acquire a pooled NFT (e.g., via award, transfer, acquisition using currency or NFT(s), etc.) can be recorded on the blockchain. In an additional and/or alternative embodiment, each play instance in each game where a pooled NFT was used as a pooled wager and/or the respective outcomes (e.g., win or loss) of each play instance and/or each game can be recorded on the blockchain. In this example embodiment, such a recording on the blockchain of all play instances in all such games and/or all such respective outcomes can allow for viewing and/or tracking of all ownership shares of individual users that contributed to acquiring the pooled NFT, thereby ensuring transparency of such ownership shares, which can eliminate subsequent disputes associated with such ownership shares. In an additional and/or alternative embodiment, the expiration and/or dissolution of a pooled NFT can be recorded on the blockchain. In example embodiments, such above-described transactions can be mined and validated prior to recordation on the blockchain.

Figure 19:
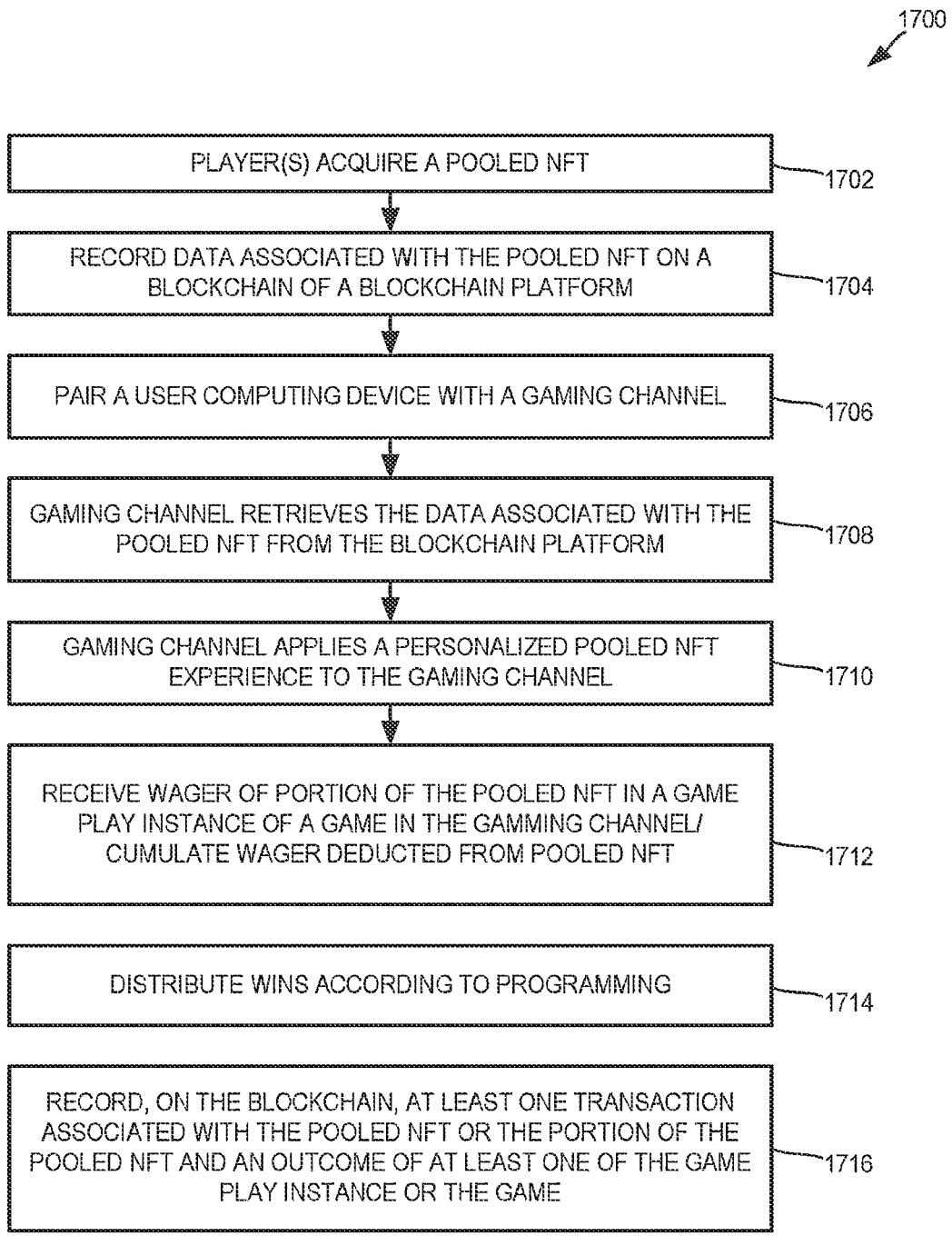
FIG. 19 is a flowchart depicting an example process of implementing a pooled NFT in a gaming computer environment including a blockchain platform in accordance with example embodiments of the present disclosure.

FIG. 19 illustrates a flowchart of an example, non-limiting computer-implemented method 1700 that can be implemented to manage one or more non-fungible tokens in a gaming environment in accordance with an example embodiment of the present disclosure. One or more portions of computer-implemented method 1700 can be implemented as an algorithm on the hardware components of the devices described herein to, for example, submit a pooled wager in a game of a gaming channel (e.g., a pooled NFT enabled gaming channel) using a pooled NFT in accordance with one or more embodiments described herein.

At 1702, method 1700 can include acquiring, by a computing device (e.g., a computing device associated with a user, such as a laptop, a smart phone, etc.), a pooled NFT. In some examples, the NFT can be acquired via a cross-channel application (e.g., cross-channel application 52) running on the computing device, via an NFT Portal/Marketplace, or through other means. The pooled NFT can be recorded on a blockchain of a digital ledger platform as described herein.

At 1704, method 1700 can include recording on a blockchain (e.g., blockchain 440) of a blockchain platform (e.g., digital ledger platform 40, digital ledger layer 42, de-centralized blockchain infrastructure 340, and/or distributed ledger network 450), data associated with the pooled non-fungible token (e.g., transaction and/or ownership data associated with the pooled NFT, etc.). For instance, method 1700 can include receiving, from a user computing device via a cross-channel application, a message at a blockchain platform (e.g., to one or more computing devices of digital ledger platform 40, digital ledger layer 42, de-centralized blockchain infrastructure 340, and/or distributed ledger network 450) to record (e.g., via the one or more computing devices of the blockchain platform) data associated with the pooled non-fungible token (e.g., transaction and/or ownership data associated with the pooled NFT, etc.) on a blockchain (e.g., blockchain 440) of the blockchain platform.

At 1706, method 1700 can include pairing, by the computing device via the cross-channel application, the computing device with a gaming channel (e.g., a gaming channel of gaming channel systems 20 and/or gaming channels 104).

At 1708, method 1700 can include retrieving, by the gaming channel, the data associated with the pooled non-fungible token from the blockchain. For instance, in one example embodiment, at 1708, method 1700 can include retrieving via the one or more computing devices of the gaming channel the data associated with the pooled non-fungible token from the blockchain. The data may be retrieved via one or more intermediary and bridge layers that facilitate communication between the decentralized blockchain infrastructure and the gaming channels which may be organized in a central architecture.

At 1710, method 1700 includes the gaming channel applying a personalized pooled non-fungible token experience (e.g., a graphical user interface (GUI) having one or more input fields that can be configured to receive a pooled NFT or a portion thereof as a pooled wager based at least in part on input from the pooled user) to the gaming channel. For instance, in one example embodiment, at 1710, method 1700 can include applying the NFT data to enable a personalized pooled non-fungible token experience. By way of example, a graphical user interface (GUI) can be provided having one or more input fields that can be configured to receive a pooled NFT or a portion thereof as a pooled wager based at least in part on input from the pooled user.

At 1712, method 1700 can include receiving by the gaming channel (e.g., via the cross-channel application) an input or data indicative of a portion (e.g., a percentage) of the pooled non-fungible token to be wagered in a game play instance (e.g., a single hand played in a poker game) of a game (e.g., a poker game) in the gamming channel.

At 1714, method 1700 includes distributing any wins associated with the NFT according to the programming defined by the NFT and/or a smart contract associated with the NFT.

At 1716, method 1700 includes recording, by the blockchain platform, at least one transaction associated with the pooled non-fungible token and/or the portion of the pooled non-fungible token and an outcome of at least one of the game play instance or the game. For instance, in one example embodiment, at 1714, computer-implemented method 1700 can include receiving, by the blockchain platform via the intermediary server system, a message to record (e.g., via the one or more computing devices of the blockchain platform), on a blockchain (e.g., blockchain 440) of the blockchain platform at least one transaction associated with the pooled non-fungible token and/or the portion of the pooled non-fungible token and an outcome of at least one of the game play instance or the game.

A progressive NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). A progressive NFT in accordance with one or more embodiments of the present disclosure can allow for a user to opt into an NFT progressive pool associated with a game (e.g., a lottery, a poker game, etc.) and/or a play instance of a game (e.g., a single drawing in a lottery, a single hand played in a poker game) in a gaming channel (e.g., a progressive NFT enabled gaming channel). In accordance with one or more embodiments of the present disclosure, the user can opt into an NFT progressive pool by implementing a progressive NFT in a game and/or in a play instance of a game in a gaming channel (e.g., a progressive NFT enabled gaming channel) and submitting a supplemental wager to the NFT progressive pool in addition to an original wager submitted by the user in the game or the play instance of the game. In various embodiments, if a user has opted into such an NFT progressive pool and the outcome of the game and/or the play instance of the game is a win with respect to the NFT progressive pool, the portion of the NFT progressive pool jackpot (e.g., payout) allocated for the user can be distributed to the user in the form of one or more NFTs and/or currency (e.g., cryptocurrency or real currency).

In an example embodiment, a smart contract associated with a progressive NFT can define one or more attributes of the progressive NFT and/or facilitate execution of actions associated with the progressive NFT. For example, such a smart contract can define: one or more properties of the progressive NFT; one or more use terms (e.g., terms defining how a user can opt into a NFT progressive pool using the progressive NFT, terms defining the amount of one or more supplemental wagers the user can submit at one or more play instances in a game, terms defining which game(s) the progressive NFT can be applied to, etc.); one or more life cycle terms of the progressive NFT (e.g., terms defining one or more events that can trigger expiration and/or dissolution of the progressive NFT and/or how such expiration and/or dissolution can be recorded on, for instance, a blockchain); and/or another attribute of the progressive NFT.

In another example embodiment, a smart contract can further facilitate association of the progressive NFT with a user (e.g., the owner of the progressive NFT) across one or more games in one or more gaming channels (e.g., one or more progressive NFT enabled gaming channels). For instance, in this example embodiment, the smart contract can provide confirmation to a game and/or an NFT enabled gaming channel that certain condition(s) have been satisfied to prove that a certain entity (e.g., the owner of the progressive NFT) has an ownership interest in the progressive NFT and/or that such an entity can transfer such an ownership interest to another entity.

In another example embodiment, a smart contract can further facilitate one or more actions associated with the progressive NFT and/or can further facilitate documentation of such action(s) over the life cycle of the progressive NFT. For instance, the smart contract can facilitate transfer of ownership interest(s) corresponding to the progressive NFT and/or can further facilitate recording of transaction(s) associated with such ownership interest(s). In another example, the smart contract can facilitate recording of each game and/or each play instance in each game where a progressive NFT was used by a user to opt into an NFT progressive pool and/or the respective outcomes (e.g., win or loss) of each play instance and/or each game. In this example, the smart contract can facilitate such recording on, for instance, a blockchain. In another example embodiment, a smart contract can further facilitate the expiration and/or dissolution of a progressive NFT (e.g., based on a winning outcome and/or payout of an NFT progressive pool). For example, the smart contract can facilitate the expiration and/or dissolution of a progressive NFT based at least in part on one or more life cycle terms of the progressive NFT that can be defined by and/or included with the smart contract.

According to one or more example embodiments, a user can implement a progressive NFT in one or more gamming channels of a gaming environment using, for instance, via a cross-channel application that can run on a computing device of the user (e.g., a laptop, smart phone, etc.). For instance, such a user computing device can pair with a certain progressive NFT enabled gaming channel (e.g., a progressive NFT enabled electronic gaming machine (EGM)) based at least in part on input from the user into the cross-channel application (e.g., input by the user indicative of the user's intent to pair the computing device with a progressive NFT enabled gaming channel).

In the above example, a progressive NFT enabled gaming channel can communicate with an intermediary server system and/or a blockchain platform described herein to retrieve a progressive NFT associated with the user where a progressive NFT can be stored on the intermediary server system and/or recorded on a blockchain of the blockchain platform. Alternatively, or additionally, in this example, the progressive NFT enabled gaming channel can communicate with the intermediary server system and/or the blockchain platform to retrieve data indicative of the progressive NFT, where the data indicative of the progressive NFT can be stored and/or recorded on a blockchain of the blockchain platform.

In the above example, upon receipt of the progressive NFT, the progressive NFT enabled gaming channel can generate a personalized progressive NFT experience in the progressive NFT enabled gaming channel. For instance, in one embodiment, the personalized progressive NFT experience can include a graphical user interface (GUI) having one or more input fields that can be configured to receive from the user data indicative of a progressive NFT and/or a supplemental wager to allow the user to opt into an NFT progressive pool based at least in part on such input from the user.

In one or more embodiments, the blockchain platform can include a smart contract (e.g., the above-described smart contract) that can be associated with the progressive NFT. In such embodiment(s), the smart contract can define and/or facilitate one or more actions in connection with the progressive NFT. For example, the smart contract can define logic that can be used facilitate acquisition of the progressive NFT (e.g., via a purchase using an NFT portal system described herein). In another example, the smart contract can define condition(s) that must be satisfied to transfer ownership interest(s) in the progressive NFT, confirm such condition(s) have been satisfied, execute transaction(s) to transfer such ownership interest(s) in the progressive NFT, and/or record on a blockchain of the blockchain platform any and/or all transaction data associated with the progressive NFT.

According to one or more example embodiments, the transactions associated with a progressive NFT can be recorded using one or more blocks of a blockchain which can be viewed publicly, such as by using a blockchain explorer. For instance, a transaction in which a user acquires a progressive NFT (e.g., via award, transfer, acquisition using currency or NFT(s), etc.) can be recorded on the blockchain. In an additional and/or alternative embodiment, each play instance in each game where a progressive NFT was used by a user to opt into an NFT progressive pool and/or the respective outcomes (e.g., win or loss) of each play instance and/or each game can be recorded on the blockchain. In this example embodiment, such a recording on the blockchain of all play instances in all such games and/or all such respective outcomes can allow for viewing and/or tracking of all contributions and/or payouts of individual users that contributed to the NFT progressive pool, thereby ensuring transparency of such contributions and/or payouts, which can eliminate subsequent disputes associated therewith. In an additional and/or alternative embodiment, the expiration and/or dissolution of a progressive NFT can be recorded on the blockchain. In example embodiments, such above-described transactions can be mined and validated prior to recordation on the blockchain.

Figure 20:
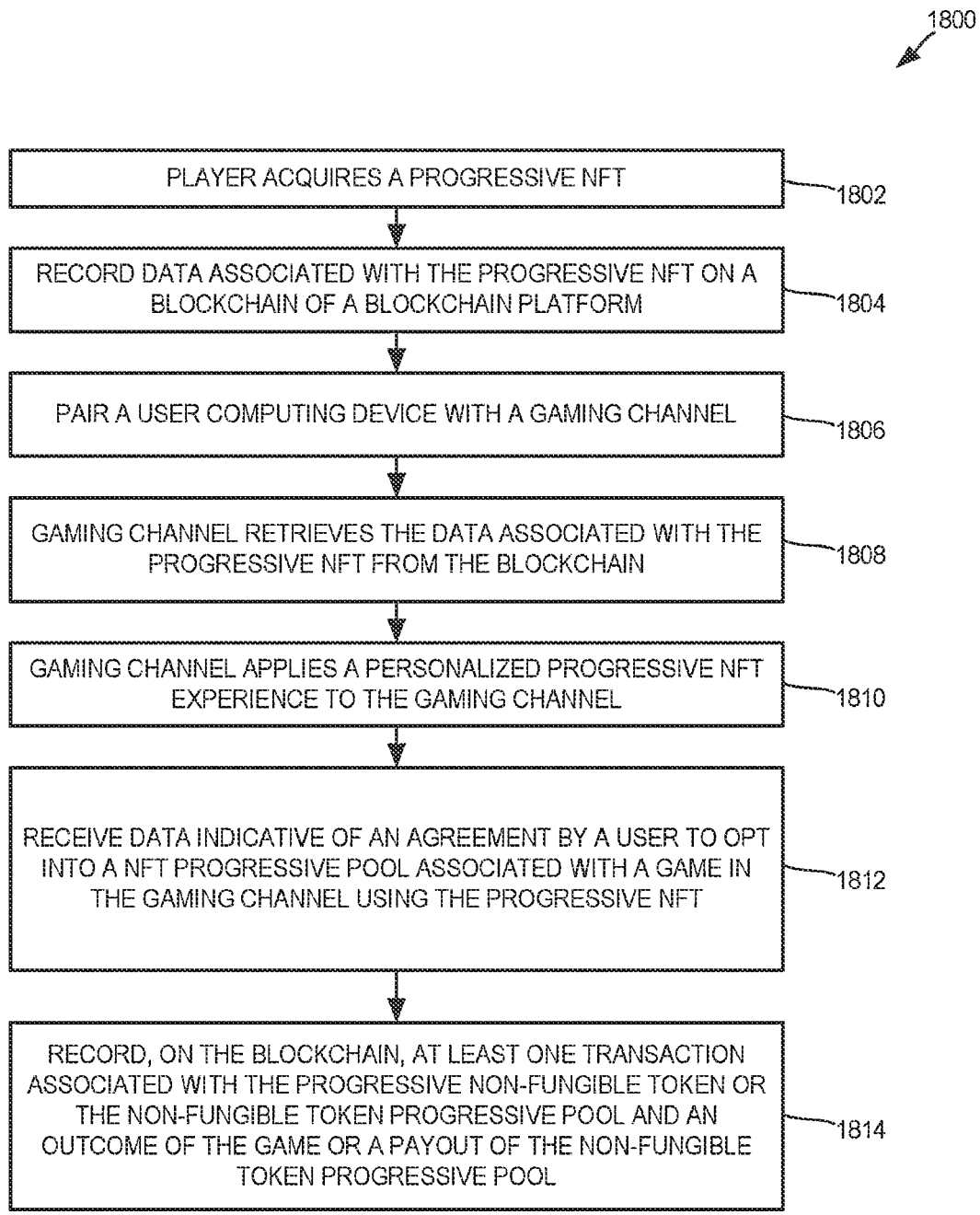
FIG. 20 is a flowchart depicting an example process of implementing a progressive NFT in a gaming computer environment including a blockchain platform in accordance with example embodiments of the present disclosure.

FIG. 20 illustrates a flowchart of an example method 1800 that can be implemented to manage one or more non-fungible tokens in a gaming environment in accordance with an example embodiment of the present disclosure. One or more portions of method 1800 can be implemented as an algorithm on the hardware components of the devices described herein to, for example, opt into an NFT progressive pool associated with a game of a gaming channel (e.g., a progressive NFT enabled gaming channel) using a progressive NFT in accordance with one or more embodiments described herein.

At 1802, method 1800 includes acquiring, by a computing device (e.g., a computing device associated with a user, such as a laptop, a smart phone, etc.) a pooled NFT via a cross-channel application, NFT Portal/Marketplace, and/or through other means.

At 1804, method 1800 includes recording on a blockchain (e.g., blockchain 440) of a blockchain platform (e.g., digital ledger platform 40, digital ledger layer 42, de-centralized blockchain infrastructure 340, and/or distributed ledger network 450), data associated with the progressive non-fungible token (e.g., transaction and/or ownership data associated with the progressive NFT, etc.). For instance, method 1800 can include sending, by the computing device via the cross-channel application, a message to a blockchain platform (e.g., to one or more computing devices of digital ledger platform 40, digital ledger layer 42, de-centralized blockchain infrastructure 340, and/or distributed ledger network 450) to record (e.g., via the one or more computing devices of the blockchain platform) data associated with the progressive non-fungible token (e.g., transaction and/or ownership data associated with the progressive NFT, etc.) on a blockchain (e.g., blockchain 440) of the blockchain platform.

At 1806, method 1800 includes pairing the computing device with a gaming channel (e.g., a gaming channel of gaming channel systems 20 and/or gaming channels 104).

At 1808, method 1800 includes the gaming channel retrieving the data associated with the progressive NFT from the blockchain platform. By way of example, At 1810, method 1800 includes the gaming channel applying a personalized progressive non-fungible token experience (e.g., a graphical user interface (GUI) having one or more input fields that can be configured to receive from the user data indicative of a progressive NFT and/or a supplemental wager to allow the user to opt into an NFT progressive pool) to the gaming channel. For instance, method can include receiving from a user computing device via a cross-channel application, a message to apply (e.g., via the one or more computing devices of the gaming channel) a personalized progressive non-fungible token experience to the gaming channel based at least in part on the data associated with the progressive non-fungible token.

At 1812, method 1800 includes receiving data indicative of an agreement by a user (e.g., data indicative of the progressive non-fungible token and a supplemental wager) to opt into a non-fungible token progressive pool associated with a game (e.g., a lottery, a poker game, etc.) in the gaming channel using the progressive non-fungible token.

At 1814, method 1800 includes recording on the blockchain, at least one transaction associated with the progressive non-fungible token or the non-fungible token progressive pool and an outcome of the game or a payout of the non-fungible token progressive pool.

A pact NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). The pact NFT can include and/or represent a pact (e.g., an agreement) between individual users to split any gains and/or losses incurred by any individual user of the pact according to one or more pre-defined terms. For example, the pact NFT e can include and/or represent a pact (e.g., an agreement) between individual users to split any gains and/or losses incurred by any individual user of the pact according to different ownership shares of the pact NFT held by respective individual users in the pact (e.g., according to the ownership percentage of the pact NFT held by each individual user in the pact).

In one example embodiment, a group of individual users can collectively acquire a pact NFT using, for instance, currency (e.g., cryptocurrency or real currency) and/or one or more NFTs respectively acquired by the individual users in accordance with one or more embodiments of the present disclosure. In another example embodiment, individual users can respectively acquire an ownership share of a pact NFT using, for instance, currency (e.g., cryptocurrency or real currency) and/or one or more NFTs respectively acquired by the individual users in accordance with one or more embodiments of the present disclosure.

In one or more embodiments of the present disclosure, such a pact NFT can allow an individual user of the pact to participate in a game independently from or with other individual users of the pact. In one or more embodiments, a pre-defined term of a pact associated with a pact NFT can specify: if an individual user of the pact incurs any gains and/or losses in connection with a game and/or a play instance of a game in a gaming channel (e.g., a pact NFT enabled gaming channel), one or more other individual users of the pact will share in the gains and/or losses based on one or more other pre-defined terms of the pact and/or the pact NFT (e.g., based on percentage of ownership share of the pact NFT held by the other individual user(s) of the pact).

In an example embodiment, a smart contract associated with a pact NFT can define one or more attributes of the pact NFT and/or facilitate execution of actions associated with the pact NFT. For example, such a smart contract can define: one or more properties of the pact NFT; one or more pre-defined terms (e.g., terms defining which game(s) and/or gaming channel(s) the pact NFT can be applied to, terms defining how gains and/or losses incurred by one individual user of the pact can be distributed to one or more other individual users of the pact, etc.); the individual ownership share percentage of each individual user that contributed to acquiring a pact NFT and/or how each user contributed to acquiring the pact NFT (e.g., via currency or one or more NFTs); one or more life cycle terms of the pact NFT (e.g., terms defining one or more events that can trigger expiration and/or dissolution of the pact NFT and/or how such expiration and/or dissolution can be recorded on, for instance, a blockchain); and/or another attribute of the pact NFT.

In another example embodiment, the above-described smart contract can further facilitate association of the pact NFT with all individual users of the pact across one or more games in one or more gaming channels (e.g., one or more pact NFT enabled gaming channels) such that individual users of the pact can be notified of any gains and/or losses incurred by an individual user. For instance, in this example embodiment, the smart contract can provide confirmation to a game and/or an NFT enabled gaming channel that certain condition(s) have been satisfied to prove that a certain entity (e.g., an individual user of the pact) has an ownership interest in the pact NFT and/or that such an entity can transfer such an ownership interest to another entity.

In another example embodiment, the above-described smart contract can further facilitate one or more actions associated with the pact NFT and/or can further facilitate documentation of such action(s) over the life cycle of the pact NFT. For instance, the smart contract can facilitate transfer of ownership interest(s) corresponding to the pact NFT and/or can further facilitate recording of transaction(s) associated with such ownership interest(s). In another example, the smart contract can facilitate recording of each play instance in each game played by each individual user of the pact and/or the respective outcomes (e.g., win or loss) of each play instance and/or each game. In this example, the smart contract can facilitate such recording on, for instance, a blockchain. In another example embodiment, the above-described smart contract can further facilitate the expiration and/or dissolution of a pact NFT. For example, the smart contract can facilitate the expiration and/or dissolution of a pact NFT based at least in part on one or more life cycle terms of the pact NFT that can be defined by and/or included with the smart contract and/or in a pre-defined term of the pact.

According to one or more example embodiments, an individual user of a pact associated with a pact NFT can implement the pact NFT in one or more gamming channels of a gaming environment using, for instance, a cross-channel application that can run on a computing device of the user (e.g., a laptop, smart phone, etc.). For instance, such a user computing device can pair with a certain pact NFT enabled gaming channel (e.g., a pact NFT enabled electronic gaming machine (EGM)) based at least in part on input from the individual user of the pact into the cross-channel application (e.g., input by the individual user of the pact indicative of the user's intent to pair the computing device with a pact NFT enabled gaming channel).

In the above example, a pact NFT enabled gaming channel can communicate with an intermediary server system and/or a blockchain platform described herein to retrieve a pact NFT associated with the individual user of the pact, where such a pact NFT can be stored on the intermediary server system and/or recorded on a blockchain of the blockchain platform. Alternatively, or additionally, in this example, based on such pairing, the pact NFT enabled gaming channel can communicate with the intermediary server system and/or the blockchain platform to retrieve data indicative of the pact NFT, where such data indicative of the pact NFT can be stored and/or recorded on a blockchain of the blockchain platform.

In the above example, upon receipt of the pact NFT and/or data indicative of the pact NFT, the pact NFT enabled gaming channel can generate a personalized pact NFT experience in the pact NFT enabled gaming channel. For instance, in one embodiment, the personalized pact NFT experience can include a graphical user interface (GUI) having one or more input fields that can be configured to receive an indication that the individual user intends to implement a pact NFT and/or a pact wager based at least in part on input from the individual user, where the pact wager and/or the pact NFT can be associated with a pact between a plurality of users. In this example embodiment, the GUI of the personalized pact NFT experience can further include data indicative of the identities (e.g., hash function key(s)) of all individual users in the pact that can be affected by the pact wager of the individual user. In various embodiments, the above-described intermediary server system, blockchain platform, cross-channel application, and/or pact NFT enabled gaming channel can notify one or more (e.g., all) individual users in the pact of any gains and/or losses incurred by any individual user of the pact. In some embodiments, the above-described intermediary server system, blockchain platform, cross-channel application, and/or pact NFT enabled gaming channel can further facilitate distribution of corresponding gains or collection of corresponding losses incurred by each individual user of the pact in response to the respective gains or losses incurred by any individual user of the pact.

In one or more embodiments, the above-described blockchain platform can include a smart contract (e.g., the above-described smart contract) that can be associated with the pact NFT. In such embodiment(s), the smart contract can define and/or facilitate one or more actions in connection with the pact NFT. For example, the smart contract can define logic that can be used to facilitate acquisition of the pact NFT (e.g., via a purchase using an NFT portal system described herein). In another example, the smart contract can define condition(s) that must be satisfied to transfer ownership interest(s) in the pact NFT, confirm such condition(s) have been satisfied, execute transaction(s) to transfer such ownership interest(s) in the pact NFT, and/or record on a blockchain of the blockchain platform any and/or all transaction data associated with the pact NFT.

According to one or more example embodiments, the transactions associated with a pact NFT can be recorded using one or more blocks of a blockchain which can be viewed publicly, such as by using a blockchain explorer. For instance, a transaction in which one or more individual users (e.g., a group of users) acquire a pact NFT (e.g., via award, transfer, acquisition using currency or NFT(s), etc.) can be recorded on the blockchain. In an additional and/or alternative embodiment, each play instance in each game played by an individual user of the pact and/or the respective outcomes (e.g., win or loss) of each play instance and/or each game can be recorded on the blockchain. In this example embodiment, such a recording on the blockchain of all play instances in all such games and/or all such respective outcomes can allow for viewing and/or tracking of all gains and/or losses incurred by individual users of the pact, thereby ensuring transparency of such gains and/or losses, which can eliminate subsequent disputes associated therewith. In an additional and/or alternative embodiment, the expiration and/or dissolution of a pact NFT can be recorded on the blockchain. In example embodiments, such above-described transactions can be mined and validated prior to recordation on the blockchain.

Figure 21:
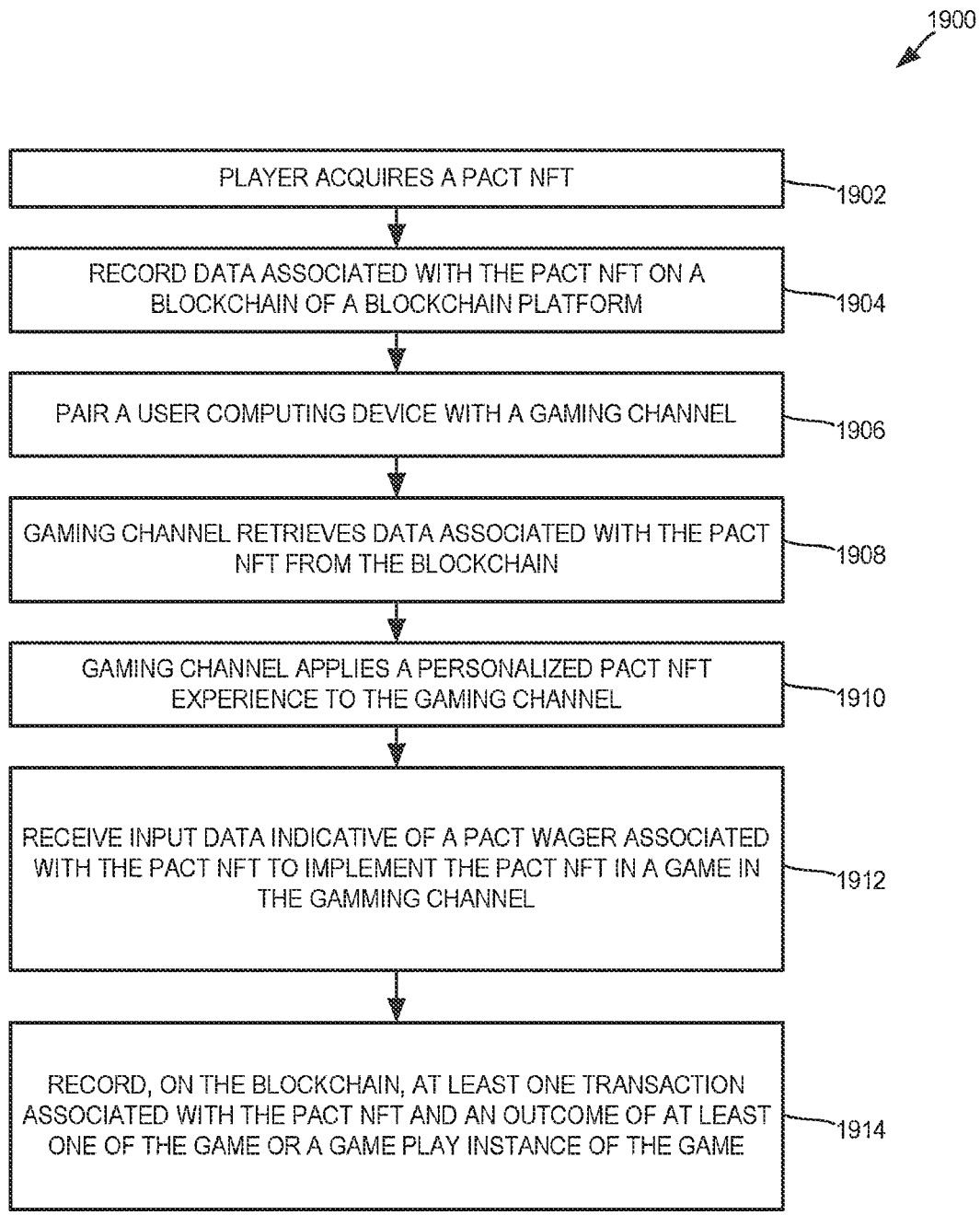
FIG. 21 is a flowchart depicting an example process of implementing a pact NFT in a gaming computer environment including a blockchain platform in accordance with example embodiments of the present disclosure.

FIG. 21 illustrates a flowchart of an example method 1900 that can be implemented to manage one or more non-fungible tokens in a gaming environment in accordance with an example embodiment of the present disclosure. One or more portions of computer-implemented method 1900 can be implemented as an algorithm on the hardware components of the devices described herein to, for example, submit a pact wager in a game of a gaming channel (e.g., a pact NFT enabled gaming channel) using a pact NFT in accordance with one or more embodiments described herein.

At 1902, computer-implemented method 1900 includes a player acquiring a pact non-fungible token.

At 1904, method 1900 includes recording, on a blockchain (e.g., blockchain 440) of a blockchain platform, data associated with the pact non-fungible token (e.g., transaction and/or ownership data associated with the pact NFT, etc.).

At 1906, method 1900 includes pairing, by the computing device via the cross-channel application, the computing device with a gaming channel (e.g., a gaming channel of gaming channel systems 20 and/or gaming channels 104).

At 1908, method 1900 includes the gaming channel retrieving the data associated with the pact non-fungible token from the blockchain.

At 1910, method 1900 includes the gaming channel applying a personalized pact non-fungible token experience (e.g., a graphical user interface (GUI) having one or more input fields that can be configured to receive an indication that an individual user intends to implement a pact NFT and/or a pact wager) to the gaming channel.

At 1912, method 1900 includes receiving data indicative of a pact wager (e.g., a value of the pact wager) associated with the pact non-fungible token. In some examples, the data can be received via personalized pact non-fungible token experience on the gaming channel to implement the pact non-fungible token in a game (e.g., a poker game) in the gamming channel.

At 1914, method 1900 includes recording, at least one transaction associated with the pact non-fungible token and/or an outcome (e.g., a win payout or a loss collection) of at least one of the game or a game play instance of the game (e.g., a single hand played in a poker game). For instance at least one transaction associated with the pact non-fungible token and/or an outcome (e.g., a win payout or a loss collection) of at least one of the game or a game play instance of the game (e.g., a single hand played in a poker game) can be recorded.

A lottery NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). The lottery NFT can include and/or represent a lottery ticket. A lottery NFT can include a lottery draw date that can be indicative of the date on which a gaming channel, such as a lottery NFT enabled gaming channel, will implement a lottery game associated with the lottery NFT and determine a lottery NFT winner. In one or more embodiments, such a lottery NFT enabled gaming channel can implement the lottery game and/or determine the lottery NFT winner using, for instance, one or more random draw algorithms. In some embodiments, if a lottery NFT acquired by a user is determined to be the lottery NFT winner, the user can be notified by the lottery NFT enabled gaming channel and claim the payout at one or more lottery NFT enabled gaming channels associated with a gaming environment (e.g., a real, physical gaming environment and/or a virtual, computer-implemented gaming environment).

In an example embodiment, a smart contract associated with a lottery NFT can define one or more attributes of the lottery NFT and/or facilitate execution of actions associated with the lottery NFT. For example, such a smart contract can define: one or more properties of the lottery NFT (e.g., data indicative of the lottery NFT owner, the value paid to acquire the lottery NFT, etc.); one or more pre-defined terms (e.g., terms defining which lottery game(s) and/or lottery NFT enabled gaming channel(s) the lottery NFT can be associated with, terms defining one or more lottery draw dates associated with the lottery NFT, terms defining how a lottery NFT winner can be notified of and/or collect a payout associated with a lottery game, terms defining one or more dates and/or times by which a lottery NFT winner must claim or otherwise forfeit a payout associated with a lottery game, etc.); one or more life cycle terms of the lottery NFT (e.g., terms defining one or more events that can trigger expiration and/or dissolution of the lottery NFT and/or how such expiration and/or dissolution can be recorded on, for instance, a blockchain); and/or another attribute of the lottery NFT.

In another example embodiment, the above-described smart contract can further facilitate association of the lottery NFT with the owner of the lottery NFT across one or more lottery games in one or more lottery NFT enabled gaming channels such that the owner of the lottery NFT can be notified in event the lottery NFT is determined to be the lottery NFT winner on a lottery draw date. For instance, in this example embodiment, the smart contract can provide confirmation to a lottery game and/or a lottery NFT enabled gaming channel that certain condition(s) have been satisfied to prove that a certain entity (e.g., the lottery NFT owner) has an ownership interest in the lottery NFT and/or that such an entity can transfer such an ownership interest to another entity.

In another example embodiment, the above-described smart contract can further facilitate one or more actions associated with the lottery NFT and/or can further facilitate documentation of such action(s) over the life cycle of the lottery NFT. For instance, the smart contract can facilitate transfer of ownership interest(s) corresponding to the lottery NFT and/or can further facilitate recording of transaction(s) associated with such ownership interest(s). In another example, the smart contract can facilitate recording of each lottery play instance in each lottery game associated with the lottery NFT and/or the respective outcomes (e.g., win or loss) of each lottery play instance and/or each lottery game. In this example, the smart contract can facilitate such recording(s) on, for instance, a blockchain. In another example embodiment, the above-described smart contract can further facilitate the expiration and/or dissolution of a lottery NFT. For example, the smart contract can facilitate the expiration and/or dissolution of a lottery NFT based at least in part on one or more life cycle terms of the lottery NFT that can be defined by and/or included with the smart contract.

According to one or more example embodiments, an owner of a lottery NFT can implement the lottery NFT in one or more lottery NFT enabled gaming channels of a gaming environment using, for instance, a cross-channel application that can run on a computing device associated with the owner (e.g., a laptop, smart phone, etc.). For instance, such a computing device can pair with one or more lottery NFT enabled gaming channels (e.g., a lottery NFT enabled electronic gaming machine (EGM)) based at least in part on input from the owner of the lottery NFT into the cross-channel application (e.g., input by the owner of the lottery NFT indicative of the owner's intent to pair the computing device with a lottery NFT enabled gaming channel).

In an example embodiment, if a lottery NFT owned by a user is determined on the lottery draw date to be the lottery NFT winner, a lottery NFT enabled gaming channel that performed the lottery game can notify the owner via, for instance, the above-described cross-channel application that can run on a computing device associated with the owner of the lottery NFT. In this example, the owner of the lottery NFT can use the above-described cross-channel application to pair the above-described computing device with the lottery NFT enabled gaming channel to claim a payout associated with the lottery game as described below. For instance, based on such pairing, the lottery NFT enabled gaming channel can communicate with an intermediary server system and/or a blockchain platform described herein to retrieve the lottery NFT owned by the user, where the lottery NFT can be stored on the intermediary server system and/or recorded on a blockchain of the blockchain platform. Alternatively, or additionally, in this example, based on such pairing, the lottery NFT enabled gaming channel can communicate with the intermediary server system and/or the blockchain platform to retrieve data indicative of the lottery NFT, where such data indicative of the lottery NFT can be stored and/or recorded on a blockchain of the blockchain platform. In this example, upon receipt of the lottery NFT and/or data indicative of the lottery NFT, the lottery NFT enabled gaming channel can generate a personalized lottery NFT experience in the lottery NFT enabled gaming channel. For instance, in one embodiment, the personalized lottery NFT experience can include a graphical user interface (GUI) having one or more input fields that can be configured to receive data indicative of the lottery NFT owner's identity (e.g., a hash function key, personal identification code, etc.) and/or configured to receive data indicative of the owner's intent to implement the lottery NFT to claim the payout associated with the lottery game. In some embodiments, an owner of a lottery NFT that is determined to be the lottery NFT winner must complete the above-described process to claim a payout associated with the lottery game by a defined date and/or time or otherwise forfeit the payout.

In some embodiments, the above-described GUI of the personalized lottery NFT experience can further include data indicative of the identity (e.g., hash function key(s)) of one or more other users that respectively own one or more other lottery NFT(s) that have also been determined to be the lottery NFT winner(s). In these embodiments, the GUI of the personalized lottery NFT experience can further include data indicative of the respective payouts to each owner of each lottery NFT determined to be the lottery NFT winners. In some embodiments, the owner(s) of such other lottery NFT(s) that have been determined to also be the lottery NFT winner can be notified and/or can claim their respective payouts in the same manner as described above. In some embodiments, the above-described cross-channel application and/or lottery NFT enabled gaming channel can further facilitate distribution of the payout to the owner(s) of the lottery NFT(s) determined to be the lottery NFT winner(s).

In one or more embodiments, the above-described blockchain platform can include a smart contract (e.g., the above-described smart contract) that can be associated with the lottery NFT. In such embodiment(s), the smart contract can define and/or facilitate one or more actions in connection with the lottery NFT. For example, the smart contract can define logic that can be used to facilitate acquisition of the lottery NFT (e.g., via a purchase using an NFT portal system described herein). In another example, the smart contract can define condition(s) that must be satisfied to transfer ownership interest(s) in the lottery NFT, confirm such condition(s) have been satisfied, execute transaction(s) to transfer such ownership interest(s) in the lottery NFT, and/or record on a blockchain of the blockchain platform any and/or all transaction data associated with the lottery NFT.

According to one or more example embodiments, the transactions associated with a lottery NFT can be recorded using one or more blocks of a blockchain which can be viewed publicly, such as by using a blockchain explorer. For instance, a transaction in which one or more users (e.g., a group of users) acquire a lottery NFT (e.g., via award, transfer, acquisition using currency or NFT(s), etc.) can be recorded on the blockchain. In an additional and/or alternative embodiment, each lottery play instance in each lottery game played in a lottery NFT enabled gaming channel and/or the respective outcomes (e.g., win or loss) of each lottery play instance and/or each lottery game can be recorded on the blockchain. In this example embodiment, such a recording(s) on the blockchain of all lottery play instances in all such lottery games and/or all such respective outcomes can allow for viewing and/or tracking of all payouts associated with one or more lottery games, thereby ensuring transparency of such payouts, which can eliminate subsequent disputes associated therewith. In an additional and/or alternative embodiment, the expiration and/or dissolution of a lottery NFT can be recorded on the blockchain. In example embodiments, such above-described transactions can be mined and validated prior to recordation on the blockchain.

Figure 22:
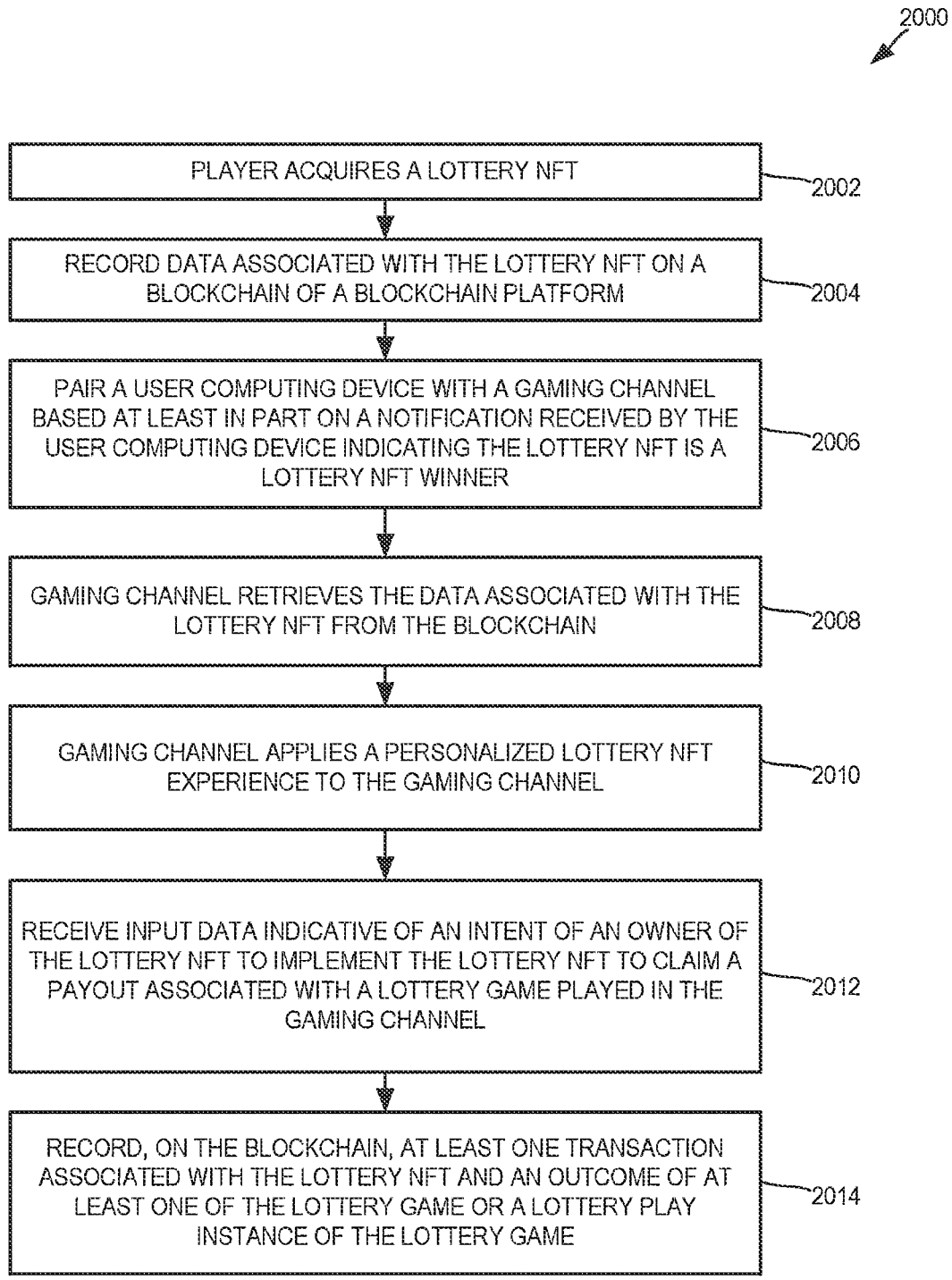
FIG. 22 is a flowchart depicting an example process of implementing a lottery NFT in a gaming computer environment including a blockchain platform in accordance with example embodiments of the present disclosure.

FIG. 22 illustrates a flowchart of an example, non-limiting computer-implemented method 2000 that can be implemented to manage one or more non-fungible tokens in a gaming environment in accordance with an example embodiment of the present disclosure. One or more portions of computer-implemented method 2000 can be implemented as an algorithm on the hardware components of the devices described herein to, for example, to claim a payout associated with a lottery game played in a gaming channel (e.g., a lottery NFT enabled gaming channel) using a lottery NFT in accordance with one or more embodiments described herein.

At 2002, method 2000 includes a player acquiring a lottery NFT (e.g., via a cross-channel application, NFT Portal, gaming channel, etc.).

At 2004, method 2000 includes recording, by the computing device via the cross-channel application, on a blockchain (e.g., blockchain 440) of a blockchain platform, data associated with the lottery non-fungible token (e.g., transaction and/or ownership data associated with the lottery NFT, data identifying a gaming channel and/or a lottery game associated with the lottery non-fungible token, etc.).

At 2006, method 2000 includes pairing a user computing device via the cross-channel application with a gaming channel (e.g., a gaming channel of gaming channel systems 20 and/or gaming channels 104) based at least in part on a notification (e.g., from the gaming channel) received by the computing device (e.g., via the cross-channel application) indicating the lottery non-fungible token is a lottery non-fungible token winner.

At 2008, method 2000 includes the gaming channel retrieving the data associated with the lottery non-fungible token from the blockchain.

At 2010, method 2000 includes the gaming channel applying a personalized lottery non-fungible token experience to the gaming channel.

At 2012, method 2000 includes receiving input data indicative of an intent of an owner of the lottery non-fungible token to implement the lottery non-fungible token to claim a payout associated with a lottery game played in the gaming channel.

At 2014, method 2000 includes recording, on the blockchain, at least one transaction associated with the lottery non-fungible token and an outcome (e.g., a payout) of at least one of the lottery game or a lottery play instance of the lottery game. For instance, in one example embodiment, at 2014, computer-implemented method 2000 can include sending, by the computing device via the cross-channel application, a message to one or more computing devices of a blockchain platform (e.g., to one or more computing devices of digital ledger platform 40, digital ledger layer 42, de-centralized blockchain infrastructure 340, and/or distributed ledger network 450) to record (e.g., via the one or more computing devices of the blockchain platform), on a blockchain (e.g., blockchain 440) of the blockchain platform, at least one transaction associated with the lottery non-fungible token and an outcome (e.g., a payout) of at least one of the lottery game or a lottery play instance of the lottery game.

A bond NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). The bond NFT can include and/or represent an underlying digital asset that can be used by an owner of the bond NFT if and when the owner elects to exercise the bond NFT upon expiration of one or more lock-in periods (e.g., pre-defined time periods and/or dates) that can be associated with the bond NFT. In some embodiments, the bond NFT can be inactive and/or valueless until expiration of a first lock-in period in such one or more lock-in periods.

In one or more embodiments, a value of the above-described bond NFT (e.g., a value associated with access to a defined number of games and/or gaming channels) can be correlated with such one or more lock-in periods that can be associated with the bond NFT. In these embodiment(s), the value of the NFT can progressively increase (e.g., incrementally) if the owner does not exercise the bond NFT upon expiration of at least one of such one or more lock-in periods. For instance, in these embodiment(s), at the expiration of a first lock-in period the NFT can have a first value, at the expiration of a second lock-in period (e.g., subsequent to the first lock-in period) the NFT can have a second value that is greater than the first value, at the expiration of a third lock-in period (e.g., subsequent to the second lock-in period) the NFT can have a third value that is greater than the second value, and so on. In these embodiment(s), the owner of the bond NFT can elect to exercise the bond NFT upon expiration of a certain lock-in period and action value or content of the NFT corresponding to such a certain lock-in period.

In one or more embodiments, the bond NFT can have an expiration date associated therewith that can be indicative of a date by which an owner of the bond NFT must exercise the bond NFT and action the NFT value or content or otherwise forfeit the NFT. In some embodiments, the bond NFT can have an expiration date associated therewith that can be indicative of a date by which an owner of the bond NFT must exercise the bond NFT or otherwise forfeit the content or value associated with the NFT, as the underlying value or content can expire and/or dissolve at a defined time (e.g., on or after the expiration date of the bond NFT).

As an example, a game symbol may be implemented as a bond NFT with a lock-in period of 2 months. On expiration of 6 months, the player may be eligible for 500 game plays for any game having a corresponding game symbol. The 500 game plays may be available for a period of 3 months. At the expiration of 6 months, 2000 games may be available for play by the player.

In an example embodiment, a smart contract associated with a bond NFT can define one or more attributes of the bond NFT and/or facilitate execution of actions associated with the bond NFT. For example, such a smart contract can define: one or more properties of the bond NFT (e.g., data indicative of the bond NFT owner, the value paid to acquire the bond NFT, etc.); one or more pre-defined terms (e.g., terms defining the one or more lock-in periods and/or corresponding values of the NFT, terms defining the game(s) and/or gaming channel(s) to which the NFT can be applied, etc.); one or more life cycle terms of the NFT (e.g., terms defining an expiration date associated with the bond NFT and/or how such expiration and/or dissolution can be recorded on, for instance, a blockchain); and/or another attribute of the bond NFT.

In another example embodiment, the above-described smart contract can further facilitate association of the bond NFT with the owner of the bond NFT across one or more games in one or more gaming channels. For instance, in this example embodiment, the smart contract can provide confirmation to a game and/or a gaming channel that certain condition(s) have been satisfied to prove that a certain entity (e.g., the bond NFT owner) has an ownership interest in the bond NFT and/or that such an entity can transfer such an ownership interest to another entity.

In another example embodiment, the above-described smart contract can further facilitate one or more actions associated with the bond NFT and/or can further facilitate documentation of such action(s) over the life cycle of the bond NFT. For instance, the smart contract can facilitate transfer of ownership interest(s) corresponding to the bond NFT and/or can further facilitate recording of transaction(s) associated with such ownership interest(s). In another example, the smart contract can facilitate recording of each play instance in each game associated with the bond NFT and/or the respective outcomes (e.g., win or loss) of each play instance and/or each game. In this example, the smart contract can facilitate such recording(s) on, for instance, a blockchain. In another example embodiment, the above-described smart contract can further facilitate the expiration and/or dissolution of the bond NFT. For example, the smart contract can facilitate the expiration and/or dissolution of the bond NFT based at least in part on one or more life cycle terms of the bond NFT that can be defined by and/or included with the smart contract.

According to one or more example embodiments, an owner of a bond NFT can implement the bond NFT in one or more gaming channels of a computing and/or gaming environment described herein using, for instance, a cross-channel application that can run on a computing device associated with the owner (e.g., a laptop, smart phone, etc.). For instance, such a computing device can pair with one or more gaming channels (e.g., an electronic gaming machine (EGM)) based at least in part on input from the owner of the bond NFT into the cross-channel application (e.g., input by the owner of the bond NFT indicative of the owner's intent to pair the computing device with a gaming channel).

In an example embodiment, upon expiration of a lock-in period associated with a bond NFT, if an owner of the bond NFT elects to exercise the bond NFT, the owner can use the above-described cross-channel application to pair the above-described computing device with a bond NFT enabled gaming channel to do so. For instance, based on such pairing, the bond NFT enabled gaming channel can communicate with an intermediary server system and/or a blockchain platform described herein to retrieve the bond NFT owned by the user, where the NFT is recorded on a blockchain of the blockchain platform. Alternatively, or additionally, in this example, based on such pairing, the bond NFT enabled gaming channel can communicate with the intermediary server system and/or the blockchain platform to retrieve data indicative of the bond NFT, where such data indicative of either the NFT can be stored and/or recorded on a blockchain of the blockchain platform. In this example, upon receipt of the bond NFT, the bond NFT enabled gaming channel can generate a personalized bond NFT experience in the bond NFT enabled gaming channel. For instance, in one embodiment, the personalized bond NFT experience can include a graphical user interface (GUI) having one or more input fields that can be configured to receive data indicative of the bond NFT owner's identity (e.g., a hash function key, personal identification code, etc.) and/or configured to receive data indicative of the owner's intent to exercise the bond NFT. In some embodiments, the above-described GUI of the personalized bond NFT experience can further include data indicative of a current value of the NFT that can correspond to the expiration of the lock-in period that triggered the owner's ability to exercise the bond NFT.

In one or more embodiments, the above-described blockchain platform can include a smart contract (e.g., the above-described smart contract) that can be associated with the bond NFT T. In such embodiment(s), the smart contract can define and/or facilitate one or more actions in connection with the bond NFT. For example, the smart contract can define logic that can be used facilitate acquisition of the bond NFT (e.g., via a purchase using an NFT portal system described herein). In another example, the smart contract can define condition(s) that must be satisfied to transfer ownership interest(s) in the bond NFT, confirm such condition(s) have been satisfied, execute transaction(s) to transfer such ownership interest(s) in the bond NFT, and/or record on a blockchain of the blockchain platform any and/or all transaction data associated with the bond NFT.

According to one or more example embodiments, the transactions associated with a bond NFT can be recorded using one or more blocks of a blockchain which can be viewed publicly, such as by using a blockchain explorer. For instance, a transaction in which one or more users (e.g., a group of users) acquire a bond NFT (e.g., via award, transfer, acquisition using currency or NFT(s), etc.) can be recorded on the blockchain. In an additional and/or alternative embodiment, each play instance in each game played in a bond NFT enabled gaming channel using the bond NFT can be recorded on the blockchain. In this embodiment, the respective outcomes (e.g., win or loss) of each play instance and/or each game can also be recorded on the blockchain. In this example embodiment, such recordings on the blockchain can allow for viewing and/or tracking of all transactions (e.g., exercising the bond NFT, etc.) and/or outcomes associated with the bond NFT, thereby ensuring transparency of such events, which can eliminate subsequent disputes associated therewith. In an additional and/or alternative embodiment, the expiration and/or dissolution of a bond NFT can be recorded on the blockchain. In example embodiments, such above-described transactions can be mined and validated prior to recordation on the blockchain.

Figure 23:
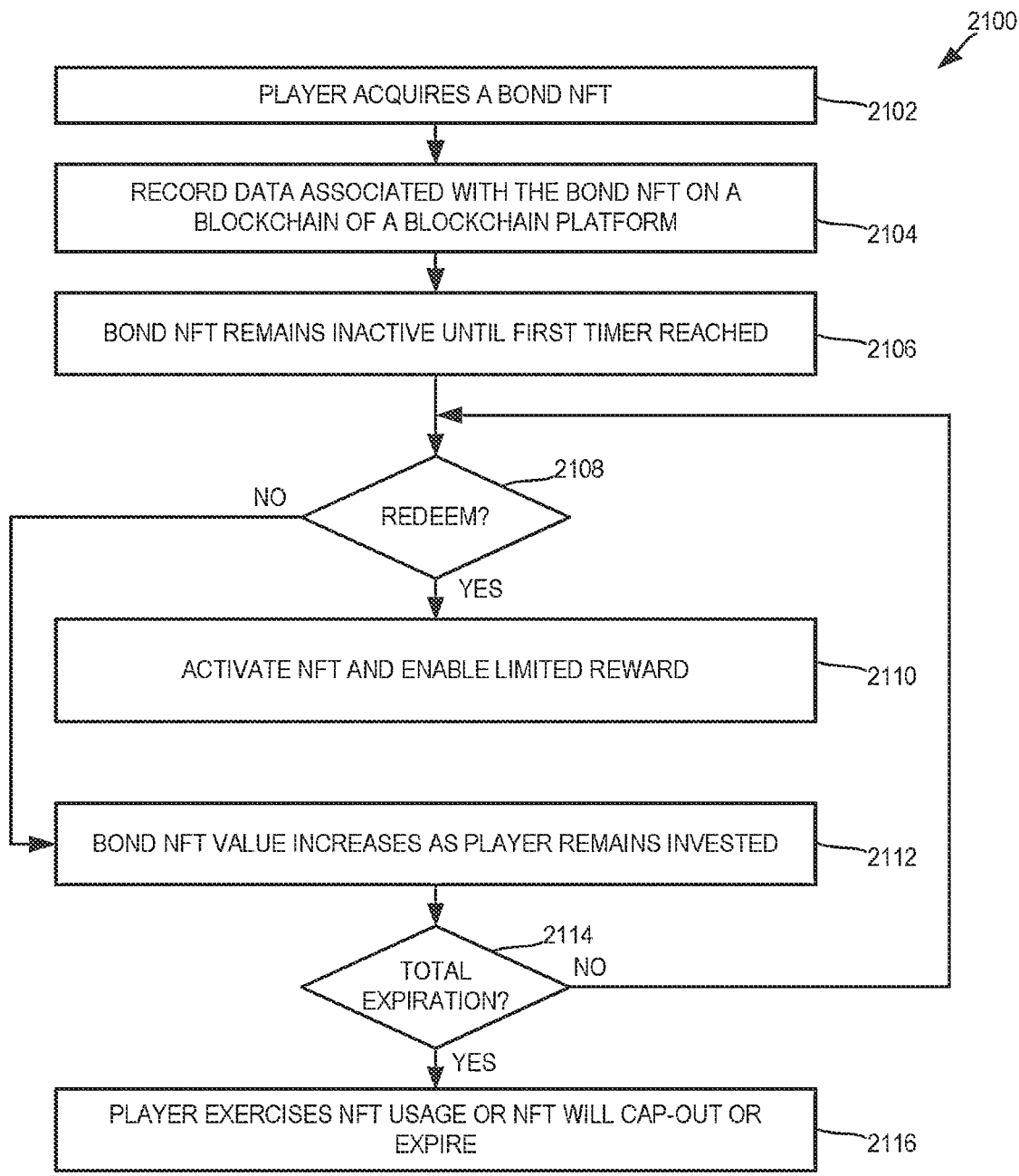
FIG. 23 is a flowchart depicting an example process of implementing a bond NFT in a gaming computer environment including a blockchain platform in accordance with example embodiments of the present disclosure.

FIG. 23 illustrates a flowchart of an example method 2100 that can be implemented to manage one or more non-fungible tokens in a gaming environment in accordance with an example embodiment of the present disclosure. One or more portions of computer-implemented method 2100 can be implemented as an algorithm on the hardware components of the devices described herein to, for example, to exercise a bond NFT to in accordance with one or more embodiments described herein.

At 2102, method 2100 includes a player acquiring a bond NFT.

At 2104, method 2100 includes recording, on a blockchain (e.g., blockchain 440) of a blockchain platform (e.g., digital ledger platform 40, digital ledger layer 42, decentralized blockchain infrastructure 340, and/or distributed ledger network 450), data associated with at least one of the bond non-fungible token.

At 2106, method 2100 includes the bond NFT remaining inactive until a first timer is reached. The first timer can represent a lock-in period of the bond NFT.

At 2108, after the first timer is reached, method 2100 includes determining whether input is received from the player indicating a desire to exercise the bond NFT.

If input is received indicating that the player wishes to redeem the bond NFT, method 2100 proceeds to step 2110. At 2110, method 2100 includes activating the NFT and enabling a limited reward. In some examples, a gaming channel may apply a personalized bond non-fungible token experience (e.g., a graphical user interface (GUI) having one or more input fields that can be configured to receive data indicative of an intent of an owner of the bond non-fungible token to exercise the bond non-fungible token.

At 2112, the bond NFT value increases as the player remains invested in the bond NFT.

At 2114, method 2100 determines whether a total expiration of the bond NFT has occurred. If an expiration of the bond NFT has not occurred, method 2100 returns to step 2108 to determine whether input is received to redeem the NFT. If an expiration of the bond NFT has occurred, method 2100 proceeds at 2116. The player can exercise the bond NFT usage or the NFT may cap-out or expire after a period of time.)

An NFT in accordance with one or more embodiments of the present disclosure can be loaned via an NFT portal or marketplace as described herein. An NFT in accordance with one or more embodiments of the present disclosure be held as collateral against a loan made by a lender to a borrower, where one or more ownership interests corresponding to the NFT can transfer to the lender if the borrower defaults on the loan (e.g., if the borrower fails to repay the loan per the terms of a loan agreement executed between the borrower and the lender).

In one or more example embodiments of the present disclosure, one or more ownership interests corresponding to the NFT can be temporarily and/or permanently transferred to the lender and/or a third-party (e.g., a third-party escrow account) according to one or more pre-defined loan terms that can be defined in a loan agreement executed by the lender and the borrower. For instance, in an example embodiment, upon execution of the loan agreement, one or more ownership interests corresponding to the NFT can temporarily transfer to the lender and/or to a third-party (e.g., a third-party escrow account). In this example embodiment, if the borrower repays the loan on or before a defined date according to one or more pre-defined loan terms defined in the loan agreement, such ownership interest(s) corresponding to the NFT can transfer back to the borrower. In this example embodiment, if the borrower fails to repay the loan on or before a defined date according to one or more pre-defined loan terms defined in the loan agreement, one or more ownership interests corresponding to the NFT can formally transfer to the lender.

In an example embodiment, a smart contract associated with a NFT can define one or more attributes of the NFT and/or facilitate execution of actions associated with the NFT. For example, such a smart contract can define: one or more properties of the NFT (e.g., data indicative of a lender, a borrower, and/or a third-party associated with the NFT, the value of the NFT, etc.); one or more pre-defined terms (e.g., terms defining the one or more loan payment dates and/or a loan period end date indicative of the date by which the borrow must repay the entire amount of the loan, terms defining the game(s) and/or gaming channel(s) to which the NFT can be applied, terms defining temporary and/or permanent transfer of ownership interest(s) corresponding to the NFT under the loan agreement, terms defining one or more criteria that must be satisfied to temporarily and/or permanently transfer one or more ownership interest(s) corresponding to the NFT, etc.); one or more life cycle terms of the NFT (e.g., terms defining an expiration date associated with the NFT and/or how such expiration and/or dissolution can be recorded on, for instance, a blockchain); and/or another attribute of the NFT.

In another example embodiment, the above-described smart contract can further facilitate association of the NFT with the borrower, the lender, and/or a third-party across one or more games in one or more gaming channels. For instance, in this example embodiment, the smart contract can provide confirmation to a game and/or a gaming channel that certain condition(s) have been satisfied to prove that a certain entity has an ownership interest in the NFT and/or that such an entity can transfer such an ownership interest to another entity. In another example embodiment, the above-described smart contract can further facilitate one or more actions associated with the NFT and/or documentation of such action(s) over the life cycle of the NFT. For instance, the smart contract can facilitate transfer of ownership interest(s) corresponding to the NFT and/or recording of transaction(s) associated with such ownership interest(s). In another example, the smart contract can facilitate recording of each play instance in each game associated with the NFT and/or the respective outcomes (e.g., win or loss) of each play instance and/or each game. In this example, the smart contract can facilitate such recording(s) on, for instance, a blockchain. In another example embodiment, the above-described smart contract can further facilitate the expiration and/or dissolution of the NFT. For example, the smart contract can facilitate the expiration and/or dissolution of the NFT based at least in part on one or more life cycle terms of the NFT that can be defined by and/or included with the smart contract.

According to one or more embodiments of the present disclosure, a user can implement a loan agreement using a NFT as collateral by accessing an NFT portal system of a computing and/or gaming environment described herein to locate a lender that will accept the NFT as collateral for a loan under terms of the loan agreement. In one or more embodiments, based on locating such a lender, the parties associated with the loan agreement (e.g., borrower, lender, and/or third-party) can employ a decentralized finance (DeFi) application, a cryptocurrency application, and/or a blockchain platform (e.g., a digital ledger platform) of such a computing and/or gaming environment to: execute the loan agreement; execute any transaction(s) associated with the NFT per the terms of the loan agreement (e.g., distribution of loan funds, collection of loan payments, and/or transfer (e.g., temporary and/or permanent) of ownership interest(s) in the NFT between the borrower, the lender, and/or the third-party); and/or record such transaction(s) on a blockchain of the blockchain platform.

In one or more embodiments, the above-described blockchain platform can include a smart contract (e.g., the above-described smart contract) that can be associated with the NFT. In such embodiment(s), the smart contract can define and/or facilitate one or more actions in connection with the loan agreement and/or the NFT. For example, the smart contract can define the logic used by the DeFi application and/or the cryptocurrency application to execute and/or manage the loan agreement and/or term(s) thereof. In another example, the smart contract can define condition(s) that must be satisfied to transfer ownership interest(s) in the NFT, confirm such condition(s) have been satisfied, execute transaction(s) to transfer such ownership interest(s) in the NFT, and/or record on a blockchain of the blockchain platform any and/or all transaction data associated with the loan agreement and/or the NFT.

According to one or more example embodiments, transaction data associated with the loan agreement and/or the NFT can be recorded (e.g., by the above-described smart contract) on one or more blocks of the blockchain which can be viewed publicly, such as by using a blockchain explorer of the blockchain platform. For instance, a transaction in which one or more of the parties associated with the loan agreement (e.g., borrower, lender, and/or third-party) acquire the NFT can be recorded on the blockchain. In an additional and/or alternative embodiment, each play instance in each game played in an NFT enabled gaming channel using the NFT can be recorded on the blockchain. In this embodiment, the respective outcomes (e.g., win or loss) of each play instance and/or each game can also be recorded on the blockchain. In the above example embodiments, such recordings on the blockchain can allow for viewing and/or tracking of all transactions associated with the NFT, thereby ensuring transparency of such events, which can eliminate subsequent disputes associated therewith. In an additional and/or alternative embodiment, the expiration and/or dissolution of the NFT can be recorded on the blockchain. In example embodiments, such above-described transactions can be mined and validated prior to recordation on the blockchain.

Figure 24:
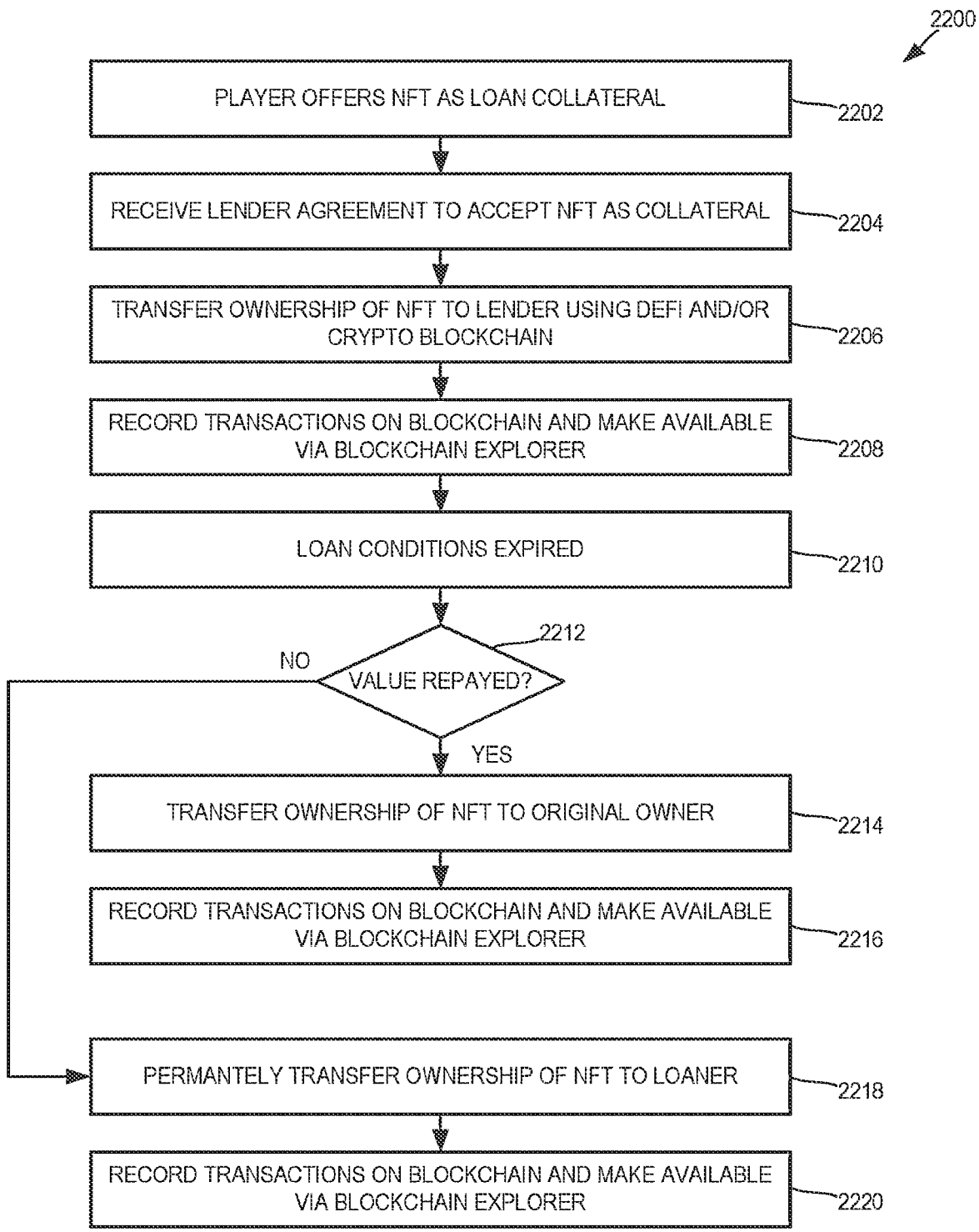
FIG. 24 is a flowchart depicting an example process of implementing an NFT as collateral in a gaming computer environment including a blockchain platform in accordance with example embodiments of the present disclosure.

FIG. 24 illustrates a flowchart of an example method 2200 that can be implemented to manage one or more non-fungible tokens in a gaming environment in accordance with an example embodiment of the present disclosure. One or more portions of computer-implemented method 2200 can be implemented as an algorithm on the hardware components of the devices described herein to, for example, to use a loan NFT as collateral against a loan in a loan agreement between users associated with a gaming environment in accordance with one or more embodiments described herein.

At 2202, method 2200 includes a player offering an NFT as loan collateral. A player can offer an NFT as loan collateral via the NFT Portal/Marketplace in example embodiments.

At 2204, method 2200 includes receiving a lender agreement to accept the NFT as collateral in exchange for a loan of value.

A loan non-fungible token with a loan agreement (e.g., a loan agreement between users associated with computing environment 10, 100, and/or 200 and/or gaming computing environment 100). For example, such processor(s) can associate the loan non-fungible token with the loan agreement by recoding on a blockchain (e.g., blockchain 440) data indicative of the relationship between the loan non-fungible token and the loan agreement, such as: data indicating that the loan non-fungible token is being used as collateral against a loan according to terms defined in the loan agreement; and/or data indicating the terms of the loan agreement pertaining to the loan non-fungible token.

At 2206, one or more transactions can be executed to transfer ownership of the NFT to the lender. Method 2200 can include receiving data indicative of ownership interest in the loan non-fungible token in association with the loan agreement. Additionally, method 2200 can include receiving data indicative of one or more ownership interests of a borrower, a lender, and/or a third-party as defined in and/or conditioned by one or more terms in the loan agreement.

At 2208, method 2200 includes recording on a blockchain (e.g., blockchain 440), data indicative of a transaction corresponding to the ownership interest in association with the loan agreement. For example, the system can record, on the blockchain, data indicative of a transaction in which one or more ownership interests in the loan non-fungible token were transferred from a borrower to a lender.

At 2210, method 2200 includes expiration of the loan conditions.

At 2212, method 2200 includes determining whether the loan value has been repaid. If the value of the loan has been repaid, method 2200 continues at 2212 where one or more transactions are executed to transfer ownership of the NFT back to the original owner. At 2214, method 2200 includes recording one or more transactions on the blockchain relating to repayment of the loan and/or the transfer of ownership back to the original owner.

If the value of the loan has not been repaid, method 2200 continues at 2216 where one or more transactions are executed to permanently transfer ownership of the NFT to the lender. At 2218, method 2200 includes recording one or more transactions on the blockchain relating to the transfer of formal ownership to the lender. At 2220, method 2200 includes recording on a blockchain (e.g., blockchain 440), data indicative of a transaction corresponding to the ownership interest in association with the loan agreement.

A NFT in accordance with one or more embodiments of the present disclosure can be leased by a first user (e.g., the owner, hereafter "lessor") to a second user (hereafter "lessee") according to a lease agreement between such users, where one or more ownership interests corresponding to the NFT can transfer to the lessee for the duration of the lease. The lease agreement can be defined by one or more smart contracts in example embodiments. The lease agreement in accordance with one or more embodiments of the present disclosure can define various terms of the lease, such as duration of the lease and/or dividends to be paid by the lessee to the lessor for the duration of the lease. In some embodiments, upon expiration of the lease agreement, one or more ownership interests corresponding to the NFT can transfer back to the lessor. In some embodiments, upon a breach of the lease agreement by lessee, one or more ownership interests corresponding to the NFT can transfer back to the lessor.

In an example embodiment, a smart contract associated with a NFT can define one or more attributes of the NFT and/or facilitate execution of actions associated with the NFT. For example, such a smart contract can define: one or more properties of the NFT (e.g., data indicative of a lessor and/or lessee associated with the NFT, the value of the NFT, etc.); one or more pre-defined terms (e.g., terms defining the one or more lease payment dates and/or a lease period end date indicative of the date on which one or more ownership interests corresponding to the NFT will transfer back to the lessor, terms defining the game(s) and/or gaming channel(s) to which the NFT can be applied, terms defining temporary and/or permanent transfer of ownership interest(s) corresponding to the NFT under the lease agreement, terms defining one or more criteria that must be satisfied to temporarily and/or permanently transfer one or more ownership interest(s) corresponding to the NFT, etc.); one or more life cycle terms of the NFT (e.g., terms defining an expiration date associated with the NFT and/or how such expiration and/or dissolution can be recorded on, for instance, a blockchain); and/or another attribute of the NFT.

In another example embodiment, the above-described smart contract can further facilitate association of the NFT with the lessor and/or the lessee across one or more games in one or more gaming channels. For instance, in this example embodiment, the smart contract can provide confirmation to a game and/or a gaming channel that certain condition(s) have been satisfied to prove that a certain entity (e.g., the lessor) has an ownership interest in the NFT and/or that such an entity can transfer such an ownership interest to another entity (e.g., the lessee). In another example embodiment, the above-described smart contract can further facilitate one or more actions associated with the NFT and/or documentation of such action(s) over the life cycle of the NFT. For instance, the smart contract can facilitate transfer of ownership interest(s) corresponding to the NFT and/or recording of transaction(s) associated with such ownership interest(s). In another example, the smart contract can facilitate recording of each play instance in each game associated with the NFT and/or the respective outcomes (e.g., win or loss) of each play instance and/or each game. In this example, the smart contract can facilitate such recording(s) on, for instance, a blockchain. In another example embodiment, the above-described smart contract can further facilitate the expiration and/or dissolution of the NFT. For example, the smart contract can facilitate the expiration and/or dissolution of the NFT based at least in part on one or more life cycle terms of the NFT that can be defined by and/or included with the smart contract.

According to one or more embodiments of the present disclosure, a lessor and/or owner of a NFT can implement a lease agreement to lease the NFT by accessing an NFT portal system of a computing and/or gaming environment described herein to locate a lessee that will pay dividends to the lessor for the duration of the lease in return for one or more ownership interests corresponding to the NFT. In one or more embodiments, based on locating such a lessee, the lessor and/or the lessee can employ a decentralized finance (DeFi) application, a cryptocurrency application, and/or a blockchain platform (e.g., a digital ledger platform) of such a computing and/or gaming environment to: execute the lease agreement; execute any transaction(s) associated with the NFT per the terms of the lease agreement (e.g., collection of dividend payments and/or transfer (e.g., temporary and/or permanent) of ownership interest(s) in the NFT between the lessor and the lessee); and/or record such transaction(s) on a blockchain of the blockchain platform.

In one or more embodiments, the above-described blockchain platform can include a smart contract (e.g., the above-described smart contract) that can be associated with the NFT. In such embodiment(s), the smart contract can define and/or facilitate one or more actions in connection with the lease agreement and/or the NFT. For example, the smart contract can define the logic used by the DeFi application and/or the cryptocurrency application to execute and/or manage the lease agreement and/or term(s) thereof. In another example, the smart contract can define condition(s) that must be satisfied to transfer ownership interest(s) in the NFT, confirm such condition(s) have been satisfied, execute transaction(s) to transfer such ownership interest(s) in the NFT, and/or record on a blockchain of the blockchain platform any and/or all transaction data associated with the lease agreement and/or the NFT.

According to one or more example embodiments, transaction data associated with the lease agreement and/or the NFT can be recorded (e.g., by the above-described smart contract) on one or more blocks of the blockchain which can be viewed publicly, such as by using a blockchain explorer of the blockchain platform. For instance, a transaction in which the lessor or the lessee acquire the NFT can be recorded on the blockchain. In an additional and/or alternative embodiment, each play instance in each game played in an NFT enabled gaming channel using the NFT can be recorded on the blockchain. In this embodiment, the respective outcomes (e.g., win or loss) of each play instance and/or each game can also be recorded on the blockchain. In the above example embodiments, such recordings on the blockchain can allow for viewing and/or tracking of all transactions associated with the NFT, thereby ensuring transparency of such events, which can eliminate subsequent disputes associated therewith. In an additional and/or alternative embodiment, the expiration and/or dissolution of the NFT can be recorded on the blockchain. In example embodiments, such above-described transactions can be mined and validated prior to recordation on the blockchain.

Figure 25:
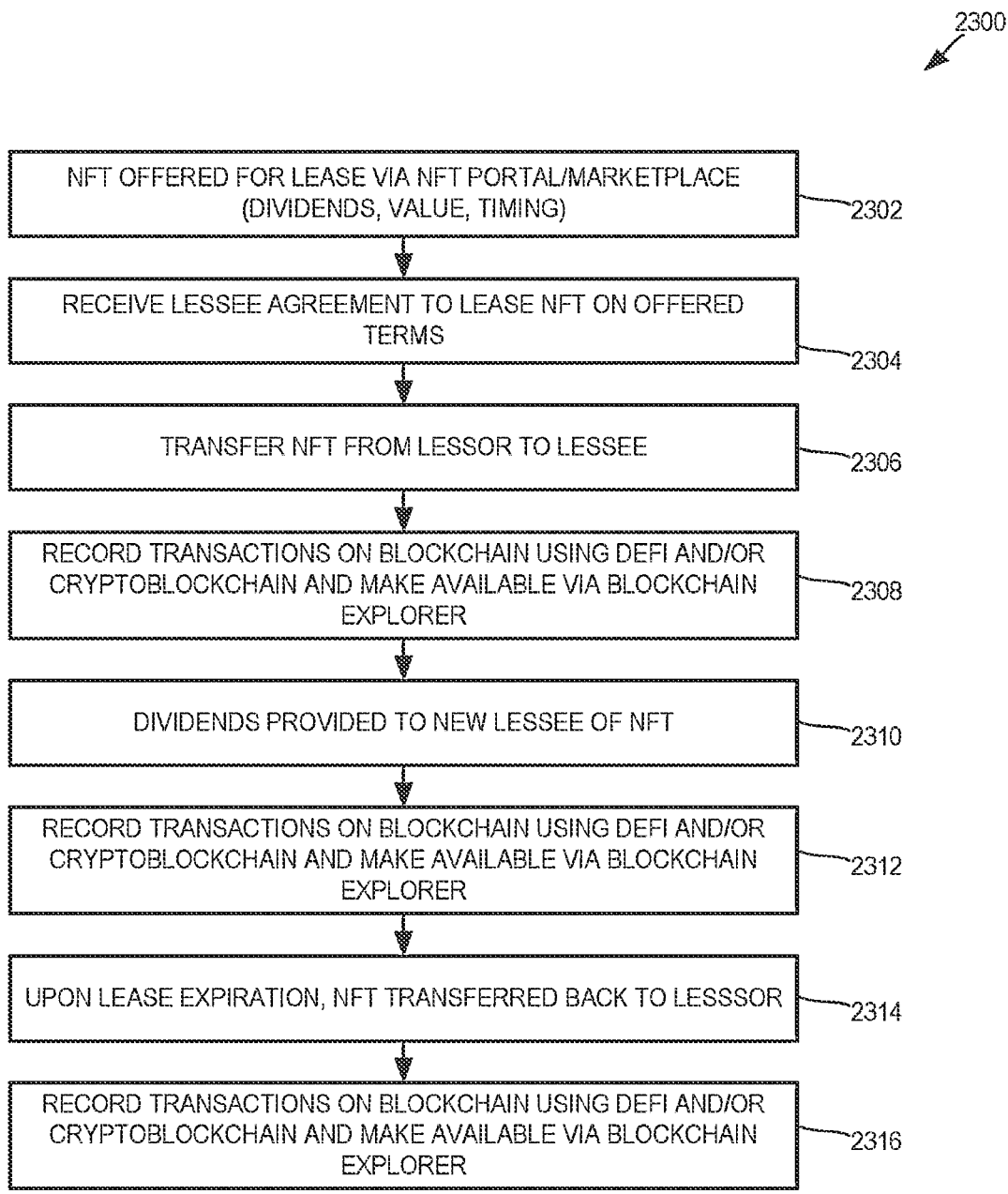
FIG. 25 is a flowchart depicting an example process of leasing an NFT as in a gaming computer environment including a blockchain platform in accordance with example embodiments of the present disclosure.

FIG. 25 illustrates a flowchart of an example method 2300 that can be implemented to manage one or more non-fungible tokens in a gaming environment in accordance with an example embodiment of the present disclosure. One or more portions of computer-implemented method 2300 can be implemented as an algorithm on the hardware components of the devices described herein to, for example, to lease one or more ownership interests corresponding to a NFT to a user associated with a gaming environment in return for dividends in accordance with one or more embodiments described herein.

At 2302, method 2300 includes offering an NFT for lease via an NFT Portal/Marketplace.

At 2304, method 2300 includes receiving an indication of a lessee agreement to lease the NFT on the offered terms. The terms may indicate that the lessor is leasing the non-fungible token to a lessee for the duration of the lease in return for dividends paid by the lessee to the lessor according to terms defined in the lease agreement.

At 2306, method 2300 includes transferring the NFT from the lessor to the lessee. Method 2300 can include receiving data indicative of ownership interest in the lease non-fungible token in association with the lease agreement. For example, such processor(s) can receive data indicative of one or more ownership interests of a lessor (e.g., the owner) and/or a lessee of the NFT as defined in and/or conditioned by one or more terms in the lease agreement.

At 2308, method 2300 includes recording, on a blockchain (e.g., blockchain 440), data indicative of a transaction corresponding to the ownership interest in association with the lease agreement. For example, such processor(s) can record, on the blockchain, data indicative of a transaction in which one or more ownership interests in the lease non-fungible token were transferred from a lessor (e.g., the owner) to a lessee of the NFT or vice versa according to terms of the lease agreement.

At 2310, method 2300 includes providing dividends to the new lessee of the NFT. Method 2300 can include receiving data indicative of at least one transaction corresponding to dividends of the lease non-fungible token.

At 2312, method 2300 includes recording, on the blockchain, data associated with the dividend transaction(s). The transactions can be recorded using a DeFi and/or crypto blockchain. The transactions can be made available via the blockchain explorer.

At 2314, method 2300 includes transferring the NFT from the lessee back to the lessor upon the lease expiration. Method 2300 can include receiving data indicative of ownership interest in the lease non-fungible token in association with the lease agreement.

At 2316, method 2300 includes recording, on a blockchain (e.g., blockchain 440), data indicative of a transaction corresponding to the ownership interest in association with the lease agreement. For example, such processor(s) can record, on the blockchain, data indicative of a transaction in which one or more ownership interests in the lease non-fungible token were transferred from the lessee back to the lessor.

An insurance NFT in accordance with one or more embodiments of the present disclosure can be acquired (e.g., via purchase, award, exchange, gift, etc.) by one or more users associated with a computing and/or gaming environment described herein (e.g., a real, physical gaming environment and/or a virtual, computer-implemented gaming environment). The insurance NFT can include and/or represent an insurance policy (e.g., insurance agreement) underwritten by an insurer entity that can protect an asset NFT against certain events, such as theft, loss, and/or valuation loss for the duration of the insurance policy. The insurance NFT re can be associated with, tagged to, and/or tag along with the asset NFT that it protects. In some embodiments, a smart contract can be associated with the asset NFT and/or the insurance NFT. In these embodiments, the smart contract can collect a pre-defined insurance payout in response to the occurrence of a corresponding insured event as defined by the terms of the insurance policy. In some embodiments, if an insured entity (e.g., an owner of the asset NFT) fails to pay the insurance premium associated with the insurance NFT as defined by the terms of the insurance policy, the insurance NFT can be disassociated with and/or delinked from the asset NFT (e.g., via the smart contract).

In an example embodiment, a smart contract associated with an asset NFT and/or an insurance NFT can define one or more attributes of the insurance NFT and/or facilitate execution of actions associated with the insurance NFT. For example, such a smart contract can define: one or more properties of the insurance NFT (e.g., data indicative of an insurer entity and/or an insured entity associated with the insurance NFT, the value of the insurance NFT, etc.); one or more pre-defined terms (e.g., terms defining the one or more insurance premium payment dates and/or an insurance policy end date indicative of the date on which the insurance policy will expire, terms defining the game(s) and/or gaming channel(s) to which the asset NFT and/or the insurance NFT can be applied, terms defining temporary and/or permanent transfer of ownership interest(s) corresponding to the insurance NFT under the insurance policy, terms defining one or more criteria that must be satisfied to temporarily and/or permanently transfer one or more ownership interest(s) corresponding to the insurance NFT, etc.); one or more life cycle terms of the insurance NFT (e.g., terms defining an expiration date associated with the insurance NFT and/or how such expiration and/or dissolution can be recorded on, for instance, a blockchain); and/or another attribute of the insurance NFT.

In another example embodiment, the above-described smart contract can further facilitate association of the insurance NFT with the asset NFT, the insured entity, and/or the insurer entity across one or more games in one or more gaming channels. For instance, in this example embodiment, the smart contract can provide confirmation to a game and/or a gaming channel that certain condition(s) have been satisfied to prove that an insurer entity has an ownership interest in the insurance NFT and/or that such an insurer entity can transfer such an ownership interest to an owner of an asset NFT (e.g., the insured entity). In another example embodiment, the above-described smart contract can further facilitate one or more actions associated with the insurance NFT and/or documentation of such action(s) over the life cycle of the insurance NFT. For instance, the smart contract can facilitate transfer of ownership interest(s) corresponding to the insurance NFT and/or recording of transaction(s) associated with such ownership interest(s).

In another example, the above-described smart contract can collect a pre-defined insurance payout from the insurer entity in response to the occurrence of a corresponding insured event as defined by the terms of the insurance policy. In another example, if the insured entity fails to pay the insurance premium associated with the insurance NFT as defined by the terms of the insurance policy, the smart contract can disassociate and/or delink the insurance NFT from the asset NFT. In another example, the smart contract can facilitate recording of each play instance in each game and/or the respective outcomes thereof (e.g., win or loss) associated with the insurance NFT and/or the asset NFT. In this example, the smart contract can facilitate such recording(s) on, for instance, a blockchain. In another example embodiment, the above-described smart contract can further facilitate the expiration and/or dissolution of the insurance NFT. For example, the smart contract can facilitate the expiration and/or dissolution of the insurance NFT based at least in part on one or more life cycle terms of the insurance NFT that can be defined by and/or included with the smart contract.

According to one or more embodiments of the present disclosure, an owner of an asset NFT can acquire an insurance NFT to protect the asset NFT by accessing an NFT portal system of a computing and/or gaming environment described herein. For example, such an owner of an asset NFT can access such an NFT portal system to locate an insurer entity that will underwrite an insurance policy and link an insurance NFT to the asset NFT to protect the asset NFT from certain pre-defined insurance events in return for a premium paid by the owner (insured entity) to the insurer entity. In one or more embodiments, based on locating such an insurer entity, the owner of the asset NFT (insured entity) and/or the insurer entity can employ a decentralized finance (DeFi) application, a cryptocurrency application, and/or a blockchain platform (e.g., a digital ledger platform) of such a computing and/or gaming environment to: execute the insurance policy; execute any transaction(s) associated with the insurance NFT and/or the asset NFT per the terms of the insurance policy (e.g., collection of premium payments and/or transfer (e.g., temporary and/or permanent) of ownership interest(s) in the insurance NFT between the insurer entity and the insured entity); and/or record such transaction(s) on a blockchain of the blockchain platform.

In one or more embodiments, the above-described blockchain platform can include a smart contract (e.g., the above-described smart contract) that can be associated with the insurance NFT and/or the asset NFT. In such embodiment(s), the smart contract can define and/or facilitate one or more actions in connection with the insurance policy, the insurance NFT, and/or the asset NFT. For example, the smart contract can define the logic used by the DeFi application and/or the cryptocurrency application to execute and/or manage the insurance policy and/or term(s) thereof. In another example, the smart contract can define condition(s) that must be satisfied to transfer ownership interest(s) in the insurance NFT, confirm such condition(s) have been satisfied, execute transaction(s) to transfer such ownership interest(s) in the insurance NFT, and/or record on a blockchain of the blockchain platform any and/or all transaction data associated with the insurance policy, the insurance NFT, and/or the asset NFT.

According to one or more example embodiments, transaction data associated with the insurance policy, the insurance NFT, and/or the asset NFT can be recorded (e.g., by the above-described smart contract) on one or more blocks of the blockchain which can be viewed publicly, such as by using a blockchain explorer of the blockchain platform. For instance, a transaction in which the owner of an asset NFT (insured entity) or the insurer entity acquire the insurance NFT can be recorded on the blockchain. In an additional and/or alternative embodiment, each play instance in each game played in an NFT enabled gaming channel using the insurance NFT and/or the asset NFT can be recorded on the blockchain. In this embodiment, the respective outcomes (e.g., win or loss) of each play instance and/or each game can also be recorded on the blockchain. In the above example embodiments, such recordings on the blockchain can allow for viewing and/or tracking of all transactions associated with the insurance NFT and/or the asset NFT, thereby ensuring transparency of such events, which can eliminate subsequent disputes associated therewith. In an additional and/or alternative embodiment, the expiration and/or dissolution of the insurance NFT (e.g., disassociation and/or delinking of the insurance NFT from the asset NFT) can be recorded on the blockchain. In example embodiments, such above-described transactions can be mined and validated prior to recordation on the blockchain.

Figure 26:
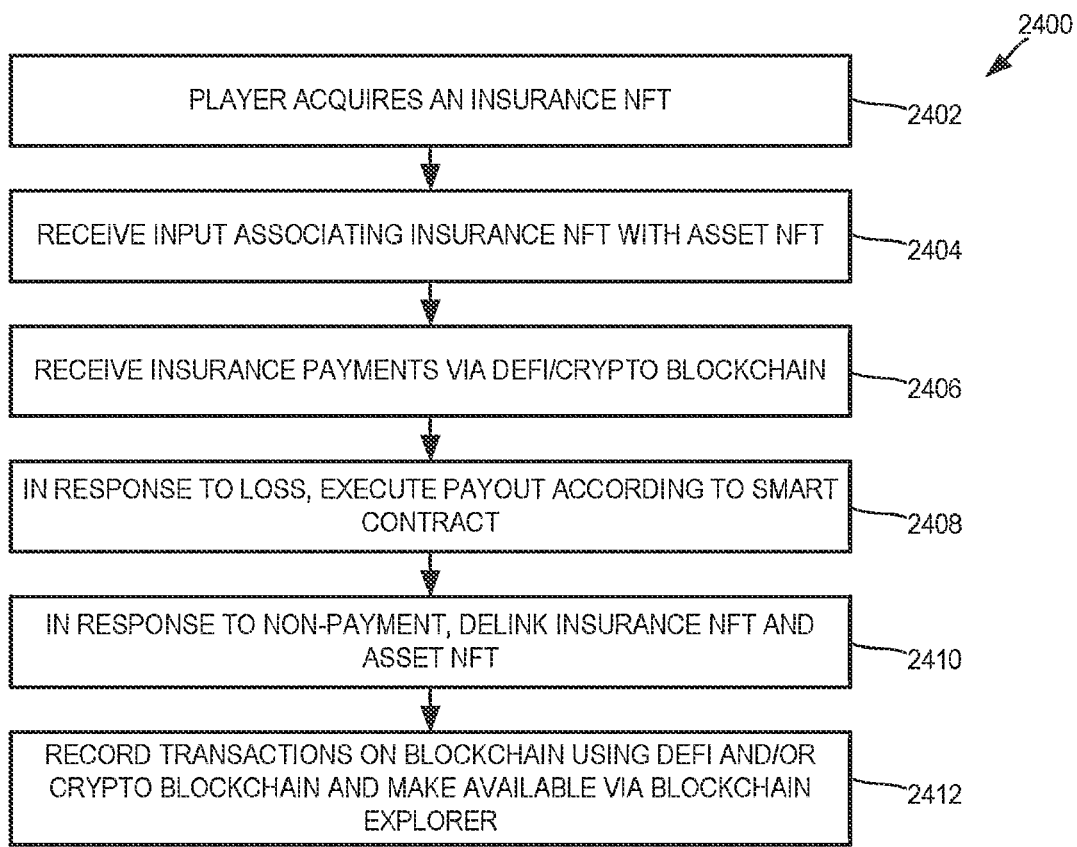
FIG. 26 is a flowchart depicting an example process of implementing an insurance NFT in a gaming computer environment including a blockchain platform in accordance with example embodiments of the present disclosure.

FIG. 26 illustrates a flowchart of an example method 2400 that can be implemented to manage one or more non-fungible tokens in a gaming environment in accordance with an example embodiment of the present disclosure. One or more portions of method 2400 can be implemented as an algorithm on the hardware components of the devices described herein to, for example, to insure an asset NFT of a user associated with a gaming environment using an insurance NFT in accordance with one or more embodiments described herein.

At 2402, method 2400 includes a player acquiring an insurance NFT. At 2404 method 2400 includes receiving input to associate the insurance NFT with an asset NFT. An insurance NFT can be associated with an asset non-fungible token in association with an insurance policy (e.g., an insurance policy between users associated with computing environment 10, 100, and/or 200 and/or gaming computing environment 100). For example, such processor(s) can associate the insurance non-fungible token with the asset non-fungible token in association with the insurance policy by recoding on a blockchain (e.g., blockchain 440) data indicative of the relationship between the insurance non-fungible token, the asset non-fungible token, and the insurance policy. For instance, such processor(s) can facilitate such association by recoding on a blockchain (e.g., blockchain 440) data that can include, but is not limited to: data indicating that an insurer entity has underwritten the insurance policy and associated and/or linked the insurance non-fungible token with the asset non-fungible token to insure the asset non-fungible token against certain predefined insured events for the duration of the insurance policy in return for premium paid by an owner of the asset non-fungible token (insured entity) to an insurer entity according to terms defined in the insurance policy; and/or data indicating the terms of the insurance policy pertaining to the insurance non-fungible token and the asset non-fungible token.

At 2406, method 2400 includes receiving payments for the insurance NFT through a DeFi distributed application and/or a crypto blockchain.

At 2408, in response to a loss or other insurance event, method 2400 includes executing a payout according to a smart contract linked to the insurance NFT.

At 2410, in response to non-payment of the insurance premium, method 2400 includes delinking the insurance NFT and the asset NFT.

At 2412, method 2400 includes recording on a blockchain (e.g., blockchain 440), data indicative of one or more transactions associated with the NFT. The transactions may include transactions relating to acquisition of the NFT, linking the NFT to an asset NFT, payment of the insurance NFT, payouts in accordance with the insurance NFT, failure to pay a premium, etc. For example, such processor(s) can record, on the blockchain, data indicative of a transaction in which one or more insurance non-fungible tokens were involved.

According to an example aspect of the present disclosure, an identity NFT can be acquired by one or more users associated with a computing and/or gaming environment described herein (e.g., a real, physical gaming environment and/or a virtual, computer-implemented gaming environment). The identity NFT in accordance with one or more embodiments of the present disclosure can be generated to store information regarding a player identity. Other NFTs owned or otherwise associated with the player of the identity NFT can be linked to the identity NFT. In an example embodiment, an identity NFT cannot be sold/transferred or re-used. It can be immutable to provide a secure record of all data and transactions associated with the identify NFT. In some examples, an identity NFT can replace all other forms of identification within a gaming environment.

According to one or more embodiments of the present disclosure, a player can acquire (e.g., purchase) an identity NFT by accessing an NFT portal system of a computing and/or gaming environment described herein. The NFT portal system can validate a player (e.g., know your customer-KYC) via an oracle smart contract on a chainlink or KYC distributed application. Once an NFT is validated via oracles or other distributed applications, an identity NFT can be issued. Thereafter, the player can use the identity NFT for any transaction on the gaming or digital ledger platform, such as for DeFi transactions, Crypto transactions, or other blockchain transactions.

Figure 27:
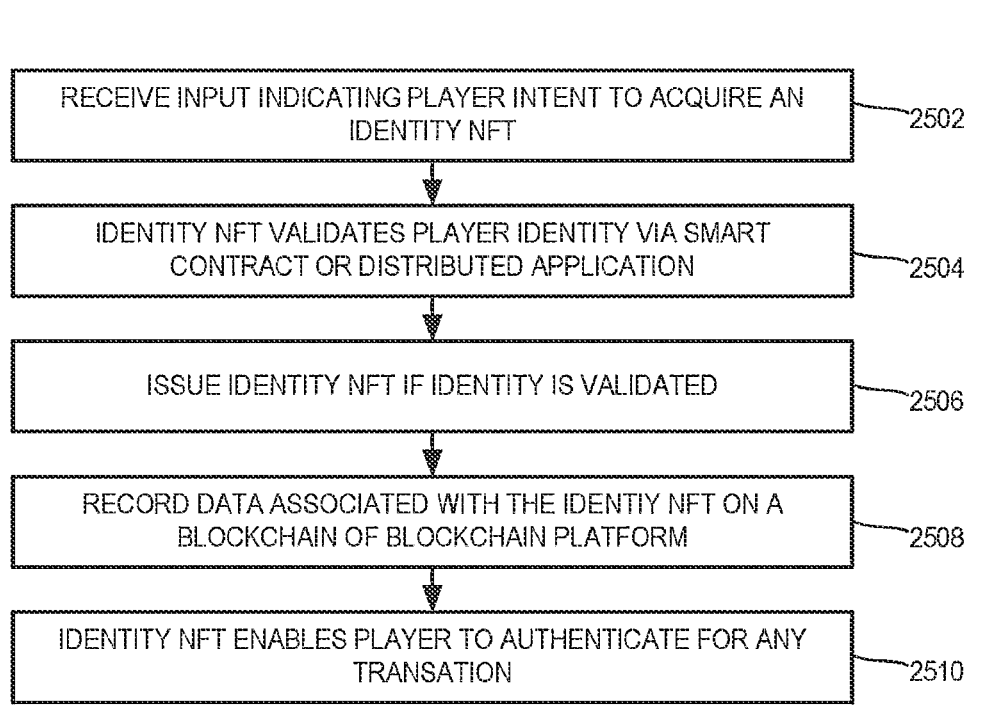
FIG. 27 is a flowchart depicting an example process of implementing an identity NFT in a gaming computer environment including a blockchain platform in accordance with example embodiments of the present disclosure.

FIG. 27 depicts a flowchart illustrating an example method for issuing and using an identity non-fungible token within a gaming environment n accordance with an example embodiment of the present disclosure. One or more portions of method 2500 can be implemented as an algorithm on the hardware components of the devices described herein to, for example, validate a player identity and issue an identity NFT.

At 2502, method 2500 includes receiving input from a player indicating an intent to acquire an identity NFT. In example embodiments, a player may use a computing device to acquire an identity NFT via a cross-channel application (e.g., cross-channel application 52) running on the computing device. Other techniques may be used to acquire an identity token such as a user acquiring an identity NFT via an NFT Portal/Marketplace that is accessed using a standard web browser or other application.

At 2504, method 2500 includes validating the player identify via a smart contract or distributed application associated with the digital ledger platform. Step 2504 can be performed prior to issuing the NFT issued to the player at 2506. In example embodiments, a know your customer (KYC) profile of a user can be validated via an oracle smart contract that is implemented on Chainlink or another suitable distributed application for meeting know your customer requirements.

At 2508, method 2500 includes recording data associated with the identity NFT on a blockchain of the blockchain platform. Step 2506 can include issuing the NFT to the player and recording one or more transactions associated with the identity NFT on the blockchain.

At 2510, method 2500 includes authenticating, validating, or otherwise using the identify NFT to authenticate a player for a transaction. Step 2510 can be performed for any transaction within any gaming channel of the system.

A Roadmap NFT in accordance with one or more embodiments of the present disclosure can be acquired (by one or more users associated with a computing and/or gaming environment described herein (e.g., a real, physical gaming environment and/or a virtual, computer-implemented gaming environment). A roadmap NFT can be an NFT associated with an NFT campaign in example embodiments. An operator of a gaming system can publish a timeline for a limited number of NFTs to be bought/sold during a limited time period. All dates and quantities of the roadmap NFTs can be made available and be real-time updated on the NFT portal.

Figure 28:
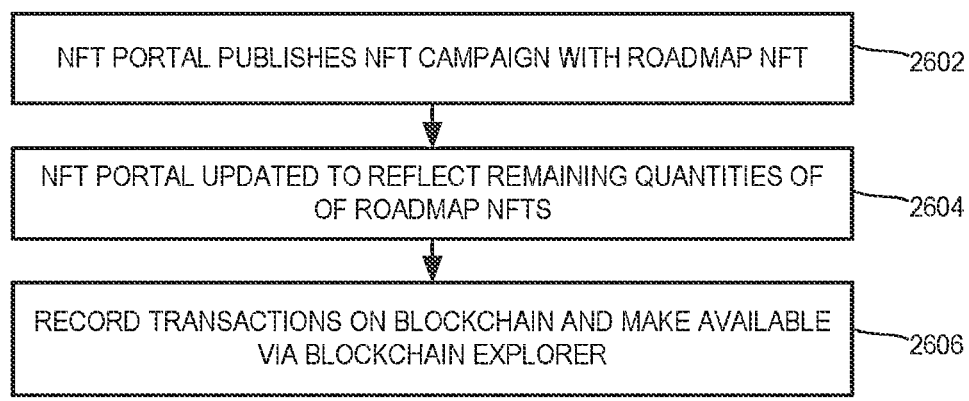
FIG. 28 is a flowchart depicting an example process of implementing a roadmap NFT in a gaming computer environment including a blockchain platform in accordance with example embodiments of the present disclosure.

FIG. 28 depicts a flowchart illustrating an example method for issuing and managing a roadmap NFT within a gaming environment in accordance with an example embodiment of the present disclosure. One or more portions of method 2600 can be implemented as an algorithm on the hardware components of the devices described herein to, for example, issue and manage a roadmap NFT.

At 2602, method 2600 includes an NFT portal publishing an NFT campaign including one or more Roadmap NFTs. The campaign can define attributes and parameters of the Roadmap NFTs, such as timeline for release of the NFTs for acquisition of the Roadmap NFTs. The campaign may also publish a limited time period during which the Roadmap NFTs may be bought or sold.

At 2604, method 2600 includes updating the NFT Portal to reflect the remaining quantities of the Roadmap NFTs as they are bought and sold within the gaming environment.

At 2606, method 2600 includes recording, on the blockchain, at least one transaction associated with a Roadmap NFT. For instance, in one example embodiment, at 2014, computer-implemented method 2000 can include receiving at the blockchain platform via the intermediary server at least one transaction associated with the Roadmap NFT.

According to an example aspect of the present disclosure, a gaming provider can run an event where an NFT is selected at a certain time period and/or interval as a winning NFT. For example, an event can be established to select any random NFT that is in circulation in the market to be a special winner. A player can pair a cross-channel app with a gaming channel to win awards associated with the event.

Figure 29:
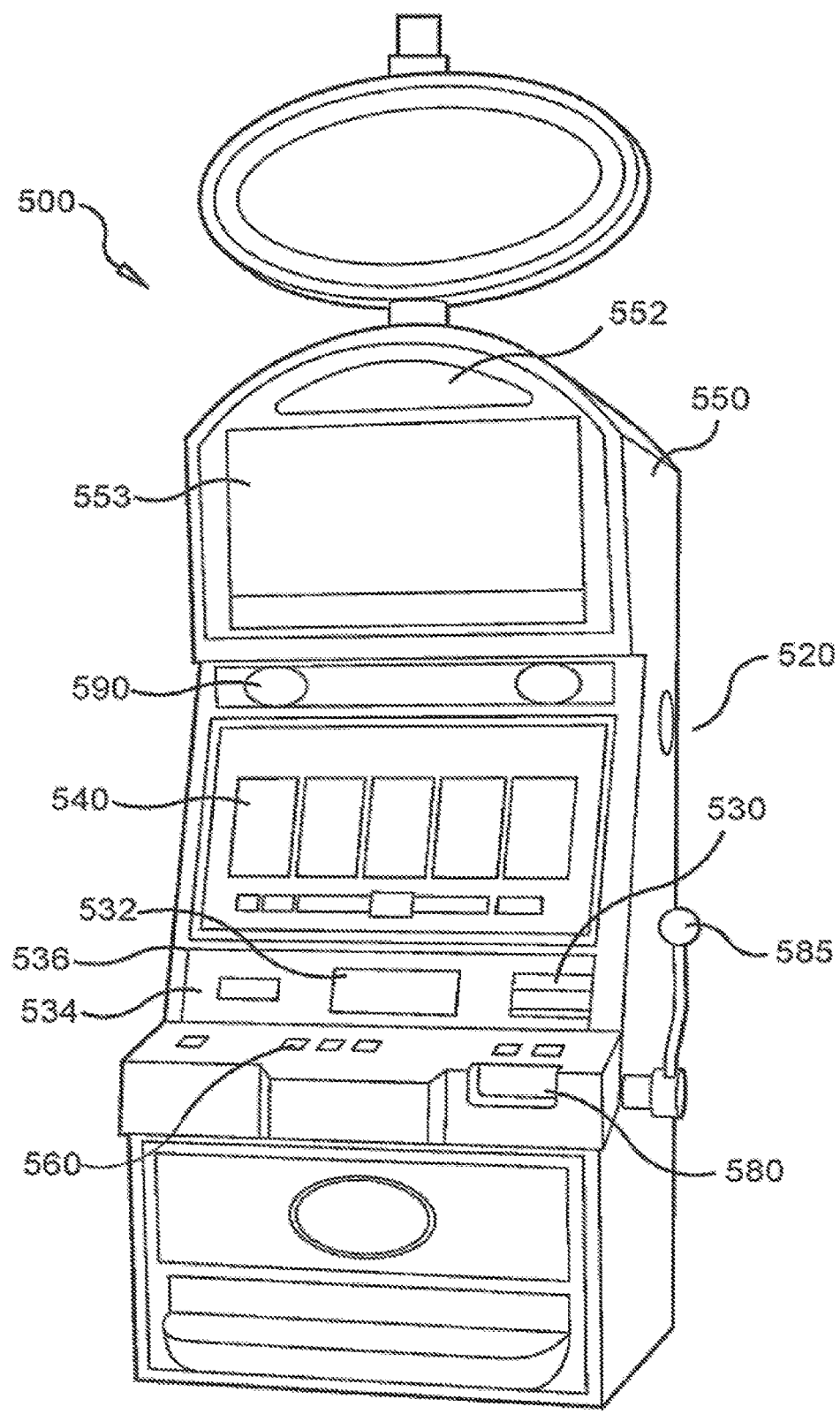
FIG. 29 is a perspective view of a gaming machine in accordance with example embodiments of the present disclosure.

The following figures and description provide an example architecture for the foregoing systems. It is to be understood, however, that the following figures and description are for exemplary purposes only and that other suitable architectures may be used. Referring to FIG. 29, gaming machine 500 capable of supporting various embodiments of the invention is shown, including cabinet housing 520, primary game display 540 upon which a primary game and feature game may be displayed, top box 550 which may display multiple progressives that may be won during play of the feature game, player-activated buttons 560, player tracking panel 536, bill/voucher acceptor 580 and one or more speakers 590. Cabinet housing 520 may be a self-standing unit that is generally rectangular in shape and may be manufactured with reinforced steel or other rigid materials which are resistant to tampering and vandalism. Cabinet housing 520 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 500 or thin client capability such as that incorporating some of the capability of a remote server. Exemplary types of gaming machines are disclosed in U.S. Pat. Nos. 6,517,433, 8,057,303, and 8,226,459, which are incorporated herein by reference in their entireties.

In one or more embodiments, cabinet housing 520 houses a processor, circuitry, and software (not shown) for receiving signals from the player-activated buttons 560, operating the games, and transmitting signals to the respective displays and speakers. Any shaped cabinet may be implemented with any embodiment of gaming machine 500 so long as it provides access to a player for playing a game. For example, cabinet 520 may comprise a slant-top, bar-top, or table-top style cabinet, including a Bally Cinevision™ or CineReels™ cabinet. The operation of gaming machine 500 is described more fully below.

The plurality of player-activated buttons 560 may be used for various functions such as, but not limited to, selecting a wager denomination, selecting a game to be played, selecting a wager amount per game, initiating a game, or cashing out money from gaming machine. Buttons 560 may be operable as input mechanisms and may include mechanical buttons, electromechanical buttons or touch screen buttons. Optionally, a handle 585 may be rotated by a player to initiate a game.

In one or more embodiments, buttons 560 may be replaced with various other input mechanisms known in the art such as, but not limited to, a touch screen system, touch pad, track ball, mouse, switches, toggle switches, or other input means used to accept player input such as a Bally iDeck™. One other example input means is a universal button module as disclosed in U.S. Pat. App. Publication No. 2006/0247047, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 520 may optionally include top box 550 which contains "top glass" 552 comprising advertising or payout information related to the game or games available on gaming machine 500. Player tracking panel 536 includes player tracking card reader 534 and player tracking display 532. Voucher printer 530 may be integrated into player tracking panel 536 or installed elsewhere in cabinet housing 520 or top box 550.

Game display 540 may present a game of chance wherein a player receives one or more outcomes from a set of potential outcomes. For example, one such game of chance is a video slot machine game. In other aspects of the invention, gaming machine 500 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 540 is, typically, a CRT or a flat-panel display in the form of, but not limited to, liquid crystal, plasma, electroluminescent, vacuum fluorescent, field emission, or any other type of panel display known or developed in the art. Game display 540 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 540 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 540 may also present information such as, but not limited to, player information, advertisements and casino promotions, graphic displays, news and sports updates, or even offer an alternate game. This information may be generated through a host computer networked with gaming machine 500 on its own initiative or it may be obtained by request of the player using either one or more of the plurality of player-activated buttons 560; the game display itself, if game display 540 comprises a touch screen or similar technology; buttons (not shown) mounted about game display 540 which may permit selections such as those found on an ATM machine, where legends on the screen are associated with respective selecting buttons; or any player input device that offers the required functionality.

Cabinet housing 520 incorporates a single game display 540. However, in alternate embodiments, cabinet housing 520 or top box 550 may house one or more additional displays 553 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 30:
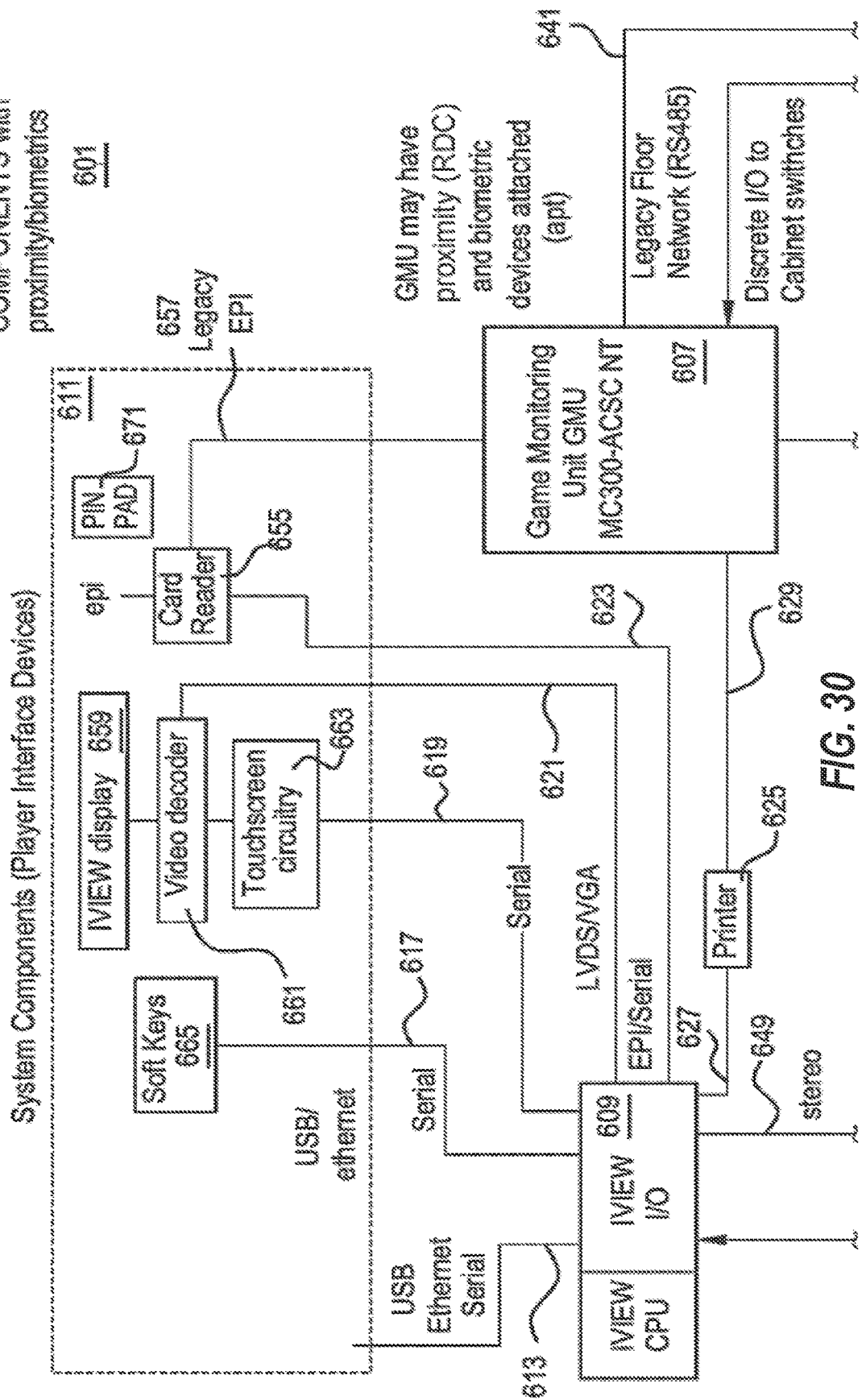
FIGS. 30 and 31 are block diagrams depicting the physical and logical components of the gaming machine of FIG. 29 in accordance with example embodiments of the present disclosure.
Figure 31:
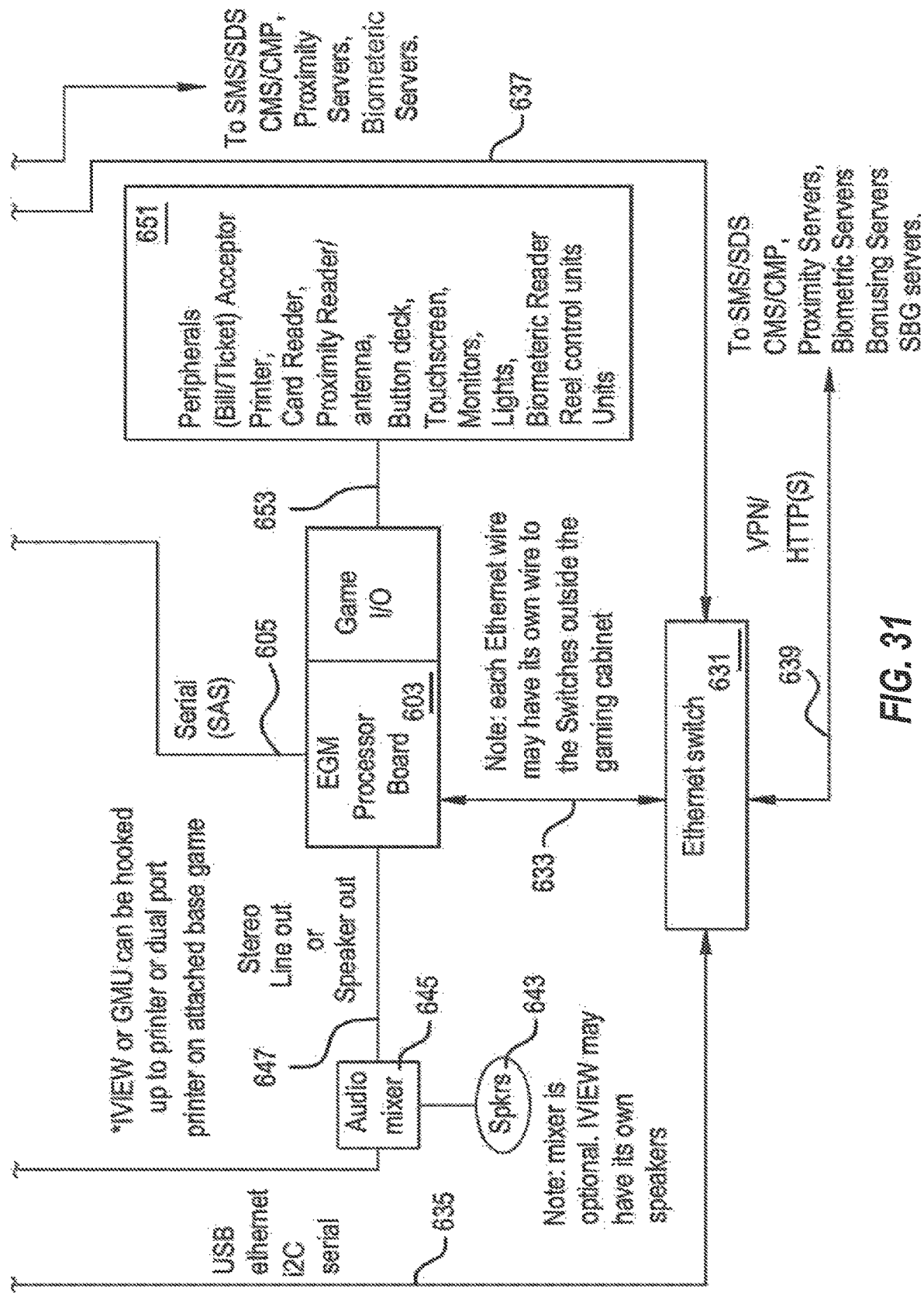

Referring to FIGS. 30 and 31, electronic gaming machine 601 is shown in accordance with one or more embodiments. Electronic gaming machine 601 includes base game integrated circuit board 603 (EGM Processor Board) connected through serial bus line 605 to game monitoring unit (GMU) 1507 (such as a Bally MC300 or ACSC NT), and player interface integrated circuit board (PIB) 609 connected to player interface devices 611 over bus lines 613, 615, 617, 619, 621, 623. Printer 625 is connected to PM 609 and GMU

607 over bus lines 627, 629. Base game integrated circuit board 603, PIB 609, and GMU 607 connect to Ethernet switch 631 over bus lines 633, 635, 637. Ethernet switch 631 connects to a slot management system (SMS) and a casino management system (CMS) network over bus line 639. GMU 607 also may connect to the SMS and CMS network over bus line 641. Speakers 643 connect through audio mixer 645 and bus lines 647, 649 to base game integrated circuit board 603 and PIB 609. The proximity and biometric devices and circuitry may be installed by upgrading a commercially available PIB 609, such as a Bally iView unit. Coding executed on base game integrated circuit board 603, PIB 609, and/or GMU 607 may be upgraded to integrate a game according to one or more embodiments of the present invention, as is more fully described herein.

Peripherals 651 connect through I/O board 653 to base game integrated circuit board 603. For example, a bill/ticket acceptor is typically connected to a game input-output board 653 which is, in turn, connected to a conventional central processing unit ("CPU") base game integrated circuit board 603, such as an Intel Pentium microprocessor mounted on a gaming motherboard. I/O board 653 may be connected to base game integrated circuit board 603 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 603 executes a game program that causes base game integrated circuit board 603 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 653 to base game integrated circuit board 603 which, in turn, assigns an appropriate number of credits for play in accordance with the game program. The player may further control the operation of the gaming machine by way of other peripherals 651, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 600; for example, it may be part of a central determination host system which provides random game outcomes to the game program. Thereafter, the player may or may not interact with the game through electromechanical or touch screen buttons to change the displayed indicia. Finally, base game integrated circuit board 603 under control of the game program and OS compares the final display of indicia to a pay table. The set of possible game outcomes may include a subset of outcomes related to the triggering of a feature game. In the event the displayed outcome is a member of this subset, base game integrated circuit board 603, under control of the game program and by way of I/O Board 653, may cause feature game play to be presented on a feature display.

Predetermined payout amounts for certain outcomes, including feature game outcomes, are stored as part of the game program. Such payout amounts are, in response to instructions from base game integrated circuit board 603, provided to the player in the form of coins, credits or currency via I/O board 653 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 607 includes an integrated circuit board and GMU processor and memory including coding for network communications, such as the G2S (game-to-system) protocol from the Gaming Standards Association, Las Vegas, Nev., used for system communications over the network. As shown, GMU 607 may connect to card reader 655 through bus 657 and may thereby obtain player card information and transmit the information over the network through bus 641. Gaming activity information may be transferred by the base game integrated circuit board 603 to GMU 607 where the information may be translated into a network protocol, such as S2S, for transmission to a server, such as a player tracking server, where information about a player's playing activity may be stored in a designated server database.

PIB 609 includes an integrated circuit board, PID processor, and memory which includes an operating system, such as Windows CE, a player interface program which may be executable by the PID processor together with various input/output (I/O) drivers for respective devices which connect to PIB 609, such as player interface devices 611, and which may further include various games or game components playable on PIB 609 or playable on a connected network server and PIB 609 is operable as the player interface. PIB 609 connects to card reader 655 through bus 623, display 659 through video decoder 661 and bus 621, such as an LVDS or VGA bus.

As part of its programming, the PID processor executes coding to drive display 659 and provide messages and information to a player. Touch screen circuitry interactively connects display 659 and video decoder 661 to PIB 609, such that a player may input information and cause the information to be transmitted to PM 609 either on the player's initiative or responsive to a query by PIB 609. Additionally soft keys 665 connect through bus 617 to PM 609 and operate together with display 659 to provide information or queries to a player and receive responses or queries from the player. PIB 609, in turn, communicates over the CMS/SMS network through Ethernet switch 631 and busses 635, 639 and with respective servers, such as a player tracking server.

Player interface devices 611 are linked into the virtual private network of the system components in gaming machine 601. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView processing board and game monitoring unit (GMU) processing board. The GMU and iView can combined into one like the commercially available Bally GTM iView device. This device may have a video mixing technology to mix the EGM processor's video signals with the iView display onto the top box monitor or any monitor on the gaming device.

In the example embodiment, GMU 607 and/or PIB 609 are configured to transmit and receive data with a management computing device (not shown). In particular, GMU 607 and/or PIB 609 may transmit messages indicating the operational state, status, events and/or other data associated with the gaming machine to the management computing device 106, and the management computing device 106 may transmits commands, such as operational state commands, and/or other data to GMU 607 and/or PIB 609. These commands are in a data format recognized by GMU 607 and/or PIB 609 and cause GMU 607 and/or PIB 609 to execute instruction to facilitate an operational state transition. The operational state transition may include selectively enabling, disabling, or otherwise changing operation of hardware and/or software of the gaming machine. In one example, input devices such as the soft keys 665 may be disabled. In another example, the card reader 655 may accept cards, but the card data may not be read or transmitted to networked server systems.

Figure 32:
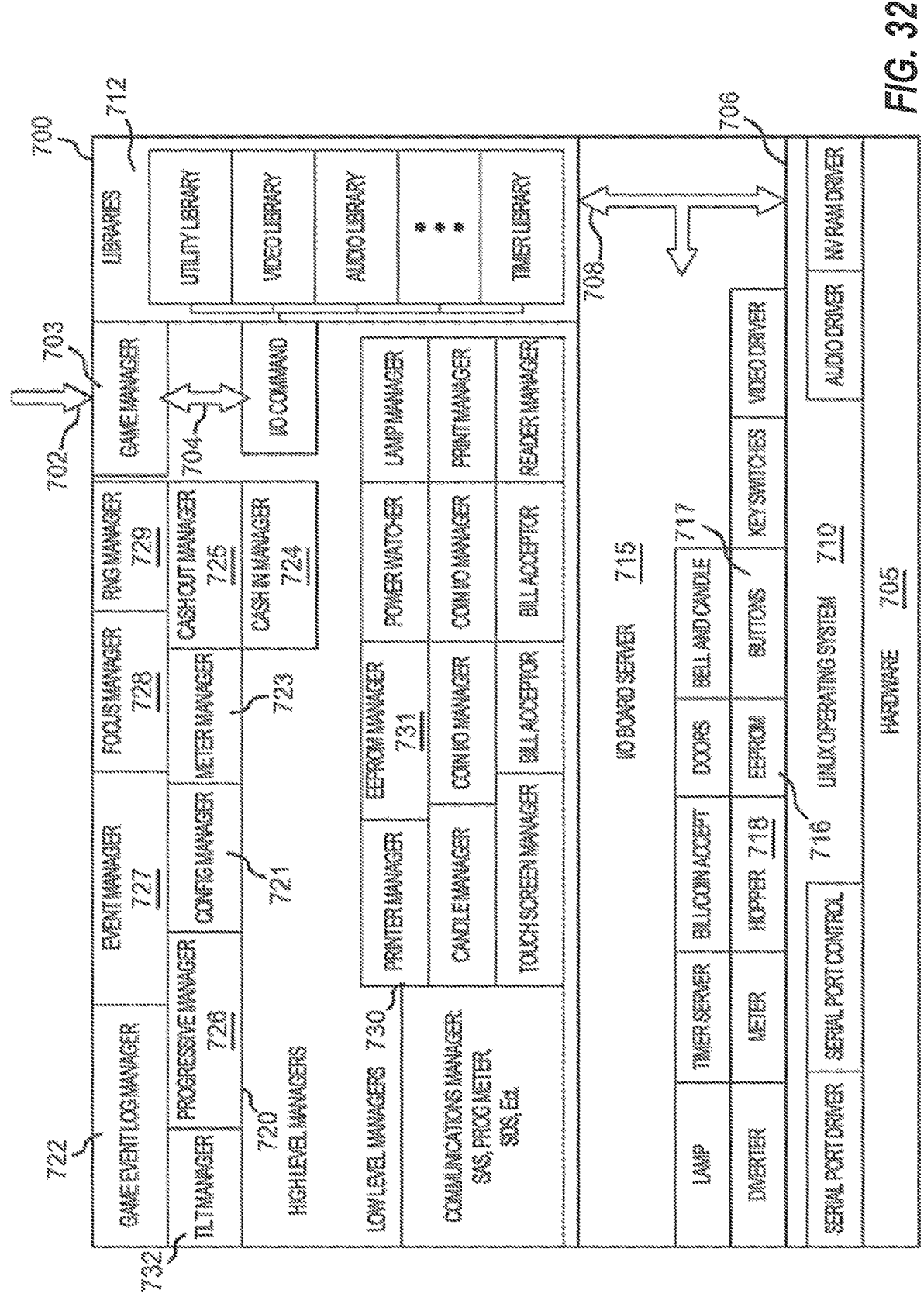
FIG. 32 is a block diagram of the logical components of a gaming kernel in accordance example embodiments of the present disclosure.

In accordance with one or more embodiments, FIG. 32 is a functional block diagram of a gaming kernel 700 of a game program under control of base game integrated circuit board 603. The game program uses gaming kernel 700 by calling into application programming interface (API) 702, which is part of game manager 703. The components of game kernel 700 as shown in FIG. 32 are only illustrative, and should not be considered limiting. For example, the number of managers may be changed, additional managers may be added or some managers may be removed without deviating from the scope and spirit of the invention.

As shown in the example, there are three layers: a hardware layer 705; an operating system layer 710, such as, but not limited to, Linux; and a game kernel layer 700 having game manager 703 therein. The operational states of a gaming machine may be defined by one or more parameters over the three layers. As a result, the enable and disable commands may change, disable, or enable these parameters accordingly. In one or more embodiments, the use of a standard operating system 710, such as a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 700 executes at the user level of the operating system 710, and itself contains a major component called the I/O Board Server 715. To properly set the bounds of game application software (making integrity checking easier), all game applications interact with gaming kernel 700 using a single API 702 in game manager 703. This enables game applications to make use of a well-defined, consistent interface, as well as making access points to gaming kernel 700 controlled, where overall access is controlled using separate processes.

For example, game manager 703 parses an incoming command stream and, when a command dealing with I/O comes in (arrow 704), the command is sent to an applicable library routine 712. Library routine 712 decides what it needs from a device, and sends commands to I/O Board Server 715 (see arrow 708). A few specific drivers remain in operating system 710's kernel, shown as those below line 706. These are built-in, primitive, or privileged drivers that are (i) general (ii) kept to a minimum and (iii) are easier to leave than extract. In such cases, the low-level communications is handled within operating system 710 and the contents passed to library routines 712.

Thus, in a few cases library routines may interact with drivers inside operating system 710, which is why arrow 708 is shown as having three directions (between library utilities 712 and I/O Board Server 715, or between library utilities 712 and certain drivers in operating system 710). No matter which path is taken, the logic needed to work with each device is coded into modules in the user layer of the diagram. Operating system 710 is kept as simple, stripped down, and common across as many hardware platforms as possible. The library utilities and user-level drivers change as dictated by the game cabinet or game machine in which it will run. Thus, each game cabinet or game machine may have an base game integrated circuit board 603 connected to a unique, relatively dumb, and as inexpensive as possible I/O adapter board 640, plus a gaming kernel 700 which will have the game-machine-unique library routines and I/O Board Server 715 components needed to enable game applications to interact with the gaming machine cabinet. Note that these differences are invisible to the game application software with the exception of certain functional differences (i.e., if a gaming cabinet has stereo sound, the game application will be able make use of API 702 to use the capability over that of a cabinet having traditional monaural sound).

Game manager 703 provides an interface into game kernel 700, providing consistent, predictable, and backwards compatible calling methods, syntax, and capabilities by way of game application API 702. This enables the game developer to be free of dealing directly with the hardware, including the freedom to not have to deal with low-level drivers as well as the freedom to not have to program lower level managers 730, although lower level managers may be accessible through game manager 703's interface 702 if a programmer has the need. In addition to the freedom derived from not having to deal with the hardware level drivers and the freedom of having consistent, callable, object-oriented interfaces to software managers of those components (drivers), game manager 703 provides access to a set of upper level managers 720 also having the advantages of consistent callable, object-oriented interfaces, and further providing the types and kinds of base functionality required in casino-type games. Game manager 703, providing all the advantages of its consistent and richly functional interface 702 as supported by the rest of game kernel 700, thus provides a game developer with a multitude of advantages.

Game manager 703 may have several objects within itself, including an initialization object (not shown). The initialization object performs the initialization of the entire game machine, including other objects, after game manager 703 has started its internal objects and servers in appropriate order. In order to carry out this function, the kernel's configuration manager 721 is among the first objects to be started; configuration manager 721 has data needed to initialize and correctly configure other objects or servers.

The upper level managers 720 of game kernel 700 may include game event log manager 722 which provides, at the least, a logging or logger base class, enabling other logging objects to be derived from this base object. The logger object is a generic logger; that is, it is not aware of the contents of logged messages and events. The log manager's (722) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 723 manages the various meters embodied in the game kernel 700. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 723 receives its initialization data for the meters, during start-up, from configuration manager 721. While running, the cash in (724) and cash out (725) managers call the meter manager's (723) update functions to update the meters. Meter manager 723 will, on occasion, create backup copies of the soft meters by storing the soft meters' readings in EEPROM. This is accomplished by calling and using EEPROM manager 731.

In accordance with still other embodiments, progressive manager 726 manages progressive games playable from the game machine. Event manager 727 is generic, like log manager 722, and is used to manage various gaming machine events. Focus manager 728 correlates which process has control of various focus items. Tilt manager 732 is an object that receives a list of errors (if any) from configuration manager 721 at initialization, and during game play from processes, managers, drivers, etc. that may generate errors. Random number generator manager 729 is provided to allow easy programming access to a random number generator (RNG), as a RNG is required in virtually all casino-style (gambling) games. RNG manager 729 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 725 has the responsibility of configuring and managing monetary output devices. During initialization, cash out manager 725, using data from configuration manager 721, sets the cash out devices correctly and selects any selectable cash out denominations. During play, a game application may post a cash out event through the event manager 727 (the same way all events are handled), and using a call-back posted by cash out manager 725, cash out manager 725 is informed of the event. Cash out manager 725 updates the credit object, updates its state in non-volatile memory, and sends an appropriate control message to the device manager that corresponds to the dispensing device. As the device dispenses dispensable media, there will typically be event messages being sent back and forth between the device and cash out manager 725 until the dispensing finishes, after which cash out manager 725, having updated the credit manager and any other game state (such as some associated with meter manager 723) that needs to be updated for this set of actions, sends a cash out completion event to event manager 727 and to the game application thereby. Cash in manager 724 functions similarly to cash out manager 725, only controlling, interfacing with, and taking care of actions associated with cashing in events, cash in devices, and associated meters and crediting.

In a further example, in accordance with one or more embodiments, I/O server 715 may write data to the gaming machine EEPROM memory, which is located in the gaming machine cabinet and holds meter storage that must be kept even in the event of power failure. Game manager 703 calls the I/O library functions to write data to the EEPROM. The I/O server 715 receives the request and starts a low priority EEPROM thread 716 within I/O server 715 to write the data. This thread uses a sequence of 8 bit command and data writes to the EEPROM device to write the appropriate data in the proper location within the device. Any errors detected will be sent as IPC messages to game manager 703. All of this processing is asynchronous.

In accordance with one embodiment, button module 717 within I/O server 715, polls (or is sent) the state of buttons every 2 ms. These inputs are debounced by keeping a history of input samples. Certain sequences of samples are required to detect a button was pressed, in which case the I/O server 715 sends an inter-process communication event to game manager 703 that a button was pressed or released. In some embodiments, the gaming machine may have intelligent distributed I/O which debounces the buttons, in which case button module 717 may be able to communicate with the remote intelligent button processor to get the button events and simply relay them to game manager 703 via IPC messages. In still another embodiment, the I/O library may be used for pay out requests from the game application. For example, hopper module 718 must start the hopper motor, constantly monitor the coin sensing lines of the hopper, debounce them, and send an IPC message to the game manager 703 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 33:
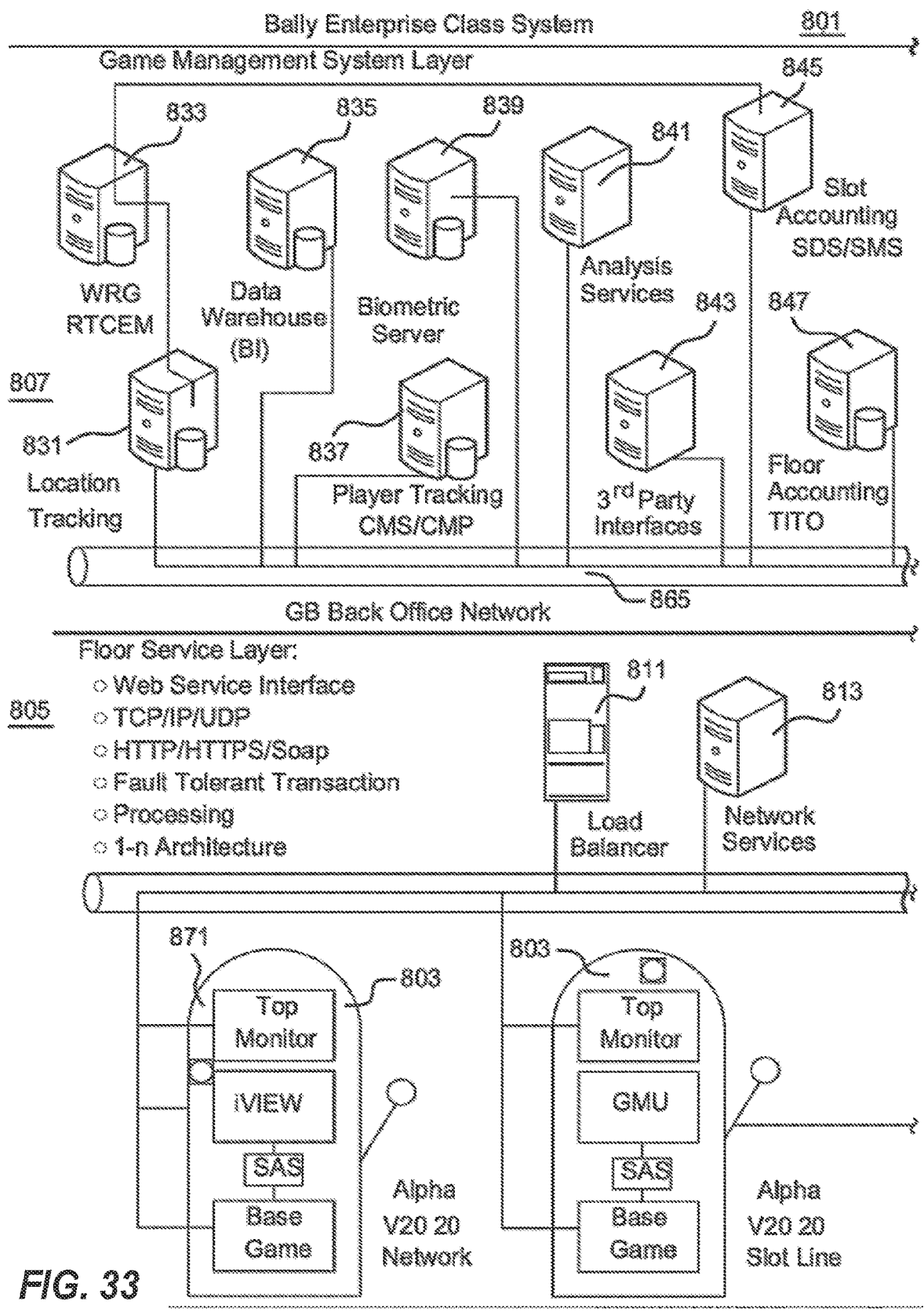
FIGS. 33 and 34 are a schematic block diagram showing the hardware elements of a networked gaming system in accordance with example embodiments of the present disclosure.
Figure 34:
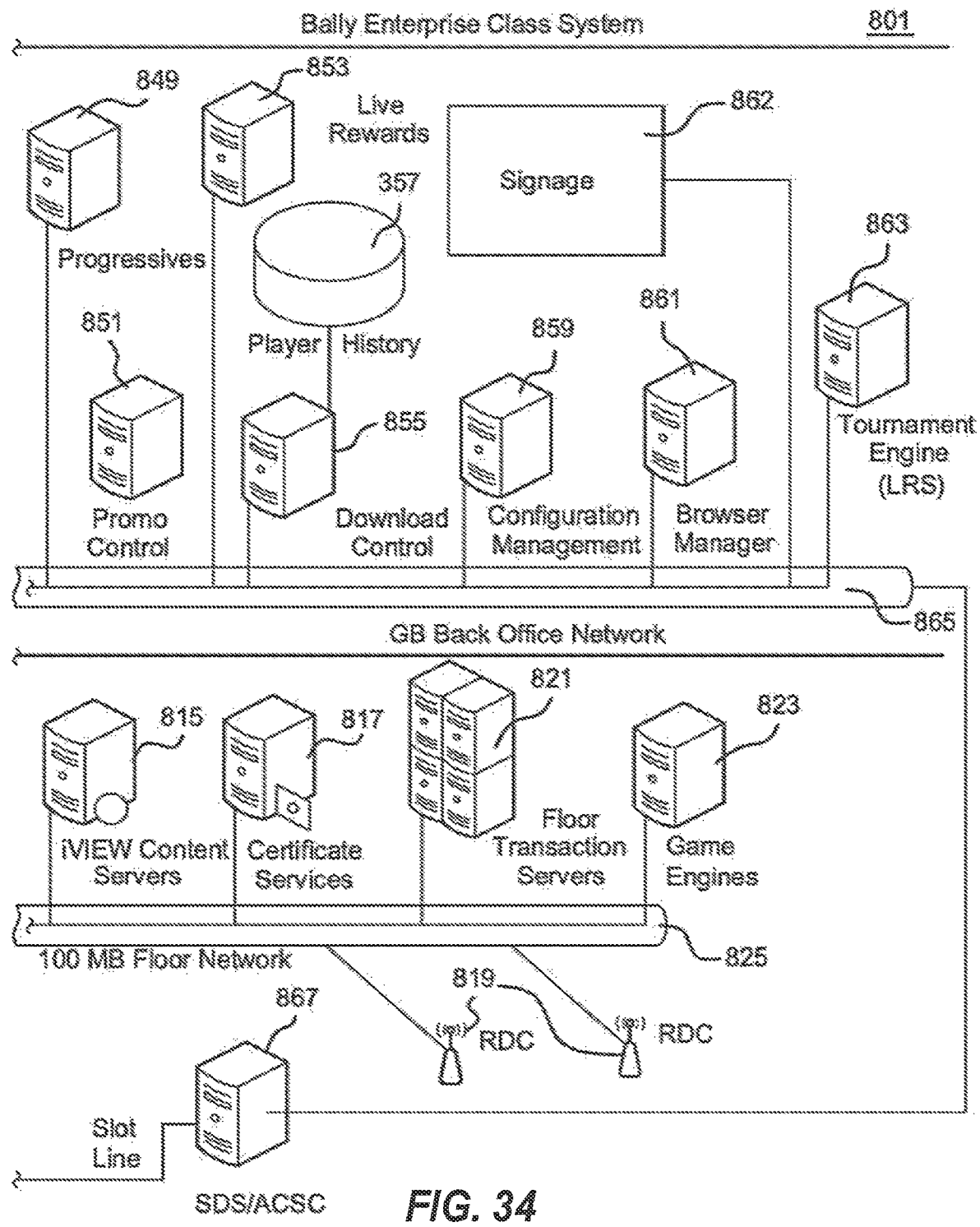

Referring to FIGS. 33 and 34, enterprise gaming system 801 is shown in accordance with one or more embodiments. Enterprise gaming system 801 may include one casino or multiple locations and generally includes a network of gaming machines 803, floor management system (SMS) 805, and casino management system (CMS) 807. SMS 805 may include load balancer 811, network services servers 813, player interface (iView) content servers 815, certificate services server 817, floor radio dispatch receiver/transmitters (RDC) 819, floor transaction servers 821 and game engines 823, each of which may connect over network bus 825 to gaming machines 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, feature game (such as Bally Live Rewards) server 853, download control server 855, player history database 857, configuration management server 859, browser manager 861, tournament engine server 863 connecting through bus 865 to server host 867 and gaming machines 803. The various servers and gaming machines 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports.

A blockchain interface system of a gaming channel (shown in FIG. 1) may be incorporated into SMS 805, CMS 807, or another suitable network (including networks dedicated to the management computing device and the gaming machines). The blockchain interface system may be incorporated within one of the servers shown in FIGS. 33 and 34 (e.g., configuration management server 859), or the management blockchain interface system may be a separate device communicatively coupled to the corresponding network. The various CMS and SMS servers are descriptively entitled to reflect the functional executable programming stored thereon and the nature of databases maintained and utilized in performing their respective functions.

Gaming machines 803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 807 and/or SMS 805 servers and devices, firmware, media, operating systems, and configurations may be downloaded to the system components of respective gaming machines for upgrading or managing floor content and offerings in accordance with operator selections or automatically depending upon CMS 807 and SMS 805 master programming. The data and programming updates to gaming machines 803 are authenticated using conventional techniques prior to install on the system components.

In various embodiments, any of the gaming machines 803 may be a mechanical reel spinning slot machine or a video slot machine or a gaming machine offering one or more of the above described games including a group play game. Alternately, gaming machines 803 may provide a game with a simulated musical instrument interface as a primary or base game or as one of a set of multiple primary games selected for play by a random number generator. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Pat. App. Publication No. 2008/0139305, entitled "Networked System and Method for Group Play Gaming," filed on Nov. 9, 2007, which is hereby incorporated by reference in its entirety for all purposes.

Figure 35:
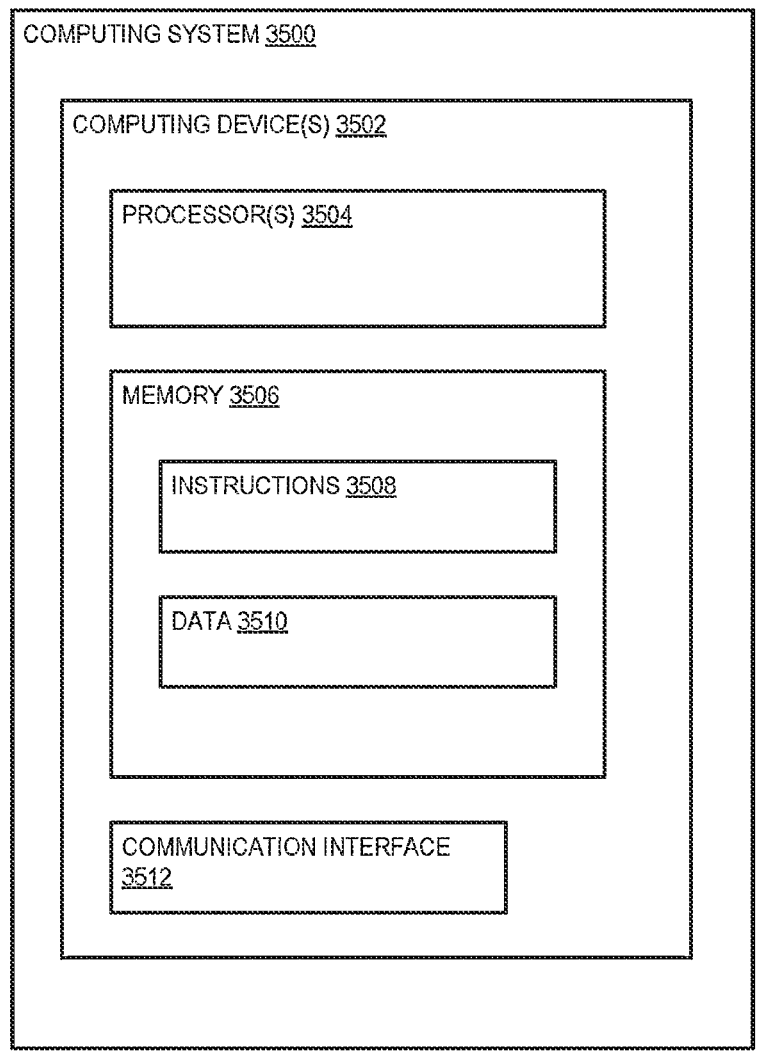
FIG. 35 illustrates a block diagram of an example of a computing system in accordance with example embodiments of the present disclosure.

FIG. 35 depicts a block diagram of an example computing system 3500 that can be used by an object tracking system, mobile computing device, a server (e.g., intermediary server system 30), and/or other systems to implement methods and systems according to example embodiments of the present disclosure. As shown, the computing system 3500 can include one or more computing device(s) 3502. The one or more computing device(s) 3502 can include one or more processor(s) 3504 and one or more memory device(s) 3506. The one or more processor(s) 3504 can include any suitable processing device, such as a microprocessor, microcontroller, integrated circuit, logic device, or other suitable processing device. The one or more memory device(s) 3506 can include one or more computer-readable media, including, but not limited to, non-transitory computer-readable media, RAM, ROM, hard drives, flash drives, or other memory devices.

The one or more memory device(s) 3506 can store information accessible by the one or more processor(s) 3504, including computer-readable instructions 3508 that can be executed by the one or more processor(s) 3504. The instructions 3508 can be any set of instructions that when executed by the one or more processor(s) 3504, cause the one or more processor(s) 3504 to perform operations. The instructions 3508 can be software written in any suitable programming language or can be implemented in hardware. In some embodiments, the instructions 3508 can be executed by the one or more processor(s) 3504 to cause the one or more processor(s) 3504 to perform operations, such as, for instance, one or more of the operations described herein for actioning NFTs across a plurality of gaming channels and/or for associating an NFT with a player associated with a gaming environment (e.g., as described in further detail below).

The memory device(s) 3506 can further store data 3510 that can be accessed by the processors 3504. For example, the data 3510 can include blockchain data, etc., as described herein. The data 3510 can include one or more table(s), function(s), algorithm(s), model(s), equation(s), etc. according to example embodiments of the present disclosure.

The one or more computing device(s) 3502 can also include a communication interface 3512 used to communicate, for example, with the other components of system. The communication interface 3512 can include any suitable components for interfacing with one or more network(s), including for example, transmitters, receivers, ports, controllers, antennas, or other suitable components.

With reference to one or more of the above-described example embodiments illustrated in FIGS. 1-35, additional and/or alternative example aspects of the present disclosure are generally directed to a computer-based gaming environment that can facilitate associating an NFT with a player associated with a gaming environment. For instance, in one or more example embodiments, computing environment 10, intermediary server system 30, and/or gaming computing environment 100 can facilitate associating an NFT 144 of NFTs 144 with a user 102 of users 102.

According to example embodiments of the present disclosure, to facilitate such association of an NFT 144 with a user 102, intermediary server system 30 can include, be coupled to, and/or otherwise be associated with one or more computing devices such as, for example, one or more computing devices 3502 that can respectively include, be coupled to, and/or otherwise be associated with one or more processors 3504 and/or one or more memory devices 3506. In these or other embodiments, one or more memory devices 3506 can each store instructions that, when executed by any of one or more processors 3504, can cause any of such one or more processors 3504, one or more computing devices 3502, and/or intermediary server system 30 to perform operations (e.g., collectively, individually, concurrently, sequentially, etc.) in accordance with one or more example embodiments described herein. For instance, such instructions, when executed by any of one or more processors 3504, can cause any of such one or more processors 3504, one or more computing devices 3502, and/or intermediary server system 30 to perform one or more operations that can facilitate association of user 102 with NFT 144 in accordance with one or more embodiments described herein.

In at least one example embodiment, intermediary server system 30 can obtain data indicating NFT 144 is to be actioned (e.g., transferred) to user 102, where user 102 can be associated with computing environment 10, gaming computing environment 100, and/or another computing and/or gaming environment according to example embodiments described herein (e.g., user 102 can have a player and/or user account established and/or other associated with any of such computing and/or gaming environments). For example, in this or another embodiment, intermediary server system 30 can obtain data indicating that NFT 144 and/or one or more ownership rights and/or privileges associated therewith are to be transferred to user 102.

In one or more embodiments described herein, based at least in part on (e.g., in response to) receipt of such data indicating NFT 144 is to be actioned to user 102, intermediary server system 30 can generate identification data (not illustrated in the figures) that associates NFT 144 with user 102, where the identification data can include and/or constitute embedded data (not illustrated in the figures) descriptive of user 102 and NFT 144. For example, in at least one embodiment, the identification data and/or the embedded data descriptive of user 102 and NFT 144 can include and/or constitute: identity data descriptive of user 102 (e.g., name, username, gaming identification number, telephone number, e-mail address, etc.); data descriptive of user 102 and/or a player and/or user account associated with, for instance, computing environment 10 and/or gaming computing environment 100 that can correspond to user 102 (e.g., account identification data, telephone number, e-mail address, etc.); data descriptive of a digital wallet of user 102 (e.g., mobile wallet 422, crypto wallet 423, etc.); digital asset identification data corresponding to NFT 144; data descriptive of an identifier corresponding to NFT 144, where the identifier can include and/or constitute data indicative of a storage location where NFT 144 is stored (e.g., the identifier can include and/or constitute a pointer and/or a computer program object having a memory address where NFT 144 is stored); and/or other data descriptive of user 102 and NFT 144. In some embodiments, intermediary server system 30 can encrypt and/or otherwise encode the above-described identification data and/or embedded data descriptive of user 102 and NFT 144 such that the data is protected and/or secured from interception, viewing, and/or use by one or more unintended third-parties.

According to one or more embodiments of the present disclosure, intermediary server system 30 can create an identification code (not illustrated in the figures) that can include the above-described identification data and/or embedded data descriptive of user 102 and NFT 144. For example, in at least one embodiment, based at least in part on (e.g., in response to) generating the identification data, intermediary server system 30 can create an identification code such as, for instance, a barcode, a quick response (QR) code (e.g., an audio QR code, a visual QR code, etc.), an audio code, a visual code, a numeric code, a textual code, an alphanumeric code, and/or another type of code that can include the identification data and/or embedded data descriptive of user 102 and NFT 144.

In accordance with one or more embodiments described herein, intermediary server system 30 can change a status indicator corresponding to NFT 144 to reflect that a transfer of ownership of NFT 144 to user 102 is in progress, where the status indicator can be associated with, for instance, blockchain 142 and/or blockchain 440 (e.g., a block 442 of blockchain 142 and/or blockchain 440) that can have data descriptive of NFT 144 (e.g., digital asset identification data corresponding to NFT 144 and/or an identifier that can include and/or constitute a pointer and/or a computer program object having a memory address where NFT 144 is stored). For instance, in these or other embodiments, such a status indicator can be a component that can be included in, coupled to, and/or otherwise associated with, for example, NFT portal system 32, digital ledger platform 40, digital ledger layer 42, ledger explorer 46, dApp systems 60, GUI 402, and/or GUI 430. In some embodiments, intermediary server system 30 can use a smart contract associated with NFT 144 such as, for instance, smart contract 43 and/or one of smart contracts 358 to facilitate changing the state of such a status indicator to reflect that a transfer of ownership of NFT 144 to user 102 is in progress. In one or more embodiments, intermediary server system 30 can change the state of such a status indicator to reflect that a transfer of ownership of NFT 144 to user 102 is in progress to prevent NFT 144 from being actioned (e.g., transferred) to another entity (e.g., another player, an entity of another gaming environment, etc.) while intermediary server system 30 is generating the above-described identification data that associates NFT 144 with user 102 and/or the above-described identification code that can include such identification data.

In one example embodiment, intermediary server system 30 can change the state of such a status indicator to reflect that a transfer of ownership of NFT 144 to user 102 is in progress upon receipt of the above-described data indicating NFT 144 is to be actioned to user 102. For instance, in this example embodiment, intermediary server system 30 can change the state of such a status indicator to reflect that a transfer of ownership of NFT 144 to user 102 is in progress before intermediary server system 30 generates the identification data and/or the identification code. In another example embodiment, intermediary server system 30 can change the state of such a status indicator to reflect that a transfer of ownership of NFT 144 to user 102 is in progress while (e.g., concurrently, at the same time) intermediary server system 30 is generating the identification data and/or the identification code.

In at least one embodiment described herein, intermediary server system 30 can associate one or more rights and/or privileges with the identification data, the identification code, NFT 144, and/or user 102, where the one or more rights and/or privileges can be associated with computing environment 10, gaming computing environment 100, and/or another gaming and/or computing environment. For example, in this or another embodiment, intermediary server system 30 can associate the identification data and/or the identification code with one or more rights and/or privileges of user 102 with respect to NFT 144, computing environment 10, gaming computing environment 100, and/or another computing and/or gaming environment (e.g., right(s) and/or privilege(s) granted and/or assigned to user 102 via ownership of NFT 144 and/or right(s) and/or privilege(s) granted and/or assigned to user 102 via computing environment 10, gaming computing environment 100, and/or another computing and/or gaming environment). In some embodiments, intermediary server system 30 can associate one or more rights and/or privileges with the identification data, the identification code, NFT 144, and/or user 102, where such one or more rights and/or privileges can be defined, executed, and/or otherwise managed by a smart contract that can be associated with NFT 144 such as, for instance, smart contract 43. In an embodiment, intermediary server system 30 can associate the identification data and/or the identification code with such right(s) and/or privilege(s) of user 102 during (e.g., concurrently) and/or after generation of the identification data and/or the identification code.

According to one or more embodiments of the present disclosure, intermediary server system 30 can provide the above-described identification code to user 102. For example, in these one or more embodiments, based at least in part on (e.g., in response to) creating the identification code, intermediary server system 30 can provide the identification code to user 102 via, for instance, network 18 and/or cross-channel application 52 that can be installed on and/or executed on user computing device 50 that can be associated with user 102.

In at least one embodiment described herein, upon receipt of the identification code, intermediary server system 30 can request that user 102 provide intermediary server system 30 with confirmation of user's 102 receipt and/or acceptance of the identification code, NFT 144, data descriptive of NFT 144, and/or data indicative of the location of NFT 144. In this or another embodiment, upon receipt of the identification code, user 102 can provide intermediary server system 30 (e.g., via cross-channel application 52 and/or GUI 420) with confirmation of user's 102 receipt and/or acceptance of the identification code, NFT 144, data descriptive of NFT 144, and/or data indicative of the location of NFT 144. In some embodiments, upon receipt of the identification code, user 102 can verify the authenticity of NFT 144 (e.g., via cross-channel application 52 and/or GUI 420) and/or provide intermediary server system 30 with confirmation that NFT 144 is authentic (e.g., via cross-channel application 52 and/or GUI 420). For example, in one embodiment, the identification code and/or the above-described identification data that can associate user 102 with NFT 144 can include data descriptive of NFT 144 and/or data indicative of the location of NFT 144 (e.g., the above-described identifier and/or pointer). In this example embodiment, user 102 can thereby view (e.g., via cross-channel application 52 and/or GUI 420) the data descriptive of NFT 144 and/or access (e.g., view, execute, use, etc.) NFT 144 to confirm its authenticity and, if authentic, provide (e.g., via cross-channel application 52 and/or GUI 420) intermediary server system 30 with such confirmation of NFT 144 authenticity.

According to one or more embodiments of the present disclosure, upon receiving confirmation of user's 102 receipt and/or acceptance of the identification code, intermediary server system 30 can change the state of the above-described status indicator corresponding to NFT 144 to reflect that a transfer of ownership of NFT 144 to user 102 is complete. In some embodiments, intermediary server system 30 can use a smart contract associated with NFT 144 such as, for instance, smart contract 43 and/or one of smart contracts 358 to facilitate changing the state of such a status indicator to reflect that a transfer of ownership of NFT 144 to user 102 is complete. In one or more embodiments, intermediary server system 30 can change the state of such a status indicator to reflect that a transfer of ownership of NFT 144 to user 102 is complete to inform other entities (e.g., another player, an entity of another gaming environment, etc.) that NFT 144 is currently unavailable for transfer.

In one or more embodiments described herein, upon receiving confirmation of user's 102 receipt and/or acceptance of the identification code, intermediary server system 30 can record data descriptive of a transfer of ownership of NFT 144 to user 102 on a blockchain such as, for instance, blockchain 142 and/or blockchain 440. For example, in these one or more embodiments, intermediary server system 30 can record, on one or more blocks 442 of blockchain 142 and/or blockchain 440, data that can include, for instance: data descriptive of the identity of user 102; data descriptive of NFT 144; data indicative of a location of NFT 144 (e.g., the above-described identifier and/or pointer); data indicative of user's 102 ownership of NFT 144; data descriptive of the identification code; data descriptive of the identification data; data descriptive of the above-described embedded data descriptive of user 102 and NFT 144; and/or other data that can reflect ownership of NFT 144 by user 102. In some embodiments, intermediary server system 30 can utilize a smart contract that can be associated with NFT 144 such as, for instance, smart contract 43 to facilitate recording such data descriptive of a transfer of ownership of NFT 144 to user 102 on blockchain 142 and/or blockchain 440.

In at least one example embodiment, upon receiving confirmation of user's 102 receipt and/or acceptance of the identification code, intermediary server system 30 can store data descriptive of the association of user 102 with NFT 144 on, for instance, one or more memory devices 3506. For example, in this or another example embodiment, intermediary server system 30 can store, on one or more memory devices 3506, data that can include, for instance: data descriptive of the identification code; data descriptive of the identification data; data descriptive of the above-described embedded data descriptive of user 102 and NFT 144; data descriptive of NFT 144 (e.g., digital asset identification data); and/or other data that can reflect the association of user 102 with NFT 144. In another embodiment, intermediary server system 30 can store NFT 144 itself and/or data indicative of the location of NFT 144 (e.g., the above-described identifier and/or pointer) on, for instance, one or more memory devices 3506.

In one or more embodiments of the present disclosure, upon intermediary server system 30 receiving confirmation of user's 102 receipt and/or acceptance of the identification code, user 102 can use the identification code to implement one or more operations in computing environment 10 and/or gaming computing environment 100 (e.g., via cross-channel application 52, GUI 420, one or more gaming channel systems 20, one or more gaming channels 104, etc.) according to one or more example embodiments described herein. As described above, in some embodiments, intermediary server system 30 can associate the identification data and/or the identification code with one or more rights and/or privileges of user 102 with respect to NFT 144, computing environment 10, gaming computing environment 100, and/or another computing and/or gaming environment (e.g., right(s) and/or privilege(s) granted and/or assigned to user 102 via ownership of NFT 144 and/or right(s) and/or privilege(s) granted and/or assigned to user 102 via computing environment 10, gaming computing environment 100, and/or another computing and/or gaming environment). In this manner, any or all rights and/or privileges of user 102 with respect to NFT 144, computing environment 10, gaming computing environment 100, and/or another computing and/or gaming environment can be represented and/or encapsulated by the identification code such that the identification code can provide user 102 with an NFT enabled gaming experience in computing environment 10, gaming computing environment 100, and/or another computing and/or gaming environment according to one or more example embodiments of the present disclosure.

In accordance with one or more embodiments described herein, intermediary server system 30 can receive input data indicative of user 102 using the identification code in, for instance, computing environment 10 and/or gaming computing environment 100 to perform one or more operations associated with NFT 144. For example, in some embodiments, intermediary server system 30 can receive input data indicative of, for instance, scanned data from a scanner that has been used to scan the identification code (e.g., a QR code) and/or other input data indicative of user's 102 use of the identification code to perform such operation(s) associated with NFT 144.

In at least one embodiment described herein, the one or more operations associated with NFT 144 can include, but are not limited to, for instance: validating the authenticity of NFT 144 (e.g., the existence of NFT 144) and/or user's 102 ownership of NFT 144; exercising, celebrating, and/or otherwise executing (e.g., implementing) NFT 144 and/or the underlying content associated with NFT 144 (e.g., content linked to and/or represented by NFT 144) such as, for instance, rendering the underlying content of NFT 144 (e.g., an image, video, audio, game character, text, emoji, etc.) and/or data descriptive of user's 102 identity (e.g., name, username, etc.) on a display (e.g., a screen and/or monitor included in, coupled to, and/or otherwise associated with intermediary server system 30, computing environment 10, gaming computing environment 100, and/or another computing and/or gaming environment); transferring ownership of NFT 144 from user 102 to one or more other entities (e.g., another player, an entity associated with another computing and/or gaming environment, etc.); transferring one or more ownership rights and/or privileges of NFT 144 from user 102 to one or more other entities (e.g., another player, an entity associated with another computing and/or gaming environment, etc.); providing (e.g., via cross-channel application 52 and/or GUI 420) user 102 with an audit trail descriptive of one or more transactions corresponding to NFT 144 and/or data descriptive of NFT 144; providing (e.g., via network 18, etc.) data indicative of the above-described identification data, data indicative of NFT 144, and/or data descriptive of user 102 (e.g., name, username, etc.) to one or more remote computing devices (e.g., to a remote computing device (e.g., a server located external to computing environment 10 and/or gaming computing environment 100) that provides a media platform (e.g., social media platform), where user 102 can exercise, celebrate, and/or otherwise execute (e.g., implement) NFT 144 and/or underlying content associated with NFT 144 on the media platform); and/or another operation associated with NFT 144.

In one example embodiment, based at least in part (e.g., in response to) receipt of such input data indicative of user 102 using the identification code in, for instance, computing environment 10 and/or gaming computing environment 100 to perform one or more operations associated with NFT 144, intermediary server system 30 can perform and/or facilitate performing such one or more operations (e.g., intermediary server system 30 can forego validation of the identification code and perform and/or facilitate performing one or more of the above-described operations). In another example embodiment, based at least in part (e.g., in response to) receipt of such input data indicative of user 102 using the identification code in, for instance, computing environment 10 and/or gaming computing environment 100 to perform such one or more operations associated with NFT 144, intermediary server system 30 can: validate the identification code against the identification data and/or the above-described embedded data descriptive of user 102 and NFT 144; and perform and/or facilitate performing such one or more operations (e.g., one or more of the above-described operations) based at least in part on (e.g., in response to) validation of the identification code by intermediary server system 30. For example, intermediary server system 30 can evaluate the identification data and/or the above-described embedded data descriptive of user 102 and NFT 144 to confirm the authenticity of NFT 144 (e.g., actual existence of NFT 144) and/or user's 102 ownership of NFT 144. In embodiments where the identification code and/or the embedded data descriptive of user 102 and NFT 144 is encrypted and/or otherwise encoded with protection and/or security features, intermediary server system 30 can decrypt and/or decode the identification code and/or the embedded data to confirm such authenticity of NFT 144 and/or user's 102 ownership of NFT 144.

According to one or more embodiments of the present disclosure, to facilitate validating the identification code against the identification data and/or the above-described embedded data descriptive of user 102 and NFT 144 (e.g., to confirm authenticity of NFT 144 and/or user's 102 ownership thereof), intermediary server system 30 can access one or more storage locations and/or devices to analyze, for instance: the identification data; the embedded data descriptive of user 102 and NFT 144; and/or NFT 144. For example, in one embodiment, to facilitate such validation of the identification code, intermediary server system 30 can access one or more memory devices 3506 that can store, for instance: data descriptive of the identification code; data descriptive of the identification data; data descriptive of the above-described embedded data descriptive of user 102 and NFT 144; data descriptive of NFT 144 (e.g., digital asset identification data); data indicative of the location of NFT 144 (e.g., the above-described identifier and/or pointer); and/or NFT 144 itself. In another embodiment, to facilitate such validation of the identification code, intermediary server system 30 can access (e.g., via smart contract 43) one or more blocks of a blockchain such as, for example, one or more blocks 442 of blockchain 142 and/or blockchain 440 that can store, for instance: data descriptive of the identity of user 102; data descriptive of NFT 144; data indicative of a location of NFT 144 (e.g., the above-described identifier and/or pointer); data indicative of user's 102 ownership of NFT 144; data descriptive of the identification code; data descriptive of the identification data; data descriptive of the above-described embedded data descriptive of user 102 and NFT 144; and/or other data that can reflect ownership of NFT 144 by user 102.

In at least one embodiment described herein, based at least in part on (e.g., in response to) validation of the identification code by intermediary server system 30 as described above, intermediary server system 30 can perform and/or facilitate performing one or more of the above-described operations associated with NFT 144. For example, in one embodiment, intermediary server system 30 can provide (e.g., via cross-channel application 52 and/or GUI 420) user 102 with an audit trail descriptive of one or more transactions corresponding to NFT 144 and/or data descriptive of NFT 144 based at least in part on validation of the identification code by intermediary server system 30 against the above-described identification data and/or embedded data descriptive of user 102 and NFT 144.

In some embodiments, intermediary server system 30 can disassociate NFT 144 from user 102. For example, in one or more embodiments, based on receiving input data (e.g., via network 18, user computing device 50, cross-channel application 52, and/or GUI 420) indicating user's 102 intent to transfer ownership of NFT 144 to another entity (e.g., another player, an entity associated with another computing and/or gaming environment, etc.), intermediary server system 30 can validate user's 102 ownership interests associated with NFT 144 and further disassociate user 102 from NFT 144. For instance, in at least one embodiment, intermediary server system 30 can disassociate user 102 from NFT 144 by, for instance, deleting the above-described identification data that can associate NFT 144 with user 102 and/or the above-described data descriptive of user 102 and NFT 144 that can be embedded in such identification data. In some embodiments, intermediary server system 30 can disassociate user 102 from NFT 144 by, for instance, deleting and/or removing, from one or more storage locations (e.g., one or more blocks 442 of blockchain 142 and/or blockchain 440, one or more memory devices 3506, etc.), such identification data and/or such data descriptive of user 102 and NFT 144 that can be embedded in the identification data.

Aspects of the present disclosure provide numerous technical effects and benefits. For example, in multiple embodiments of the present disclosure, intermediary server system 30 and/or the above-described identification code that can associate user 102 with NFT 144 can provide user 102 with an NFT enabled gaming experience across, for instance, multiple gaming channel systems 20 and/or gaming channels 104 of computing environment 10 and/or gaming computing environment 100, respectively, while protecting and/or keeping confidential, the digital asset identification data of NFT 144.

In some embodiments, intermediary server system 30 and/or the above-described identification code can also provide user 102 with an NFT enabled gaming experience across one or more gaming channels (e.g., gaming channel systems 20, gaming channels 104, etc.) of one or more gaming and/or computing environments (e.g., computing environment 10, gaming computing environment 100, and/or another computing and/or gaming environment), regardless of whether such environments have one or more resources (e.g., software applications, hardware, infrastructure, communication protocols, services, etc.) that provide and/or support NFT enabled operations and/or transactions involving use of a decentralized digital ledger (e.g., digital ledger platform 40, digital ledger layer 42, etc.) such as, for example, a blockchain (e.g., blockchain 142, blockchain 440, etc.). That is, for instance, intermediary server system 30 and/or the identification code according to example embodiments of the present disclosure can allow for elimination (e.g., by intermediary server system 30 and/or one or more resources thereof and/or associated therewith) of the task of accessing data on such a blockchain (e.g., each time user 102 utilizes the identification code to access and/or implement NFT 144) to confirm authenticity of NFT 144 (e.g., the existence of NFT 144) and/or user's 102 ownership interest(s) associated with NFT 144. Consequently, in these or other embodiments, intermediary server system 30 and/or the identification code can provide a heterogeneity solution for heterogenous computing and/or gaming systems such that user 102 can have an NFT enabled experience across one or more gaming channels (e.g., gaming channel systems 20, gaming channels 104, etc.) of at least one of such computing and/or gaming systems (e.g., computing environment 10, gaming computing environment 100, and/or another computing and/or gaming environment).

Further, as intermediary server system 30 and/or the identification code according to example embodiments of the present disclosure can allow for elimination of the task of accessing data on a blockchain (e.g., blockchain 142, blockchain 440, etc.) to confirm authenticity of NFT 144 (e.g., the existence of NFT 144) and/or user's 102 ownership interest(s) associated with NFT 144, intermediary server system 30 and/or the identification code can thereby improve performance, efficiency, and/or workload capacity (e.g., improved bandwidth of communication channels, improved processing capacity, etc.) of one or more resources (e.g., intermediary server system 30, user computing device 50, one or more computing devices 3502, one or more processors 3504, network 18, cross-channel application 52, smart contract 43, etc.) that perform and/or are otherwise involved with one or more operations associated with utilizing NFT 144 (e.g., NFT creation, modification, transfer, implementation, communication, etc.) in one or more gamming channels (e.g., gaming channel systems 20, gaming channels 104, etc.) of a computing and/or gamming system (e.g., computing environment 10, gaming computing environment 100, and/or another computing and/or gaming environment). For example, as intermediary server system 30 and/or the identification code according to example embodiments of the present disclosure can allow for elimination (e.g., by intermediary server system 30 and/or one or more resources thereof and/or associated therewith) of the task of accessing data on a blockchain (e.g., each time user 102 utilizes the identification code to access and/or implement NFT 144) to confirm authenticity of NFT 144 and/or user's 102 ownership interest(s) associated with NFT 144, intermediary server system 30 and/or the identification code can thereby eliminate one or more computationally expensive and/or energy consuming operations that would otherwise be performed by such one or more resources (e.g., intermediary server system 30) in accessing such data on a blockchain. Therefore, intermediary server system 30 and/or the identification code according to example embodiments of the present disclosure can improve the performance, efficiency, and/or workload capacity of such one or more resources. Accordingly, intermediary server system 30 and/or the identification code can thereby also reduce computational costs and/or energy consumption associated with such one or more resources.

Figure 36:
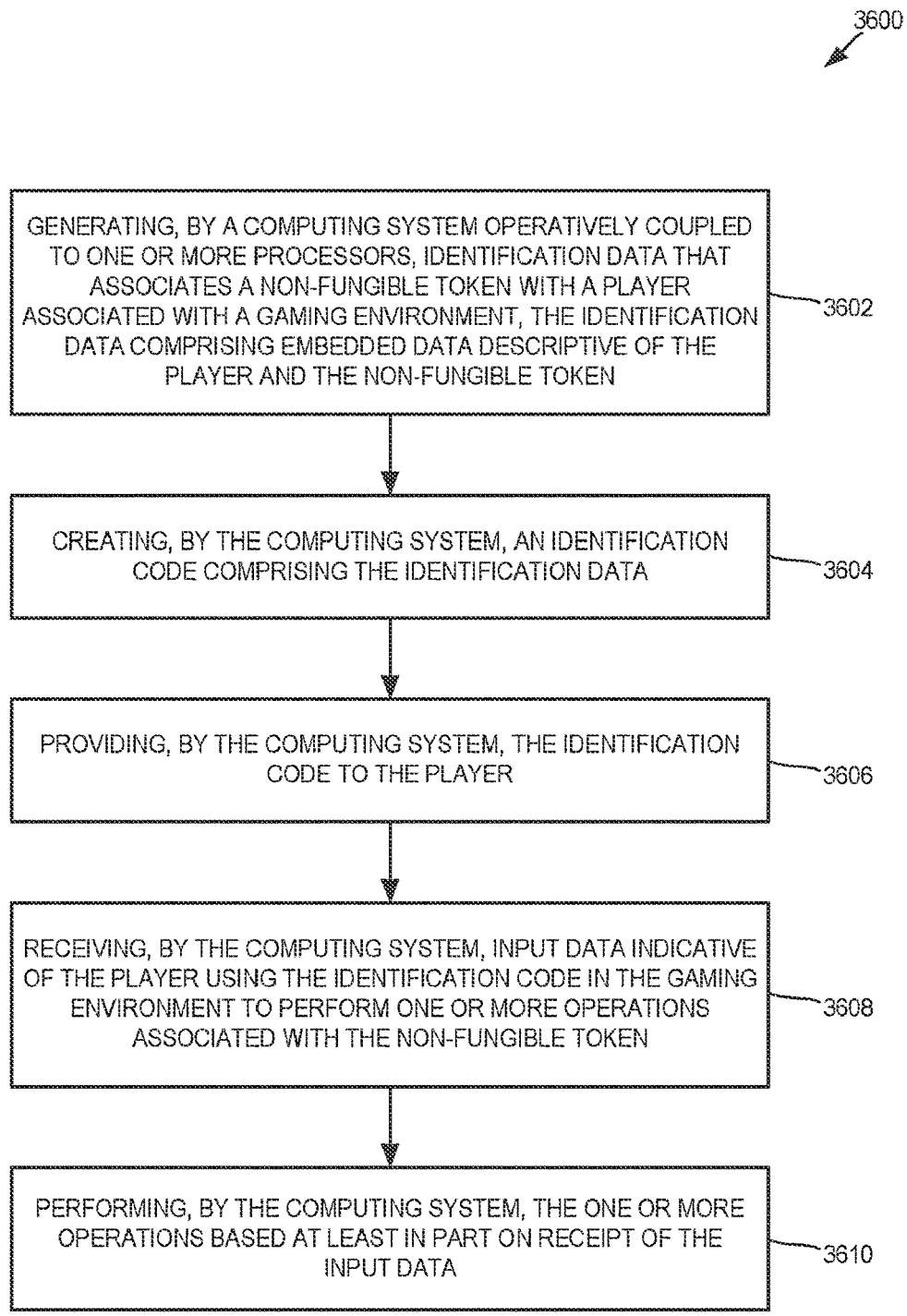
FIG. 36 illustrates a flow diagram of an example, non-limiting computer-implemented method that can facilitate association of an NFT with a player associated with a gaming environment according to example embodiments of the present disclosure.

FIG. 36 illustrates a flow diagram of an example, non-limiting computer-implemented method 3600 that can facilitate association of an NFT with a player associated with a gaming environment according to example embodiments of the present disclosure. In one or more embodiments of the present disclosure, one or more portions of computer-implemented method 3600 can be executed and/or implemented by one or more computing systems and/or computing devices including, for example, intermediary server system 30, computing system 3500, one or more computing devices 3502, and/or another computing system and/or computing device described herein. Further, in these one or more embodiments, one or more portions of computer-implemented method 3600 can be executed and/or implemented as an algorithm and/or as machine-readable instructions (e.g., computer software) using, for instance, one or more hardware components of one or more devices and/or systems disclosed herein.

The example embodiment illustrated in FIG. 36 depicts steps performed in a particular order for purposes of illustration and discussion. However, those of ordinary skill in the art, using the disclosures provided herein, will understand that various steps of computer-implemented method 3600 and/or any other methods disclosed herein can be adapted, combined, modified, rearranged, omitted, and/or expanded without deviating from the scope of the present disclosure.

At 3602, computer-implemented method 3600 can include generating, by a computing system (e.g., intermediary server system 30, computing system 3500, and/or one or more computing devices 3502) operatively coupled to one or more processors (e.g., one or more processors 3504), identification data that associates a non-fungible token with a player associated with a gaming environment (e.g., computing environment 10 and/or gaming computing environment 100), the identification data comprising embedded data descriptive of the player and the non-fungible token. For example, intermediary server system 30, computing system 3500, and/or one or more computing devices 3502 can generate the above-described identification data that can include embedded data descriptive of user 102 and NFT 144, where such identification data associates NFT 144 with user 102.

At 3604, computer-implemented method 3600 can include creating, by the computing system, an identification code (e.g., a QR code or another type of code) comprising the identification data.

At 3606, computer-implemented method 3600 can include providing, by the computing system, the identification code to the player. For example, intermediary server system 30, computing system 3500, and/or one or more computing devices 3502 can provide the identification code to user 102 via network 18, user computing device 50, cross-channel application 52, and/or GUI 420.

At 3608, computer-implemented method 3600 can include receiving, by the computing system, input data indicative of the player using the identification code in the gaming environment (e.g., computing environment 10 and/or gaming computing environment 100) to perform one or more operations associated with the non-fungible token. For example, intermediary server system 30, computing system 3500, and/or one or more computing devices 3502 can receive input data such as, for instance, scanned data from a scanner that can be indicative of user 102 using the identification code (e.g., data indicative of user 102 scanning a QR code that can include and/or constitute the identification code) to perform one or more of the above-described operations that can be associated with NFT 144 (e.g., transfer ownership of NFT 144, implement NFT 144 (e.g., implement the underlying content (e.g., video, image, audio, etc.) represented by and/or linked to NFT 144), and/or another operation).

At 3610, computer-implemented method 3600 can include performing, by the computing system, the one or more operations based at least in part on receipt of the input data (e.g., receipt of the input data via one or more input devices such as, for instance, a scanner that can be coupled to intermediary server system 30, computing system 3500, and/or one or more computing devices 3502). For example, in one embodiment, intermediary server system 30, computing system 3500, and/or one or more computing devices 3502 can forego verifying the authenticity (e.g., existence) of NFT 144 and/or confirmation of user's 102 ownership rights associated with NFT 144 and proceed to performing the one or more operations. In another embodiment, intermediary server system 30, computing system 3500, and/or one or more computing devices 3502 can verify the authenticity (e.g., existence) of NFT 144 and/or confirmation of user's 102 ownership rights associated with NFT 144 before performing the one or more operations. For example, as described above, intermediary server system 30, computing system 3500, and/or one or more computing devices 3502 can validate the authenticity (e.g., existence) of NFT 144 and/or user's 102 ownership rights associated with NFT 144 by analyzing the identification code against the above-described embedded data descriptive of user 102 and NFT 144.

FIGS. 37, 38, 39, and 40 illustrate flow diagrams of an example, non-limiting computer-implemented methods 3700, 3800, 3900, and 4000, respectively, that can each be implemented to manage one or more NFTs in a gaming environment in accordance with one or more embodiments of the present disclosure. For example, computer-implemented methods 3700, 3800, 3900, and 4000 can each be implemented to facilitate one or more operations in connection with associating an NFT with a player associated with a gaming environment according to example embodiments of the present disclosure. In some embodiments, computer-implemented methods 3700, 3800, 3900, and 4000 can each include and/or constitute a use case and/or application of the disclosed technology of the present disclosure. For instance, computer-implemented methods 3700, 3800, 3900, and 4000 can each include and/or constitute a use case and/or application of the above-described identification code that can associate an NFT with a player associated with a gaming environment in accordance with one or more embodiments disclosed herein.

In one or more embodiments of the present disclosure, one or more portions of computer-implemented methods 3700, 3800, 3900, and 4000 can be executed and/or implemented by one or more computing systems and/or computing devices including, for example, intermediary server system 30, computing system 3500, one or more computing devices 3502, and/or another computing system and/or computing device described herein. Further, in these one or more embodiments, one or more portions of computer-implemented methods 3700, 3800, 3900, and 4000 can be executed and/or implemented as an algorithm and/or as machine-readable instructions (e.g., computer software) using, for instance, one or more hardware components of one or more devices and/or systems disclosed herein.

The example embodiments illustrated in FIGS. 37, 38, 39, and 40 each depict steps performed in a particular order for purposes of illustration and discussion. However, those of ordinary skill in the art, using the disclosures provided herein, will understand that various steps of computer-implemented methods 3700, 3800, 3900, and 4000 and/or any other methods disclosed herein can be adapted, combined, modified, rearranged, omitted, and/or expanded without deviating from the scope of the present disclosure.

Figure 37:
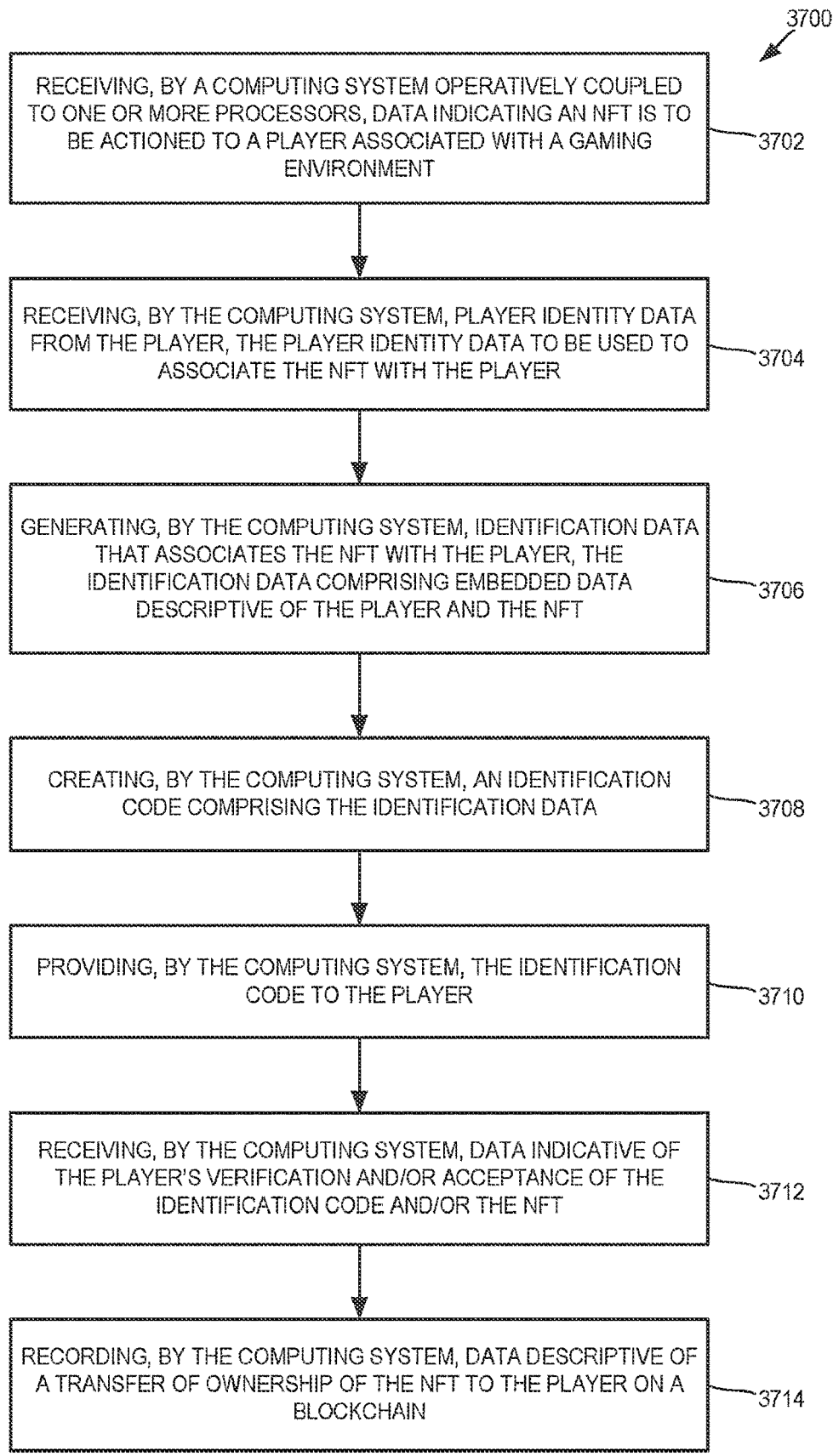
FIG. 37 illustrates a flow diagram of an example, non-limiting computer-implemented method that can facilitate association of an NFT with a player associated with a gaming environment according to example embodiments of the present disclosure.

FIG. 37 illustrates a flow diagram of an example, non-limiting computer-implemented method 3700 that can facilitate association of an NFT with a player associated with a gaming environment according to example embodiments of the present disclosure.

At 3702, computer-implemented method 3700 can include receiving, by a computing system (e.g., intermediary server system 30, computing system 3500, and/or one or more computing devices 3502) operatively coupled to one or more processors (e.g., one or more processors 3504), data indicating an NFT is to be actioned to a player associated with a gaming environment (e.g., computing environment 10 and/or gaming computing environment 100). For example, intermediary server system 30, computing system 3500, and/or one or more computing devices 3502 can receive data indicating NFT 144 is to be actioned to user 102 via network 18, cross-channel application 52, and/or GUI 420.

At 3704, computer-implemented method 3700 can include receiving, by the computing system, player identity data from the player, the player identity data to be used to associate the NFT with the player. For example, intermediary server system 30, computing system 3500, and/or one or more computing devices 3502 can receive player identity data from user 102 such as, for instance, a phone number, e-mail, digital wallet identification data, player and/or user account data, and/or other player identity data corresponding to user 102 via network 18, user computing device 50, cross-channel application 52, and/or GUI 420.

At 3706, computer-implemented method 3700 can include generating, by the computing system, identification data (e.g., the above-described identification data that can include embedded data descriptive of user 102 and NFT 144) that associates the NFT with the player, the identification data comprising embedded data descriptive of the player and the NFT (e.g., the above-described embedded data descriptive of user 102 and NFT 144).

At 3708, computer-implemented method 3700 can include creating, by the computing system, an identification code (e.g., a QR code or another type of code) comprising the identification data.

At 3710, computer-implemented method 3700 can include providing, by the computing system, the identification code to the player. For example, intermediary server system 30, computing system 3500, and/or one or more computing devices 3502 can provide the identification code to user 102 via network 18, user computing device 50, cross-channel application 52, and/or GUI 420.

At 3712, computer-implemented method 3700 can include receiving, by the computing system, data indicative of the player's verification and/or acceptance of the identification code and/or the NFT. For example, intermediary server system 30, computing system 3500, and/or one or more computing devices 3502 can receive data indicative of user 102 selecting one or more icons that can be included on GUI 420 such as, for instance, a "verify and/or accept" icon to signify user's 102 confirmation of the authenticity of NFT 144 and/or user's 102 acceptance of NFT 144. In this example, intermediary server system 30, computing system 3500, and/or one or more computing devices 3502 can receive such data from user 102 via network 18, user computing device 50, cross-channel application 52, and/or GUI 420.

At 3714, computer-implemented method 3700 can include recording, by the computing system, data descriptive of a transfer of ownership of the NFT to the player on a blockchain. For example, intermediary server system 30, computing system 3500, and/or one or more computing devices 3502 can utilize network 18, digital ledger platform 40, digital ledger layer 42, and/or smart contract 43 to record data descriptive of a transfer of ownership of NFT 144 to user 102 on blockchain 142 and/or blockchain 440 (e.g., on one or more blocks 442 of blockchain 142 and/or blockchain 440).

Figure 38:
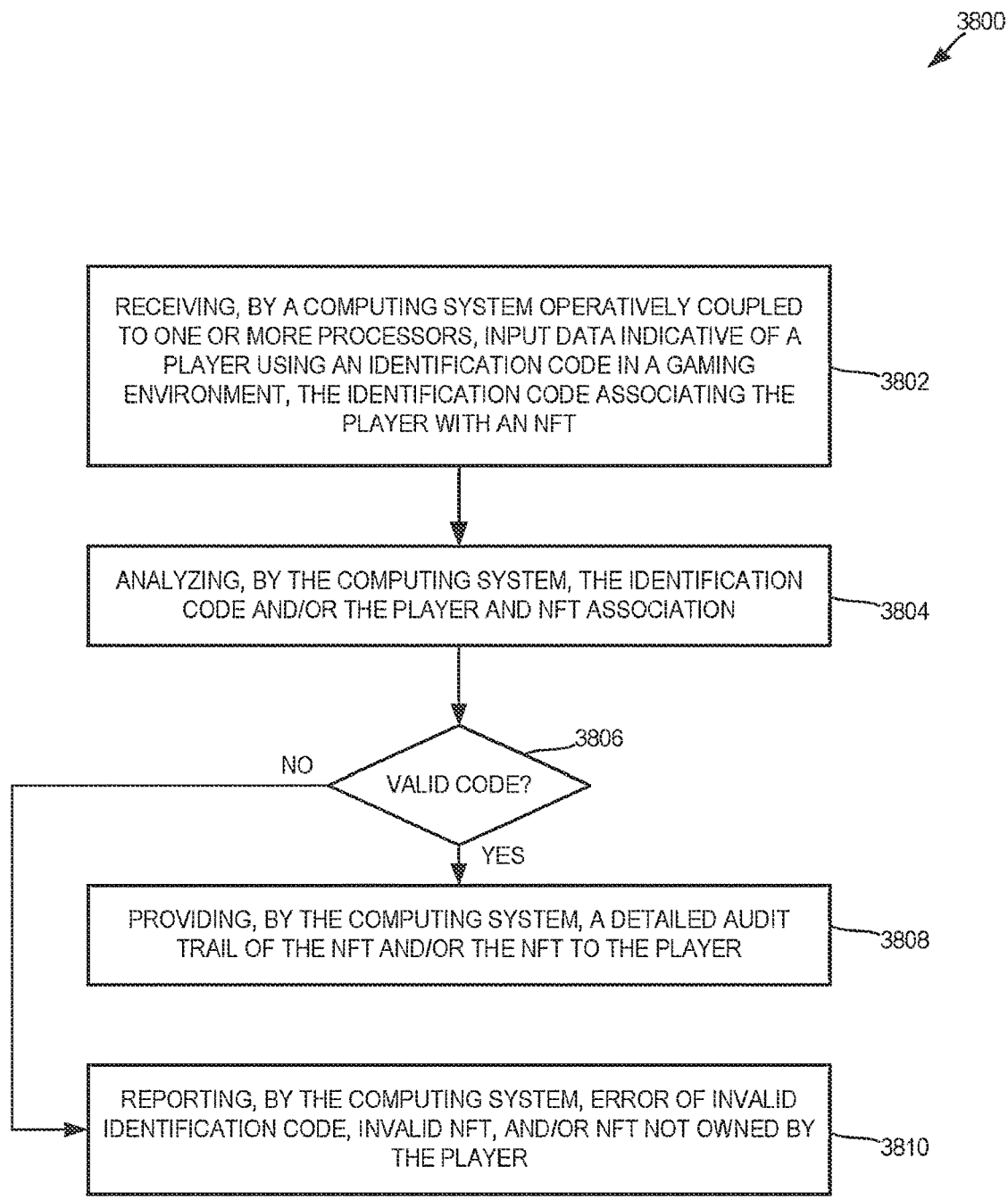
FIG. 38 illustrates a flow diagram of an example, non-limiting computer-implemented method that can facilitate validation of an association of an NFT with a player associated with a gaming environment according to example embodiments of the present disclosure.

FIG. 38 illustrates a flow diagram of an example, non-limiting computer-implemented method 3800 that can facilitate validation of an association of an NFT with a player associated with a gaming environment according to example embodiments of the present disclosure.

At 3802, computer-implemented method 3800 can include receiving, by a computing system (e.g., intermediary server system 30, computing system 3500, and/or one or more computing devices 3502) operatively coupled to one or more processors (e.g., one or more processors 3504), input data indicative of a player using an identification code (e.g., a QR code) in a gaming environment (e.g., computing environment 10 and/or gaming computing environment 100), the identification code associating the player with an NFT. For example, intermediary server system 30, computing system 3500, and/or one or more computing devices 3502 can receive input data such as, for instance, scanned data from a scanner that can be indicative of user 102 using the above-described identification code that can associate user 102 with an NFT 144. For instance, intermediary server system 30, computing system 3500, and/or one or more computing devices 3502 can receive (e.g., via one or more input devices (e.g., a scanner) that can be coupled to intermediary server system 30, computing system 3500, and/or one or more computing devices 3502) data indicative of user 102 scanning a QR code that can include and/or constitute the identification code.

At 3804, computer-implemented method 3800 can include analyzing, by the computing system, the identification code and/or the player and NFT association. For example, as described above, intermediary server system 30, computing system 3500, and/or one or more computing devices 3502 can validate the authenticity (e.g., existence) of NFT 144 and/or user's 102 ownership rights associated with NFT 144 by analyzing the identification code against the above-described embedded data descriptive of user 102 and NFT 144.

At 3806, computer-implemented method 3800 can include determining, by the computing system, whether the identification code is valid.

If it is determined at 3806 that the identification code is valid, at 3804, computer-implemented method 3800 can include providing, by the computing system, a detailed audit trail of the NFT and/or the NFT to the player. For example, intermediary server system 30, computing system 3500, and/or one or more computing devices 3502 can provide user 102 with a list of transaction and/or ownership transfer history corresponding to NFT 144 and/or data indicative of the location of the NFT such as, for instance, the above-described identifier and/or pointer having a memory address where NFT 144 can be stored. For instance, intermediary server system 30, computing system 3500, and/or one or more computing devices 3502 can provide such data to user 102 via network 18, user computing device 50, cross-channel application 52, and/or GUI 420.

If it is determined at 3806 that the identification code is invalid, at 3810, computer-implemented method 3800 can include reporting, by the computing system, error of invalid identification code, invalid NFT, and/or NFT not owned by the player. For example, in one embodiment, intermediary server system 30, computing system 3500, and/or one or more computing devices 3502 can utilize network 18, digital ledger platform 40, digital ledger layer 42, and/or smart contract 43 to record data descriptive of such error(s) on blockchain 142 and/or blockchain 440 (e.g., on one or more blocks 442 of blockchain 142 and/or blockchain 440). In another embodiment, intermediary server system 30, computing system 3500, and/or one or more computing devices 3502 can record data descriptive of such error(s) on a software database (e.g., an index, a table, a list, etc.) that can be stored on one or more memory devices 3506.

Figure 39:
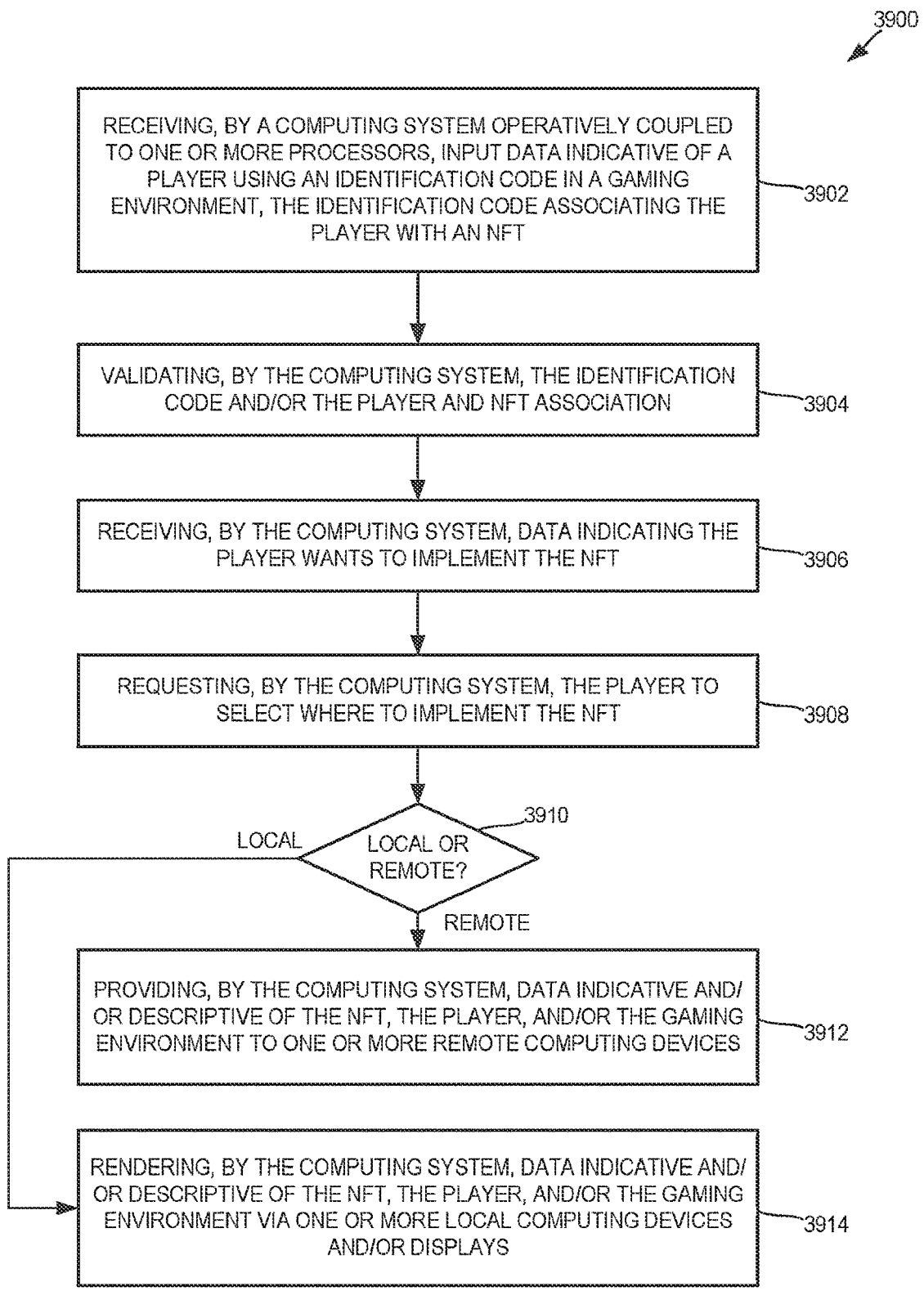
FIG. 39 illustrates a flow diagram of an example, non-limiting computer-implemented method that can facilitate local and/or remote implementation an NFT associated with a player associated with a gaming environment according to example embodiments of the present disclosure.

FIG. 39 illustrates a flow diagram of an example, non-limiting computer-implemented method 3900 that can facilitate local and/or remote implementation an NFT associated with a player associated with a gaming environment according to example embodiments of the present disclosure.

At 3902, computer-implemented method 3900 can include receiving, by a computing system (e.g., intermediary server system 30, computing system 3500, and/or one or more computing devices 3502) operatively coupled to one or more processors (e.g., one or more processors 3504), input data indicative of a player using an identification code in a gaming environment (e.g., computing environment 10 and/or gaming computing environment 100), the identification code associating the player with an NFT. For example, intermediary server system 30, computing system 3500, and/or one or more computing devices 3502 can receive input data such as, for instance, scanned data from a scanner that can be indicative of user 102 using the above-described identification code that can associate user 102 with an NFT 144. For instance, intermediary server system 30, computing system 3500, and/or one or more computing devices 3502 can receive (e.g., via one or more input devices (e.g., a scanner) that can be coupled to intermediary server system 30, computing system 3500, and/or one or more computing devices 3502) data indicative of user 102 scanning a QR code that can include and/or constitute the identification code.

At 3904, computer-implemented method 3900 can include validating, by the computing system, the identification code and/or the player and NFT association. For example, as described above, intermediary server system 30, computing system 3500, and/or one or more computing devices 3502 can validate the authenticity (e.g., existence) of NFT 144 and/or user's 102 ownership rights associated with NFT 144 by analyzing the identification code against the above-described embedded data descriptive of user 102 and NFT 144.

At 3906, computer-implemented method 3900 can include receiving, by the computing system, data indicating the player wants to implement the NFT. For example, intermediary server system 30, computing system 3500, and/or one or more computing devices 3502 can receive data indicative of user 102 selecting one or more icons that can be included on GUI 420 such as, for instance, a "view" icon, a "play" icon, a "render" icon, a "relive" icon, and/or another icon to signify user's 102 intent to implement NFT 144. In this example, intermediary server system 30, computing system 3500, and/or one or more computing devices 3502 can receive such data from user 102 via network 18, user computing device 50, cross-channel application 52, and/or GUI 420.

At 3908, computer-implemented method 3900 can include requesting, by the computing system, the player to select where to implement the NFT. For example, intermediary server system 30 can request that user 102 select whether to implement NFT 144 (e.g., to implement the underlying content represented by and/or linked to NFT 144) via one or more local computing devices and/or via one or more remote computing devices (e.g., one or more computing devices (e.g., a server) that are external to computing environment 10 and/or gaming computing environment 100, where such remote computing device(s) can host a media platform (e.g., a social media platform) on which the underlying content of NFT 144 can be implemented (e.g., rendered, viewed, accessed, etc.) by such remote computing device(s)). In this example, intermediary server system 30, computing system 3500, and/or one or more computing devices 3502 can submit such a request to user 102 via network 18, user computing device 50, cross-channel application 52, and/or GUI 420.

At 3910, computer-implemented method 3900 can include determining, by the computing system, where to implement the NFT. For example, intermediary server system 30, computing system 3500, and/or one or more computing devices 3502 can determine where to implement NFT 144 based on receiving input data from user 102 via network 18, cross-channel application 52, and/or GUI 420, where such input data can be indicative of where and/or how user 102 wants to implement NFT 144. For instance, intermediary server system 30, computing system 3500, and/or one or more computing devices 3502 can receive data indicative of user 102 selecting one or more icons that can be included on GUI 420 such as, for instance, a "local NFT implementation" icon and/or a "remote NFT implementation" icon.

If it is determined at 3910 that the player wants to implement the NFT via one or more remote computing devices, at 3912, computer-implemented method 3900 can include providing, by the computing system, data indicative and/or descriptive of the NFT, the player, and/or the gaming environment to one or more remote computing devices. For example, based on user 102 selecting a "remote NFT implementation" icon that can be included on GUI 420, a drop-down menu that can be included on GUI 420 can then allow user 102 to select one or more remote computing devices to which intermediary server system 30, computing system 3500, and/or one or more computing devices 3502 can send (e.g., via network 18) data indicative and/or descriptive of NFT 144, user 102, and/or user's 102 association with NFT 144, computing environment 10, and/or gaming computing environment 100. For instance, intermediary server system 30, computing system 3500, and/or one or more computing devices 3502 can provide (e.g., via network 18) such one or more remote computing devices with the above-described identifier and/or pointer having a memory address where NFT 144 can be stored, user's 102 identity data (e.g., name, username, etc.), and/or data descriptive of computing environment 10 and/or gaming computing environment 100. In some embodiments, such one or more remote computing devices can include, host, and/or operate a media platform (e.g., a social media platform) on which such one or more remote computing devices can implement (e.g., play, display, etc.) underlying content represented by and/or linked to NFT 144.

If it is determined at 3910 that the player wants to implement the NFT via one or more local computing devices, at 3914, computer-implemented method 3900 can include rendering, by the computing system, data indicative and/or descriptive of the NFT, the player, and/or the gaming environment via one or more local computing devices and/or displays. For example, based on user 102 selecting a "local NFT implementation" icon that can be included on GUI 420, a drop-down menu that can be included on GUI 420 can then allow user 102 to select one or more local computing devices and/or displays that can be coupled to and/or used by intermediary server system 30, computing system 3500, and/or one or more computing devices 3502 to implement NFT 144 and/or display data indicative and/or descriptive of NFT 144, user 102, and/or user's 102 association with NFT 144, computing environment 10, and/or gaming computing environment 100. For instance, intermediary server system 30, computing system 3500, and/or one or more computing devices 3502 can render (e.g., play, display, etc.) underlying content represented by and/or linked to NFT 144, user's 102 identity data (e.g., name, username, etc.), and/or data descriptive of computing environment 10 and/or gaming computing environment 100 via one or more local computing devices and/or displays (e.g., a screen, monitor, etc.) that can be coupled to intermediary server system 30, computing system 3500, and/or one or more computing devices 3502.

Although not illustrated in FIG. 39, in some embodiments, computer-implemented method 3900 can include performing both operation 3912 and operation 3914 based at least in part on (e.g., in response to) receiving (e.g., via network 18, cross-channel application 52, and/or GUI 420), by the computing system, data indicating the player wants to implement the NFT via both local and remote computing devices.

Figure 40:
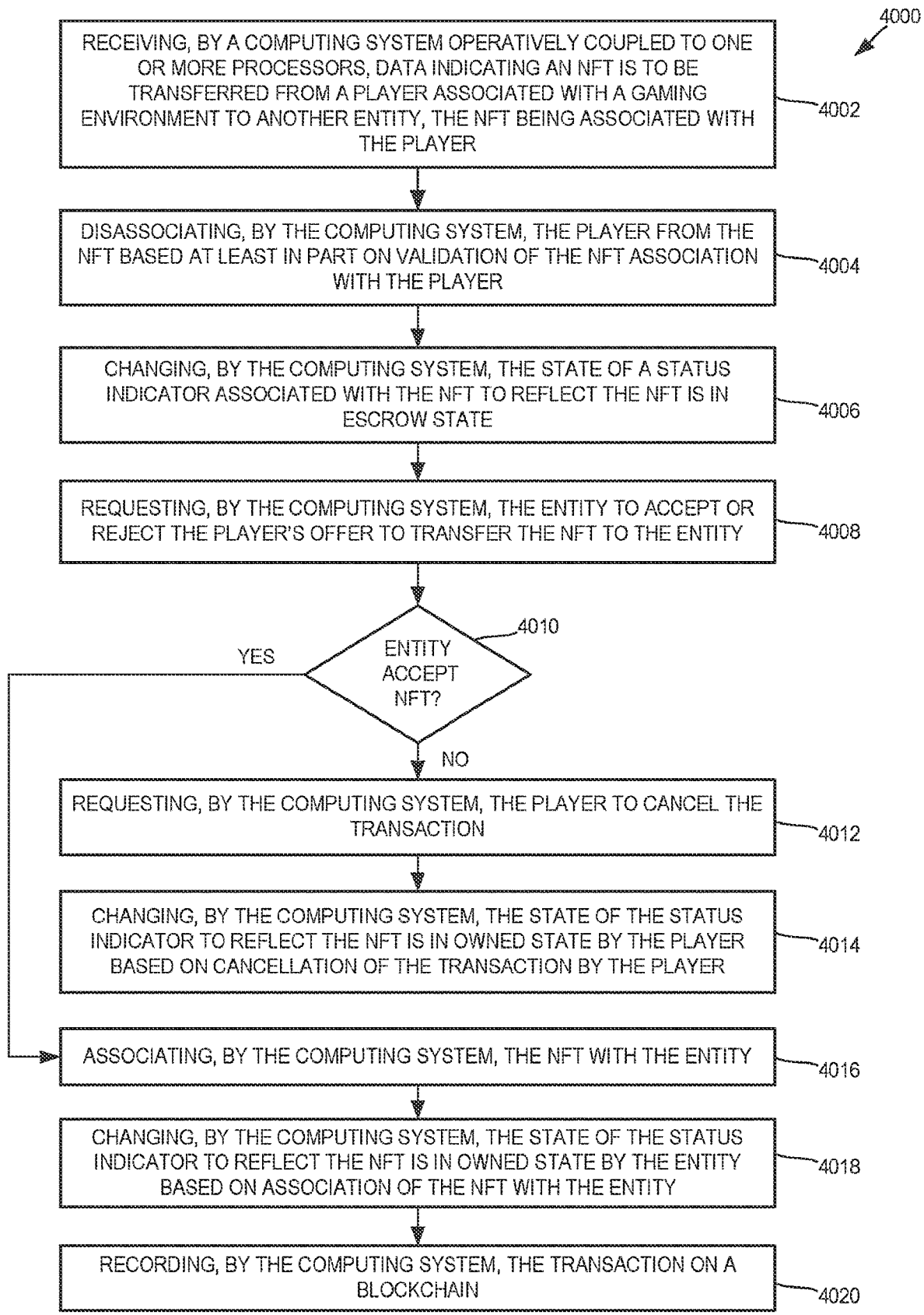
FIG. 40 illustrates a flow diagram of an example, non-limiting computer-implemented method that can facilitate transfer of an NFT associated with a player associated with a gaming environment to another entity according to example embodiments of the present disclosure.

FIG. 40 illustrates a flow diagram of an example, non-limiting computer-implemented method 4000 that can facilitate transfer of an NFT associated with a player associated with a gaming environment to another entity according to example embodiments of the present disclosure.

At 4002, computer-implemented method 4000 can include receiving, by a computing system (e.g., intermediary server system 30, computing system 3500, and/or one or more computing devices 3502) operatively coupled to one or more processors (e.g., one or more processors 3504), data indicating an NFT is to be transferred from a player associated with a gaming environment (e.g., computing environment 10 and/or gaming computing environment 100) to another entity, the NFT being associated with the player. For example, intermediary server system 30, computing system 3500, and/or one or more computing devices 3502 can receive input data such as, for instance, scanned data from a scanner that can be indicative of user 102 using the above-described identification code that can associate user 102 with an NFT 144. For instance, intermediary server system 30, computing system 3500, and/or one or more computing devices 3502 can receive (e.g., via one or more input devices (e.g., a scanner) that can be coupled to intermediary server system 30, computing system 3500, and/or one or more computing devices 3502) data indicative of user 102 scanning a QR code that can include and/or constitute the identification code. In this example, intermediary server system 30, computing system 3500, and/or one or more computing devices 3502 can further receive data indicative of user 102 selecting a "transfer NFT" icon that can be included on GUI 420 to signify user's 102 intent to transfer NFT 144. In this example, intermediary server system 30, computing system 3500, and/or one or more computing devices 3502 can receive such data from user 102 via network 18, user computing device 50, cross-channel application 52, and/or GUI 420. In this example, the entity can be, for instance, another player and/or an entity associated with a computing and/or gaming environment other than computing environment 10 and/or gaming computing environment 100.

At 4004, computer-implemented method 4000 can include disassociating, by the computing system, the player from the NFT based at least in part on validation (e.g., via intermediary server system 30 as described above) of the NFT association with the player. For example, in some embodiments, based at least in part on validating association of NFT 144 with user 102 (e.g., in accordance with computer-implemented method 3800 described above and illustrated in FIG. 38), intermediary server system 30, computing system 3500, and/or one or more computing devices 3502 can disassociate user 102 from NFT 144 by, for instance, deleting the above-described identification data that can associate NFT 144 with user 102 and/or the above-described data descriptive of user 102 and NFT 144 that can be embedded in such identification data. In some embodiments, intermediary server system 30, computing system 3500, and/or one or more computing devices 3502 can disassociate user 102 from NFT 144 by, for instance, deleting and/or removing, from one or more storage locations (e.g., blockchain 142 and/or blockchain 440, one or more memory devices 3506, etc.), such identification data and/or such data descriptive of user 102 and NFT 144 that can be embedded in the identification data.

At 4006, computer-implemented method 4000 can include changing, by the computing system, the state of a status indicator associated with the NFT to reflect the NFT is in escrow state. For example, intermediary server system 30, computing system 3500, and/or one or more computing devices 3502 can use a smart contract associated with NFT 144 such as, for instance, smart contract 43 and/or one of smart contracts 358 to facilitate changing the state of the above-described status indicator to reflect that a transfer of ownership of NFT 144 from user 102 to the entity is in progress and NFT 144 is in an escrow state. In one or more embodiments, intermediary server system 30, computing system 3500, and/or one or more computing devices 3502 can change the state of such a status indicator to reflect that a transfer of ownership of NFT 144 from user 102 to the entity is in progress and NFT 144 is in an escrow state to inform other entities (e.g., another player, an entity of another gaming environment, etc.) that NFT 144 is currently unavailable for transfer.

At 4008, computer-implemented method 4000 can include requesting, by the computing system, the entity to accept or reject the player's offer to transfer the NFT to the entity. For example, intermediary server system 30, computing system 3500, and/or one or more computing devices 3502 can submit a request to the entity that the entity either accept or reject user's 102 offer to transfer NFT 144 to the entity. In this example, intermediary server system 30, computing system 3500, and/or one or more computing devices 3502 can submit such a request to the entity via network 18, one of user computing devices 50, cross-channel application 52, and/or GUI 420, where such one of user computing devices 50 can be associated with the entity.

At 4010, computer-implemented method 4000 can include determining, by the computing system, whether the entity accepted the player's offer to transfer the NFT to the entity. For example, intermediary server system 30, computing system 3500, and/or one or more computing devices 3502 can determine whether the entity accepted or rejected user's 102 offer to transfer NFT 144 based on receiving input data from the entity via network 18, one of user computing device 50 associated with the entity, cross-channel application 52, and/or GUI 420, where such input data can be indicative of the entity's acceptance or rejection of user's 102 offer to transfer NFT 144 to the entity. For instance, intermediary server system 30, computing system 3500, and/or one or more computing devices 3502 can receive data indicative of the entity selecting an icon that can be included on GUI 420 such as, for instance, an "accept NFT" icon or a "reject NFT" icon.

If it is determined at 4010 that the entity rejected the user's offer to transfer the NFT to the entity, at 4012, computer-implemented method 4000 can include requesting, by the computing system, the player to cancel the transaction. For example, based on the entity selecting a "reject NFT" icon that can be included on GUI 420, intermediary server system 30, computing system 3500, and/or one or more computing devices 3502 can submit a request to user 102 via network 18, user computing device 50, cross-channel application 52, and/or GUI 420 for user 102 to cancel the transaction.

At 4014, computer-implemented method 4000 can include changing, by the computing system, the state of the status indicator to reflect the NFT is in owned state by the player based on cancellation of the transaction by the player. For example, based on receiving such a request (e.g., via network 18, user computing device 50, cross-channel application 52, and/or GUI 420), user 102 can select an icon such as, for instance, a "cancel NFT transfer" icon that can be include on GUI 420 to signify user's 102 intent to cancel the transaction. In this example, based on receiving data indicative of user 102 cancelling the transaction (e.g., via network 18, user computing device 50, cross-channel application 52, and/or GUI 420), intermediary server system 30, computing system 3500, and/or one or more computing devices 3502 can use a smart contract associated with NFT 144 such as, for instance, smart contract 43 and/or one of smart contracts 358 to facilitate changing the state of the above-described status indicator to reflect that ownership of NFT 144 has reverted back to user 102. Although not illustrated in FIG. 40, in some embodiments, computer-implemented method 4000 can include reverting (e.g., by intermediary server system 30, computing system 3500, and/or one or more computing devices 3502) ownership of NFT 144 back to user 102 if a defined time duration associated with the transaction expires before user 102 cancels the transaction.

If it is determined at 4010 that the entity accepted the user's offer to transfer the NFT to the entity, at 4016, computer-implemented method 4000 can include associating, by the computing system, the NFT with the entity. For example, based on the entity selecting an "accept NFT" icon that can be included on GUI 420, intermediary server system 30, computing system 3500, and/or one or more computing devices 3502 can execute, for instance, operations 3602, 3604, and/or 3606 of above-described computer-implemented method 3600 with respect to the entity to facilitate: associating NFT 144 with the entity; generating a new identification token (e.g., a new QR code) that represents and/or encapsulates such association of NFT 144 with the entity; and/or providing the new identification token to the entity.

At 4018, computer-implemented method 4000 can include changing, by the computing system, the state of the status indicator to reflect the NFT is in owned state by the entity based on association of the NFT with the entity. For example, based on associating NFT 144 with the entity (e.g., by executing operations 3602, 3604, and/or 3606 of above-described computer-implemented method 3600 with respect to the entity), intermediary server system 30, computing system 3500, and/or one or more computing devices 3502 can use a smart contract associated with NFT 144 such as, for instance, smart contract 43 and/or one of smart contracts 358 to facilitate changing the state of the above-described status indicator to reflect that ownership of NFT 144 has been transferred to the entity.

At 4020, computer-implemented method 4000 can include recording, by the computing system, the transaction on a blockchain. For example, intermediary server system 30, computing system 3500, and/or one or more computing devices 3502 can record data descriptive of the transfer of ownership of NFT 144 to the entity on blockchain 142 and/or blockchain 440. For instance, intermediary server system 30, computing system 3500, and/or one or more computing devices 3502 can utilize network 18, digital ledger platform 40, digital ledger layer 42, and/or smart contract 43 to record data descriptive of the transfer of ownership of NFT 144 to the entity on blockchain 142 and/or blockchain 440 (e.g., on one or more blocks 442 of blockchain 142 and/or blockchain 440). In some embodiments, intermediary server system 30, computing system 3500, and/or one or more computing devices 3502 can utilize network 18, digital ledger platform 40, digital ledger layer 42, and/or smart contract 43 to update a transaction audit trail corresponding to NFT 144 that can be located on blockchain 142 and/or blockchain 440 (e.g., on one or more blocks 442 of blockchain 142 and/or blockchain 440). For instance, intermediary server system 30, computing system 3500, and/or one or more computing devices 3502 can utilize network 18, digital ledger platform 40, digital ledger layer 42, and/or smart contract 43 to add data descriptive of the transfer of ownership of NFT 144 to the entity on such a transaction audit trail corresponding to NFT 144.

With reference to one or more of the above-described example embodiments illustrated in FIGS. 1-40, additional and/or alternative example aspects of the present disclosure are generally directed to a computer-based gaming environment that can facilitate integration of NFT and/or metaverse components and/or functionality in a gaming environment to provide a player with a borderless, boundaryless, and interleaved real-virtual world gaming experience across different gaming channels, different entities (e.g., different gaming organizations, different casinos, different product and/or service providers, etc.), and/or different environments (e.g., different gaming environments, different physical real-world environments, different computer-based environments, etc.). For instance, in one or more example embodiments, computing environment 10, intermediary server system 30, and/or gaming computing environment 100 can facilitate integration of NFT and/or metaverse components and/or functionality in a gaming environment to provide a player with a borderless, boundaryless, and interleaved real-virtual world gaming experience across different gaming channels, different entities (e.g., different gaming organizations, different casinos, different product and/or service providers, etc.), and/or different environments (e.g., different gaming environments, different physical real-world environments, different computer-based environments, etc.). According to example embodiments of the present disclosure, to facilitate such integration of NFT and/or metaverse components and/or functionality in a gaming environment, intermediary server system 30 can include, be coupled to (e.g., communicatively, operatively, etc.), and/or otherwise be associated with one or more computing devices such as, for example, one or more computing devices 3502 that can respectively include, be coupled to, and/or otherwise be associated with one or more processors 3504 and/or one or more memory devices 3506. In these or other embodiments, one or more memory devices 3506 can each store instructions that, when executed by any of one or more processors 3504, can cause any of such one or more processors 3504, one or more computing devices 3502, and/or intermediary server system 30 to perform operations (e.g., collectively, individually, concurrently, sequentially, etc.) in accordance with one or more example embodiments described herein. For instance, such instructions, when executed by any of one or more processors 3504, can cause any of such one or more processors 3504, one or more computing devices 3502, and/or intermediary server system 30 to perform one or more operations that can facilitate integration of NFT and/or metaverse components and/or functionality in a gaming environment in accordance with one or more embodiments described herein.

In one or more embodiments, intermediary server system 30 can generate, implement, host, manage, and/or otherwise be involved with the creation and/or operation of a metaverse gaming environment and/or one or more metaverse gaming devices thereof to facilitate integration of NFT and/or metaverse components and/or functionality in a gaming environment in accordance with one or more embodiments described herein. In some embodiments, to facilitate integration of NFT and/or metaverse components and/or functionality in a gaming environment in accordance with one or more embodiments of the present disclosure, intermediary server system 30 can generate, implement, host, manage, and/or otherwise be involved with the creation and/or operation of one or more metaverse gaming devices of a metaverse gaming environment that is operated by and/or otherwise associated with a remote computing system (not illustrated in the figures) that is external to intermediary server system 30.

As an example, the metaverse gaming environment according to example embodiments of the present disclosure can include, constitute, and/or otherwise be associated with a metaverse gaming system (not illustrated in the figures) that can be included in gaming channel systems 20 and/or gaming channels 104 described above and illustrated in the example embodiments depicted in FIGS. 1 and 2, respectively. In another example, the metaverse gaming device(s) according to example embodiments of the present disclosure can be included in, coupled to, and/or otherwise associated with such a metaverse gaming system that can be included in gaming channel systems 20 and/or gaming channels 104 as described above.

In some embodiments, intermediary server system 30 can generate, implement, host, manage, and/or otherwise be involved with the creation and/or operation of one or more physical gaming devices (e.g., an electronic gaming machine (EGM)) located in a physical gaming environment (e.g., a casino) to facilitate integration of NFT and/or metaverse components and/or functionality in a gaming environment in accordance with one or more embodiments described herein. As an example, the physical gaming device(s) according to example embodiments of the present disclosure can include, constitute, and/or otherwise be associated with physical gaming systems 21, electronic gaming machine 112, and/or gaming machine 500 described above and illustrated in the example embodiments depicted in FIGS. 1, 2, and 29, respectively. In another example, the physical gaming device(s) according to example embodiments of the present disclosure can include, constitute, and/or otherwise be associated with a real, physical game device and/or table (e.g., blackjack table) that can be coupled to a computing device such as, for instance, one or more computing devices 3502 as described below.

In at least one example embodiment of the present disclosure, to facilitate the above-described integration of NFT and/or metaverse components and/or functionality in a gaming environment, intermediary server system 30 can sync, couple, and/or otherwise associate a metaverse gaming device of a metaverse gaming environment with a physical gaming device of a physical gaming environment. For example, intermediary server system 30 according to example embodiments described herein can sync, couple, and/or otherwise associate a virtual and/or digital gaming device that can be implemented in a metaverse gaming environment with a real gaming device and/or a real gaming table that can be implemented in a physical gaming environment such as, for instance, a casino. In multiple embodiments, intermediary server system 30 can sync, couple, and/or otherwise associate the metaverse gaming device with the physical gaming device such that the metaverse gaming device can include and/or constitute a virtual and/or digital representation of the physical gaming device in the metaverse gaming environment.

In one embodiment, the physical gaming device can constitute, include, be coupled to, and/or otherwise be associated with an electronic and/or computer-based gaming device such as, for example, an EGM (e.g., gaming machine 500), an electronic table game (ETG), and/or another electronic and/or computer-based gaming device that can be physically located in a physical gaming environment such as, for instance, a casino. In this embodiment, the metaverse gaming device can constitute and/or include application software (e.g., computer-readable instructions) such as, for example, an application instance, an application object, a system image, a virtual machine, and/or other application software that can be implemented in the metaverse gaming environment and synced with, coupled to, and/or otherwise correspond to the physical gaming device. For instance, in this embodiment, the metaverse gaming device can constitute and/or include such application software (e.g., application instance, application object, system image, virtual machine, etc.) that can be synced with, coupled to, and/or otherwise correspond to the physical gaming device such that the application software can constitute a virtual and/or digital representation of the physical gaming device in the metaverse gaming environment.

In another embodiment, the physical gaming device can constitute, include, be coupled to, and/or otherwise be associated with a real, physical table game (e.g., poker table, blackjack table, roulette table, etc.) that can be physically located in a physical gaming environment such as, for instance, a casino. In this embodiment, the physical gaming device can constitute, include, be coupled to, and/or otherwise be associated with a computing device (e.g., a special-purpose computer or general-purpose computer) such as, for example, one or more computing devices 3502 that can be physically located in the physical gaming environment and/or another environment and can perform one or more operations associated with the physical gaming device.

In one embodiment, the above-described computing device (e.g., one or more computing devices 3502) can provide output data that can include and/or constitute instructions associated with executing a game and/or a gameplay via the physical gaming device (e.g., the computing device can provide output data that is descriptive of which card(s) a gaming dealer should deal to one or more users 102 participating in the game and/or gameplay). In another example embodiment, the computing device (e.g., one or more computing devices 3502) can receive input data that can be descriptive of one or more activities and/or events associated with the physical gaming device. For example, in one embodiment, the computing device (e.g., one or more computing devices 3502) can receive input data that can be descriptive of an outcome (e.g., win, loss, tie, etc.) of a game and/or a gameplay that can be implemented via the physical gaming device in the physical gaming environment. In one or more embodiments, the computing device (e.g., one or more computing devices 3502) can store (e.g., on one or more memory devices 3506), communicate, and/or otherwise manage the above-described output and/or input data.

In the embodiments described above, where the physical gaming device can constitute, include, be coupled to, and/or otherwise be associated with such a computing device (e.g., one or more computing devices 3502), the metaverse gaming device can constitute and/or include application software (e.g., computer-readable instructions) such as, for example, an application instance, an application object, a system image, a virtual machine, and/or other application software that can be implemented in the metaverse gaming environment and synced with, coupled to, and/or otherwise correspond to the computing device (e.g., one or more computing devices 3502) and/or the physical gaming device. For instance, in these or other embodiments, the metaverse gaming device can constitute and/or include such application software (e.g., application instance, application object, system image, virtual machine, etc.) that can be synced with, coupled to, and/or otherwise correspond to the computing device (e.g., one or more computing devices 3502) and/or the physical gaming device such that the application software can constitute a virtual and/or digital representation of the computing device (e.g., one or more computing devices 3502) and/or the physical gaming device in the metaverse gaming environment.

In multiple embodiments of the present disclosure, the metaverse gaming device and/or the above-described application software can include and/or constitute a virtual and/or digital representation of one or more attributes, structural components, and/or functionality of the physical gaming device. For example, in embodiments where the physical gaming device is an EGM such as, for instance, gaming machine 500 described above, the metaverse gaming device and/or the above-described application software can include and/or constitute a virtual and/or digital representation of one or more attributes (e.g., featured game(s), graphical user interface(s), etc.), structural components (e.g., cabinet housing 520, primary game display 540, etc.), and/or functionality of gaming machine 500. In one or more other example embodiments where the physical gaming device is a real, physical table game such as, for instance, a blackjack table, the metaverse gaming device and/or the above-described application software can include and/or constitute a virtual and/or digital representation of one or more attributes, structural components, and/or functionality of the blackjack table (e.g., table design, size, shape, color, number of player positions, player seat design, etc.).

In one or more embodiments described herein, intermediary server system 30 can sync, couple, and/or otherwise associate the metaverse gaming device with the physical gaming device such that one or more attributes, activities, and/or operations associated with one of such devices is also associated with the other device. As an example, in one embodiment, intermediary server system 30 can sync, couple, and/or otherwise associate the metaverse gaming device with the physical gaming device such that an outcome (e.g., win, loss, tie, etc.) of a gameplay executed via the physical gaming device in the physical gaming environment can also be the outcome of the gameplay that can be output by the metaverse gaming device in the metaverse gaming environment. In at least one embodiment, intermediary server system 30 can sync, couple, and/or otherwise associate the metaverse gaming device with the physical gaming device such that the metaverse gaming device in the metaverse gaming environment can output in real-time (e.g., live, simultaneously, etc.) the same outcome that can be output by the physical gaming device in the physical gaming environment. For instance, in this or another embodiment, the outcome can result from execution of a gameplay via the physical gaming device in the physical gaming environment and the metaverse gaming device can simultaneously output the same outcome in the metaverse gaming environment at the same time the outcome is output by the physical gaming device in the physical gaming environment.

According to one or more embodiments described herein, intermediary server system 30 can sync, couple, and/or otherwise associate the metaverse gaming device with the physical gaming device such that intermediary server system 30 can provide a metaverse gaming experience associated with a gameplay to a player such as, for instance, user 102 participating in the gameplay while being located at the physical gaming device and/or in the physical gaming environment. For example, in at least one embodiment, whether the gameplay is executed via the physical gaming device or the metaverse gaming device, intermediary server system 30 can sync, couple, and/or otherwise associate the metaverse gaming device with the physical gaming device such that intermediary server system 30 can provide a metaverse gaming experience associated with a gameplay to user 102 participating in the gameplay while being located at the physical gaming device and/or in the physical gaming environment. For instance, in this example embodiment, intermediary server system 30 can employ an augmented reality process and/or a virtual reality process to provide the metaverse gaming experience associated with the gameplay to user 102 participating in the gameplay while being located at the physical gaming device and/or in the physical gaming environment.

That is, for example, in one or more embodiments, user 102 can employ an augmented and/or virtual reality device (e.g., augmented reality glasses, a head-up-display (HUD), a smart phone, etc.) and physically stand or sit at a real, physical blackjack table in a real, physical casino. In these or other example embodiments, intermediary server system 30 can facilitate execution of a blackjack game via the metaverse gaming device and employ an augmented and/or virtual reality process to provide user 102 (e.g., via user's 102 augmented and/or virtual reality device) with a metaverse gaming experience of the blackjack game while user 102 is physically located at such a blackjack table in such a casino located in the real world.

In one or more embodiments, intermediary server system 30 can employ an augmented and/or virtual reality process to provide user 102 (e.g., via user's 102 augmented and/or virtual reality device) with a metaverse gaming experience of the blackjack game while user 102 is physically located at such a blackjack table by, for example, projecting images and/or video corresponding to one or more entities (e.g., objects, other players, etc.) associated with the execution of the blackjack game by intermediary server system 30 via the metaverse gaming device in the metaverse gaming environment. In these one or more embodiments, intermediary server system 30 can employ the augmented and/or virtual reality process to project the images and/or video such that user 102 can view and/or interact with such image and/or video projections via user's 102 augmented and/or virtual reality device. In at least one embodiment, intermediary server system 30 can employ the augmented and/or virtual reality process to project the images and/or video in real-time (e.g., live) such that user 102 can view and/or interact with such projected images and/or videos during the blackjack game via user's 102 augmented and/or virtual reality device.

In one example embodiment, intermediary server system 30 can employ an augmented and/or virtual reality process to provide user 102 (e.g., via user's 102 augmented and/or virtual reality device) with a metaverse gaming experience of the blackjack game while user 102 is physically located at such a blackjack table by, for example, projecting avatar images and/or videos corresponding to other players (e.g., other users 102) that are participating in the blackjack game, where such other players are participating in the blackjack game via the metaverse gaming device in the metaverse gaming environment. In this example embodiment, intermediary server system 30 can employ the augmented and/or virtual reality process to project the avatar images and/or videos such that user 102 can view and/or interact with the avatar images and/or videos via user's 102 augmented and/or virtual reality device. In at least one embodiment, intermediary server system 30 can employ the augmented and/or virtual reality process to project the avatar images and/or videos in real-time (e.g., live) such that user 102 can view and/or interact with such projected avatar images and/or videos during the blackjack game via user's 102 augmented and/or virtual reality device.

In accordance with at least one embodiment of the present disclosure, intermediary server system 30 can sync, couple, and/or otherwise associate the metaverse gaming device with the physical gaming device such that intermediary server system 30 can prevent multiple players (e.g., multiple users 102) from concurrently employing the same metaverse gaming device and/or the same physical gaming device. For example, intermediary server system 30 can prevent such concurrent use of the same metaverse gaming device and/or the same physical gaming device whether such multiple players (e.g., multiple users 102) attempt to concurrently employ the same metaverse gaming device in the metaverse gaming environment or the same physical gaming device in the physical gaming environment.

As an example, in one embodiment, intermediary server system 30 can sync, couple, and/or otherwise associate a metaverse gaming device with a physical gaming device as described above and intermediary server system 30 can receive (e.g., via one or more computing devices 3502, network 18, user computing device 50, cross-channel application 52, GUI 420, etc.) data indicative of a first user 102 employing the metaverse gaming device (e.g., data indicative of the first user 102 employing the metaverse gaming device in the metaverse gaming environment). In this example embodiment, intermediary server system 30 can subsequently receive (e.g., via one or more computing devices 3502, network 18, user computing device 50, cross-channel application 52, GUI 420, etc.) a request from a second user 102 to employ the physical gaming device in the physical gaming environment, where the physical gaming device has been synced, coupled, and/or otherwise associated with the metaverse gaming device as described above. In this example embodiment, intermediary server system 30 can provide (e.g., via one or more computing devices 3502, network 18, user computing device 50, cross-channel application 52, GUI 420, etc.) the second user 102 with data indicative of a rejection of the request based at least in part on the data indicative of the first user 102 employing the metaverse gaming device in the metaverse gaming environment.

In another example embodiment, intermediary server system 30 can sync, couple, and/or otherwise associate a metaverse gaming device with a physical gaming device as described above and intermediary server system 30 can receive (e.g., via one or more computing devices 3502, network 18, user computing device 50, cross-channel application 52, GUI 420, etc.) data indicative of a first user 102 employing the physical gaming device (e.g., data indicative of the first user 102 employing the physical gaming device in the physical gaming environment). In this example embodiment, intermediary server system 30 can subsequently receive (e.g., via one or more computing devices 3502, network 18, user computing device 50, cross-channel application 52, GUI 420, etc.) a request from a second user 102 to employ the metaverse gaming device in the metaverse gaming environment, where the metaverse gaming device has been synced, coupled, and/or otherwise associated with the physical gaming device as described above. In this example embodiment, intermediary server system 30 can provide (e.g., via one or more computing devices 3502, network 18, user computing device 50, cross-channel application 52, GUI 420, etc.) the second user 102 with data indicative of a rejection of the request based at least in part on the data indicative of the first user 102 employing the physical gaming device in the physical gaming environment.

In additional and/or alternative embodiments, intermediary server system 30 can sync, couple, and/or otherwise associate the metaverse gaming device with the physical gaming device such that intermediary server system 30 can allow multiple players (e.g., multiple users 102) to concurrently employ the same metaverse gaming device and/or the same physical gaming device. For example, intermediary server system 30 can allow such concurrent use of the same metaverse gaming device and/or the same physical gaming device whether such multiple players (e.g., multiple users 102) attempt to concurrently employ the same metaverse gaming device in the metaverse gaming environment or the same physical gaming device in the physical gaming environment. In one embodiment, intermediary server system 30 can sync, couple, and/or otherwise associate a metaverse gaming device with a physical gaming device as described above such that the multiple players (e.g., multiple users 102) can concurrently employ the same metaverse gaming device and/or the same physical gaming device to, for instance, share a gaming and/or social experience resulting from and/or otherwise associated with execution of a gameplay via the metaverse gaming device and/or the physical gaming device.

In one or more embodiments described herein, intermediary server system 30 can sync, couple, and/or otherwise associate the metaverse gaming device with the physical gaming device such that intermediary server system 30 can prevent multiple players (e.g., multiple users 102) from concurrently occupying the same player role in a gameplay executed via the metaverse gaming device and/or the physical gaming device. For example, intermediary server system 30 can prevent such concurrent occupation of the same player role whether such multiple players (e.g., multiple users 102) attempt to concurrently occupy the same player role via the metaverse gaming device in the metaverse gaming environment or via the physical gaming device in the physical gaming environment.

In additional and/or alternative embodiments, intermediary server system 30 can sync, couple, and/or otherwise associate the metaverse gaming device with the physical gaming device such that intermediary server system 30 can allow multiple players (e.g., multiple users 102) to concurrently occupy the same player role in a gameplay executed via the metaverse gaming device and/or the physical gaming device. For example, intermediary server system 30 can allow such concurrent occupation of the same player role whether such multiple players (e.g., multiple users 102) attempt to concurrently occupy the same player role in a gameplay executed via the metaverse gaming device in the metaverse gaming environment or the physical gaming device in the physical gaming environment. In one embodiment, intermediary server system 30 can sync, couple, and/or otherwise associate a metaverse gaming device with a physical gaming device as described above such that the multiple players (e.g., multiple users 102) can concurrently occupy the same player role in the gameplay to, for instance, share a gaming and/or social experience resulting from and/or otherwise associated with execution of the gameplay via the metaverse gaming device and/or the physical gaming device.

In one or more embodiments of the present disclosure, intermediary server system 30 can associate the metaverse gaming device and/or the physical gaming device with an NFT such as, for instance, an NFT 144. For example, in some embodiments, intermediary server system 30 can associate the physical gaming device with an NFT 144 such that NFT 144 constitutes a representation of the physical gaming device in the metaverse gaming environment. For instance, in these or other embodiments, such an NFT 144 can be used in the metaverse gaming environment and/or the physical gaming environment to implement and/or reflect one or more events corresponding to the physical gaming device that occur in the physical gaming environment. In one or more other embodiments, intermediary server system 30 can associate NFT 144 with the metaverse gaming device, where the metaverse gaming device can be synced, coupled, and/or otherwise associated with the physical gaming device as described above. In this manner, intermediary server system 30 according to example embodiments described herein can thereby associate NFT 144 with the metaverse gaming device and the physical gaming device, where NFT 144 can represent the metaverse gaming device and the association of the metaverse gaming device with the physical gaming device (e.g., the association established via the above-described syncing of the metaverse gaming device with the physical gaming device).

In one embodiment, intermediary server system 30 can associate an NFT 144 with the metaverse gaming device and/or the physical gaming device by creating and/or defining a machine-readable contract such as, for instance, smart contract 43 as described herein that can include data that is descriptive of the identity of NFT 144, the identity of the metaverse gaming device, and/or the identity of the physical gaming device. In this or another embodiment, smart contract 43 can further include pre-defined terms and/or conditions corresponding to NFT 144, the metaverse gaming device, and/or the physical gaming device. In this or another embodiment, intermediary server system 30 can create and/or define smart contract 43 such that it includes digital asset identification data of NFT 144 that smart contract 43 and/or the pre-defined terms and/or conditions thereof can associate with identification data of the metaverse gaming device (e.g., identification data descriptive of the above-described application software that can constitute the metaverse gaming device) and/or identification data of the physical gaming device (e.g., serial number, model number, etc.).

In another embodiment, intermediary server system 30 can associate an NFT 144 with the metaverse gaming device and/or the physical gaming device by implementing the same or similar process as described above for associating a player (e.g., a user 102) with an NFT (e.g., an NFT 144). For instance, in this or another embodiment, intermediary server system 30 can associate NFT 144 with the metaverse gaming device and/or the physical gaming device by generating NFT 144 and gaming device identification data that can associate NFT 144 with the metaverse gaming device and/or the physical gaming device, where such NFT 144 and gaming device identification data can include and/or constitute embedded data descriptive of NFT 144, the metaverse gaming device, and/or the physical gaming device. For example, in this or another embodiment, the NFT 144 and gaming device identification data and/or the embedded data descriptive of NFT 144, the metaverse gaming device, and/or the physical gaming device can include and/or constitute: digital asset identification data corresponding to NFT 144; data descriptive of an identifier corresponding to NFT 144, where the identifier can include and/or constitute data indicative of a storage location where NFT 144 is stored (e.g., the identifier can include and/or constitute a pointer and/or a computer program object having a memory address where NFT 144 is stored); identification data of the metaverse gaming device (e.g., identification data descriptive of the above-described application software that can constitute the metaverse gaming device); identification data of the physical gaming device (e.g., serial number, model number, etc.); and/or other data descriptive of NFT 144, the metaverse gaming device, and/or the physical gaming device. In some embodiments, intermediary server system 30 can encrypt and/or otherwise encode the above-described NFT 144 and gaming device identification data and/or embedded data descriptive of NFT 144, the metaverse gaming device, and/or the physical gaming device such that the data is protected and/or secured from interception, viewing, and/or use by one or more unintended third-parties.

In some embodiments of the present disclosure, intermediary server system 30 can create a gaming device identification code that can include the above-described NFT 144 and gaming device identification data and/or embedded data descriptive of NFT 144, the metaverse gaming device, and/or the physical gaming device. For example, in at least one embodiment, based at least in part on (e.g., in response to) generating the NFT 144 and gaming device identification data, intermediary server system 30 can create the above-described gaming device identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT 144 and gaming device identification data and/or embedded data descriptive of NFT 144, the metaverse gaming device, and/or the physical gaming device. In one or more embodiments, intermediary server system 30 can provide (e.g., via one or more computing devices 3502, network 18, user computing device 50, cross-channel application 52, GUI 420, etc.) the gaming device identification code to, for instance, user 102 and/or another entity that can use the gaming device identification code in the same or similar manner as described above to implement and/or otherwise utilize NFT 144, the metaverse gaming device (e.g., to execute a game via the metaverse gaming device, to transfer ownership of NFT 144 and/or the metaverse gaming device, etc.), and/or the physical gaming device (e.g., to record gameplay outcome(s) output by the physical gaming device, to transfer ownership of NFT 144 and/or the physical gaming device, etc.).

In at least one embodiment, intermediary server system 30 can record data descriptive of NFT 144, the metaverse gaming device, and/or the physical gaming device on a blockchain (e.g., blockchain 142, blockchain 440, etc.) in accordance with one or more embodiments described herein. For example, in this or another embodiment, intermediary server system 30 can employ the above-described smart contract 43 to record, on one or more blocks 442 of blockchain 142 and/or blockchain 440, data that can include, for instance: data descriptive of the identity of the metaverse gaming device (e.g., identification data descriptive of the above-described application software that can constitute the metaverse gaming device); data descriptive of the identity of the physical gaming device (e.g., serial number, model number, etc.); data descriptive of the identity of NFT 144 (e.g., digital asset identification data of NFT 144); data indicative of a location of NFT 144 (e.g., the above-described identifier and/or pointer); data indicative of an entity's ownership of NFT 144, the metaverse gaming device, and/or the physical gaming device; data descriptive of the above-described gaming device identification code; data descriptive of the above-described NFT 144 and gaming device identification data; data descriptive of the above-described embedded data descriptive of NFT 144, the metaverse gaming device, and/or the physical gaming device; and/or other data that can be descriptive of NFT 144, the metaverse gaming device, and/or the physical gaming device.

According to one or more embodiments described herein, intermediary server system 30 can provide an outcome of a gameplay that can be executed via the metaverse gaming device or the physical gaming device to one or more players (e.g., one or more users 102) in the metaverse gaming environment and/or the physical gaming environment. For example, in at least one embodiment, intermediary server system 30 can provide (e.g., via one or more computing devices 3502, network 18, user computing device 50, cross-channel application 52, GUI 420, etc.) data descriptive of an outcome (e.g., win, loss, tie, etc.) of a gameplay that can be executed via the metaverse gaming device or the physical gaming device to one or more users 102 participating in the gameplay via the metaverse gaming device in the metaverse gaming environment and/or via the physical gaming device in the physical gaming environment. That is, for instance, in this example embodiment, intermediary server system 30 can provide the outcome of the gameplay to such one or more users 102 via the metaverse gaming device and/or the physical gaming device.

As an example, in some embodiments, intermediary server system 30 can receive (e.g., via user computing device 50, cross-channel application 52, and/or GUI 420) a request from user 102 employing the metaverse gaming device to allow user 102 to participate in a gameplay via the metaverse gaming device, where the gameplay is to be executed via the physical gaming device. In these or other example embodiments, intermediary server system 30 can provide user 102 with the outcome of the gameplay via the metaverse gaming device (e.g., via one or more augmented reality and/or virtual reality processes and/or devices, user computing device 50, cross-channel application 52, GUI 420, etc.). As another example, in additional and/or alternative embodiments, intermediary server system 30 can receive (e.g., via user computing device 50, cross-channel application 52, and/or GUI 420) a request from a player employing the physical gaming device to allow user 102 to participate in a gameplay via the physical gaming device, where the gameplay is to be executed via the metaverse gaming device. In these or other example embodiments, intermediary server system 30 can provide user 102 with the outcome of the gameplay via the physical gaming device (e.g., via gaming machine 500, one or more computing devices 3502, user computing device 50, cross-channel application 52, GUI 420, etc.).

In at least one example embodiment of the present disclosure, intermediary server system 30 can associate the above-described outcome of the gameplay with an NFT such as, for instance, an NFT 144. In one embodiment, intermediary server system 30 can associate the outcome with an NFT 144 by creating and/or defining a machine-readable contract such as, for instance, smart contract 43 as described herein that can include data that is descriptive of the outcome, the identity of the outcome, and the identity of NFT 144. In this or another embodiment, smart contract 43 can further include pre-defined terms and/or conditions corresponding to the outcome and/or NFT 144. In this or another embodiment, intermediary server system 30 can create and/or define smart contract 43 such that it includes digital asset identification data of NFT 144 that smart contract 43 and/or the pre-defined terms and/or conditions thereof can associate with data descriptive of the outcome and/or the identity of the outcome.

In another embodiment, intermediary server system 30 can associate the above-described outcome with an NFT 144 by implementing the same or similar process as described above for associating a player (e.g., a user 102) with an NFT (e.g., an NFT 144) and/or for associating an NFT (e.g., an NFT 144) with a metaverse gaming device and/or a physical gaming device. For instance, in this or another embodiment, intermediary server system 30 can associate the outcome with an NFT 144 by generating NFT 144 and outcome identification data that can associate the outcome with NFT 144, where the NFT 144 and outcome identification data can include and/or constitute embedded data descriptive of the outcome and NFT 144. For example, in this or another embodiment, the NFT 144 and outcome identification data and/or the embedded data descriptive of the outcome and NFT 144 can include and/or constitute: digital asset identification data corresponding to NFT 144; data descriptive of an identifier corresponding to NFT 144, where the identifier can include and/or constitute data indicative of a storage location where NFT 144 is stored (e.g., the identifier can include and/or constitute a pointer and/or a computer program object having a memory address where NFT 144 is stored); data descriptive of the outcome (e.g., data descriptive of a win, loss, and/or tie, data descriptive of a value (e.g., monetary value) corresponding to the outcome, etc.); identification data of the outcome (e.g., a digital code, digital number, and/or another digital identifier that can identify the outcome as being the result of a certain gameplay executed via the metaverse gaming device or the physical gaming device); and/or other data descriptive of the outcome and/or NFT 144. In some embodiments, intermediary server system 30 can encrypt and/or otherwise encode the above-described NFT 144 and outcome identification data and/or embedded data descriptive of the outcome and NFT 144 such that the data is protected and/or secured from interception, viewing, and/or use by one or more unintended third-parties.

In some embodiments of the present disclosure, intermediary server system 30 can create an outcome identification code that can include the above-described NFT 144 and outcome identification data and/or embedded data descriptive of the outcome and NFT 144. For example, in at least one embodiment, based at least in part on (e.g., in response to) generating the NFT 144 and outcome identification data, intermediary server system 30 can create the above-described outcome identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT 144 and outcome identification data and/or embedded data descriptive of the outcome and NFT 144. In one or more embodiments, intermediary server system 30 can provide (e.g., via one or more computing devices 3502, network 18, user computing device 50, cross-channel application 52, GUI 420, etc.) the outcome identification code to, for instance, user 102 and/or another entity that can use the outcome identification code in the same or similar manner as described above to implement and/or otherwise utilize NFT 144 and/or the outcome (e.g., to redeem a monetary value corresponding to the outcome).

In at least one embodiment, intermediary server system 30 can record data descriptive of the outcome and/or NFT 144 on a blockchain (e.g., blockchain 142 and/or blockchain 440) in accordance with one or more embodiments described herein. In one or more embodiments, intermediary server system 30 can record on one or more blocks 442 of blockchain 142 and/or blockchain 440 data descriptive of an association of the outcome of the gameplay with NFT 144, the metaverse gaming device, and/or the physical gaming device. For example, intermediary server system 30 can employ the above-described smart contract 43 to record, on one or more blocks 442 of blockchain 142 and/or blockchain 440, data that can include, for instance: data descriptive of the outcome (e.g., data descriptive of a win, loss, and/or tie, data descriptive of a value (e.g., monetary value) corresponding to the outcome, etc.); identification data of the outcome (e.g., a digital code, digital number, and/or another digital identifier that can identify the outcome as being the result of a certain gameplay executed via the metaverse gaming device or the physical gaming device); data descriptive of an association of the outcome with the metaverse gaming device and/or the physical gaming device (e.g., data descriptive of the outcome being the result of a certain gameplay executed via the metaverse gaming device or the physical gaming device); data descriptive of the identity of NFT 144 (e.g., digital asset identification data of NFT 144); data indicative of a location of NFT 144 (e.g., the above-described identifier and/or pointer); data indicative of a user's 102 ownership of NFT 144 and/or the outcome (e.g., data descriptive of user's 102 identity and data descriptive of how user 102 received the outcome and/or NFT 144 as a result of winning a certain gameplay executed via the metaverse gaming device or the physical gaming device); data descriptive of the above-described outcome identification code; data descriptive of the above-described NFT 144 and outcome identification data; data descriptive of the above-described embedded data descriptive of the outcome and NFT 144; and/or other data that can be descriptive of the outcome and/or NFT 144.

According to one or more embodiments described herein, to facilitate integration of NFT and/or metaverse components and/or functionality in a gaming environment, intermediary server system 30 can configure an NFT 144 such that it can be used and/or redeemed by different entities in the metaverse gaming environment, the physical gaming environment, and/or another environment (e.g., another physical environment, computing environment, and/or computer-based gaming environment). For example, intermediary server system 30 can configure any of NFTs 144 described in one or more embodiments of the present disclosure such that any of NFTs 144 can be used and/or redeemed by different entities (e.g., different players, different product and/or service vendors, etc.) in the metaverse gaming environment, the physical gaming environment, and/or another environment (e.g., by a different real-world casino, by a non-gaming organization (e.g., a product and/or service vendor), and/or by another entity).

In one embodiment, intermediary server system 30 can create such a redeemable NFT 144 and provide it (e.g., via one or more computing devices 3502, network 18, user computing device 50, cross-channel application 52, GUI 420, etc.) to a user 102 in the metaverse gaming environment and/or the physical gaming environment. In some embodiments, intermediary server system 30 can configure such a redeemable NFT 144 such that it is associated with and/or can be redeemed to receive a digital asset (e.g., another NFT 144, crypto currency, etc.) in the metaverse gaming environment and/or a physical asset (e.g., a car) in the physical gaming environment and/or another physical environment.

In at least one embodiment, intermediary server system 30 can configure such a redeemable NFT 144 such that it includes, constitutes, and/or is otherwise associated with, for example, a voucher that can be used and/or redeemed by different entities (e.g., different players, different product and/or service vendors, etc.) in the metaverse gaming environment, the physical gaming environment, and/or another environment (e.g., another physical environment, computing environment, and/or computer-based gaming environment). For example, in at least one embodiment, intermediary server system 30 can associate a voucher with an NFT 144 that has been actioned to a user 102 in the metaverse gaming environment (e.g., ownership of NFT 144 has been transferred to user 102 in the metaverse gaming environment). In this or another embodiment, intermediary server system 30 can associate the voucher with NFT 144 and configure the voucher such that it can be redeemed by user 102 via one or more entities (e.g., different players, different product and/or service vendors, etc.) in the metaverse gaming environment, the physical gaming environment, and/or another environment (e.g., another physical environment, computing environment, and/or computer-based gaming environment). For instance, in this or another embodiment, intermediary server system 30 can associate the voucher with NFT 144 and configure the voucher such that it can be redeemed by user 102 to action NFT 144 (e.g., transfer ownership of NFT 144) to an entity (e.g., a product or service provider, a gaming organization, etc.) in the metaverse gaming environment, the physical gaming environment, and/or another environment (e.g., another physical environment, computing environment, and/or computer-based gaming environment).

In one example embodiment, a user 102 can participate in a gameplay that can be executed via the metaverse gaming device in the metaverse gaming environment. In this example embodiment, the metaverse gaming device can output a winning outcome in favor of user 102 (e.g., user 102 can win) and the metaverse gaming device and/or intermediary server system 30 can provide (e.g., via one or more computing devices 3502, network 18, user computing device 50, cross-channel application 52, GUI 420, etc.) user 102 with an award corresponding to the winning outcome (e.g., a monetary value, an asset, a service, etc.). In this example embodiment, intermediary server system 30 can associate the winning outcome with an NFT 144 and can further associate NFT 144 with, for instance, a voucher that user 102 and/or another entity (e.g., another player, a product or service vendor, etc.) can use and/or redeem in the metaverse gaming environment, the physical gaming environment, and/or another environment (e.g., another physical environment, computing environment, and/or computer-based gaming environment). For example, in this example embodiment, the voucher can be redeemed to receive the winning outcome (e.g., an asset, a product, a service, etc.) and/or the value (e.g., monetary value) corresponding to the winning outcome. In one embodiment, user 102 can redeem the voucher at a real, physical product and/or service vendor such as, for instance, a car dealership located in the real, physical world, where user 102 can redeem the voucher to receive the monetary value of the winning outcome and/or apply such monetary value toward the purchase of a vehicle from the car dealership.

In accordance with one or more embodiments of the present disclosure, to facilitate configuring an NFT 144 such that it can be used and/or redeemed by different entities across different gaming channels and/or different environments as described above, intermediary server system 30 can associate an NFT 144 with, for instance, a voucher that can be used and/or redeemed by such different entities across such different environments. In at least one embodiment, to facilitate such association of an NFT 144 with a voucher such that NFT 144 and/or the voucher can be used and/or redeemed by such different entities across such different environments, intermediary server system 30 can associate an NFT 144 with the voucher by implementing the same or similar process as described above for associating a player (e.g., a user 102) with an NFT (e.g., an NFT 144) and/or for associating an NFT (e.g., an NFT 144) with a metaverse gaming device and/or a physical gaming device.

In at least one embodiment, intermediary server system 30 can associate an NFT 144 with the voucher by generating NFT 144 and voucher identification data that can associate an NFT 144 with the voucher, where the NFT 144 and voucher identification data can include and/or constitute embedded data descriptive of NFT 144 and the voucher. For example, in this or another embodiment, the NFT 144 and voucher identification data and/or the embedded data descriptive of NFT 144 and the voucher can include and/or constitute: digital asset identification data corresponding to NFT 144; data descriptive of an identifier corresponding to NFT 144, where the identifier can include and/or constitute data indicative of a storage location where NFT 144 is stored (e.g., the identifier can include and/or constitute a pointer and/or a computer program object having a memory address where NFT 144 is stored); data descriptive of the voucher (e.g., data descriptive of which entities can use and/or redeem the voucher in which environment, data descriptive of an expiration date of the voucher, data descriptive of an asset, a value (e.g., monetary value), a product, and/or a service corresponding to the voucher and/or NFT 144, etc.); identification data of the voucher (e.g., a digital code, digital number, and/or another digital identifier that can identify the voucher); and/or other data descriptive of NFT 144 and/or the voucher. In some embodiments, intermediary server system 30 can encrypt and/or otherwise encode the above-described NFT 144 and voucher identification data and/or embedded data descriptive of NFT 144 and the voucher such that the data is protected and/or secured from interception, viewing, and/or use by one or more unintended third-parties.

In some embodiments of the present disclosure, intermediary server system 30 can create a voucher identification code that can include the above-described NFT 144 and voucher identification data and/or embedded data descriptive of NFT 144 and the voucher. For example, in at least one embodiment, based at least in part on (e.g., in response to) generating the NFT 144 and voucher identification data, intermediary server system 30 can create the above-described voucher identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT 144 and voucher identification data and/or embedded data descriptive of NFT 144 and the voucher. In one or more embodiments, intermediary server system 30 can provide (e.g., via one or more computing devices 3502, network 18, user computing device 50, cross-channel application 52, GUI 420, etc.) the voucher identification code and/or the voucher to, for instance, user 102 and/or another entity that can use the voucher identification code in the same or similar manner as described above to implement and/or otherwise utilize NFT 144 and/or the voucher (e.g., to redeem an asset, product, service, and/or monetary value corresponding to the voucher).

In at least one embodiment, intermediary server system 30 can record on a blockchain (e.g., blockchain 142 and/or blockchain 440) data descriptive of NFT 144, the voucher, and/or ownership of NFT 144 and/or the voucher by user 102 in accordance with one or more embodiments described herein. In one or more embodiments, intermediary server system 30 can employ the above-described smart contract 43 to record, on one or more blocks 442 of blockchain 142 and/or blockchain 440, data that can include, for instance: data descriptive of the voucher (e.g., data descriptive of which entities can use and/or redeem the voucher in which environment, data descriptive of an expiration date of the voucher, data descriptive of an asset, a value (e.g., monetary value), a product, and/or a service corresponding to the voucher and/or NFT 144, etc.); identification data of the voucher (e.g., a digital code, digital number, and/or another digital identifier that can identify the voucher); identification data of the entity that generated and/or issued the voucher (e.g., identity data corresponding to a gaming entity (e.g., gaming organization, casino, company, etc.) and/or another entity that generated and/or issued the voucher); data descriptive of the identity of NFT 144 (e.g., digital asset identification data of NFT 144); data indicative of a location of NFT 144 (e.g., the above-described identifier and/or pointer); data indicative of a user's 102 ownership of NFT 144 and/or the voucher (e.g., data descriptive of user's 102 identity and data descriptive of how user 102 obtained the voucher and/or NFT 144 (e.g., as a result of winning a certain gameplay executed via the metaverse gaming device or the physical gaming device), etc.); data descriptive of the above-described voucher identification code; data descriptive of the above-described NFT 144 and voucher identification data; data descriptive of the above-described embedded data descriptive of the voucher and NFT 144; and/or other data that can be descriptive of the voucher and/or NFT 144.

According to one or more embodiments of the present disclosure, intermediary server system 30 can receive data indicative of user 102 redeeming NFT 144 and/or the voucher in the metaverse gaming environment, the physical gaming environment, and/or another environment (e.g., another physical environment, computing environment, and/ or computer-based gaming environment). For example, in one embodiment, user 102 can obtain NFT 144 and/or the voucher in the metaverse gaming environment and/or the physical gaming environment as described above and can redeem NFT 144 and/or the voucher via an entity such as, for instance, a product and/or service vendor located in another environment (e.g., another physical environment, computing environment, and/or computer-based gaming environment). In this or another example embodiment, intermediary server system 30 can receive from such an entity (e.g., via a network such as, for instance, a WAN, a LAN, the Internet, etc.) data indicative of user 102 redeeming NFT 144 and/or the voucher via such an entity (e.g., data indicative of user 102 redeeming the voucher to receive a monetary value corresponding to NFT 144 and/or to apply such a monetary value toward the purchase of a product and/or service offered by the entity).

In another example embodiment, user 102 can obtain NFT 144 and/or the voucher in the form of the above-described voucher identification code (e.g., a QR code) that can associate NFT 144 with the voucher. In this or another example embodiment, user 102 can obtain such a voucher identification code in the metaverse gaming environment and/or the physical gaming environment as described above and can use the voucher identification code to redeem NFT 144 and/or the voucher via an entity located in the metaverse gaming environment, the physical gaming environment, and/or another environment (e.g., another physical environment, computing environment, and/or computer-based gaming environment). In this or another example embodiment, intermediary server system 30 can receive (e.g., via a network such as, for instance, a WAN, a LAN, the Internet, etc.) data indicative of user 102 using the voucher identification code in the metaverse gaming environment, the physical gaming environment, and/or another environment. For example, in one embodiment, intermediary server system 30 can receive input data indicative of, for instance, scanned data from a scanner that has been used to scan the voucher identification code (e.g., a QR code) and/or other input data indicative of user's 102 use of the voucher identification code to redeem NFT 144 and/or the voucher via an entity located in the metaverse gaming environment, the physical gaming environment, and/or another environment (e.g., another physical environment, computing environment, and/or computer-based gaming environment).

In accordance with at least one embodiment described herein, intermediary server system 30 can record on a blockchain (e.g., blockchain 142 and/or blockchain 440) data indicative of user 102 redeeming NFT 144 and/or the voucher in the metaverse gaming environment, the physical gaming environment, and/or another environment (e.g., another physical environment, computing environment, and/ or computer-based gaming environment). For instance, in one or more embodiments, such data indicative of user 102 redeeming NFT 144 and/or the voucher can include and/or constitute data indicative and/or descriptive of a transfer of user's 102 ownership of NFT 144 and/or the voucher to an entity that redeemed NFT 144 and/or voucher. In these one or more example embodiments, intermediary server system 30 can employ the above-described smart contract 43 to record, on one or more blocks 442 of blockchain 142 and/or blockchain 440, data that can include, for instance: data descriptive of the identity of NFT 144 (e.g., digital asset identification data of NFT 144); data indicative of a location of NFT 144 (e.g., the above-described identifier and/or pointer); data descriptive of the identity of user 102 (e.g., name, username, account identification data, etc.); data descriptive of the identity of the entity that is the new owner of NFT 144 (e.g., organization and/or company name, tax identification number, etc.); data descriptive of the above-described voucher identification code; data descriptive of the above-described NFT 144 and voucher identification data; data descriptive of the above-described embedded data descriptive of the voucher and NFT 144; and/or other data that can be descriptive of the voucher and/or NFT 144.

According to one or more embodiments of the present disclosure, intermediary server system 30 can associate an NFT 144 with a user 102 associated with the metaverse gaming environment (also referred to as a "metaverse user 102"). For example, in one or more embodiments, intermediary server system 30 can associate an NFT 144 with metaverse user 102, an account of metaverse user 102 (e.g., a metaverse gaming account), and/or one or more privileges of metaverse user 102, where the one or more privileges can be associated with the metaverse gaming environment, the physical gaming environment, and/or another environment (e.g., another physical environment, computing environment, and/or computer-based gaming environment).

In one embodiment, intermediary server system 30 can associate an NFT 144 with the above-described metaverse user 102 by creating and/or defining a machine-readable contract such as, for instance, smart contract 43 as described herein that can include data that is descriptive of the identity of NFT 144, descriptive of the identity of metaverse user 102, descriptive of an account of metaverse user 102 (e.g., a metaverse gaming account), and/or descriptive of the above-described one or more privileges of metaverse user 102 that can be associated with the metaverse gaming environment, the physical gaming environment, and/or another environment (e.g., another physical environment, computing environment, and/or computer-based gaming environment). In this or another embodiment, smart contract 43 can further include pre-defined terms and/or conditions corresponding to NFT 144, metaverse user 102, an account of metaverse user 102 (e.g., a metaverse gaming account), and/or such one or more privileges of metaverse user 102 that can be associated with the metaverse gaming environment, the physical gaming environment, and/or another environment. In this or another embodiment, intermediary server system 30 can create and/or define smart contract 43 such that it includes digital asset identification data of NFT 144 that smart contract 43 and/or the pre-defined terms and/or conditions thereof can associate with identification data of metaverse user 102, identification data of an account of metaverse user 102 (e.g., a metaverse gaming account number), and/or data descriptive of the above-described one or more privileges of metaverse user 102.

In another embodiment, intermediary server system 30 can associate an NFT 144 with the above-described metaverse user 102 by implementing the same or similar process as described above for associating a player (e.g., a user 102) with an NFT (e.g., an NFT 144). For instance, in this or another embodiment, intermediary server system 30 can associate an NFT 144 with metaverse user 102 by generating NFT 144 and metaverse player identification data that can associate NFT 144 with metaverse user 102, an account of metaverse user 102, and/or the above-described one or more privileges of metaverse user 102, where the NFT 144 and metaverse player identification data can include and/or constitute embedded data descriptive of NFT 144, metaverse user 102, an account of metaverse user 102, and/or the above-described one or more privileges of metaverse user 102. For example, in this or another embodiment, the NFT 144 and metaverse player identification data and/or the embedded data descriptive of NFT 144, metaverse user 102, an account of metaverse user 102, and/or the above-described one or more privileges of metaverse user 102 can include and/or constitute: digital asset identification data corresponding to NFT 144; data descriptive of an identifier corresponding to NFT 144, where the identifier can include and/or constitute data indicative of a storage location where NFT 144 is stored (e.g., the identifier can include and/or constitute a pointer and/or a computer program object having a memory address where NFT 144 is stored); identification data of metaverse user 102 (e.g., name, metaverse username, e-mail address, telephone number, etc.); identification data of an account of metaverse user 102 (e.g., a metaverse gaming account number associated with the metaverse gaming environment, a metaverse gaming account username, metaverse user 102's digital wallet data, etc.); data descriptive of the above-described one or more privileges of metaverse user 102 (e.g., a pre-defined privilege level having certain privileges granted to metaverse user 102 by an entity in the metaverse gaming environment); and/or other data descriptive of NFT 144, metaverse user 102, an account of metaverse user 102, and/or the above-described one or more privileges of metaverse user 102. In some embodiments, intermediary server system 30 can encrypt and/or otherwise encode the above-described NFT 144 and metaverse player identification data and/or embedded data descriptive of NFT 144, metaverse user 102, an account of metaverse user 102, and/or the above-described one or more privileges of metaverse user 102 such that the data is protected and/or secured from interception, viewing, and/or use by one or more unintended third-parties.

In some embodiments of the present disclosure, intermediary server system 30 can create a metaverse player identification code that can include the above-described NFT 144 and metaverse player identification data and/or embedded data descriptive of NFT 144, metaverse user 102, an account of metaverse user 102, and/or the above-described one or more privileges of metaverse user 102. For example, in at least one embodiment, based at least in part on (e.g., in response to) generating the NFT 144 and metaverse player identification data, intermediary server system 30 can create the above-described metaverse player identification code such as, for instance, a barcode, a quick response (QR) code (e.g., an audio QR code, a visual QR code, etc.), an audio code, a visual code, a numeric code, a textual code, an alphanumeric code, and/or another type of code that can include the NFT 144 and metaverse player identification data and/or embedded data descriptive of NFT 144, metaverse user 102, an account of metaverse user 102, and/or the above-described one or more privileges of metaverse user 102. In one or more embodiments, intermediary server system 30 can provide (e.g., via one or more computing devices 3502, network 18, user computing device 50, cross-channel application 52, GUI 420, etc.) the metaverse player identification code to, for instance, metaverse user 102 and/or another entity that can use the metaverse player identification code in the same or similar manner as described above to implement and/or otherwise utilize NFT 144, an account of metaverse user 102, and/or the above-described one or more privileges of metaverse user 102 that can be associated with the metaverse gaming environment, the physical gaming environment, and/or another environment (e.g., another physical environment, computing environment, and/or computer-based gaming environment).

As an example, in one embodiment, metaverse user 102 can utilize the metaverse player identification code in the physical gaming environment and/or another environment (e.g., another physical environment, computing environment, and/or computer-based gaming environment) to implement and/or exercise one or more privileges granted to metaverse user 102 by an entity in the metaverse gaming environment. In another example embodiment, metaverse user 102 can utilize the metaverse player identification code in the physical gaming environment and/or another environment to complete a transaction with an entity in the physical gaming environment and/or such other environment using digital funds from metaverse user's 102 metaverse gaming account associated with the metaverse gaming environment.

In at least one embodiment, intermediary server system 30 can record data descriptive of NFT 144, metaverse user 102, an account of metaverse user 102, and/or the above-described one or more privileges of metaverse user 102 on a blockchain (e.g., blockchain 142 and/or blockchain 440) in accordance with one or more embodiments described herein. For example, in this or another embodiment, intermediary server system 30 can employ the above-described smart contract 43 to record, on one or more blocks 442 of blockchain 142 and/or blockchain 440, data that can include, for instance: data descriptive of the identity of NFT 144 (e.g., digital asset identification data of NFT 144); data indicative of a location of NFT 144 (e.g., the above-described identifier and/or pointer); data descriptive of the identity of metaverse user 102 (e.g., name, metaverse username, e-mail address, telephone number, etc.); data descriptive of an account of metaverse user 102 (e.g., metaverse gaming account number, metaverse gaming account username, metaverse user's 102 digital wallet data, etc.); data descriptive of the above-described one or more privileges of metaverse user 102 (e.g., a pre-defined privilege level having certain privileges granted to metaverse user 102 by an entity in the metaverse gaming environment); data indicative of metaverse user's 102 ownership of NFT 144, metaverse user's 102 association with an metaverse gaming account of metaverse user 102, and/or metaverse user's 102 association with the above-described one or more privileges of metaverse user 102; data descriptive of the above-described metaverse player identification code; data descriptive of the above-described NFT 144 and metaverse player identification data; data descriptive of the above-described embedded data descriptive of NFT 144, metaverse user 102, an account of metaverse user 102, and/or the above-described one or more privileges of metaverse user 102; and/or other data that can be descriptive of NFT 144, metaverse user 102, an account of metaverse user 102, and/or the above-described one or more privileges of metaverse user 102.

In at least one example embodiment, intermediary server system 30 can store data that is descriptive of each of the above-described identification codes (e.g., the gaming device identification code, the outcome identification code, the voucher identification code, and/or the metaverse player identification code) on one or more memory devices 3506. For instance, in this or another example embodiment, intermediary server system 30 can store, one or more memory devices 3506, data that respectively describes the gaming device identification code, the outcome identification code, the voucher identification code, and/or the metaverse player identification code. For example, in this or another example embodiment, with respect to each of such identification codes, intermediary server system 30 can store data that can include, for instance: data descriptive of the identification code; data descriptive of the identification data and/or the embedded data that can be embodied with the identification code; data descriptive of NFT 144 (e.g., digital asset identification data); and/or data descriptive of the associations defined within the identification code (e.g., association of a gaming device with an NFT 144, association of a gameplay outcome with an NFT 144, association of a voucher with an NFT 144, association of a metaverse player with an NFT 144, etc.). In another embodiment, intermediary server system 30 can store each NFT 144 associated with each identification code and/or data indicative of the location of each NFT 144 (e.g., the above-described identifier and/or pointer) on one or more memory devices 3506.

According to one or more embodiments of the present disclosure, to facilitate validating one or more of the above-described identification codes (e.g., the gaming device identification code, the outcome identification code, the voucher identification code, and/or the metaverse player identification code) against the respective identification data and/or embedded data that can be embodied with each of such identification codes (e.g., to confirm authenticity of NFT 144 and/or the associations defined within the identification code(s)), intermediary server system 30 can access one or more storage locations and/or devices to respectively analyze, for instance: the identification data and/or embedded data that can be embodied with each identification code; and/or NFT 144. For example, in one embodiment, to facilitate such validation of each of such identification codes, the respective NFTs 144, and/or the respective associations defined within each of such identification codes, intermediary server system 30 can access one or more memory devices 3506 that can store, for instance: data descriptive of each identification code; data descriptive of the identification data and/or the embedded data that can be embodied with each identification code; data descriptive of each NFT 144 (e.g., digital asset identification data); and/or data descriptive of the associations defined within each identification code (e.g., association of a gaming device with an NFT 144, association of a gameplay outcome with an NFT 144, association of a voucher with an NFT 144, association of a metaverse player with an NFT 144, etc.); and/or each NFT 144. In another embodiment, to facilitate such validation of each of the above-described identification codes, each NFT 144 corresponding to each of such identification codes, and/or the respective associations defined within each of such identification codes, intermediary server system 30 can access the above-described one or more blocks 442 of blockchain 142 and/or blockchain 440 to analyze data that is descriptive and/or indicative of each of such identification codes, each such NFT 144, and/or each of such respective associations.

Aspects of the present disclosure provide numerous technical effects and benefits. For example, by facilitating integration of NFT and metaverse components and/or functionality in a gaming environment in accordance with one or more example embodiments of the present disclosure, intermediary server system 30 described herein can provide a user 102 with a borderless, boundaryless, and interleaved real-virtual world gaming experience across the metaverse gaming environment, the physical gaming environment, and/or another environment. Further, by facilitating integration of NFT and metaverse components and/or functionality in a gaming environment in accordance with one or more example embodiments of the present disclosure, intermediary server system 30 described herein can provide a user 102 with such a borderless, boundaryless, and interleaved real-virtual world gaming experience across different gaming channels and/or different entities that exist in, operate in, and/or are otherwise associated with any or all of such environments.

In accordance with at least one embodiment described herein, intermediary server system 30 can sync, couple, and/or otherwise associate a metaverse gaming device of a metaverse gaming environment with a physical gaming device of a physical gaming environment. In another embodiment, intermediary server system 30 can employ an augmented and/or virtual reality process to provide a metaverse gaming experience to a user 102 participating in a gameplay via a physical gaming device located in a physical gaming environment. Accordingly, in these or other embodiments, intermediary server system 30 can thereby provide one or more users 102 participating in a game in a physical gaming environment and/or a metaverse gaming environment with a borderless, boundaryless, and interleaved real-virtual world gaming experience across the metaverse gaming environment and the physical gaming environment.

In one or more embodiments described herein, intermediary server system 30 can associate an NFT 144 with a user 102 associated with a metaverse gaming environment such that user 102 can have an NFT enabled gaming experience across the metaverse gaming environment, a physical gaming environment, and/or another environment while protecting and/or keeping confidential, the digital asset identification data of NFT 144. For example, by providing the above-described metaverse player identification code that can associate an NFT 144 with a metaverse user 102 associated with a metaverse gaming environment, an account of such a metaverse user 102 (e.g., a metaverse gaming account associated with the metaverse gaming environment), and/or one or more privileges of such a metaverse user 102, intermediary server system 30 according to example embodiments described herein can thereby provide such a metaverse user 102 with an NFT enabled gaming experience across the metaverse gaming environment, a physical gaming environment, and/or another environment while protecting and/or keeping confidential, the digital asset identification data of NFT 144.

In some embodiments, the above-described computing system and/or one or more of the identification codes described above (e.g., the gaming device identification code, the outcome identification code, the voucher identification code, and/or the metaverse player identification code) can also provide a user 102 with an NFT enabled gaming experience across one or more gaming and/or computing environments (e.g., metaverse gaming environment, physical gaming environment, etc.), regardless of whether such environments have one or more resources (e.g., software applications, hardware, infrastructure, communication protocols, services, etc.) that provide and/or support NFT enabled operations and/or transactions involving use of a decentralized digital ledger (e.g., digital ledger platform 40, digital ledger layer 42, etc.) such as, for example, a blockchain (e.g., blockchain 142 and/or blockchain 440). That is, for instance, intermediary server system 30 and/or such identification code(s) according to example embodiments of the present disclosure can allow for elimination (e.g., by intermediary server system 30 and/or one or more resources thereof and/or associated therewith) of the task of accessing data on a blockchain (e.g., each time a user 102 utilizes such identification code(s) to access and/or implement NFT 144) to confirm authenticity of NFT 144 (e.g., the existence of NFT 144) and/or a user's 102 ownership interest(s) associated with such NFT 144. Consequently, in these or other embodiments, intermediary server system 30 and/or such identification code(s) can provide a heterogeneity solution for heterogenous computing and/or gaming systems such that a user 102 associated with one or more of such systems can have an NFT enabled experience across one or more gaming channels of at least one of such computing and/or gaming systems.

Further, as the above-described computing system and/or identification code(s) according to example embodiments of the present disclosure can allow for elimination of the task of accessing data on a blockchain (e.g., blockchain 142 and/or blockchain 440) to confirm authenticity of an NFT 144 (e.g., the existence of NFT 144) and/or the NFT 144 associations defined within each of such identification codes (e.g., association of a gaming device with an NFT 144, association of a gameplay outcome with an NFT 144, association of a voucher with an NFT 144, association of a metaverse player with an NFT 144, etc.), intermediary server system 30 and/or identification code(s) can thereby improve performance, efficiency, and/or workload capacity (e.g., improved bandwidth of communication channels, improved processing capacity, etc.) of one or more resources (e.g., intermediary server system 30, user computing device 50, one or more computing devices 3502, one or more processors 3504, network 18, cross-channel application 52, smart contract 43, etc.) that perform and/or are otherwise involved with one or more operations associated with utilizing an NFT 144 (e.g., NFT creation, modification, transfer, implementation, communication, etc.) across different gaming channels, different entities, and/or different environments (e.g., a metaverse gaming environment, a physical gaming environment, another physical environment, computing environment, computer-based gaming environment, etc.). For example, as intermediary server system 30 and/or identification code(s) according to example embodiments of the present disclosure can allow for elimination (e.g., by intermediary server system 30 and/or one or more resources thereof and/or associated therewith) of the task of accessing data on a blockchain (e.g., each time an entity utilizes an identification code to access and/or implement an NFT 144) to confirm authenticity of an NFT 144 and/or the above-described associations with the NFT 144, intermediary server system 30 and/or identification code(s) can thereby eliminate one or more computationally expensive and/or energy consuming operations that would otherwise be performed by such one or more resources (e.g., intermediary server system 30) in accessing such data on a blockchain. Therefore, intermediary server system 30 and/or identification code(s) according to example embodiments of the present disclosure can improve the performance, efficiency, and/or workload capacity of such one or more resources. Accordingly, intermediary server system 30 and/or identification code(s) according to example embodiments of the present disclosure can thereby also reduce computational costs and/or energy consumption associated with such one or more resources.

Figure 41:
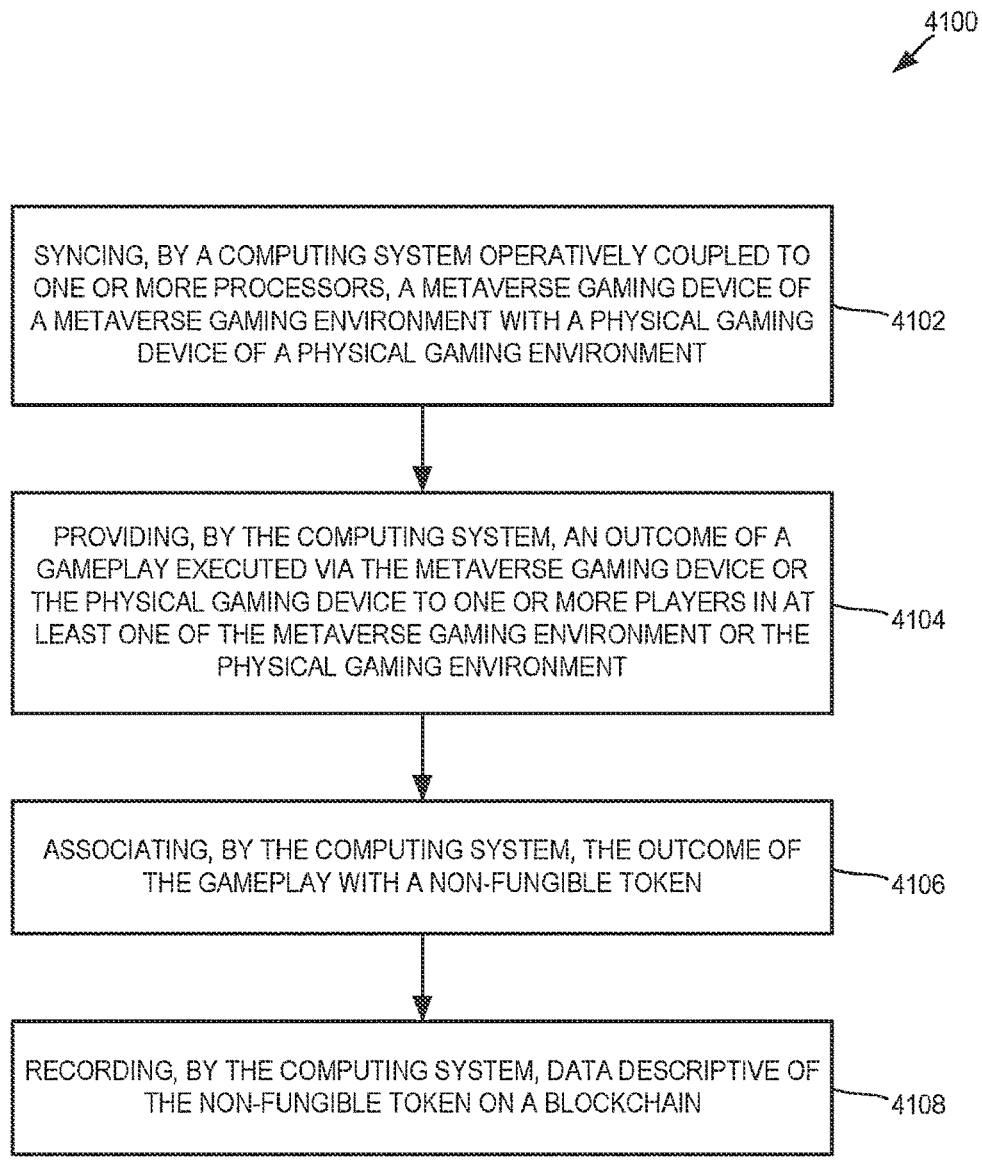
FIG. 41 illustrates a flow diagram of an example, non-limiting computer-implemented method that can facilitate integration of NFT and/or metaverse components and/or functionality in a gaming environment according to example embodiments of the present disclosure.

FIG. 41 illustrates a flow diagram of an example, non-limiting computer-implemented method 4100 that can facilitate integration of NFT and/or metaverse components and/or functionality in a gaming environment according to example embodiments of the present disclosure. In one or more embodiments of the present disclosure, one or more portions of computer-implemented method 4100 can be executed and/or implemented by one or more computing systems and/or computing devices including, for example, intermediary server system 30, computing system 3500, one or more computing devices 3502, and/or another computing system and/or computing device described herein. Further, in these one or more embodiments, one or more portions of computer-implemented method 4100 can be executed and/or implemented as an algorithm and/or as machine-readable instructions (e.g., computer software) using, for instance, one or more hardware components of one or more devices and/or systems disclosed herein.

The example embodiment illustrated in FIG. 41 depicts steps performed in a particular order for purposes of illustration and discussion. However, those of ordinary skill in the art, using the disclosures provided herein, will understand that various steps of computer-implemented method 4100 and/or any other methods disclosed herein can be adapted, combined, modified, rearranged, omitted, and/or expanded without deviating from the scope of the present disclosure.

At 4102, computer-implemented method 4100 can include syncing, by a computing system (e.g., intermediary server system 30, computing system 3500, and/or one or more computing devices 3502) operatively coupled to one or more processors (e.g., one or more processors 3504), a metaverse gaming device of a metaverse gaming environment with a physical gaming device of a physical gaming environment. For example, intermediary server system 30, computing system 3500, and/or one or more computing devices 3502 can sync, couple, and/or otherwise associate a physical gaming device such as, for instance, an EGM and/or an ETG with a metaverse gaming device that can include and/or constitute, for instance, application software (e.g., application instance, an application object, a system image, a virtual machine,) that can run as a gaming device in a metaverse gaming environment.

At 4104, computer-implemented method 4100 can include providing, by the computing system, an outcome of a gameplay executed via the metaverse gaming device or the physical gaming device to one or more players in at least one of the metaverse gaming environment or the physical gaming environment. For example, intermediary server system 30, computing system 3500, and/or one or more computing devices 3502 can provide a user 102 with such an outcome via network 18, user computing device 50, cross-channel application 52, GUI 420, and/or a display (e.g., monitor) coupled to one or more computing device 3502.

At 4106, computer-implemented method 4100 can include associating, by the computing system, the outcome of the gameplay with a non-fungible token. For example, as described above, intermediary server system 30, computing system 3500, and/or one or more computing devices 3502 can associate the outcome with an NFT 144 by generating a smart contract 43 having pre-defined terms and/or conditions that associate the outcome with NFT 144. In another example, intermediary server system 30, computing system 3500, and/or one or more computing devices 3502 can associate the outcome with NFT 144 by generating the above-described NFT and outcome identification data that can associate the outcome with NFT 144, where the NFT and outcome identification data can include and/or constitute embedded data descriptive of the outcome and NFT 144. In some embodiments, intermediary server system 30, computing system 3500, and/or one or more computing devices 3502 can further generate the above-described outcome identification code that can include the NFT and outcome identification data and/or embedded data descriptive of the outcome and NFT 144.

At 4108, computer-implemented method 4100 can include recording, by the computing system, data descriptive of the non-fungible token on a blockchain. For example, intermediary server system 30, computing system 3500, and/or one or more computing devices 3502 can employ smart contract 43 to record such data on one or more blocks 442 of blockchain 142 and/or blockchain 440.

Figure 42:
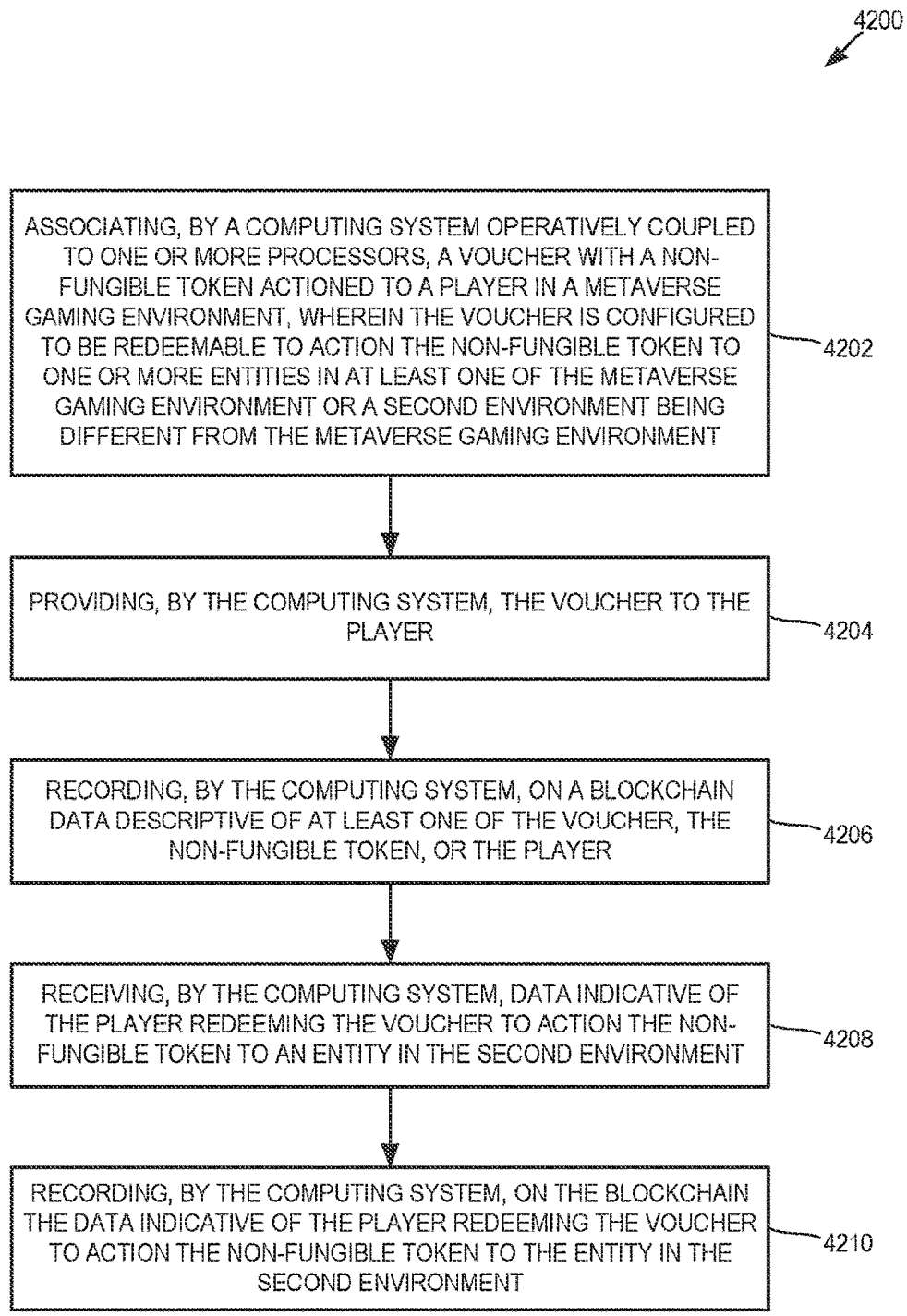
FIG. 42 illustrates a flow diagram of an example, non-limiting computer-implemented method that can facilitate integration of NFT and/or metaverse components and/or functionality in a gaming environment according to example embodiments of the present disclosure.

FIG. 42 illustrates a flow diagram of an example, non-limiting computer-implemented method 4200 that can facilitate integration of NFT and/or metaverse components and/or functionality in a gaming environment according to example embodiments of the present disclosure. In one or more embodiments of the present disclosure, one or more portions of computer-implemented method 4200 can be executed and/or implemented by one or more computing systems and/or computing devices including, for example, intermediary server system 30, computing system 3500, one or more computing devices 3502, and/or another computing system and/or computing device described herein. Further, in these one or more embodiments, one or more portions of computer-implemented method 4200 can be executed and/or implemented as an algorithm and/or as machine-readable instructions (e.g., computer software) using, for instance, one or more hardware components of one or more devices and/or systems disclosed herein.

The example embodiment illustrated in FIG. 42 depicts steps performed in a particular order for purposes of illustration and discussion. However, those of ordinary skill in the art, using the disclosures provided herein, will understand that various steps of computer-implemented method 4200 and/or any other methods disclosed herein can be adapted, combined, modified, rearranged, omitted, and/or expanded without deviating from the scope of the present disclosure.

At 4202, computer-implemented method 4200 can include associating, by a computing system (e.g., intermediary server system 30, computing system 3500, and/or one or more computing devices 3502) operatively coupled to one or more processors (e.g., one or more processors 3504), a voucher with a non-fungible token actioned to a player in a metaverse gaming environment, wherein the voucher is configured to be redeemable to action the non-fungible token to one or more entities in at least one of the metaverse gaming environment or a second environment being different from the metaverse gaming environment.

For example, as described above, intermediary server system 30, computing system 3500, and/or one or more computing devices 3502 can associate the voucher with an NFT 144 by generating a smart contract 43 having predefined terms and/or conditions that associate the voucher with NFT 144. In another example, intermediary server system 30, computing system 3500, and/or one or more computing devices 3502 can associate the voucher with NFT 144 by generating the above-described NFT and voucher identification data that can associate the voucher with NFT 144, where the NFT and voucher identification data can include and/or constitute embedded data descriptive of the voucher and NFT 144. In some embodiments, intermediary server system 30, computing system 3500, and/or one or more computing devices 3502 can further generate the above-described voucher identification code that can include the NFT and voucher identification data and/or embedded data descriptive of the voucher and NFT 144.

At 4204, computer-implemented method 4200 can include providing, by the computing system, the voucher to the player. For example, intermediary server system 30, computing system 3500, and/or one or more computing devices 3502 can provide a user 102 with the voucher via network 18, user computing device 50, cross-channel application 52, and/or GUI 420.

At 4206, computer-implemented method 4200 can include recording, by the computing system, on a blockchain data descriptive of at least one of the voucher, the non-fungible token, or the player. For example, intermediary server system 30, computing system 3500, and/or one or more computing devices 3502 can employ smart contract 43 to record such data (e.g., data descriptive of user's 102 ownership of the voucher and/or NFT 144) on one or more blocks 442 of blockchain 142 and/or blockchain 440.

At 4208, computer-implemented method 4200 can include receiving, by the computing system, data indicative of the player redeeming the voucher to action the non-fungible token to an entity in the second environment. For example, intermediary server system 30, computing system 3500, and/or one or more computing devices 3502 can receive (e.g., via network 18) such data from an entity (e.g., a product and/or service vendor) that accepted and/or converted the voucher such that ownership of NFT 144 was transferred to the entity from user 102. In another example embodiment, intermediary server system 30, computing system 3500, and/or one or more computing devices 3502 can receive (e.g., via network 18) input data indicative of, for instance, scanned data from a scanner that has been used to scan a voucher identification code (e.g., a QR code) associated with the voucher and/or other input data indicative of user's 102 use of the voucher identification code to redeem the voucher to action NFT 144 to an entity located in the metaverse gaming environment, the physical gaming environment, and/or another environment (e.g., another physical environment, computing environment, and/or computer-based gaming environment).

At 4210, computer-implemented method 4200 can include recording, by the computing system, on the blockchain the data indicative of the player redeeming the voucher to action the non-fungible token to the entity in the second environment. For example, intermediary server system 30, computing system 3500, and/or one or more computing devices 3502 can employ smart contract 43 to record such data (e.g., data descriptive of a transfer of user's 102 ownership of the voucher and/or NFT 144 to the entity in the second environment) on one or more blocks 442 of blockchain 142 and/or blockchain 440.

Figure 43:
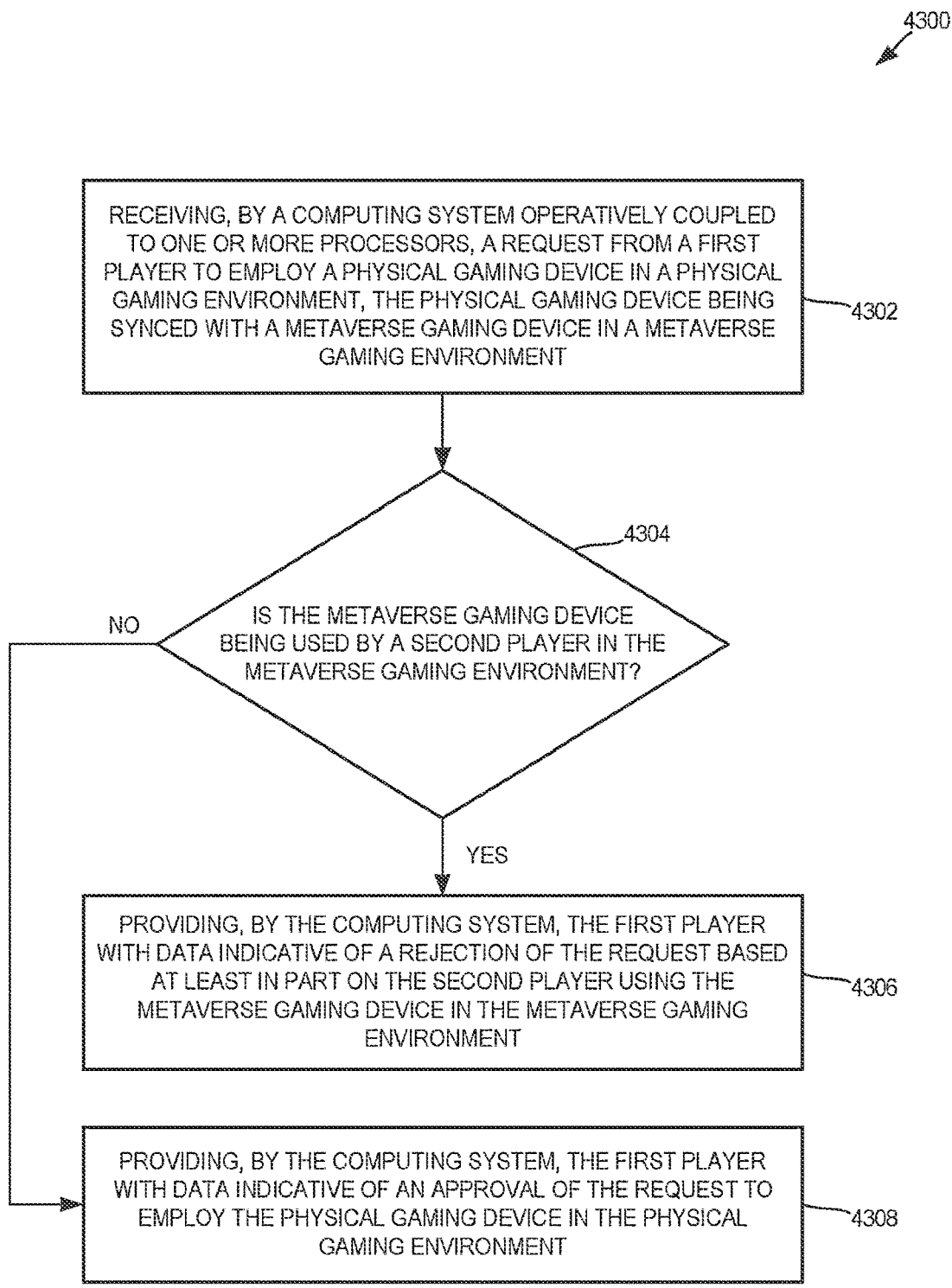
FIG. 43 illustrates a flow diagram of an example, non-limiting computer-implemented method that can facilitate integration of NFT and/or metaverse components and/or functionality in a gaming environment according to example embodiments of the present disclosure.

FIG. 43 illustrates a flow diagram of an example, non-limiting computer-implemented method 4300 that can facilitate integration of NFT and/or metaverse components and/or functionality in a gaming environment according to example embodiments of the present disclosure. In one or more embodiments of the present disclosure, one or more portions of computer-implemented method 4300 can be executed and/or implemented by one or more computing systems and/or computing devices including, for example, intermediary server system 30, computing system 3500, one or more computing devices 3502, and/or another computing system and/or computing device described herein. Further, in these one or more embodiments, one or more portions of computer-implemented method 4300 can be executed and/or implemented as an algorithm and/or as machine-readable instructions (e.g., computer software) using, for instance, one or more hardware components of one or more devices and/or systems disclosed herein.

The example embodiment illustrated in FIG. 43 depicts steps performed in a particular order for purposes of illustration and discussion. However, those of ordinary skill in the art, using the disclosures provided herein, will understand that various steps of computer-implemented method 4300 and/or any other methods disclosed herein can be adapted, combined, modified, rearranged, omitted, and/or expanded without deviating from the scope of the present disclosure.

At 4302, computer-implemented method 4300 can include receiving, by a computing system (e.g., intermediary server system 30, computing system 3500, and/or one or more computing devices 3502) operatively coupled to one or more processors (e.g., one or more processors 3504), a request from a first player to employ a physical gaming device (e.g., an EGM, an ETG, a real gaming table, etc.) in a physical gaming environment, the physical gaming device being synced with a metaverse gaming device in a metaverse gaming environment. For example, intermediary server system 30, computing system 3500, and/or one or more computing devices 3502 can receive such a request from a first user 102 via, for instance, one or more computing devices 3502 (e.g., a computing device 3502 coupled to the physical gaming device), network 18, user computing device 50, cross-channel application 52, and/or GUI 420.

At 4304, computer-implemented method 4300 can include determining, by the computing system, whether the metaverse gaming device is being used by a second player in the metaverse gaming environment. For example, intermediary server system 30, computing system 3500, and/or one or more computing devices 3502 can analyze the status of the metaverse gaming device to determine whether a second user 102 is using the device (e.g., check the processing and/or use status of an application instance, an application object, a system image, a virtual machine, and/or other application software that can execute as the metaverse gaming device in the metaverse gaming environment).

If it is determined at 4304 that the metaverse gaming device is being used by a second player in the metaverse gaming environment, at 4306, computer-implemented method 4300 can include providing, by the computing system, the first player with data indicative of a rejection of the request based at least in part on the second player using the metaverse gaming device in the metaverse gaming environment. For example, intermediary server system 30, computing system 3500, and/or one or more computing devices 3502 can provide such data indicative of a rejection of the request to first user 102 via, for instance, one or more computing devices 3502 (e.g., a computing device 3502 coupled to the physical gaming device), network 18, user computing device 50, cross-channel application 52, and/or GUI 420.

If it is determined at 4304 that the metaverse gaming device is not being used by a second player in the metaverse gaming environment, at 4308, computer-implemented method 4300 can include providing, by the computing system, the first player with data indicative of an approval of the request to employ the physical gaming device in the physical gaming environment. For example, intermediary server system 30, computing system 3500, and/or one or more computing devices 3502 can provide such data indicative of an approval of the request to first user 102 via, for instance, one or more computing devices 3502 (e.g., a computing device 3502 coupled to the physical gaming device), network 18, user computing device 50, cross-channel application 52, and/or GUI 420.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computing system, comprising:
one or more processors; and
one or more non-transitory computer-readable storage media that store instructions that, when executed by the one or more processors, cause the computing system to perform operations, the operations comprising:
syncing a metaverse gaming device of a metaverse gaming environment with a physical gaming device of a physical gaming environment;
receiving data indicative of a first player employing the metaverse gaming device in the metaverse gaming environment;
receiving a request from a second player to employ the physical gaming device in the physical gaming environment;
providing the second player with data indicative of a rejection of the request based at least in part on the data indicative of the first player employing the metaverse gaming device in the metaverse gaming environment;
providing an outcome of a gameplay executed via the metaverse gaming device or the physical gaming device to one or more players in at least one of the metaverse gaming environment or the physical gaming environment;
associating the outcome of the gameplay with a non-fungible token; and
recording data descriptive of the non-fungible token on a blockchain.

2. The computing system of claim 1, wherein the operations further comprise:
providing the outcome of the gameplay to the one or more players via at least one of the metaverse gaming device or the physical gaming device.

3. The computing system of claim 1, wherein the operations further comprise:
employing at least one of an augmented reality process or a virtual reality process to provide a metaverse gaming experience associated with the gameplay to a player participating in the gameplay while being located at the physical gaming device or in the physical gaming environment.

4. The computing system of claim 1, wherein the operations further comprise:

receiving a request from a player employing the metaverse gaming device to allow the player to participate in the gameplay via the metaverse gaming device, the gameplay to be executed via the physical gaming device; and providing the player with the outcome of the gameplay via the metaverse gaming device.

5. The computing system of claim 1, wherein the operations further comprise:

associating at least one of the metaverse gaming device or the physical gaming device with a second non-fungible token; and recording data descriptive of the second non-fungible token on the blockchain.

6. The computing system of claim 1, wherein recording the data descriptive of the non-fungible token on the blockchain comprises:

recording on the blockchain data descriptive of an association of the outcome of the gameplay with at least one of the non-fungible token, the metaverse gaming device, or the physical gaming device.

7. The computing system of claim 1, wherein the physical gaming device comprises a table game that is associated with a computing device, and wherein at least one of the table game or the computing device are physically located in the physical gaming environment.

8. The computing system of claim 1, wherein the physical gaming device comprises a table game that is associated with a computing device, wherein at least one of the table game or the computing device are physically located in the physical gaming environment, and wherein syncing the metaverse gaming device with the physical gaming device comprises:

syncing the metaverse gaming device with the computing device.

9. The computing system of claim 1, wherein the physical gaming device comprises at least one of an electronic gaming machine or an electronic table game that is physically located in the physical gaming environment.

10. The computing system of claim 1, wherein the metaverse gaming device comprises at least one of an application instance, an application object, a system image, or a virtual machine that corresponds to the physical gaming device.

11. A computer-implemented method, comprising:

syncing, by a computing system operatively coupled to one or more processors, a metaverse gaming device of a metaverse gaming environment with a physical gaming device of a physical gaming environment;

receiving data indicative of a first player employing the physical gaming device in the physical gaming environment;

receiving a request from a second player to employ the metaverse gaming device in the metaverse gaming environment; and providing the second player with data indicative of a rejection of the request based at least in part on the data indicative of the first player employing the physical gaming device in the physical gaming environment;

providing, by the computing system, an outcome of a gameplay executed via the metaverse gaming device or the physical gaming device to one or more players in at least one of the metaverse gaming environment or the physical gaming environment;

associating, by the computing system, the outcome of the gameplay with a non-fungible token; and recording, by the computing system, data descriptive of the non-fungible token on a blockchain.

12. The computer-implemented method of claim 11, further comprising:

providing, by the computing system, the outcome of the gameplay to the one or more players via at least one of the metaverse gaming device or the physical gaming device.

13. The computer-implemented method of claim 11, further comprising:

employing, by the computing system, at least one of an augmented reality process or a virtual reality process to provide a metaverse gaming experience associated with the gameplay to a player participating in the gameplay while being located at the physical gaming device or in the physical gaming environment.

14. The computer-implemented method of claim 11, further comprising:

receiving, by the computing system, a request from a player employing the metaverse gaming device to allow the player to participate in the gameplay via the metaverse gaming device, the gameplay to be executed via the physical gaming device; and providing, by the computing system, the player with the outcome of the gameplay via the metaverse gaming device.

15. The computer-implemented method of claim 11, further comprising:

associating, by the computing system, at least one of the metaverse gaming device or the physical gaming device with a second non-fungible token; and recording, by the computing system, data descriptive of the second non-fungible token on the blockchain.

16. The computer-implemented method of claim 11, wherein recording, by the computing system, the data descriptive of the non-fungible token on the blockchain comprises:

recording, by the computing system, on the blockchain data descriptive of an association of the outcome of the gameplay with at least one of the non-fungible token, the metaverse gaming device, or the physical gaming device.

17. The computer-implemented method of claim 11, wherein the physical gaming device comprises a table game that is associated with a computing device, and wherein at least one of the table game or the computing device are physically located in the physical gaming environment.

18. A computing system, comprising:

one or more processors; and one or more non-transitory computer-readable storage media that store instructions that, when executed by the one or more processors, cause the computing system to perform operations, the operations comprising:

receiving data indicative of a first player employing a metaverse gaming device in a metaverse gaming environment;

receiving a request from a second player to employ a physical gaming device in a physical gaming environment; and providing the second player with data indicative of a rejection of the request based at least in part on the data indicative of the first player employing the metaverse gaming device in the metaverse gaming environment;

associating a voucher with a non-fungible token actioned to the first player in the metaverse gaming environment, wherein the voucher is configured to be redeemable to action the non-fungible token to one or more entities in at least one of the metaverse gaming environment or a second environment being different from the metaverse gaming environment;

providing the voucher to the first player;

recording on a blockchain data descriptive of at least one of the voucher, the non-fungible token, or the first player;

receiving data indicative of the first player redeeming the voucher to action the non-fungible token to an entity in the second environment; and recording on the blockchain the data indicative of the first player redeeming the voucher to action the non-fungible token to the entity in the second environment.

* * * * *